US012514418B2

(12) United States Patent
Conrad

(10) Patent No.: US 12,514,418 B2
(45) Date of Patent: Jan. 6, 2026

(54) HAND VACUUM CLEANER

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 4 days.

(21) Appl. No.: 18/764,841

(22) Filed: Jul. 5, 2024

(65) Prior Publication Data

US 2024/0358212 A1 Oct. 31, 2024

Related U.S. Application Data

(63) Continuation-in-part of application No. 18/331,339, filed on Jun. 8, 2023, which is a continuation of
(Continued)

(51) Int. Cl.
*B04C 5/04* (2006.01)
*A47L 5/16* (2006.01)
(Continued)

(52) U.S. Cl.
CPC ............... *A47L 9/1616* (2013.01); *A47L 5/16* (2013.01); *A47L 9/0606* (2013.01); *A47L 9/1683* (2013.01); *B04C 5/04* (2013.01); *A47L 9/122* (2013.01); *A47L 9/1608* (2013.01); *A47L 9/1625* (2013.01); *A47L 9/165* (2013.01);
(Continued)

(58) Field of Classification Search
CPC ........ A47L 9/1616; A47L 5/16; A47L 9/0606; A47L 9/1683; A47L 9/122; A47L 9/1608; A47L 9/1625; A47L 9/165; A47L 9/1666; A47L 9/1691; A47L 9/24; A47L 9/246; A47L 9/2857; A47L 5/24; A47L 9/106; A47L 9/2884; A47L 9/322; B04C 5/04; Y10S 55/03
See application file for complete search history.

(56) References Cited

U.S. PATENT DOCUMENTS

| | | | |
|---|---|---|---|
| 2,327,553 | A | 8/1943 | Ponselle |
| 3,870,486 | A | 3/1975 | Eriksson et al. |

(Continued)

FOREIGN PATENT DOCUMENTS

| | | | |
|---|---|---|---|
| CA | 2275675 | A1 | 12/1999 |
| CA | 2288544 | A1 | 5/2000 |

(Continued)

OTHER PUBLICATIONS

U.S. Appl. No. 09/343,479, filed Jun. 30, 1999.
(Continued)

*Primary Examiner* — Dung H Bui
(74) *Attorney, Agent, or Firm* — Philip C. Mendes da Costa; SMART & BIGGAR LP

(57) ABSTRACT

A hand vacuum cleaner has a hand vacuum cleaner axis that extends centrally from a front end of the hand vacuum cleaner rearwardly to a rear end of the hand vacuum cleaner. The hand vacuum cleaner has a cyclone assembly including a cyclone chamber and a dirt collection chamber. A line that extends in a common horizontal direction with the hand vacuum cleaner axis extends through the cyclone chamber and the dirt collection chamber.

20 Claims, 91 Drawing Sheets

Related U.S. Application Data application No. 17/493,389, filed on Oct. 4, 2021, now Pat. No. 11,707,173, which is a continuation of application No. 17/023,101, filed on Sep. 16, 2020, now Pat. No. 11,166,609, which is a continuation of application No. 16/039,962, filed on Jul. 19, 2018, now Pat. No. 10,806,317.

(51) Int. Cl.
*A47L 9/06* (2006.01)
*A47L 9/16* (2006.01)
*A47L 9/12* (2006.01)
*A47L 9/24* (2006.01)
*A47L 9/28* (2006.01)

(52) U.S. Cl.
CPC ........... *A47L 9/1666* (2013.01); *A47L 9/1691* (2013.01); *A47L 9/24* (2013.01); *A47L 9/246* (2013.01); *A47L 9/2857* (2013.01); *Y10S 55/03* (2013.01)

(56) References Cited

U.S. PATENT DOCUMENTS 4,179,769 A 12/1979 Lundquist
4,185,354 A 1/1980 Brazier
4,466,155 A 8/1984 Grave
5,267,371 A 12/1993 Soler et al.
5,358,290 A 10/1994 Fleet et al.
5,388,301 A 2/1995 Bosyj et al.
5,412,837 A 5/1995 Peter
5,653,880 A 8/1997 Mouton
5,810,558 A 9/1998 Streeter
5,974,625 A 11/1999 Garner
6,083,292 A 7/2000 Fumagalli
6,098,244 A 8/2000 Conrad et al.
6,099,661 A 8/2000 Conrad
6,101,672 A 8/2000 Conrad et al.
6,123,779 A 9/2000 Conrad et al.
6,129,775 A 10/2000 Conrad et al.
6,135,708 A 10/2000 Conrad et al.
6,168,716 B1 1/2001 Conrad et al.
6,170,119 B1 1/2001 Conrad et al.
6,173,474 B1 1/2001 Conrad
6,174,127 B1 1/2001 Conrad et al.
6,183,641 B1 2/2001 Conrad et al.
6,224,325 B1 5/2001 Conrad et al.
6,231,645 B1 5/2001 Conrad et al.
6,238,177 B1 5/2001 Conrad et al.
6,243,917 B1 6/2001 Conrad
6,251,296 B1 6/2001 Conrad et al.
6,261,052 B1 7/2001 Conrad et al.
6,261,330 B1 7/2001 Dyson et al.
6,261,379 B1 7/2001 Conrad et al.
6,280,143 B1 8/2001 Parker et al.
6,307,358 B1 10/2001 Conrad
6,312,594 B1 11/2001 Conrad et al.
6,328,527 B1 12/2001 Conrad et al.
6,334,234 B1 1/2002 Conrad et al.
6,344,064 B1 2/2002 Conrad
6,425,913 B1 7/2002 Croggon
6,440,191 B1 8/2002 Berfield et al.
6,440,197 B1 8/2002 Conrad et al.
6,457,205 B1 10/2002 Conrad
6,532,620 B2 3/2003 Oh
6,533,834 B2 3/2003 Conrad et al.
6,599,340 B2 7/2003 Conrad et al.
6,613,129 B2 9/2003 Gen
6,719,830 B2 4/2004 Illingworth et al.
6,757,935 B1 7/2004 Sjoberg
6,782,585 B1 8/2004 Conrad et al.
6,810,558 B2 11/2004 Lee
6,896,720 B1 5/2005 Arnold et al.
6,902,596 B2 6/2005 Conrad et al.
7,014,671 B2 3/2006 Oh
7,152,275 B2 12/2006 Hitzelberger et al.
7,175,682 B2 2/2007 Nakai et al.
7,186,283 B2 3/2007 Vuijk
7,222,392 B2 5/2007 Mccormick et al.
7,261,754 B2 8/2007 Oh et al.
7,329,294 B2 2/2008 Conrad
7,422,615 B2 9/2008 Kim
7,556,662 B2 7/2009 Lee et al.
7,594,944 B2 9/2009 Oh
7,628,833 B2 12/2009 Oh
7,632,324 B2 12/2009 Makarov et al.
7,632,327 B2 12/2009 Yoo
7,635,400 B2 12/2009 Yoo
7,740,675 B2 6/2010 Conrad
7,749,293 B2 7/2010 Conrad
7,749,296 B2 7/2010 Han et al.
7,770,256 B1 8/2010 Fester
7,776,120 B2 8/2010 Conrad
7,780,752 B2 8/2010 Cha et al.
7,785,383 B2 8/2010 Oh et al.
7,803,207 B2 9/2010 Conrad
7,811,345 B2 10/2010 Conrad
7,867,308 B2 1/2011 Conrad
7,879,121 B2 2/2011 Oh
7,922,794 B2 4/2011 Morphey
7,941,895 B2 5/2011 Conrad
RE42,873 E * 11/2011 Walker .................... A47L 9/106
15/354
8,127,398 B2 3/2012 Conrad
8,146,201 B2 4/2012 Conrad
8,151,407 B2 4/2012 Conrad
8,176,596 B2 5/2012 Conrad
8,192,515 B2 6/2012 Conrad
8,292,979 B2 10/2012 Conrad
8,296,900 B2 10/2012 Conrad
8,302,250 B2 11/2012 Dyson et al.
8,347,455 B2 1/2013 Dyson et al.
8,349,428 B2 1/2013 Conrad
8,370,993 B2 2/2013 Conrad
8,375,508 B2 2/2013 Conrad
8,375,509 B2 2/2013 Bates et al.
8,448,291 B2 5/2013 Conrad
8,479,358 B2 7/2013 Conrad
8,486,170 B2 7/2013 Conrad et al.
8,510,907 B2 8/2013 Conrad
8,533,904 B2 9/2013 Conrad
8,561,257 B2 10/2013 Conrad
8,567,005 B2 10/2013 Conrad
8,578,550 B2 11/2013 Conrad
8,578,553 B2 11/2013 Conrad
8,590,102 B2 11/2013 Conrad
8,607,407 B2 12/2013 Conrad
8,621,709 B2 1/2014 Conrad
8,640,304 B2 2/2014 Conrad
8,646,147 B2 2/2014 Conrad
8,659,184 B2 2/2014 Conrad
8,677,554 B2 3/2014 Conrad
8,677,558 B2 3/2014 Conrad
8,713,751 B2 5/2014 Conrad
8,813,305 B2 8/2014 Conrad
8,834,209 B2 9/2014 Conrad
8,869,344 B2 10/2014 Conrad
8,869,345 B2 10/2014 Conrad
8,869,348 B2 10/2014 Conrad
8,875,340 B2 11/2014 Conrad
8,875,342 B2 11/2014 Conrad
9,027,198 B2 5/2015 Conrad
9,027,203 B2 5/2015 Conrad et al.
9,066,642 B2 6/2015 Conrad
9,119,513 B2 9/2015 Conrad
9,161,666 B2 10/2015 Conrad
9,161,669 B2 10/2015 Conrad
9,167,944 B2 10/2015 Conrad
9,204,769 B2 12/2015 Conrad
9,204,773 B2 12/2015 Conrad
9,215,960 B2 12/2015 Conrad
9,226,633 B2 1/2016 Conrad et al.
9,227,151 B2 1/2016 Conrad

(56) References Cited

U.S. PATENT DOCUMENTS 9,227,201 B2 1/2016 Conrad
9,232,881 B2 1/2016 Conrad
9,238,235 B2 1/2016 Conrad
9,295,995 B2 3/2016 Conrad
9,314,138 B2 4/2016 Conrad
9,314,139 B2 4/2016 Conrad et al.
9,320,401 B2 4/2016 Conrad
9,326,652 B2 5/2016 Conrad
9,364,127 B2 6/2016 Conrad
9,427,122 B2 8/2016 Conrad et al.
9,427,126 B2 8/2016 Conrad
9,433,332 B2 9/2016 Conrad
9,451,852 B2 9/2016 Conrad
9,451,855 B2 9/2016 Conrad
9,456,721 B2 10/2016 Conrad
9,492,045 B2 11/2016 Conrad
9,526,394 B2 12/2016 Conrad
9,572,463 B2 2/2017 Conrad
9,591,952 B2 3/2017 Conrad
9,591,958 B2 3/2017 Conrad
9,775,484 B2 10/2017 Conrad
9,801,513 B2 10/2017 Conrad et al.
9,820,621 B2 11/2017 Conrad et al.
9,848,748 B2 12/2017 Stickney et al.
10,064,530 B2 9/2018 Krebs et al.
10,076,183 B2 9/2018 Conrad et al.
10,149,587 B2 12/2018 Conrad et al.
10,159,393 B2 12/2018 Conrad
10,201,260 B2 2/2019 Conrad et al.
10,214,349 B2 2/2019 Conrad
10,251,519 B2 4/2019 Conrad
10,357,136 B2 7/2019 Conrad
10,537,216 B2 1/2020 Conrad
10,537,219 B2 1/2020 Conrad et al.
10,568,477 B2 2/2020 Conrad
10,575,693 B2 3/2020 Conrad
10,667,663 B2 6/2020 Conrad
10,687,679 B2 6/2020 Conrad et al.
10,729,294 B2 8/2020 Conrad et al.
10,791,890 B2 10/2020 Conrad
10,791,896 B2 10/2020 Conrad
10,888,205 B2 1/2021 Conrad et al.
10,932,634 B2 3/2021 Conrad
10,959,588 B2 3/2021 Conrad et al.
11,013,378 B2 5/2021 Conrad
11,108,254 B2 8/2021 Conrad
11,135,602 B2 10/2021 Conrad
11,154,169 B2 10/2021 Conrad
11,198,085 B2 12/2021 Conrad et al.
11,213,179 B2 1/2022 Conrad
11,246,462 B2 2/2022 Conrad
11,285,495 B2 3/2022 Conrad
11,318,482 B2 5/2022 Conrad
11,478,116 B2 10/2022 Conrad
11,478,117 B2 10/2022 Conrad et al.
11,529,034 B2 12/2022 Conrad
11,534,041 B2 12/2022 Conrad
11,534,043 B2 12/2022 Conrad
11,534,702 B2 12/2022 Conrad
11,547,258 B2 1/2023 Conrad
11,571,097 B2 2/2023 Conrad
11,612,290 B2 3/2023 Conrad
11,641,995 B2 5/2023 Conrad
11,707,170 B2 7/2023 Conrad
11,737,625 B2 8/2023 Conrad
11,745,131 B2 9/2023 Conrad
11,793,374 B2 10/2023 Conrad
11,839,343 B2 12/2023 Conrad et al.
11,841,024 B2 12/2023 Conrad
11,857,142 B2 1/2024 Conrad
11,950,745 B2 4/2024 Conrad et al.
12,053,143 B2 8/2024 Conrad
12,075,966 B2 9/2024 Conrad
2001/0027587 A1 10/2001 Conrad et al.
2002/0062531 A1 5/2002 Oh
2002/0062632 A1 5/2002 Oh
2002/0073663 A1 6/2002 Sepke et al.
2002/0137059 A1 9/2002 Rothwarf et al.
2002/0162188 A1 11/2002 Harmen
2003/0106182 A1 6/2003 Lee
2003/0201754 A1 10/2003 Conrad
2004/0177472 A1 9/2004 Go et al.
2004/0216266 A1 11/2004 Conrad
2005/0160554 A1 7/2005 Ueyama et al.
2006/0016044 A1 1/2006 Wiedemann
2006/0080947 A1 4/2006 Lee et al.
2006/0196004 A1 9/2006 Conrad
2006/0230724 A1 10/2006 Han et al.
2007/0011998 A1 1/2007 Yoo et al.
2007/0012003 A1 1/2007 Oh et al.
2007/0067944 A1 3/2007 Kitamura et al.
2007/0079580 A1 4/2007 Oh
2007/0079584 A1 4/2007 Kim et al.
2007/0079585 A1 4/2007 Oh et al.
2007/0163072 A1 7/2007 Sepke et al.
2007/0214754 A1 9/2007 Kim
2008/0040883 A1 2/2008 Beskow et al.
2008/0134460 A1 6/2008 Conrad
2008/0172992 A1 7/2008 Conrad
2008/0178416 A1 7/2008 Conrad
2008/0178418 A1 7/2008 Conrad
2008/0179133 A1 7/2008 Conrad
2008/0196366 A1 8/2008 Conrad
2008/0216281 A1 9/2008 Conrad
2008/0216282 A1 9/2008 Conrad
2008/0223010 A1 9/2008 Han et al.
2009/0133370 A1 5/2009 Yoo et al.
2009/0158932 A1 6/2009 Arnold
2009/0165431 A1 7/2009 Oh
2009/0172913 A1* 7/2009 Hyun .................... A47L 9/1625 15/347
2009/0178376 A1* 7/2009 Ha ........................ A47L 9/1683 55/344
2009/0205160 A1 8/2009 Conrad
2009/0205161 A1 8/2009 Conrad
2009/0300874 A1 12/2009 Tran et al.
2010/0175217 A1 7/2010 Conrad
2010/0212104 A1 8/2010 Conrad
2010/0229323 A1 9/2010 Conrad
2010/0229325 A1 9/2010 Conrad
2010/0229326 A1 9/2010 Conrad
2010/0229334 A1 9/2010 Conrad
2010/0229335 A1 9/2010 Conrad
2010/0242210 A1 9/2010 Conrad
2010/0243158 A1 9/2010 Conrad
2010/0251507 A1 10/2010 Conrad
2010/0299865 A1 12/2010 Conrad
2010/0299866 A1 12/2010 Conrad
2011/0146024 A1 6/2011 Conrad
2011/0219567 A1 9/2011 Conrad
2011/0219574 A1 9/2011 Conrad
2011/0219579 A1 9/2011 Conrad
2013/0227813 A1 9/2013 Conrad
2014/0215751 A1 8/2014 Kasper et al.
2014/0237757 A1* 8/2014 Conrad ................. A47L 9/1608 15/353
2014/0237768 A1 8/2014 Conrad
2019/0183307 A1 6/2019 Irfan et al.
2020/0237171 A1* 7/2020 Xu ........................ A47L 9/1625
2020/0305671 A1 10/2020 Conrad
2021/0228032 A1 7/2021 Conrad
2021/0330157 A1 10/2021 Conrad
2021/0386258 A1 12/2021 Conrad
2022/0142440 A1 5/2022 Conrad
2022/0151446 A1 5/2022 Conrad et al.
2023/0098664 A1 3/2023 Conrad
2023/0263350 A1 8/2023 Conrad et al.
2023/0348169 A1 11/2023 Conrad
2024/0008701 A1 1/2024 Conrad et al.
2024/0016351 A1 1/2024 Conrad
2024/0041284 A1 2/2024 Conrad
2024/0138634 A1 5/2024 Conrad
2024/0172909 A1 5/2024 Conrad
2024/0180373 A1 6/2024 Conrad et al.

(56) References Cited

U.S. PATENT DOCUMENTS

| | | | |
|---|---|---|---|
| 2024/0180379 | A1 | 6/2024 | Conrad |
| 2024/0245271 | A1 | 7/2024 | Conrad |
| 2024/0335077 | A1 | 10/2024 | Conrad |
| 2024/0358212 | A1 | 10/2024 | Conrad |
| 2024/0382056 | A1 | 11/2024 | Conrad |

FOREIGN PATENT DOCUMENTS

| | | | |
|---|---|---|---|
| CA | 2258416 | A1 | 7/2000 |
| CA | 2258419 | A1 | 7/2000 |
| CA | 2258421 | A1 | 7/2000 |
| CA | 2258422 | A1 | 7/2000 |
| CA | 2258423 | A1 | 7/2000 |
| CA | 2258426 | A1 | 7/2000 |
| CA | 2330801 | A1 | 7/2001 |
| CA | 2338193 | A1 | 7/2002 |
| CA | 2339514 | A1 | 9/2002 |
| CA | 2342673 | A1 | 9/2002 |
| CA | 2342993 | A1 | 9/2002 |
| CA | 2658014 | A1 | 9/2010 |
| CA | 2658022 | A1 | 9/2010 |
| CA | 2658160 | A1 | 9/2010 |
| CA | 2658366 | A1 | 9/2010 |
| CA | 2658397 | A1 | 9/2010 |
| CA | 2658497 | A1 | 9/2010 |
| CA | 2658643 | A1 | 9/2010 |
| CA | 2658644 | A1 | 9/2010 |
| CA | 2659212 | A1 | 9/2010 |
| DE | 112006003479 | T5 | 12/2008 |
| DE | 112007001314 | T5 | 4/2009 |
| EP | 885585 | A1 | 12/1998 |
| EP | 836827 | B1 | 11/2000 |
| EP | 885585 | B1 | 4/2002 |
| EP | 1602308 | A1 | 12/2005 |
| EP | 1938733 | A1 | 7/2008 |
| EP | 1952743 | A2 | 8/2008 |
| EP | 1952743 | B1 | 11/2011 |
| GB | 2319738 | A | 6/1998 |
| JP | 2012011253 | A | 1/2012 |
| WO | 9619294 | A1 | 6/1996 |
| WO | 0010718 | A1 | 3/2000 |
| WO | 2004008932 | A1 | 1/2004 |
| WO | 2008070965 | A1 | 6/2008 |
| WO | 2009026709 | A1 | 3/2009 |
| WO | 2010102396 | A1 | 9/2010 |

OTHER PUBLICATIONS

U.S. Appl. No. 18/590,937, filed Feb. 28, 2024.
U.S. Appl. No. 18/318,307, filed May 16, 2023.
U.S. Appl. No. 18/585,983, filed Feb. 23, 2024.
U.S. Appl. No. 18/590,658, filed Feb. 28, 2024.
U.S. Appl. No. 18/596,575, filed Mar. 5, 2024.
U.S. Appl. No. 18/597,664, filed Mar. 6, 2024.
International Search Report in relation to PCT/CA2012/00812 mailed on May 25, 2012.
International Preliminary Report on Patentability received on the corresponding international patent application No. PCT/CA2012/000182, dated Sep. 10, 2013.
English machine translation of DE112006003479T5, published on Apr. 23, 2009.
English machine translation of DE112007001314T5, published on Dec. 18, 2008.
Office action issued in related U.S. Appl. No. 13/508,970, Dated Feb. 7, 2014.
English machine translation of the Abstract of WO96/19294, published on Jun. 27, 1996.
English machine translation of JP2012011253, published on Jan. 19, 2012.

* cited by examiner

HAND VACUUM CLEANER

CROSS-REFERENCE TO RELATED APPLICATIONS

This application is a continuation-in-part of U.S. patent application Ser. No. 18/331,339 filed on Jun. 8, 2023 and which is still pending, which itself is a continuation of U.S. patent application Ser. No. 17/493,389, filed on Oct. 4, 2021 and issued as U.S. Pat. No. 11,707,173 on Jul. 25, 2023, which itself is a continuation of U.S. patent application Ser. No. 17/023,101, filed on Sep. 16, 2020 and issued as U.S. Pat. No. 11,166,609 on Nov. 9, 2021, which itself is a continuation of Ser. No. 16/039,962, filed on Jul. 19, 2018 and issued as U.S. Pat. No. 10,806,317 on Oct. 20, 2020.

FIELD

This disclosure relates generally to surface cleaning apparatuses. In a preferred embodiment, the surface cleaning apparatus comprises a portable surface cleaning apparatus, such as a hand vacuum cleaner.

INTRODUCTION

The following is not an admission that anything discussed below is part of the prior art or part of the common general knowledge of a person skilled in the art.

Various types of surface cleaning apparatus are known, including upright surface cleaning apparatus, canister surface cleaning apparatus, stick surface cleaning apparatus, central vacuum systems, and hand carriable surface cleaning apparatus such as hand vacuums. Further, various designs for cyclonic hand vacuum cleaners, including battery operated cyclonic hand vacuum cleaners, are known in the art.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

In accordance with one aspect of this disclosure, which may be used alone or in combination with one or more of the other aspects of this disclosure, a hand vacuum cleaner has a front end, a rear end, a central longitudinal axis that extends rearwardly through the hand vacuum cleaner from the front end to the rear end, a motor and fan assembly, an air treatment member, which may be an air treatment chamber such as a cyclone or a non-cyclonic momentum separator, and one or more energy storage members. The motor and fan assembly and the energy storage member(s) are positioned at least partially or fully on opposite ends (in the forward/rearward direction) of the air treatment member (e.g., one or both may be partially nested in and/or partially overlie the air treatment member) and optionally at opposite ends of the hand vacuum cleaner. Accordingly, for example, the motor and fan assembly may be positioned at the front end of the vacuum cleaner and the energy storage member(s) may be positioned at the rear end of the hand vacuum cleaner. Alternatively, the motor and fan assembly may be positioned at the rear end and the energy storage member(s) may be positioned at the front end. Since the energy storage members and the motor and fan assembly may be relatively heavy, an advantage of this aspect is that positioning the heavier components at either end of the vacuum may provide a better balanced hand vacuum cleaner that is comfortable to use.

In accordance with this aspect of the disclosure, there is provided a hand vacuum cleaner comprising:

a) an air flow path from a dirty air inlet, which is provided at a front end of the hand vacuum cleaner, to a clean air outlet, which is positioned rearward of the dirty air inlet;
b) an air treatment assembly comprising an air treatment chamber, the air treatment chamber comprising a central longitudinal axis that extends centrally through the air treatment chamber from a front end of the air treatment chamber to a rear end of the air treatment chamber;
c) a motor and fan assembly; and,
d) in operation, an energy storage member housing comprising an energy storage member, wherein the motor and fan assembly is provided at one of the front end and rear end of the air treatment assembly, and the energy storage member is provided at the other of the front end and rear end of the air treatment assembly.

In accordance with another aspect of this disclosure, which may be used alone or in combination with one or more of the other aspects of this disclosure, a hand vacuum cleaner has a front end having a dirty air inlet, a rear end, a central longitudinal axis that extends rearwardly through the hand vacuum cleaner from the front end to the rear end, a cyclone assembly comprising a cyclone and a front-openable door, wherein the cyclone has a cyclone axis of rotation that extends generally transverse to the forward/rearward direction. For example, if the central longitudinal axis extends horizontally, then the cyclone axis of rotation may extend generally vertically. When an internal component of the vacuum cleaner is to be accessed, for example, for cleaning or emptying of the cyclone and/or a dirt collection chamber for the cyclone, the door may be opened. Optionally, the front-openable door may be a portion of the cyclone, such as a sidewall of the cyclone chamber.

In accordance with this aspect of the disclosure, there is provided a hand vacuum cleaner comprising:

a) an air flow path from a dirty air inlet, which is provided at a front end of the hand vacuum cleaner, to a clean air outlet, which is positioned rearward of the dirty air inlet, wherein a hand vacuum cleaner axis extends rearwardly from the front end of the hand vacuum cleaner to a rear end of the hand vacuum cleaner;
b) a cyclone assembly comprising a cyclone chamber having a cyclone air inlet, a cyclone air outlet and a cyclone axis of rotation, wherein the cyclone axis of rotation extends generally transverse to the hand vacuum cleaner axis;
c) a motor and fan assembly provided in a motor housing, the motor and fan assembly having a motor axis of rotation; and,
d) a handle, wherein the cyclone assembly has an openable portion which is moveable between an open position in which the cyclone assembly is opened and a closed position in which the hand vacuum cleaner is operable to clean a surface, and the openable portion comprises at least a portion of a front wall of the cyclone assembly.

In accordance with another aspect of this disclosure, which may be used alone or in combination with one or more of the other aspects of this disclosure, a hand vacuum cleaner has a front end having a dirty air inlet, a rear end, a central longitudinal axis that extends rearwardly through the hand vacuum cleaner from the front end to the rear end and a cyclone assembly comprising a cyclone, wherein the cyclone has a cyclone axis of rotation that extends generally transverse to the forward/rearward direction. The cyclone has an outlet conduit that is located within the cyclone chamber at the air inlet end of the cyclone (e.g., the upper end of the cyclone). For example, the cyclone may have a vortex finder that extends downwardly into the cyclone. An outlet conduit may extend downstream from the vortex finder rearwardly through the cyclone. Accordingly, the outlet conduit may exit the cyclone through a sidewall of the cyclone. An inlet conduit extends from the dirty air inlet to the cyclone air inlet. If the hand vacuum cleaner is oriented with the cyclone air inlet and the outlet of the vortex finder at an upper end of the cyclone, then at least a portion of the dirty air inlet, e.g., the downstream portion thereof, may extend (e.g., curve) downwardly such that some or all of the air entering the cyclone is introduced such that as the air rotates in the cyclone, the air travels below the outlet conduit and does not impact the conduit. Accordingly, the inlet outlet may comprise or consist of a ramp portion that extends (curves) downwardly in the rearward direction. If a dirt collection chamber is provided forward of the cyclone, then the inlet conduit may extend through the dirt collection chamber. Alternately or in addition, instead of a cyclone, an air treatment chamber, which may be a non-cyclonic momentum separator may be used. An advantage of the tangential inlet with a ramp is that the air coming into the cyclone chamber may travel below the outlet conduit, rather than hitting the outlet conduit and creating turbulence within the chamber.

In accordance with this aspect of the disclosure, there is provided a hand vacuum cleaner comprising:

a) an air flow path from a dirty air inlet, which is provided at a front end of the hand vacuum cleaner, to a clean air outlet, which is positioned rearward of the dirty air inlet, wherein a hand vacuum cleaner axis extends centrally from the front end of the hand vacuum cleaner rearwardly to a rear end of the hand vacuum cleaner;

b) a cyclone assembly comprising a cyclone chamber having an upper end, a lower end, a cyclone chamber sidewall extending between the upper and lower ends of the cyclone chamber, a cyclone air inlet, a cyclone air outlet provided at the upper end of the cyclone chamber and a cyclone axis of rotation, wherein the cyclone axis of rotation extends generally transverse to the hand vacuum cleaner axis, wherein the cyclone air outlet comprises a downstream cyclone air outlet portion that extends generally rearwardly and wherein the cyclone air inlet comprises an outlet port through which, in operation, air passes as the air enters the cyclone chamber;

c) a motor and fan assembly provided in a motor housing, the motor and fan assembly having a motor axis of rotation; and, d) a handle, wherein the dirty air inlet comprises an inlet port, the air flow path comprises an inlet segment extending from the dirty air inlet to the cyclone air inlet, and a rearward projection of the inlet port intersects the cyclone air outlet, and wherein the outlet port of the cyclone air inlet is located below the downstream cyclone air outlet portion.

In accordance with another aspect of this disclosure, which may be used alone or in combination with one or more of the other aspects of this disclosure, a hand vacuum cleaner has a front end having a dirty air inlet, a rear end, a central longitudinal axis that extends rearwardly through the hand vacuum cleaner from the front end to the rear end and a cyclone assembly comprising a cyclone and a dirt collection chamber positioned in front of the cyclone, wherein the cyclone has a cyclone axis of rotation that extends generally transverse to the forward/rearward direction. Dirt that is separated from the air in the cyclone may exit the cyclone via a dirt outlet and be stored within the dirt collection chamber, which may be, at least partially, in front of the front side of the cyclone and at an elevation of the cyclone (e.g., a plane that is transverse to the cyclone axis of rotation may extend through the cyclone and the dirt collection chamber). Optionally, a portion of the dirt collection chamber may also be at an elevation below the cyclone (e.g., a plane that is transverse to the cyclone axis of rotation may extend through the dirt collection chamber and not the cyclone). Alternately, instead of a cyclone, an air treatment chamber, which may be a non-cyclonic momentum separator may be used. An advantage of this aspect is that a dirt collection chamber provided in front of the cyclone provides a larger volume for the collection of dirt particles without increasing the height of the hand vacuum cleaner in the axial direction of the cyclone axis of rotation.

In accordance with this aspect of the disclosure, there is provided a hand vacuum cleaner comprising:

a) an air flow path from a dirty air inlet, which is provided at a front end of the hand vacuum cleaner, to a clean air outlet, which is positioned rearward of the dirty air inlet, wherein a hand vacuum cleaner axis extends centrally from the front end of the hand vacuum cleaner rearwardly to a rear end of the hand vacuum cleaner;

b) a cyclone assembly comprising:

i. a cyclone chamber having an upper end, a lower end, a cyclone chamber sidewall extending between the upper and lower ends of the cyclone chamber, a cyclone air inlet, a cyclone air outlet provided at the upper end of the cyclone chamber, a dirt outlet provided at the lower end of the cyclone chamber and a cyclone axis of rotation, wherein the cyclone axis of rotation extends generally transverse to the hand vacuum cleaner axis; and ii. a dirt collection chamber exterior to the cyclone chamber wherein, in operation, dirt separated from air in the cyclone chamber enters the dirt collection chamber through the dirt outlet;

c) a motor and fan assembly provided in a motor housing, the motor and fan assembly having a motor axis of rotation; and, d) a handle, wherein a line that extends in a common horizontal direction with the hand vacuum cleaner axis extends through the cyclone chamber and the dirt collection chamber.

In accordance with this aspect of the disclosure, there is also provided a hand vacuum cleaner comprising:

a) an air flow path from a dirty air inlet, which is provided at a front end of the hand vacuum cleaner, to a clean air outlet, which is positioned rearward of the dirty air inlet, wherein a hand vacuum cleaner axis extends centrally from the front end of the hand vacuum cleaner rearwardly to a rear end of the hand vacuum cleaner;

b) a cyclone assembly comprising:

i. a cyclone chamber having an upper end, a lower end, a cyclone chamber sidewall extending between the upper and lower ends of the cyclone chamber, a cyclone air inlet, a cyclone air outlet provided at the upper end of the cyclone chamber, a dirt outlet provided at the lower end of the cyclone chamber and a cyclone axis of rotation, wherein the cyclone axis of rotation extends generally transverse to the hand vacuum cleaner axis, wherein the lower end of the cyclone chamber comprises a lower end wall and the dirt outlet comprises an opening between the lower end wall and a lower end of the cyclone chamber sidewall; and ii. a dirt collection chamber exterior to the cyclone chamber wherein, in operation, dirt separated from air in the cyclone chamber enters the dirt collection chamber through the dirt outlet;

c) a motor and fan assembly provided in a motor housing, the motor and fan assembly having a motor axis of rotation; and, d) a handle, wherein the dirt collection chamber comprises:

i. a first portion that underlies the cyclone chamber, the first portion has a first portion length in a horizontal direction of the hand vacuum cleaner axis;

ii. a second portion that is forward of the cyclone chamber, the second portion has a height in a vertical direction of the cyclone axis of rotation from a lower end of the dirt collection chamber to a lower plane that is transverse to the cyclone axis of rotation and is positioned at a lower end of the cyclone chamber sidewall, and the second portion has a second portion length in the horizontal direction.

In accordance with another aspect of this disclosure, which may be used alone or in combination with one or more of the other aspects of this disclosure, a hand vacuum cleaner has a front end having a dirty air inlet, a rear end, a central longitudinal axis that extends rearwardly through the hand vacuum cleaner from the front end to the rear end, a cyclone assembly comprising a cyclone and an optional dirt collection chamber and a handle, wherein the cyclone has a cyclone axis of rotation that extends generally transverse to the forward/rearward direction. A motor and fan assembly is positioned rearward of the cyclone and the handle is positioned rearward of the motor and fan assembly wherein a space (a finger gap) is provided between the handle and the motor and fan assembly to accommodate a user's fingers. The motor and fan assembly may be positioned toward or at the air outlet end (e.g., upper end) of the cyclone and some or all of the dirt collection chamber may be positioned below the motor and fan assembly. Alternately, or in addition, instead of a cyclone, an air treatment member, which may be an air treatment chamber such as a non-cyclonic momentum separator.

In accordance with this aspect of the disclosure, there is provided a hand vacuum cleaner comprising:

a) an air flow path from a dirty air inlet, which is provided at a front end of the hand vacuum cleaner, to a clean air outlet, which is positioned rearward of the dirty air inlet, wherein a hand vacuum cleaner axis extends centrally from the front end of the hand vacuum cleaner rearwardly to a rear end of the hand vacuum cleaner;

b) a cyclone assembly comprising a cyclone chamber having an upper end, a lower end, a cyclone chamber sidewall extending between the upper and lower ends of the cyclone chamber, a cyclone air inlet, a cyclone air outlet, and a cyclone axis of rotation, wherein the cyclone axis of rotation extends generally transverse to the hand vacuum cleaner axis;

c) a motor and fan assembly provided in a motor housing, the motor and fan assembly having a motor axis of rotation; and, d) a handle positioned rearward of the cyclone assembly wherein a finger gap is provided forward of the handle and rearward of the motor and fan assembly.

In accordance with another aspect of this disclosure, which may be used alone or in combination with one or more of the other aspects of this disclosure, a hand vacuum cleaner has a front end having a dirty air inlet, a rear end, a central longitudinal axis that extends rearwardly through the hand vacuum cleaner from the front end to the rear end and a cyclone assembly comprising a cyclone and a dirt collection chamber positioned in front of the cyclone, wherein the cyclone has a cyclone axis of rotation that extends generally transverse to the forward/rearward direction. Dirt that is separated from the air in the cyclone may exit the cyclone via a dirt outlet and be stored within the dirt collection chamber, which is at least partially in front of the front side of the cyclone and at an elevation of the cyclone (e.g., a plane that is transverse to the cyclone axis of rotation may extend through the cyclone and the dirt collection chamber). Optionally, a portion of the dirt collection chamber may also be at an elevation below the cyclone (e.g., a plane that is transverse to the cyclone axis of rotation may extend through the dirt collection chamber and not the cyclone). A front side of the cyclone assembly may be openable for emptying the dirt collection chamber and/or cyclone. For example, part or all of a front wall of the dirt collection chamber may be openable. Optionally, only the portion of the front wall of the portion of the dirt collection chamber that is at an elevation below the cyclone may be openable. Alternately, or in addition, part or all of a lower wall of the cyclone assembly may also be openable by itself or concurrently with the openable portion of the front wall. Alternately, or in addition, instead of a cyclone, an air treatment member, which may be an air treatment chamber such as a non-cyclonic momentum separator.

In accordance with this aspect of the disclosure, there is provided a hand vacuum cleaner comprising:

a) an air flow path from a dirty air inlet, which is provided at a front end of the hand vacuum cleaner, to a clean air outlet, which is positioned rearward of the dirty air inlet, wherein a hand vacuum cleaner axis extends centrally from the front end of the hand vacuum cleaner rearwardly to a rear end of the hand vacuum cleaner;

b) a cyclone assembly comprising a cyclone chamber and a dirt collection chamber exterior to the cyclone chamber, the cyclone chamber having an upper end, a lower end, a cyclone chamber sidewall extending between the upper and lower ends of the cyclone chamber, a cyclone air inlet, a cyclone air outlet, a dirt outlet and a cyclone axis of rotation wherein, in operation, dirt separated from air in the cyclone chamber enters the dirt collection chamber through a dirt outlet of the cyclone chamber, and wherein the cyclone axis of rotation extends generally transverse to the hand vacuum cleaner axis and;

c) a motor and fan assembly provided in a motor housing, the motor and fan assembly having a motor axis of rotation; and, d) a handle wherein a line that extends in a common horizontal direction with the hand vacuum cleaner axis extends through the cyclone chamber and the dirt collection chamber, and wherein the cyclone assembly has a front wall and a rear wall, the cyclone assembly has a first openable portion which is moveable between an open position in which the cyclone assembly is opened and a closed position in which the hand vacuum cleaner is operable to clean a surface, and the openable portion comprises at least a portion of one of the front wall and the rear wall of the cyclone assembly.

In accordance with another aspect of this disclosure, which may be used alone or in combination with one or more of the other aspects of this disclosure, a hand vacuum cleaner has a front end having a dirty air inlet, a rear end, a central longitudinal axis that extends rearwardly through the hand vacuum cleaner from the front end to the rear end and a cyclone assembly comprising a cyclone and an optional dirt collection chamber wherein the cyclone has a cyclone axis of rotation that extends generally parallel to the forward/rearward direction. The cyclone has a cyclone outlet that is provided at the front end of the cyclone chamber. The motor and fan assembly may be provided at the front end of the cyclone or, alternately, rearward of the cyclone, in which case an outlet conduit may extend from the front end of the cyclone rearwardly (through or radially outwardly of) the cyclone to the motor and fan assembly. A front end of the cyclone assembly and/or a lower end of the cyclone assembly may be openable to open the dirt collection chamber, if provided, and the cyclone.

In accordance with this aspect of the disclosure, there is provided a hand vacuum cleaner comprising:

a) an air flow path from a dirty air inlet, which is provided at a front end of the hand vacuum cleaner, to a clean air outlet, which is positioned rearward of the dirty air inlet;
b) an air treatment assembly comprising an air treatment chamber, the air treatment chamber comprising an air treatment chamber air inlet, an air treatment chamber air outlet provided at a front end of the air treatment chamber and a central longitudinal axis that extends centrally through the air treatment chamber from a front end of the air treatment chamber to a rear end of the air treatment chamber;
c) a main body housing a motor and fan assembly; and,
d) a handle provided on the main body, wherein, in operation, the handle is a driving handle of the hand vacuum cleaner.

In accordance with another aspect of this disclosure, which may be used alone or in combination with one or more of the other aspects of this disclosure, a hand vacuum cleaner has a front end having a dirty air inlet, a rear end, a central longitudinal axis that extends rearwardly through the hand vacuum cleaner from the front end to the rear end and a cyclone assembly comprising a cyclone and an optional dirt collection chamber wherein the cyclone has a cyclone axis of rotation that may extend generally parallel to the forward/rearward direction. The cyclone assembly is positioned towards the rear end of the hand vacuum cleaner. The cyclone assembly has an openable portion that may comprise, consist essentially of or consist of a rear wall of the cyclone assembly, which may be an exterior wall, e.g., a rear wall, of the hand vacuum cleaner. The openable portion may open the optional dirt collection chamber and/or the cyclone. An advantage of this aspect is that the cyclone may be easily accessed and/or emptied as needed by opening the rear of the cyclone.

In accordance with this aspect of the disclosure, there is provided a hand vacuum cleaner comprising:

a) an air flow path from a dirty air inlet, which is provided at a front end of the hand vacuum cleaner, to a clean air outlet, which is positioned rearward of the dirty air inlet;
b) an air treatment assembly comprising an air treatment chamber, the air treatment chamber comprising an air treatment chamber air inlet, an air treatment chamber air outlet and a central longitudinal axis that extends centrally through the air treatment chamber from a front end of the air treatment chamber to a rear end of the air treatment chamber;
c) a motor and fan assembly; and,
d) a handle, wherein the air treatment assembly is provided at a rear end of the hand vacuum cleaner and a rear end of the air treatment chamber is openable.

In accordance with another aspect of this disclosure, which may be used alone or in combination with one or more of the other aspects of this disclosure, a hand vacuum cleaner has a telescoping inlet conduit. The inlet may be retracted, e.g., partially or fully, into the hand vacuum cleaner by sliding a telescoping portion of the inlet conduit into, e.g., a stationary portion of the inlet conduit, which may be provided partially or fully internal of the hand vacuum cleaner. Part or all of the inlet conduit (e.g., the stationary portion, may be fixedly mounted to the hand vacuum cleaner and the telescoping portion may be removably mounted to the stationary portion. The inlet conduit may have an associated electrical connector. An advantage of this aspect is that the inlet may be extended when an elongated inlet is required or preferred, but retracted when not required to maintain a compact vacuum.

In accordance with this aspect of the disclosure, there is provided a hand vacuum cleaner comprising:

a) an air flow path from a retractable telescoping dirty air inlet, which is provided at a front end of the hand vacuum cleaner, to a clean air outlet, which is positioned rearward of the dirty air inlet;
b) an air treatment assembly comprising an air treatment chamber, the air treatment chamber comprising an air treatment chamber air inlet, an air treatment chamber air outlet and a central longitudinal axis that extends centrally through the air treatment chamber from a front end of the air treatment chamber to a rear end of the air treatment chamber;
c) a motor and fan assembly; and,
d) a handle.

In accordance with one aspect of this disclosure, which may be used alone or in combination with one or more of the other aspects of this disclosure, a corner or a dirt collection region of a dirt collection region is separated from a remainder of the dirt collection region by a porous member, e.g., a substrate which comprises a porous section, e.g., a mesh material, or the porous member may be a self-supporting screen. The separated portion of the dirt collection region is a sub collection area which may receive finer dirt particles. The porous member may be concurrently opened when the dirt collection region is opened or opened after the dirt collection region is opened. The dirt collection region may be a dirt collection chamber that is external to an air treatment chamber (e.g., a cyclone chamber).

In accordance with this aspect, there is provided a hand vacuum cleaner comprising:

(a) an air flow path from a dirty air inlet, which is provided at a front end of the hand vacuum cleaner, to a clean air outlet, which is positioned rearward of the dirty air inlet, wherein a hand vacuum cleaner axis extends centrally from the front end of the hand vacuum cleaner rearwardly to a rear end of the hand vacuum cleaner;

(b) an air treatment assembly comprising a front wall, a rear wall, an air treatment assembly wall extending from the front wall to the rear wall, the air treatment assembly wall comprising a lower wall portion, a porous member extending from one of the front and rear walls to the lower wall portion;

(c) a motor and fan assembly provided in a motor housing, the motor and fan assembly having a motor axis of rotation; and, (d) a handle, wherein the air treatment assembly comprises a stationary portion and an openable portion, the openable portion is moveable between an open position in which the air treatment assembly is opened and a closed position in which the hand vacuum cleaner is operable to clean a surface.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which:

FIG. 70B is a side cross-sectional view of the hand vacuum cleaner of FIG. 70A with the telescoping inlet in an extended position;

FIG. 71A is a side cross-sectional view of a hand vacuum cleaner with a telescoping inlet and an openable portion in a closed position;

FIG. 71B is a side cross-sectional view of the hand vacuum cleaner of FIG. 71A with the openable portion in an open position;

FIG. 72A is a side cross-sectional view of a hand vacuum cleaner with a telescoping inlet and an openable door and an openable portion in closed positions;

FIG. 72B is a side cross-sectional view of the hand vacuum cleaner of FIG. 72A with the openable door and openable portion in open positions;

FIG. 73A is a side cross-sectional view of a hand vacuum cleaner with a telescoping inlet and an openable portion in a closed position;

FIG. 73B is a side cross-sectional view of the hand vacuum cleaner of FIG. 73A with the openable portion in an open position;

FIG. 74A is a side cross-sectional view of a hand vacuum cleaner with a telescoping inlet and an openable portion and a rotatable handle in closed positions;

FIG. 74B is a side cross-sectional view of the hand vacuum cleaner of FIG. 74A with the openable portion in an open position;

FIG. 74C is a side cross-sectional view of the hand vacuum cleaner of FIG. 74A with the rotatable handle in a rotated position and the openable portion in a closed position;

FIGS. 75-84 are side cross-sectional views of other example hand vacuum cleaners with telescoping inlets in retracted positions;

Figure 85A:
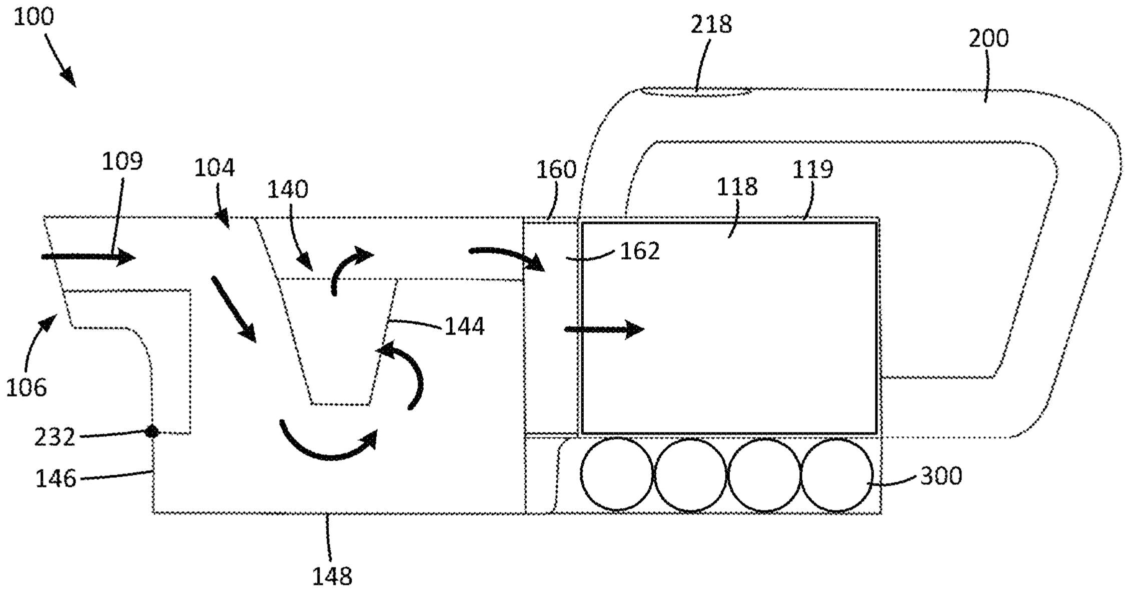
Figure 85B:
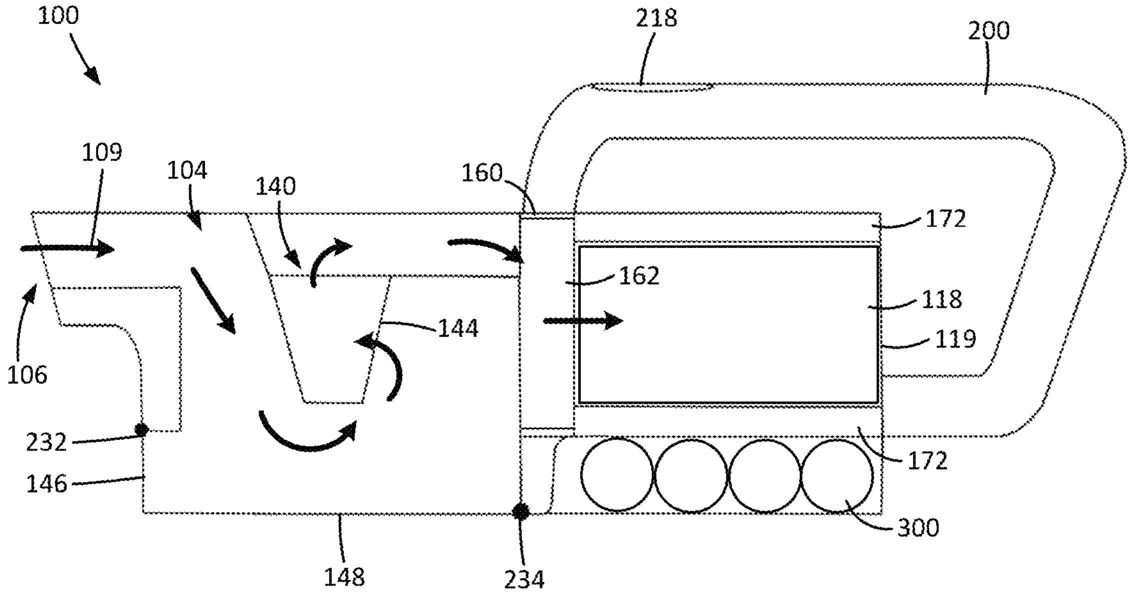
Figure 86:
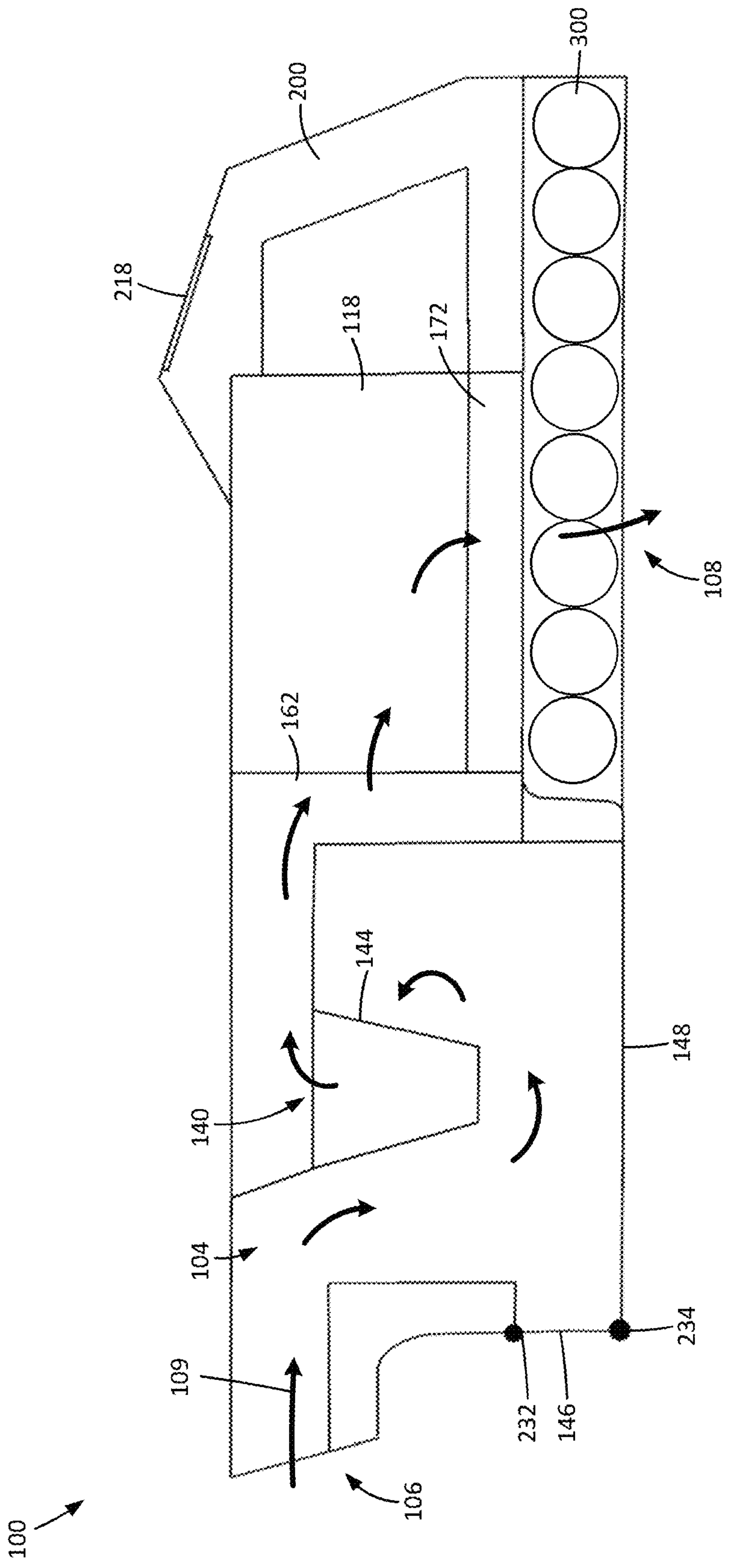
Figure 87A:
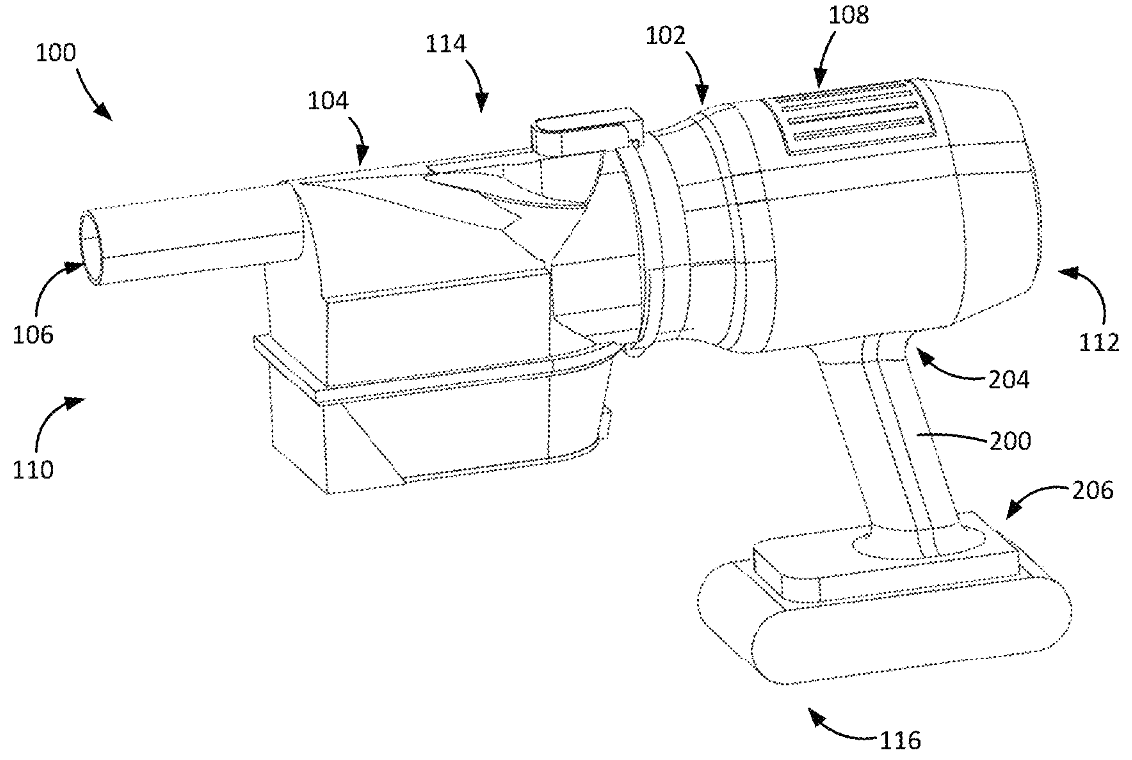
Figure 87B:
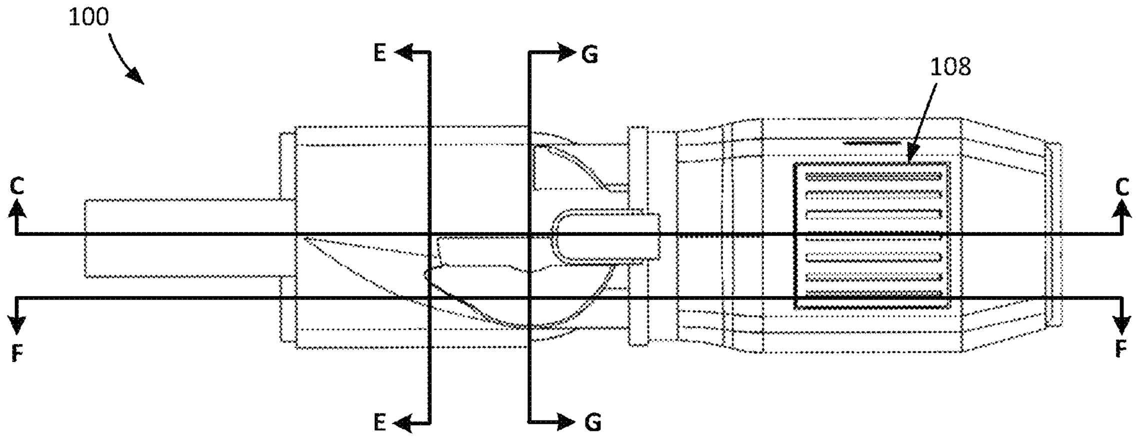
Figure 87C:
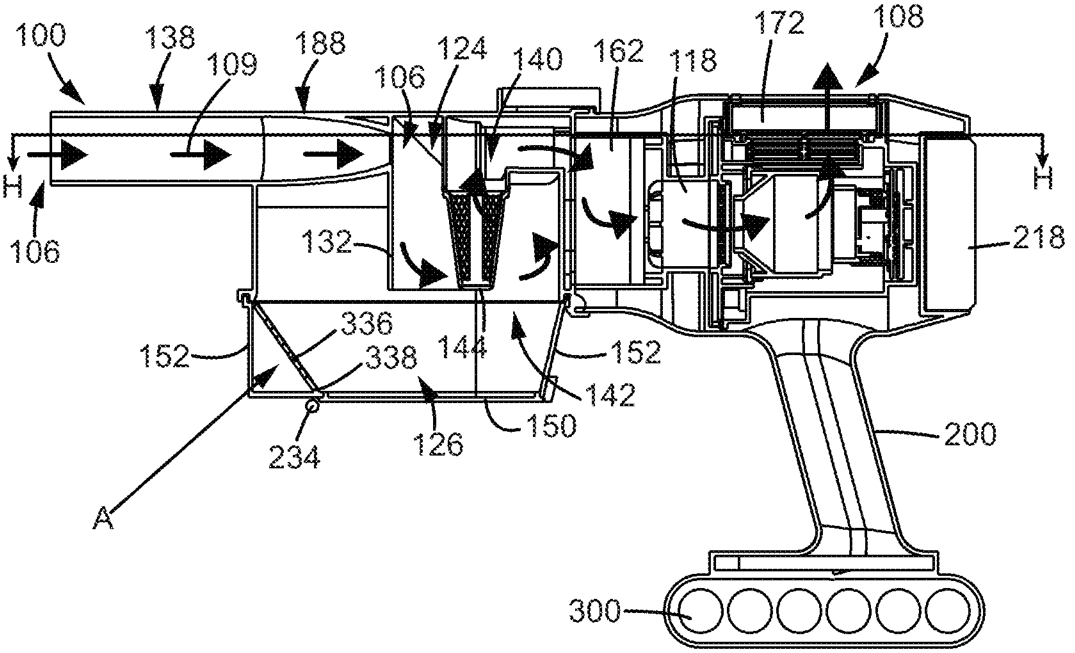
Figure 87D:
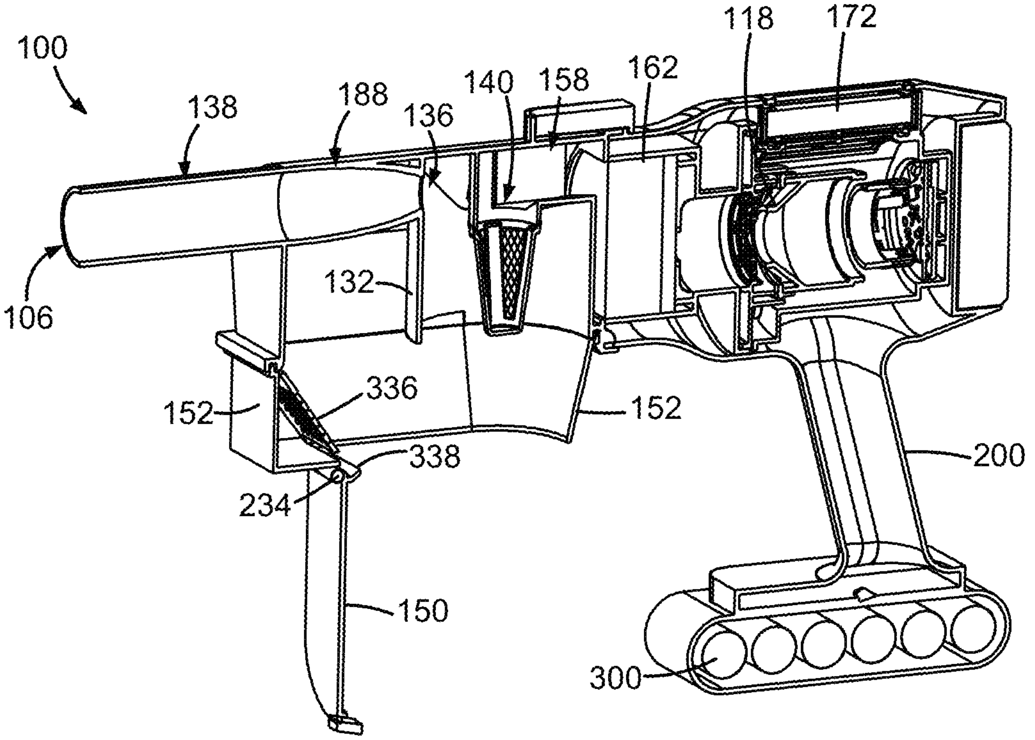
Figure 87E:
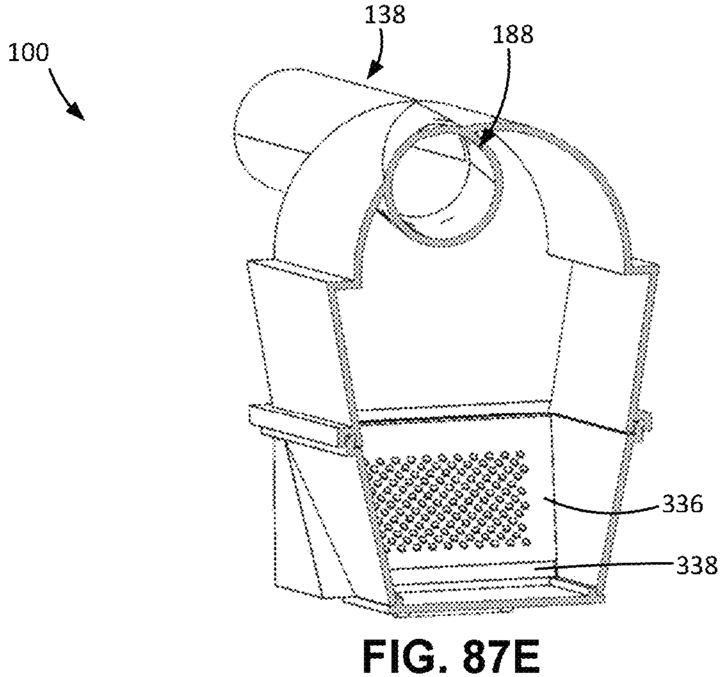
Figure 87F:
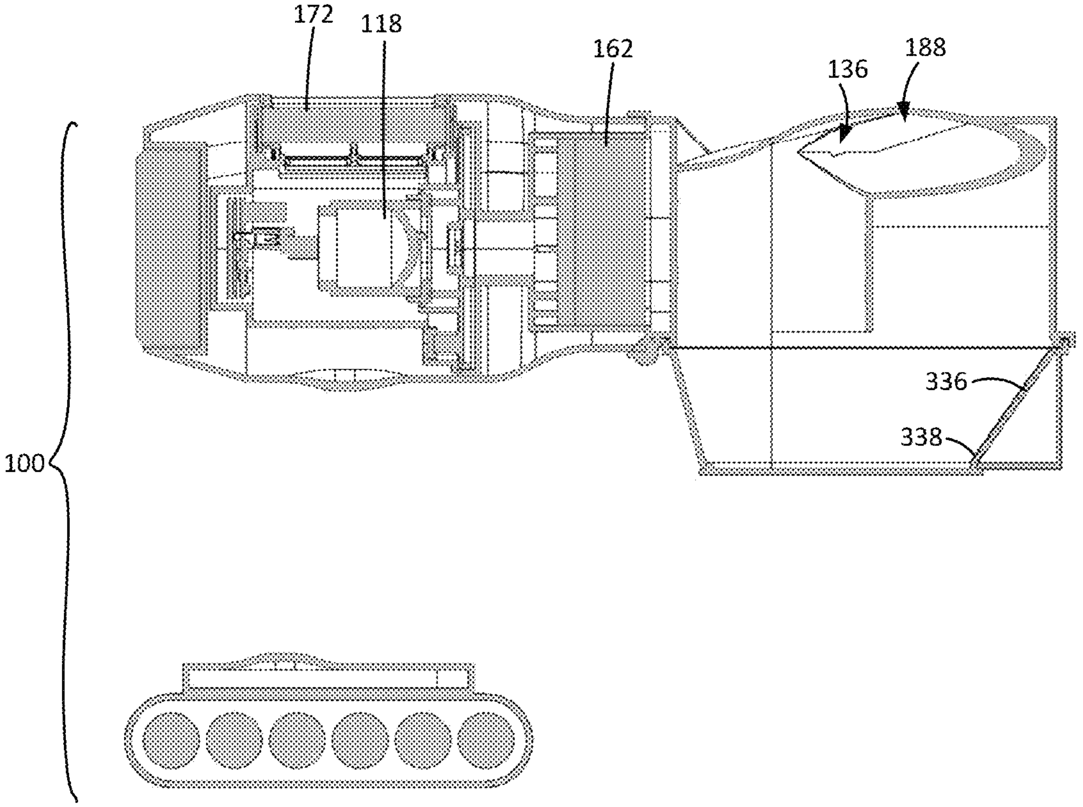
Figure 87G:
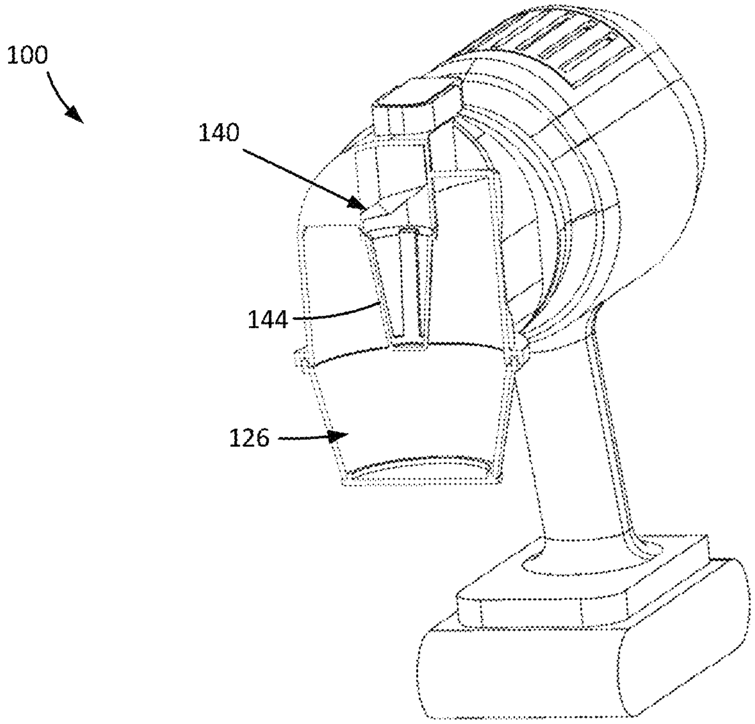
Figure 87H:
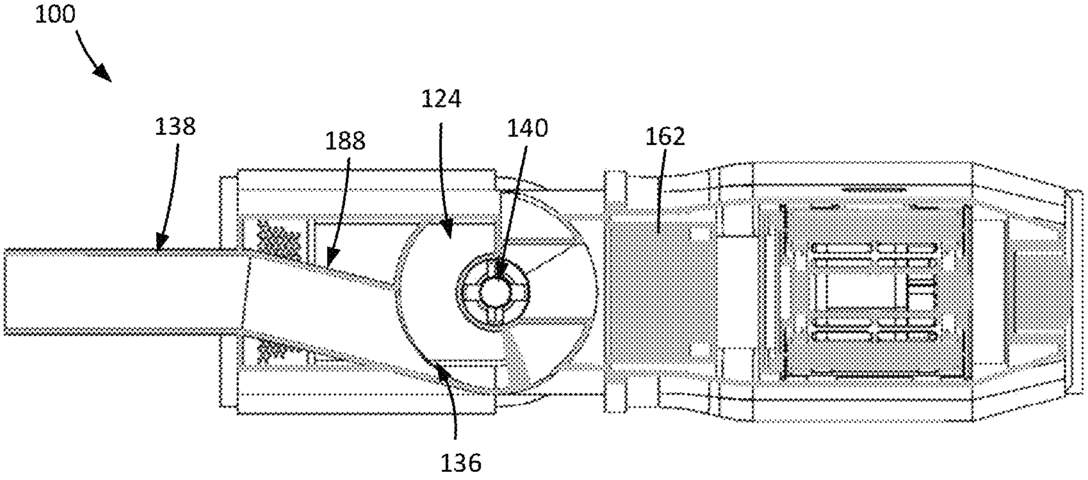
Figure 88A:
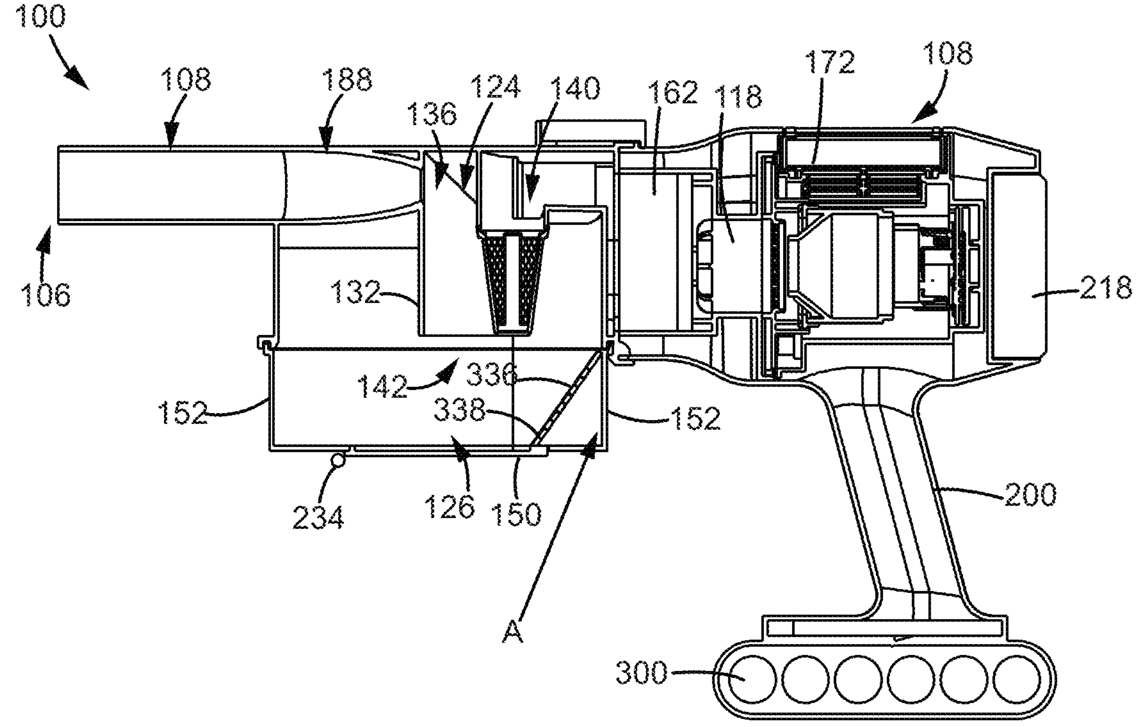
Figure 88B:
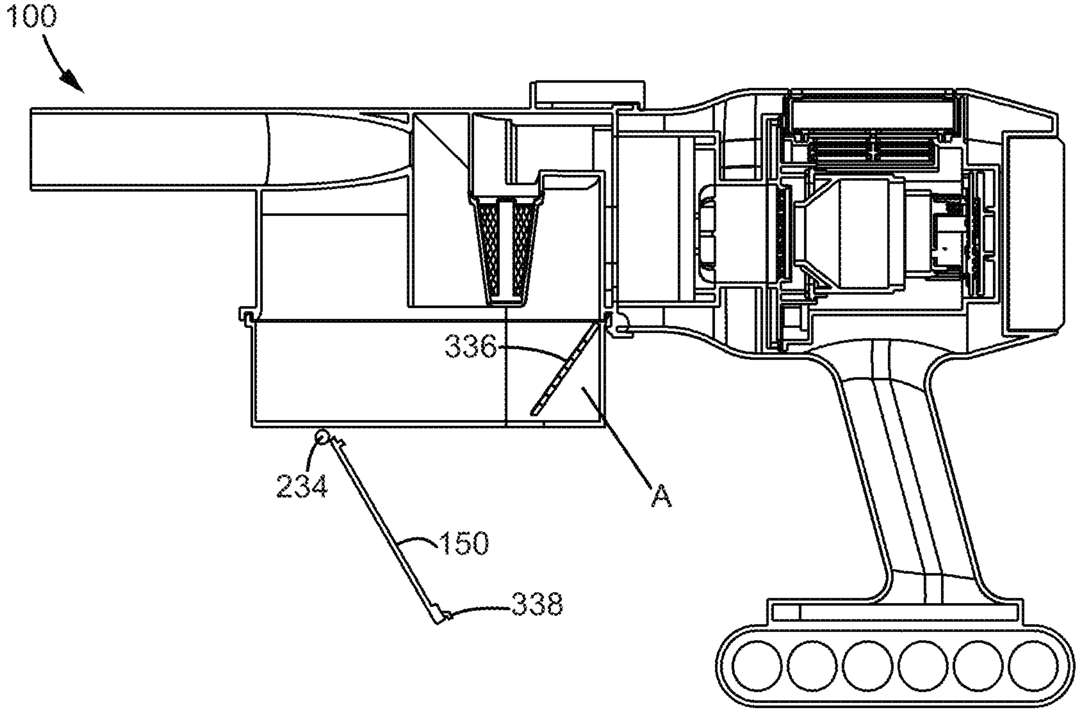
Figure 89A:
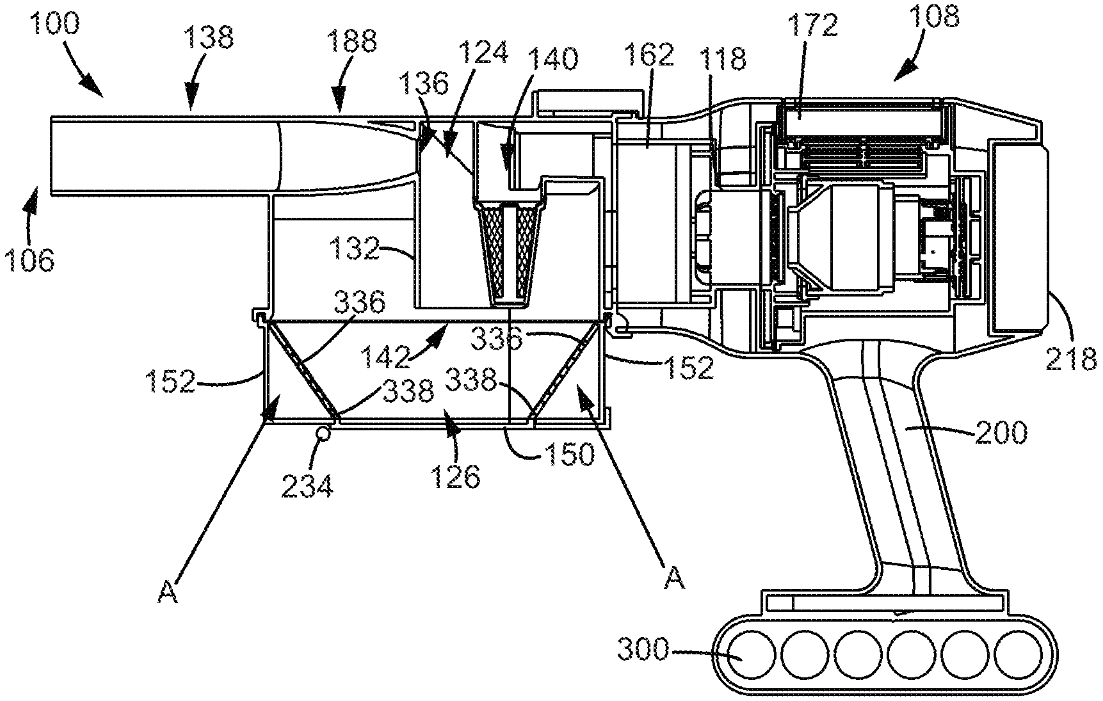
Figure 89B:
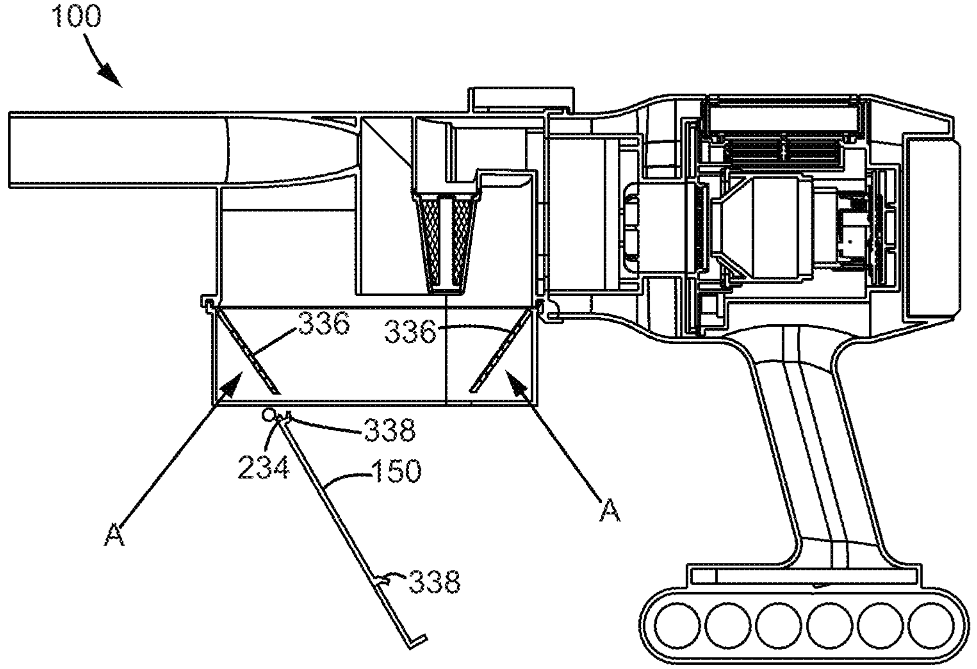
Figure 90A:
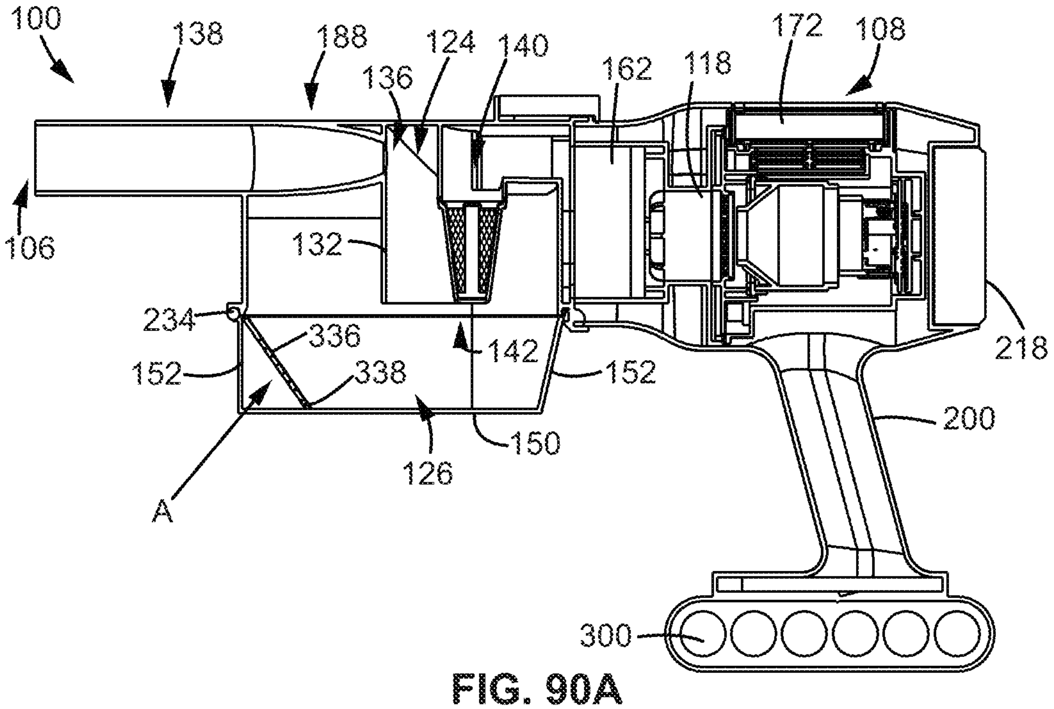
Figure 90B:
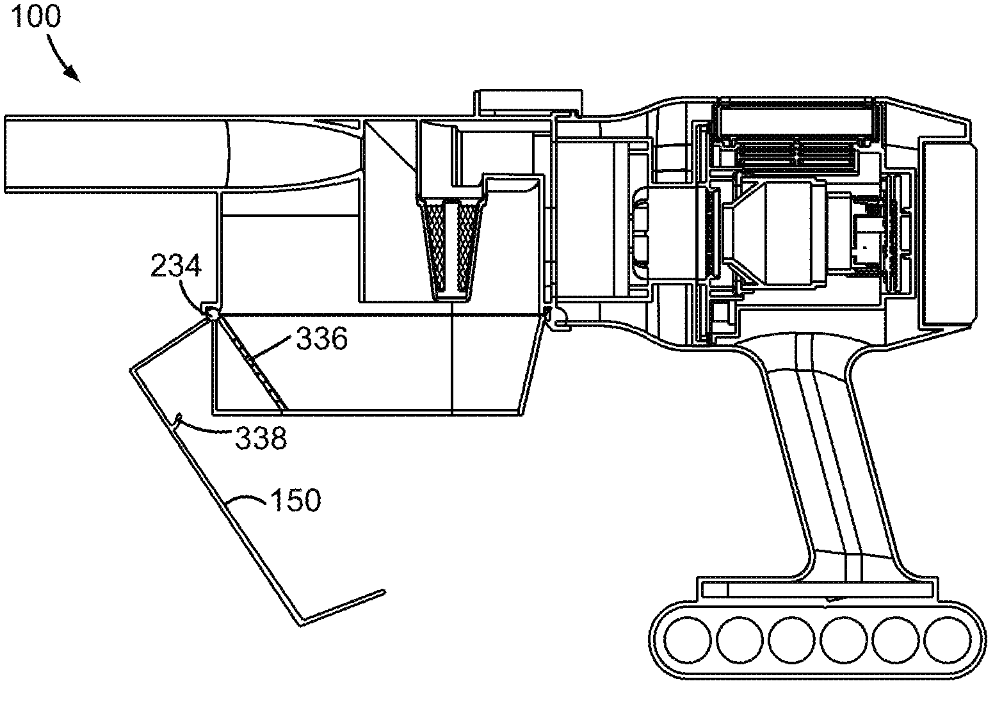
Figure 91:
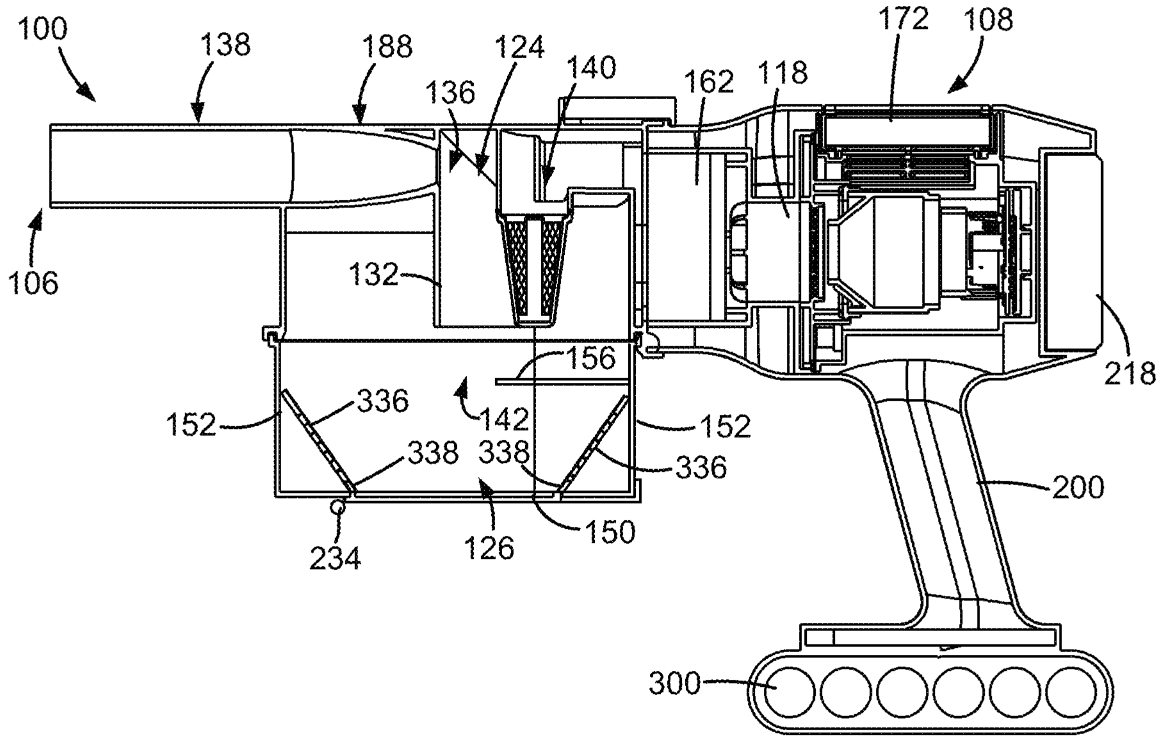
Figure 91A:
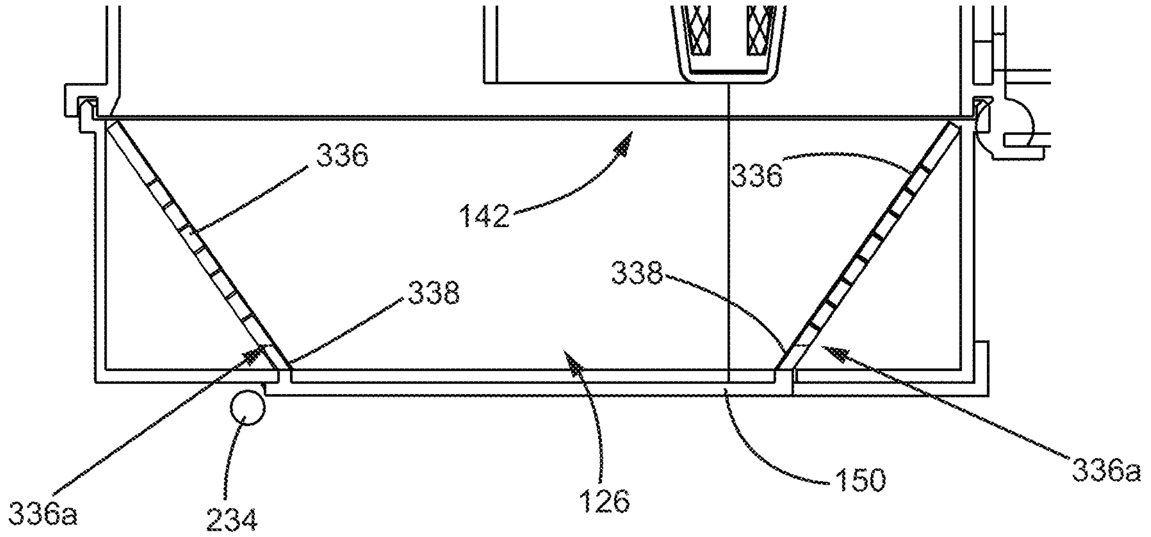

FIGS. 85A-B are side cross-sectional views of hand vacuum cleaners with multi-grip handles;

FIG. 86 is a side cross-sectional view of a hand vacuum cleaner;

FIG. 87A is a side perspective view of a hand vacuum cleaner with an openable portion in a closed position;

FIG. 87B is a top view of the hand vacuum cleaner of FIG. 87A;

FIG. 87C is a side cross-sectional view of the hand vacuum cleaner of FIG. 87A taken along the line C-C in FIG. 87B;

FIG. 87D is a perspective cross-sectional view of the hand vacuum cleaner of FIG. 87A taken along the line C-C in FIG. 87B with the openable portion in an open position;

FIG. 87E is a perspective cross-sectional view of the hand vacuum cleaner of FIG. 87A taken along the line E-E in FIG. 87B;

FIG. 87F is a side cross-sectional view of the hand vacuum cleaner of FIG. 87A taken along the line F-F in FIG. 87B;

FIG. 87G is a perspective cross-sectional view of the hand vacuum cleaner of FIG. 87A taken along the line G-G in FIG. 87B;

FIG. 87H is a top cross-sectional view of the hand vacuum cleaner of FIG. 87A taken along the line H-H in FIG. 87C;

FIG. 88A is a side cross-sectional view of a hand vacuum cleaner with a corner screen and an openable portion in a closed position;

FIG. 88B is a side cross-sectional view of the hand vacuum cleaner of FIG. 88A with the openable portion in an open position;

FIG. 89A is a side cross-sectional view of a hand vacuum cleaner with two corner screens and an openable portion in a closed position;

FIG. 89B is a side cross-sectional view of the hand vacuum cleaner of FIG. 89A with the openable portion in an open position;

FIG. 90A is a side cross-sectional view of a hand vacuum cleaner with a corner screen and an openable portion in a closed position;

FIG. 90B is a side cross-sectional view of the hand vacuum cleaner of FIG. 90A with the openable portion in an open position;

FIG. 91 is a side cross-sectional view of a hand vacuum cleaner with a corner screen; and, FIG. 91A is an enlargement of the lower end of the air treatment assembly of FIG. 91.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatus, methods and compositions are described below to provide an example of an embodiment of each claimed invention. No embodiment described below limits any claimed invention and any claimed invention may cover apparatuses and methods that differ from those described below. The claimed inventions are not limited to apparatus, methods and compositions having all of the features of any one apparatus, method or composition described below or to features common to multiple or all of the apparatus, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. None of the terms "coupled", "connected", "attached", and "fastened" distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

As used herein and in the claims, two elements are said to be "parallel" where those elements are parallel and spaced apart, or where those elements are collinear.

Some elements herein may be identified by a part number, which is composed of a base number followed by an alphabetical or subscript-numerical suffix (e.g., 300*a*, or $\mathbf{300}_1$). Multiple elements herein may be identified by part numbers that share a base number in common and that differ by their suffixes (e.g., $\mathbf{300}_1$, $\mathbf{300}_2$, and $\mathbf{300}_3$). All elements with a common base number may be referred to collectively or generically using the base number without a suffix (e.g., 300).

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies. For example, the expressions "substantially perpendicular" and "substantially parallel" mean within 10% of perpendicular and parallel, respectively.

General Description of a Surface Cleaning Apparatus

Figure 1A:
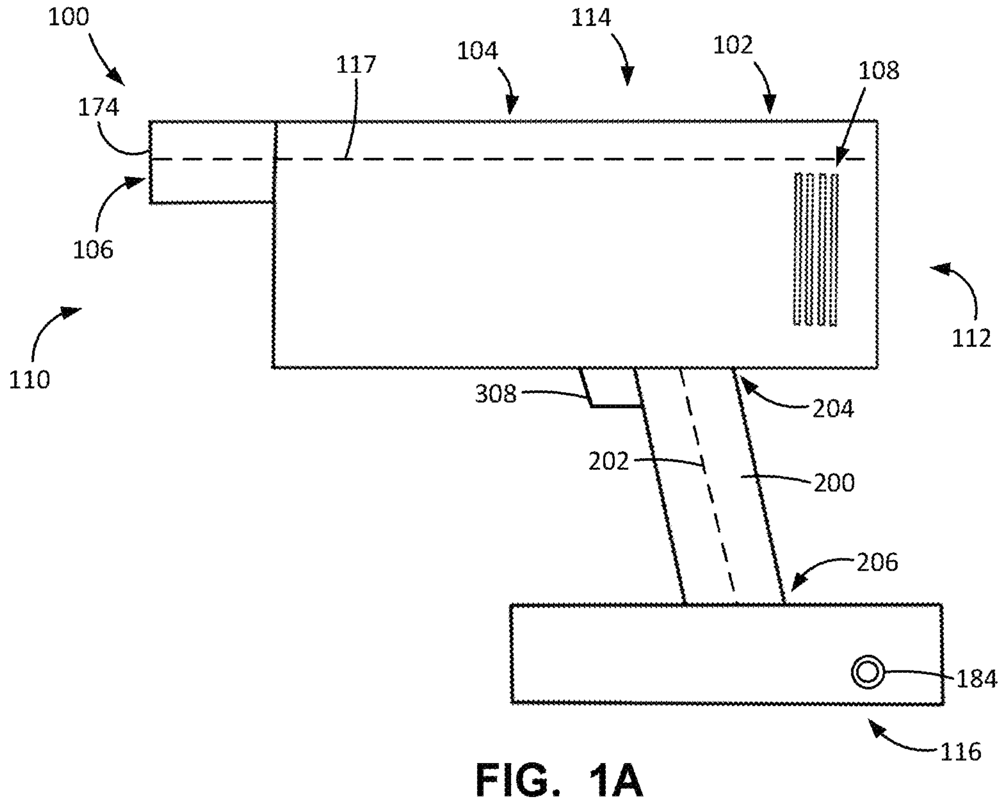
FIG. 1A is a side view of an example hand vacuum cleaner with a motor and fan assembly and an energy storage pack at opposite axial ends thereof.
Figure 1B:
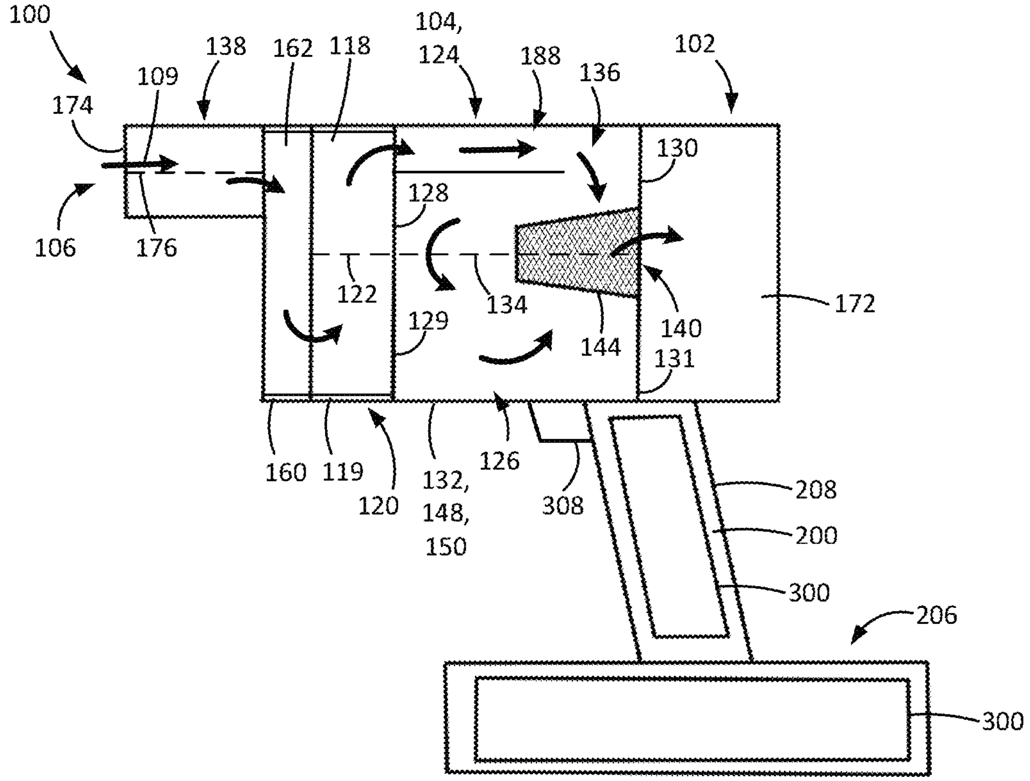
FIG. 1B is a side cross-sectional view of the hand vacuum cleaner of FIG. 1.

Referring to FIGS. 1A-1B, an exemplary embodiment of a surface cleaning apparatus is shown generally as 100. The following is a general discussion of surface cleaning apparatus 100, which provides a basis for understanding several of the features that are discussed herein. As discussed subsequently, each of the features may be used individually or in any particular combination or sub-combination in this or in other embodiments disclosed herein.

In the illustrated embodiment, surface cleaning apparatus 100 is a hand vacuum cleaner. As used herein, a hand vacuum cleaner is a vacuum cleaner that can be operated to clean a surface generally one-handedly. That is, the entire weight of the hand vacuum cleaner may be held by the same hand as the one used to direct a dirty air inlet of the hand vacuum cleaner with respect to a surface to be cleaned. For example, the dirty air inlet and the handle and/or a main body housing a motor and fan assembly of the hand vacuum cleaner may be rigidly coupled to each other (directly or indirectly) so as to move as one while maintaining a constant orientation relative to each other. This is to be contrasted with canister and upright vacuum cleaners, whose weight is typically supported by a surface (e.g., a floor) during use. When a canister vacuum cleaner is operated or when an upright vacuum cleaner is operated in a 'lift-away' configuration, a second hand is typically required to direct the dirty air inlet at the end of a flexible hose.

Surface cleaning apparatus 100 includes a main body 102 having an air treatment assembly 104 (which may be permanently affixed to main body 102 or may be removable in part or in whole therefrom for emptying, and optionally is removable as a sealed air treatment assembly 104 other than the air treatment assembly air inlet and the air treatment assembly air outlet), a dirty air inlet 106, a clean air outlet 108, and an air flow path 109 extending between dirty air inlet 106 and clean air outlet 108.

Surface cleaning apparatus 100 has a front end 110, a rear end 112, an upper end 114, and a lower end 116. A hand vacuum cleaner axis 117 extends from the front end 110 to the rear end 112. As exemplified, axis 117 extends at a constant elevation through the hand vacuum cleaner and, in the orientation of FIG. 1A axis 117 extends horizontally. In the illustrated embodiment, dirty air inlet 106 is at an upper portion of front end 110 and clean air outlet 108 is at a rearward portion of main body 102. It will be appreciated that dirty air inlet 106 and clean air outlet 108 may be provided in different locations.

A motor and fan assembly 118, which comprises an electric motor and impeller blade(s), is positioned in the air flow path to generate vacuum suction through the air flow path. The motor and fan assembly 118 is positioned within a body portion 120 which may be part of the main body 102. Optionally, the motor and fan assembly 118 may be positioned within a suction motor housing 119. The motor and fan assembly may be a suction motor that draws air through the air treatment member. In the illustrated embodiment, suction motor 118 is positioned upstream of air treatment assembly 104 in which case it may be referred to as a "dirty air motor". In other embodiments, the motor and fan assembly 118 may be positioned at alternate locations such as downstream of air treatment assembly 104 as exemplified, in which case it may be referred to as a "clean air motor". Motor and fan assembly 118 defines a motor axis 122 (about which the impeller rotates).

Motor and fan assembly 118 may be oriented in any direction. For example, when surface cleaning apparatus 100 is oriented with the upper end 114 above the lower end 116, e.g., axis 117 positioned substantially parallel to a horizontal floor, motor axis 122 may be oriented horizontally (as exemplified, e.g., in FIG. 1A) or vertically (as exemplified, e.g., in FIG. 36A). In alternative embodiments, motor and fan assembly 118 may be oriented at any angle between horizontal and vertical. As described below, motor and fan assembly 118 may have various positional arrangements, which may improve the ergonomics of the hand vacuum cleaner 100 (e.g., reduced weight, better weight balance, or greater portability).

Figure 15A:
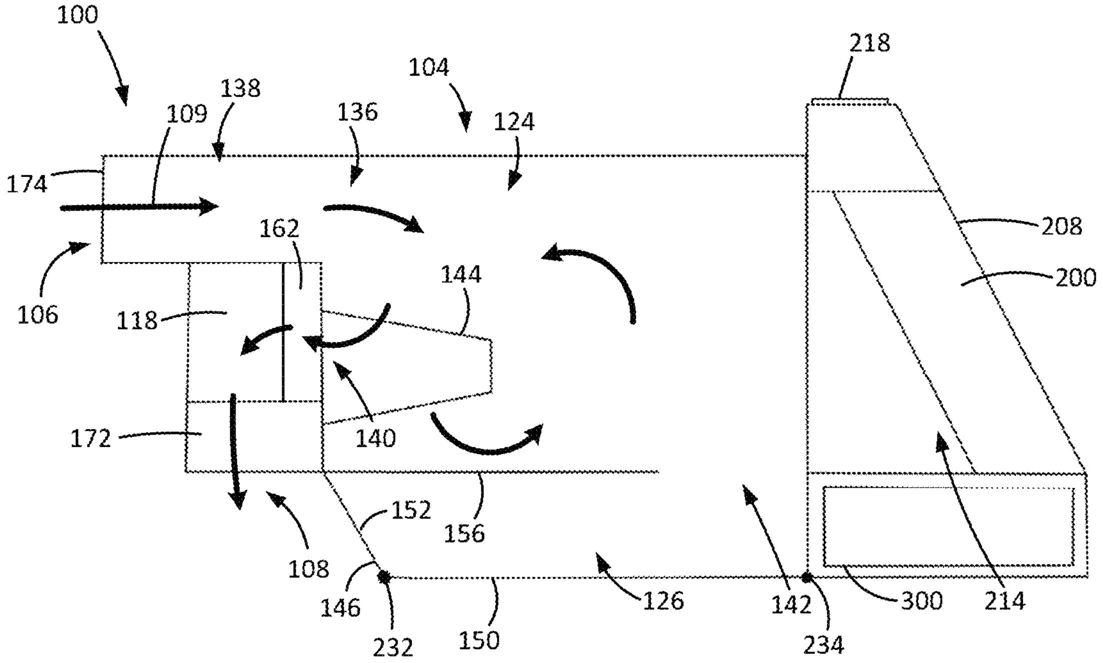
FIG. 15A is a side cross-sectional view of an example hand vacuum cleaner with an openable portion in a closed position.
Figure 15B:
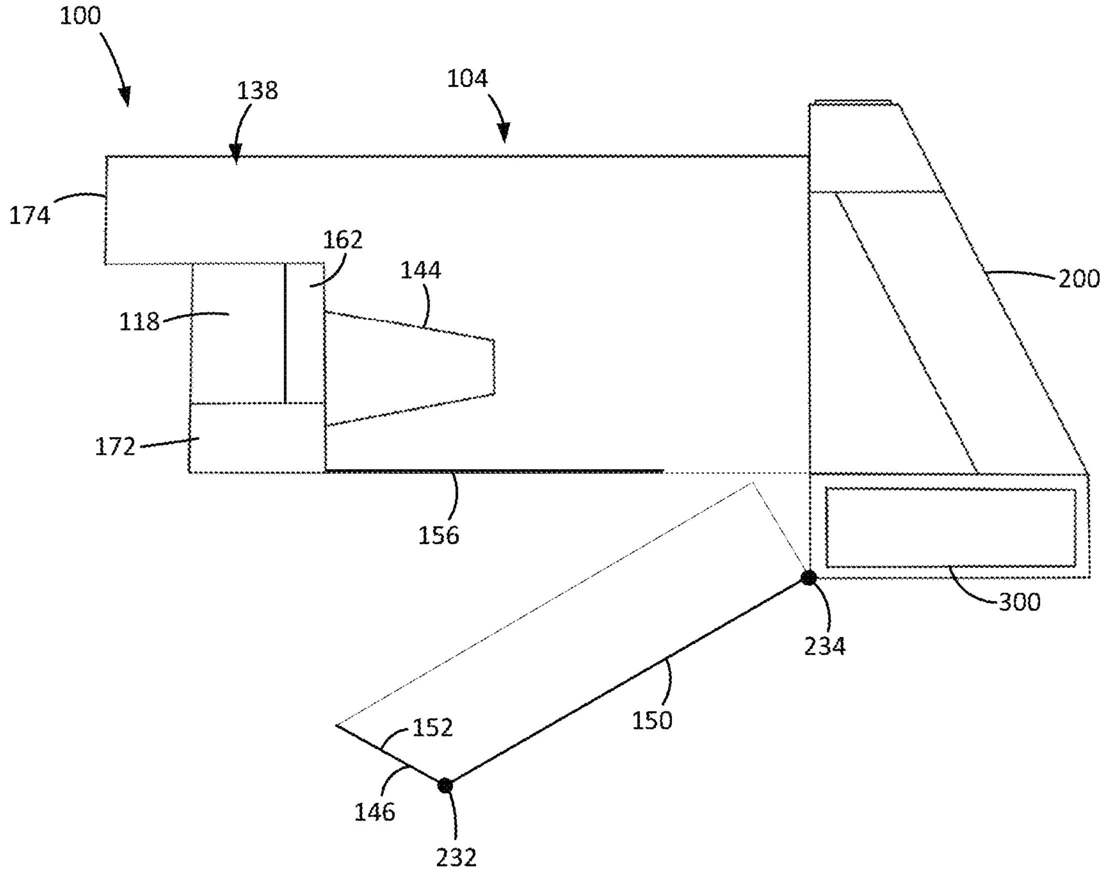
FIG. 15B is a side cross-sectional view of the hand vacuum cleaner of FIG. 15B with the openable portion in an open position.
Figure 16A:
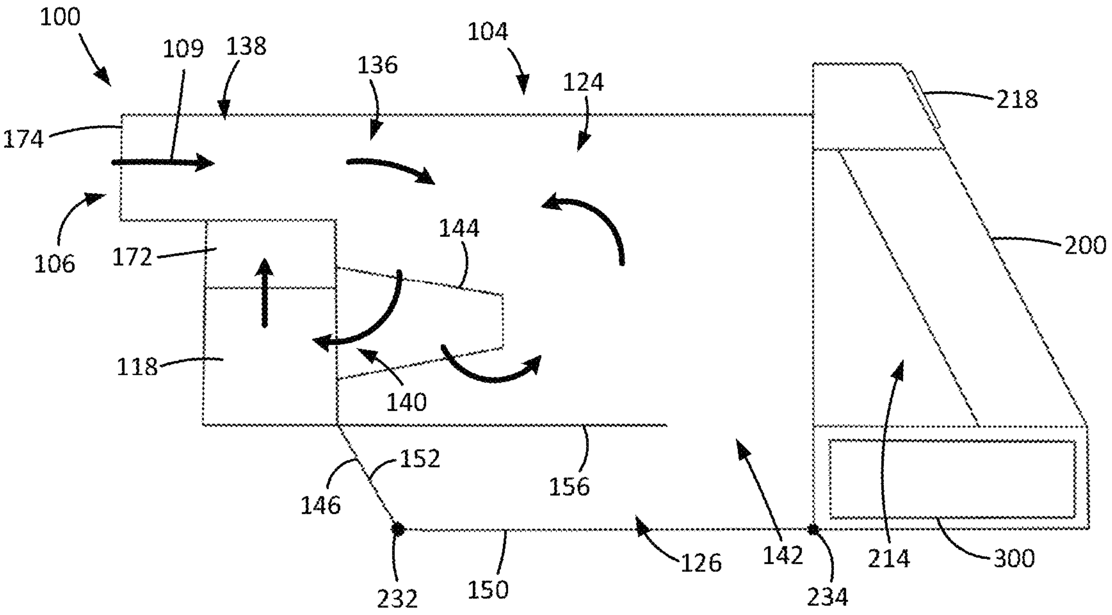
FIG. 16A is a side cross-sectional view of an example hand vacuum cleaner with a removable handle.
Figure 32:
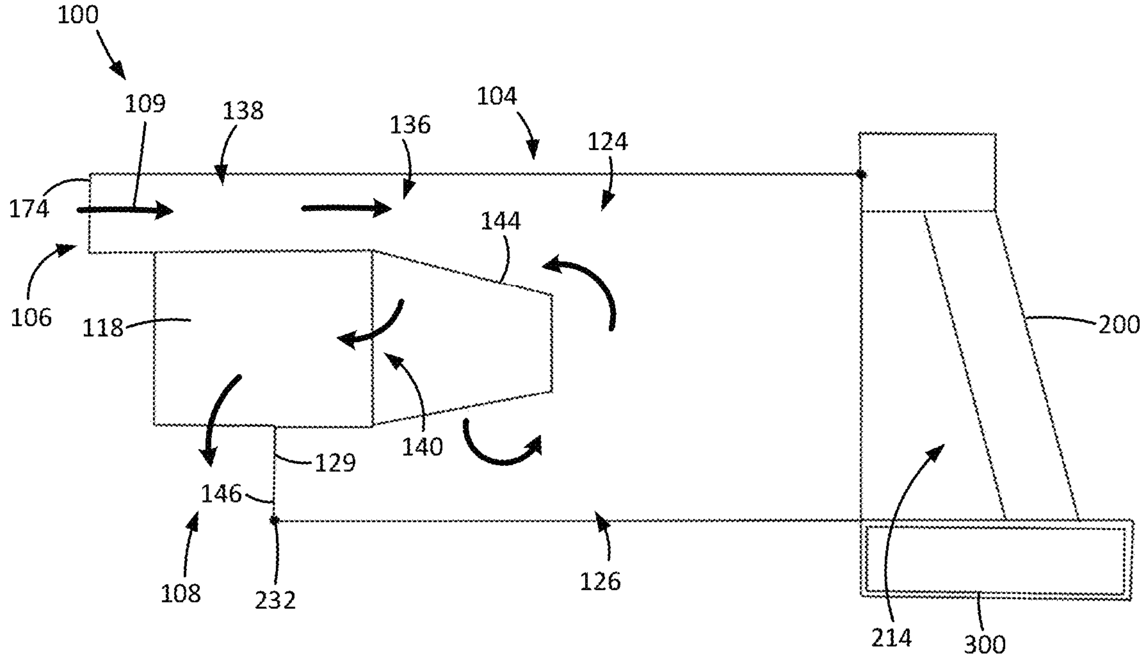

Air treatment assembly 104 is configured to remove particles of dirt and other debris from the air flow 109. Air treatment assembly 104 may comprise one or more cyclonic stages, each of which may comprise a single cyclone or a plurality of cyclones in parallel. Each cyclonic stage may have a single dirt collection region or a plurality of dirt collection regions. The dirt collection region(s) may be external to the cyclone chamber (e.g., dirt collection chambers as exemplified in FIGS. 14, 15A, and 16A) or may be internal to the cyclone chamber (e.g., FIG. 32) and configured as a dirt collection area or region within the cyclone chamber. Alternatively, air treatment assembly 104 need not include a cyclonic cleaning stage or one or more cyclonic treatment stages may be replaced by one or more non-cyclonic treatment stages. Accordingly, the air treatment assembly 104 may comprise one or more non-cyclonic treatment stages wherein each non-cyclonic treatment stage comprises one or more non-cyclonic air treatment chambers, e.g., a non-cyclonic momentum separator chamber wherein dirt is disentrained from air entering the air treatment chamber due to non-cyclonic, e.g., abrupt, changes in the speed and/or direction of air flow through the air treatment chamber. Alternately or in addition, the air treatment assembly 104 may comprise a bag, a porous physical filter media (such as foam or felt), or other air treatment members.

As exemplified in FIG. 1B, air treatment assembly 104 comprises a single cyclonic stage wherein the single cyclonic stage comprises a cyclone chamber 124 that has an internal dirt collection region or area 126. Cyclone chamber 124 has first and second cyclone ends 128, 130 and a cyclone sidewall 132 that extends, as exemplified, axially between first and second cyclone ends 128, 130. Cyclone chamber 124 has first and second cyclone end walls 129, 131 at first and second cyclone ends 128, 130, respectively. Cyclone chamber 124 has a cyclone axis 134 that extends centrally between first and second cyclone ends 128, 130. Air circulates about cyclone axis 134 when in cyclone chamber 124. Accordingly, cyclone axis 134 is alternatively referred to herein as a "cyclone axis of rotation".

Cyclone chamber 124 may be oriented in any direction. As exemplified in FIG. 1B, when hand vacuum cleaner 100 is oriented with the axis 117 extending horizontally, cyclone axis 134 may be oriented horizontally. In other words, cyclone axis 134 is generally parallel to the hand vacuum cleaner axis 117 (e.g., FIGS. 1A-B). In this configuration, first and second cyclone ends 128, 130 may be referred to as cyclone front and rear ends 128, 130, respectively. Alternatively, as exemplified, e.g., in FIG. 36A, when hand vacuum cleaner 100 is oriented with upper end 114 above lower end 116, e.g., positioned substantially parallel to a horizontal surface, cyclone axis 134 may be oriented vertically. In other words, cyclone axis 134 is generally transverse to the hand vacuum cleaner axis 117. In these configurations, first and second cyclone ends 128, 130 may be referred to as cyclone lower and upper ends 128, 130, respectively. In alternative embodiments, cyclone chamber 124 may be oriented at any angle between horizontal and vertical.

Cyclone chamber 124 includes at least one cyclone air inlet 136 in fluid communication with an inlet conduit 138, a cyclone air outlet 140, and, in some embodiments (e.g., FIG. 36A) a dirt outlet 142 that is in communication with the dirt collection chamber 126. As exemplified in FIG. 14, cyclone chamber 124 may have a single dirt outlet 142.

Alternatively, cyclone chamber 124 may include two or more dirt outlets that are in communication with the same dirt collection area, or optionally with different dirt collection areas.

Figure 49A:
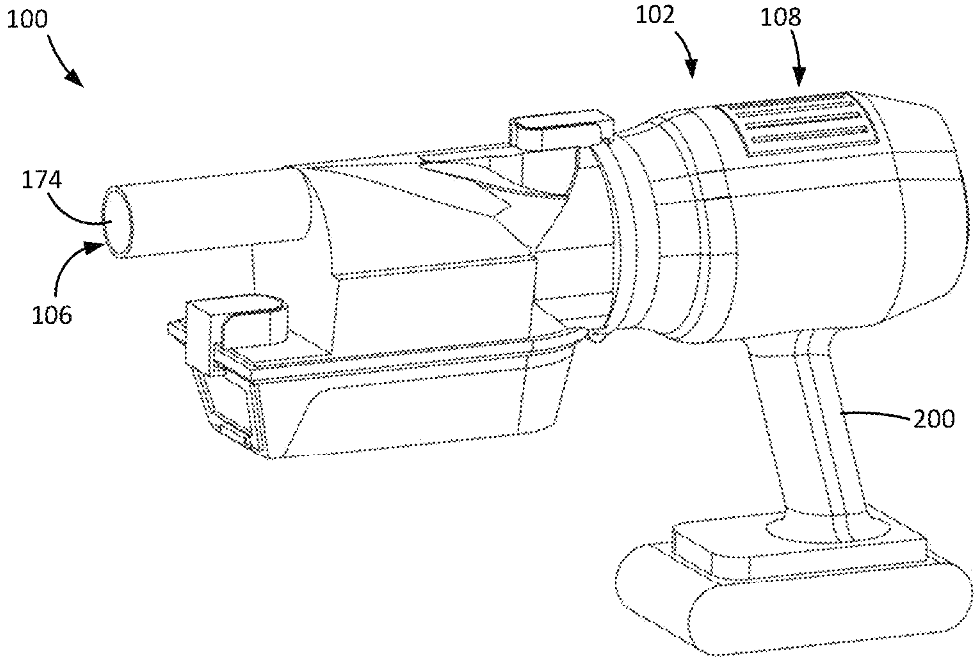
FIG. 49A is a side perspective view of a hand vacuum cleaner with an openable portion in a closed position.

Cyclone air inlet 136, cyclone air outlet 140 and dirt outlet 142 may be of any design and positioning that is known in the art. For example, cyclone air inlet 136 may be a tangential air inlet wherein the inlet directs air to enter the cyclone chamber generally tangentially oriented relative to cyclone sidewall 132, so that air entering the cyclone chamber 124 will tend to swirl and circulate within cyclone chamber 124, thereby disentraining dirt and debris from the air flow, before leaving cyclone chamber 124 through cyclone air outlet 140 (see, e.g., FIGS. 49A-B). Alternately, the cyclone air inlet may be an axial inlet with a downstream portion configured to produce a tangential flow in the cyclone chamber. In some embodiments, cyclone air inlet 136 may have a cyclone air inlet height 137 in the vertical direction (see, e.g., FIG. 49C).

Figure 9A:
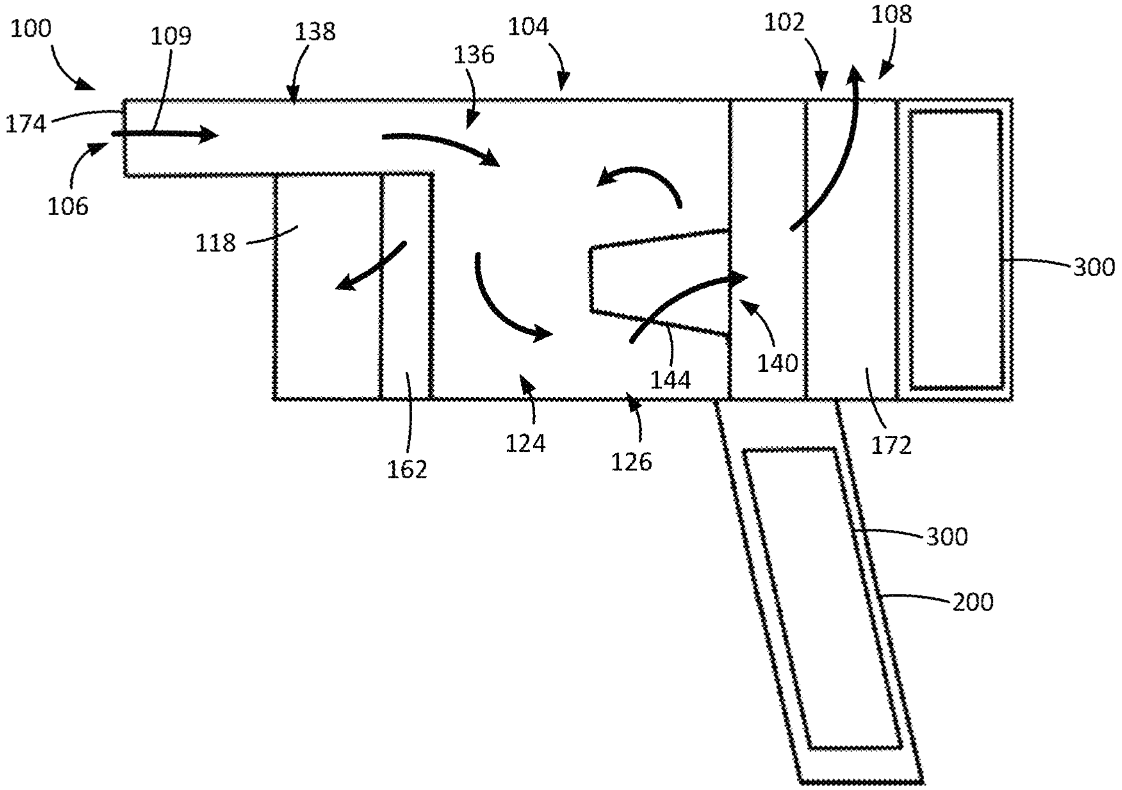
FIG. 9A is a side cross-sectional view of an example hand vacuum cleaner with a motor and fan assembly and an energy storage pack at opposite axial ends thereof.

Cyclone chamber 124 may optionally be a 'uniflow' cyclone chamber (i.e., where the cyclone air inlet and cyclone air outlet are at opposite ends of the cyclone chamber) (e.g., FIG. 9A). Alternatively, cyclone chamber 124 may provide bidirectional air flow (i.e., where the cyclone air inlet and cyclone air outlet are at the same end of the cyclone chamber). In the embodiment of FIG. 1B, cyclone chamber 124 uses bidirectional air flow. As exemplified in FIG. 1B, cyclone air inlet 136 and cyclone air outlet 140 may be both provided towards cyclone rear end 112. In other embodiments, the cyclone air outlet 140 and cyclone air inlet 136 may be both provided towards cyclone front end 110 (e.g., FIG. 5).

Figure 14:
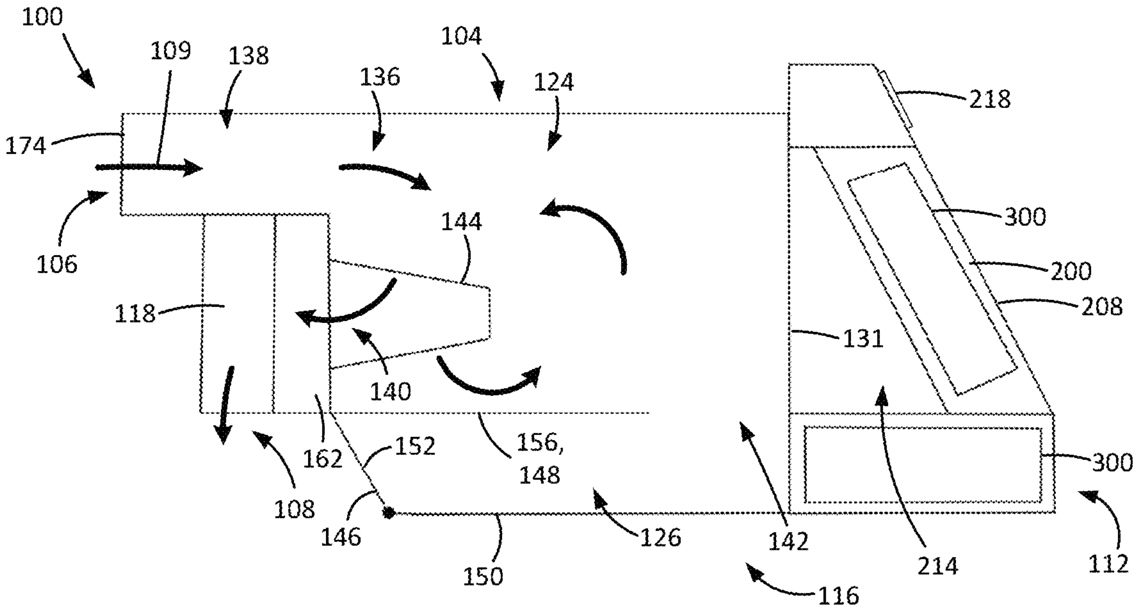
Figure 24A:
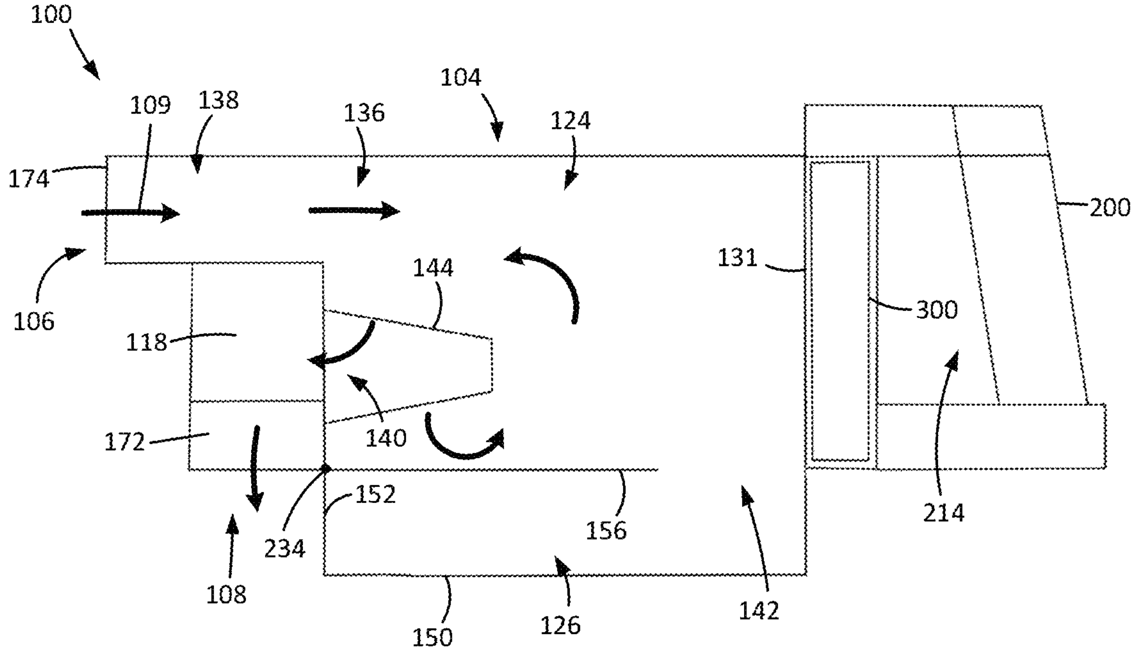
FIG. 24A is a side cross-sectional view of a hand vacuum cleaner with an openable portion in a closed position.

As exemplified, for example, in FIG. 14, dirt collection area 126 may be external to cyclone chamber 124 (i.e., dirt collection area 126 may have a discrete volume from that of cyclone chamber 124 (it may be an external chamber) and in communication with cyclone chamber 124 through dirt outlet 142). The dirt collection area 126 has a dirt collection bottom wall 150 towards the lower end 116 and may have one or more dirt collection side walls 152 which partially define the dirt collection area 126. In some embodiments, for example as exemplified in FIG. 24A, one or more of the cyclone walls (e.g., second cyclone end wall 131) may form one or more side walls of the dirt collection area 126 and partially define the dirt collection area 126. In some embodiments, the dirt collection bottom wall 150 also forms a cyclone chamber bottom wall 148 (e.g., when the dirt collection area 126 is internal to the cyclone chamber 124) (e.g., FIG. 1B). In other embodiments, the surface cleaning apparatus 100 may include separate dirt collection and cyclone chamber bottom walls 150, 148 (e.g., when the dirt collection area 126 is external to the cyclone chamber 124) (e.g., FIG. 14). As exemplified in FIG. 14, the cyclone chamber bottom wall 148 may partially define the cyclone chamber 124 and the dirt collection chamber.

The dirt outlet 142 may be at any location. For example, it may be at the same end as the air treatment chamber air outlet 140. In other embodiments, it may be at the opposite end as the air treatment chamber air outlet (e.g., FIG. 14 wherein it is rearwardly spaced and FIG. 36A wherein the dirt outlet 142 is vertically spaced apart from cyclone air inlet 136 and cyclone air outlet 140).

Figure 23:
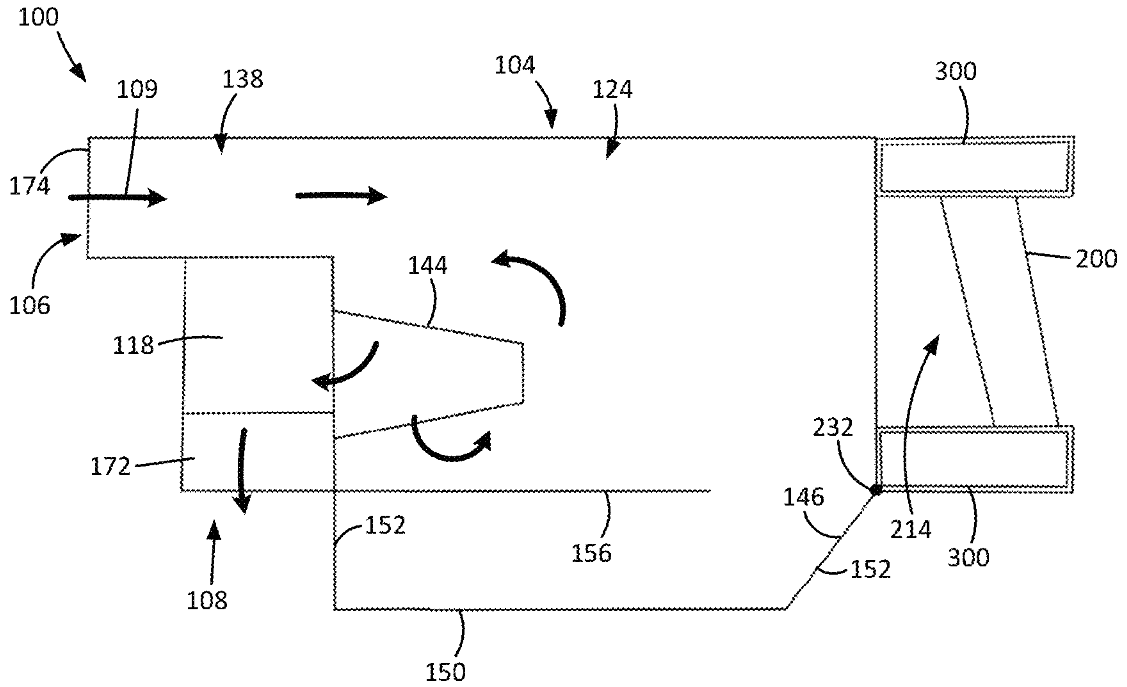
FIG. 23 is a side cross-sectional view of a hand vacuum cleaner with a motor and fan assembly and an energy storage pack at opposite axial ends thereof.
Figure 27A:
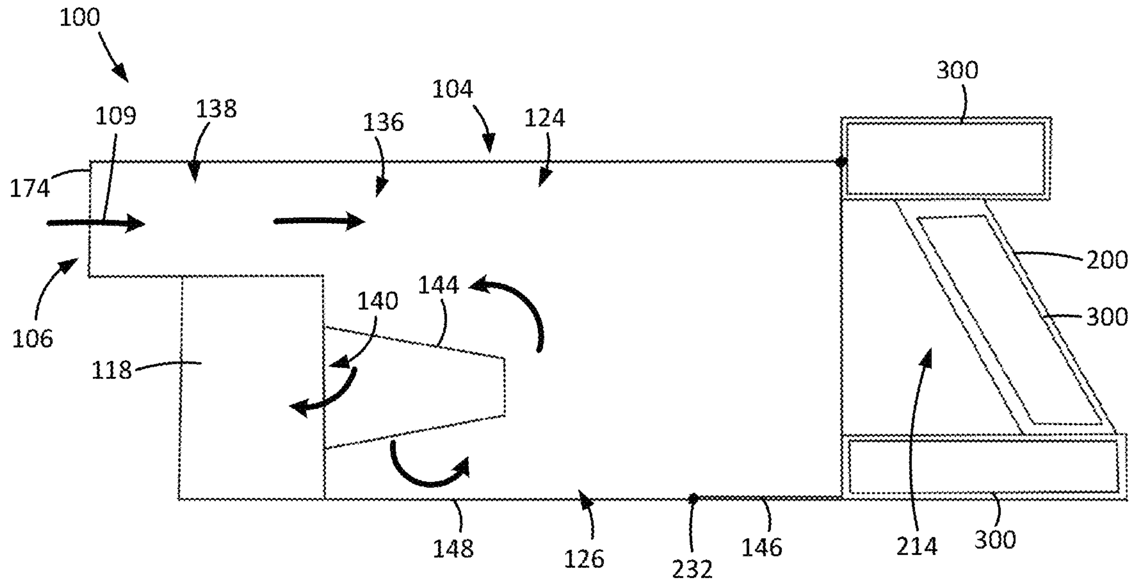
FIG. 27A is a side cross-sectional view of a hand vacuum cleaner with an openable door and a rotatable handle in closed positions.
Figure 27B:
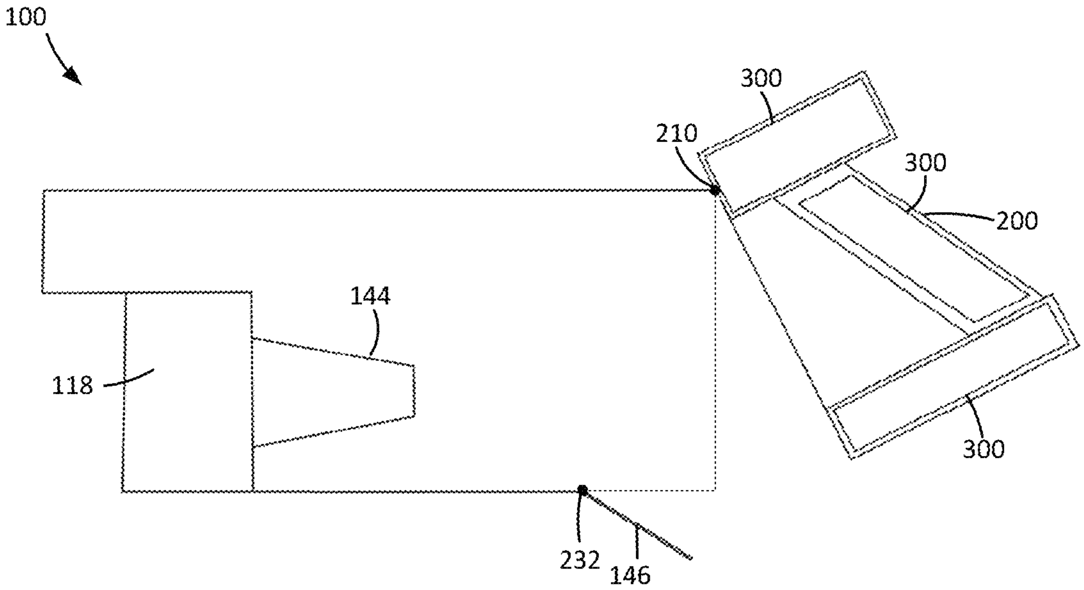
FIG. 27B is a side cross-sectional view of the hand vacuum cleaner of FIG. 27A with the openable door in an open position and the rotatable handle in a rotated position.
Figure 30:
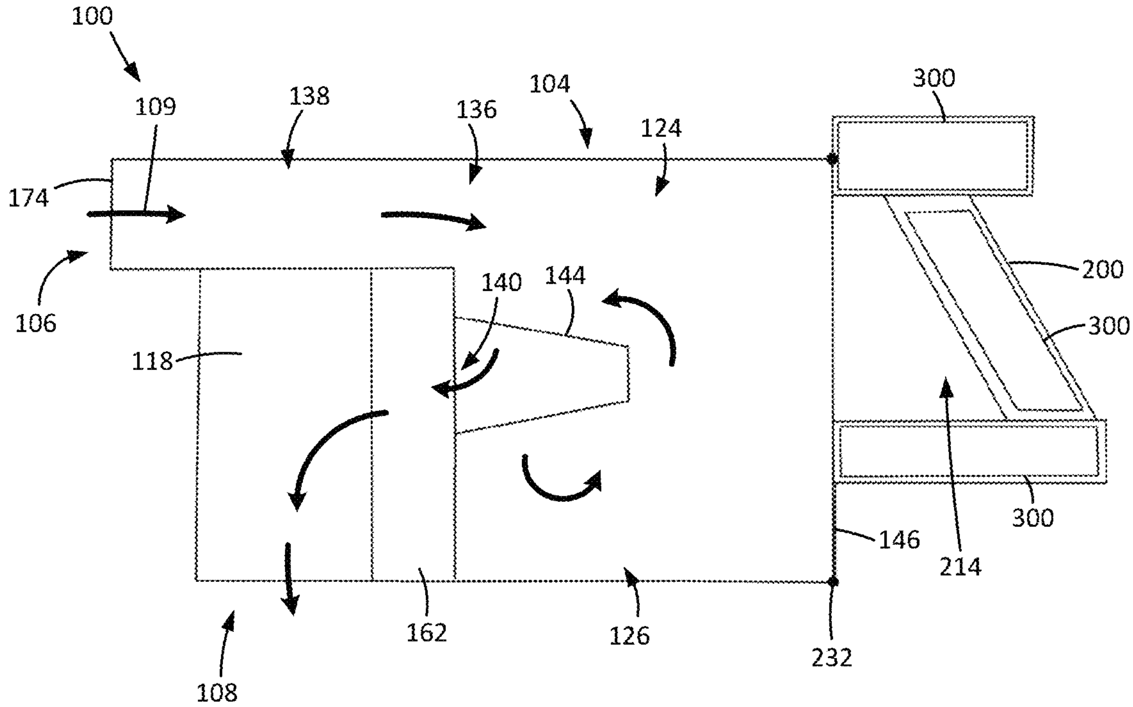
FIGS. 30-32 are side cross-sectional views of other example hand vacuum cleaners with motor and fan assemblies and energy storage packs at opposite axial ends thereof.
Figure 31:
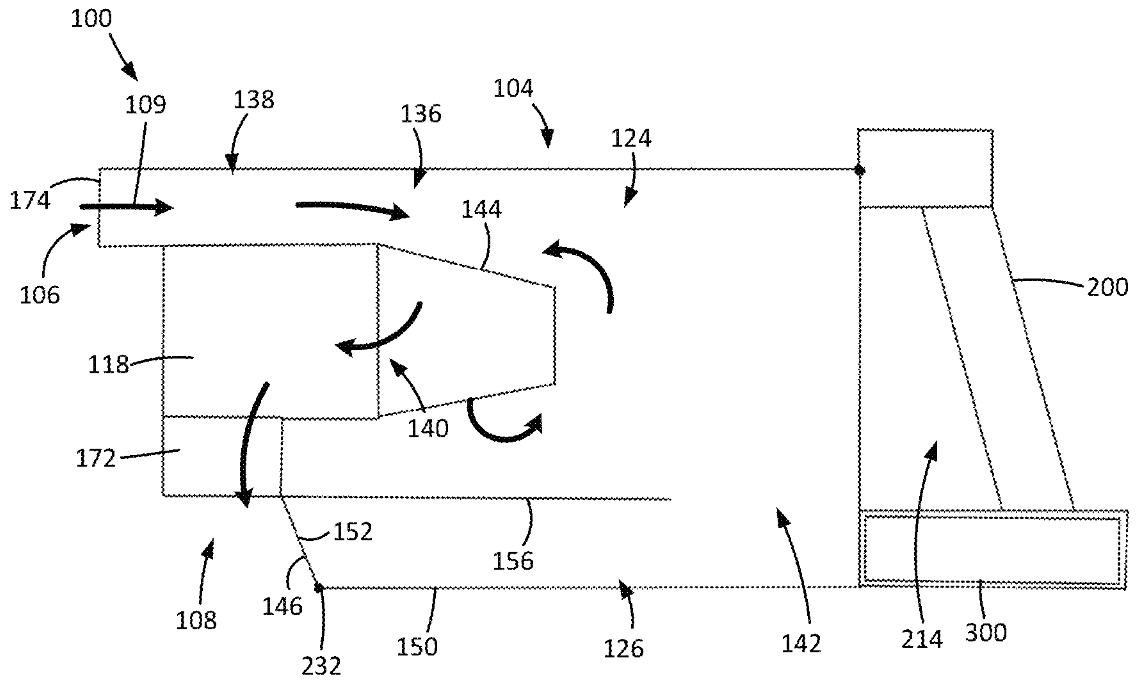
Figure 34A:
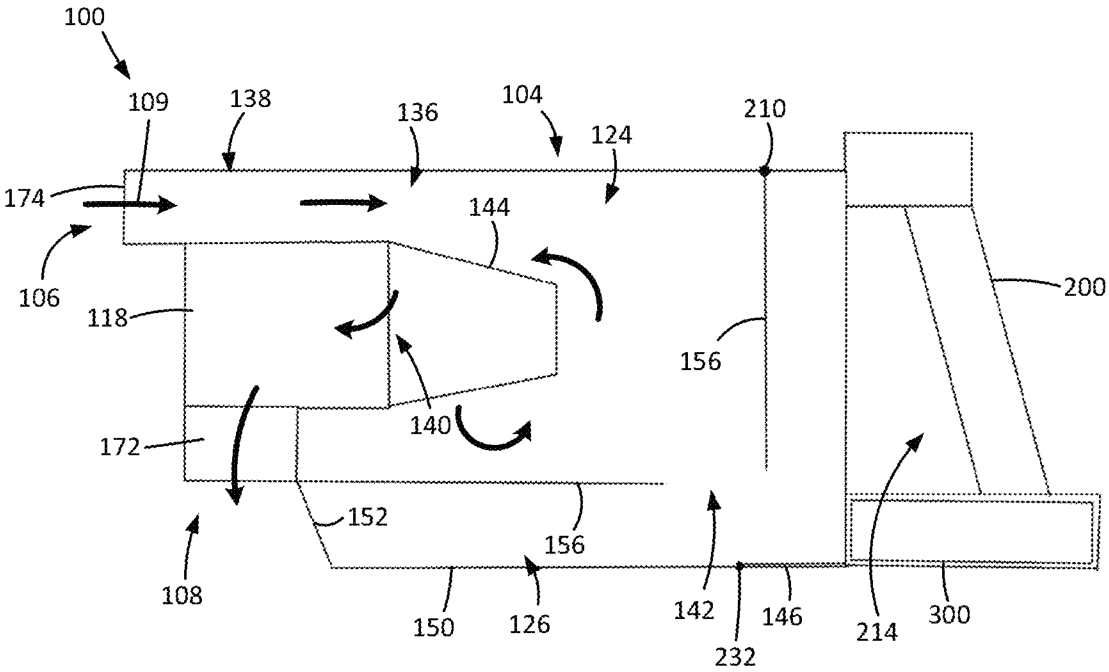
FIG. 34A is a side cross-sectional view of a hand vacuum cleaner with a rotatable rear end in a closed position.

In some embodiments, the surface cleaning apparatus 100 may include a door 146. The door 146 may be manually openable, such as by a handle, or automatically operated, such as upon or subsequently to the surface cleaning apparatus is mounted to a docking or charging station. Accordingly, dirt separated by surface cleaning apparatus 100 may travel to a supplemental dirt collection area within a docking or charging station automatically or when a user elects to open the door 146. The door 146 may rotate about any suitable rotational mount. For example, the door 146 may pivot about door hinge 232. The door 146 is openable so as to allow the dirt collected in the dirt collection area 126 to be transferred to a supplemental dirt collection assembly that is external to the surface cleaning apparatus 100. The door 146 may have any suitable location, including for example, as part of a dirt collection side wall 152 towards the front end 110 (e.g., FIG. 14), dirt collection side wall 152 towards the rear end 112 (e.g., FIG. 23), cyclone chamber bottom wall 148 (e.g., FIG. 27A), second cyclone end wall 131 (e.g., FIGS. 30, 35A), first cyclone end wall 129 (e.g., FIG. 32), and dirt collection bottom wall 150 (e.g., FIG. 34A).

In some embodiments, cyclone air outlet 140 may include one or more vortex finders 144. As exemplified in FIG. 1B, for example, the vortex finder 144 may consist of or comprise a mesh screen 146 to help filter lint, fluff, and other debris, such as hair, that remains in the exiting the cyclone chamber. Mesh screen 146 may extend axially inwardly into the cyclone chamber from a solid outlet conduit that is located in the cyclone chamber or from an end wall of the cyclone chamber.

Figure 69A:
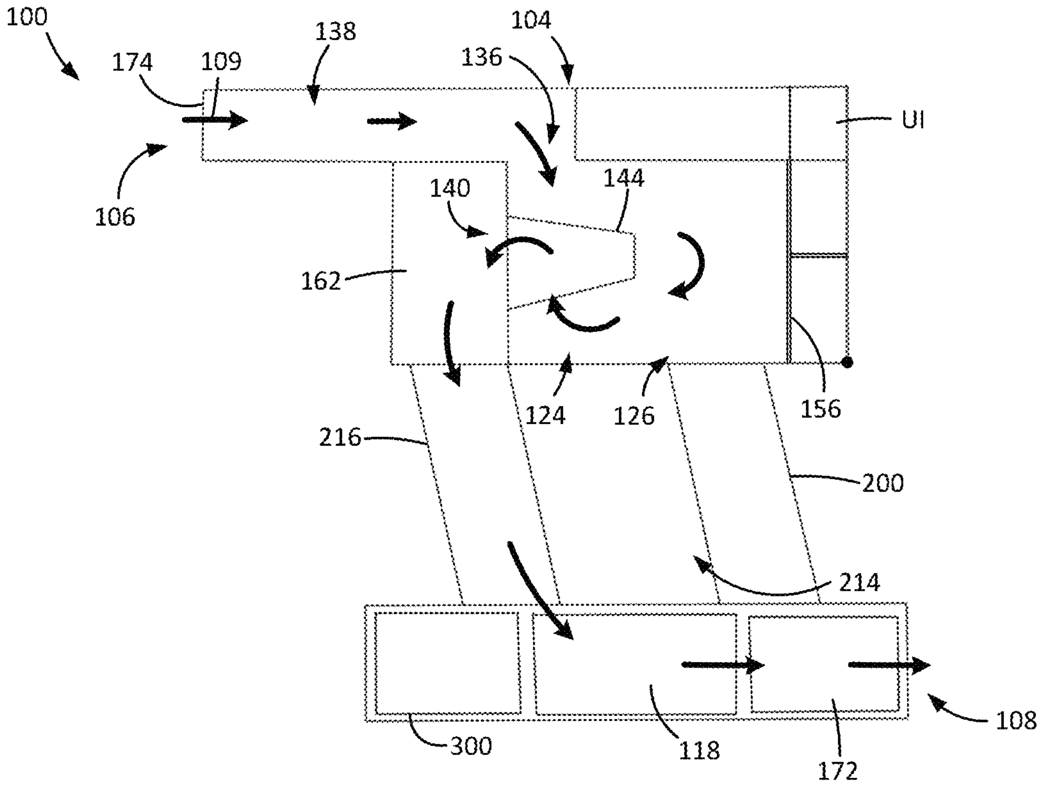
FIG. 69A is a side cross-sectional view of a hand vacuum cleaner with an openable portion in a closed position.
Figure 69B:
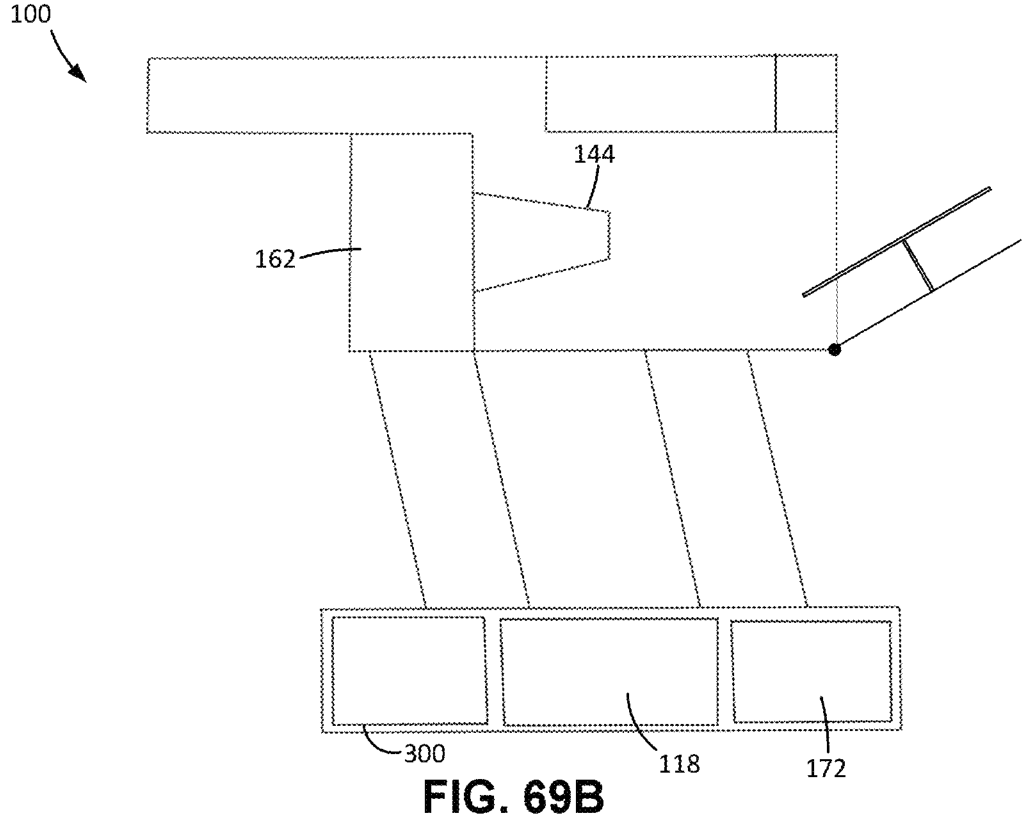
FIG. 69B is a side cross-sectional view of the hand vacuum cleaner of FIG. 69A with an openable portion in an open position.

The surface cleaning apparatus 100 may include a deflector or plate 156. Plate 156 is located axially between the cyclone chamber and an external dirt collection chamber. As exemplified, for example, in FIGS. 36A and 51A, when the inlet conduit is oriented horizontally, the plate 156 may be positioned at the lower end of the cyclone chamber or, as exemplified in FIG. 69A, at the rear end of the cyclone chamber. Accordingly, as exemplified in FIG. 36A, the first cyclone end wall 129 forms the plate 156.

If a plate is provided, then the dirt outlet 142 may be provided by one or more gaps between the plate 156 and the cyclone sidewall 132. The dirt outlet may be an annular gap that extends around a perimeter of the plate 156 (see, e.g., FIG. 51A) or part way around the perimeter of the plate 156 (see, e.g., FIG. 36A). The plate 156 may be axially spaced from the cyclone side wall (e.g., FIG. 36A) and/or radially spaced inwardly from the cyclone side wall.

Accordingly, for example, plate 156 may be sized to cover substantially all of first cyclone end 128 (e.g., FIG. 36A), and to abut the lower end of cyclone sidewall 132 to form the cyclone chamber bottom wall 148. When plate 156 abuts the lower end of cyclone sidewall 132 it may define part of the gaps or slots that form dirt outlet 142. For example, dirt outlet 142 may be bounded on three sides by cyclone sidewall 132 and on a fourth side by plate 156. Alternatively, cyclone sidewall 132 may be spaced apart from plate 156 and the dirt outlet is defined by the gap between the plate 156 and the end of the cyclone sidewall 132 (e.g., FIG. 51A).

Figure 51A:
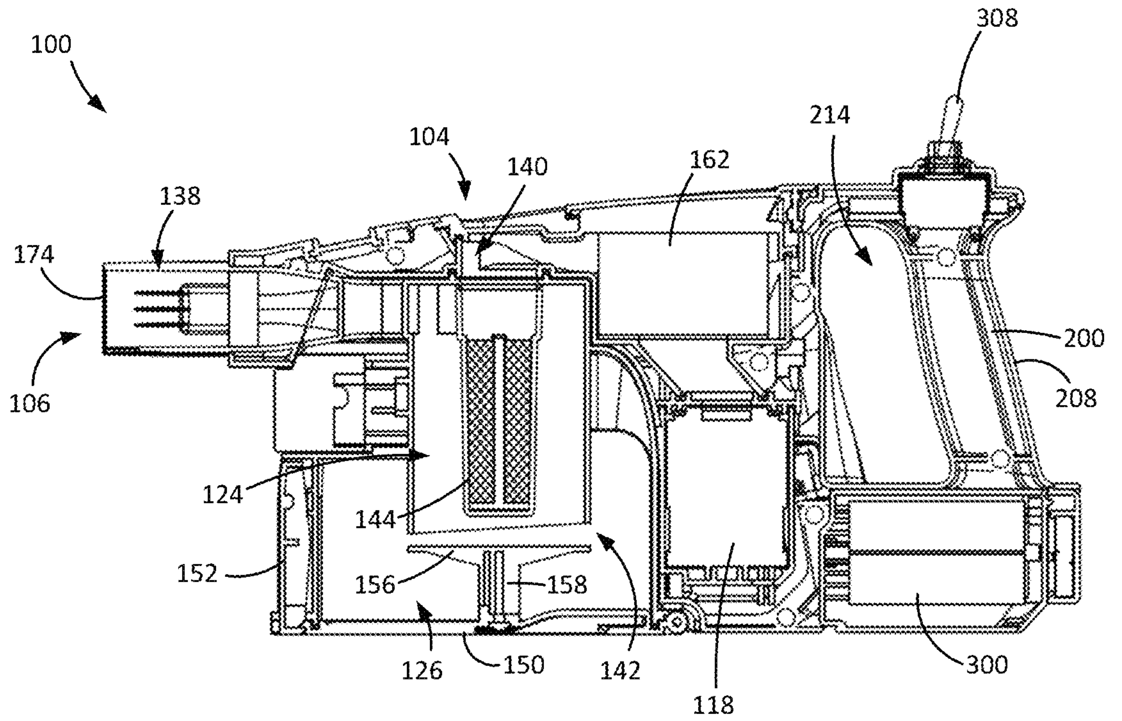
FIG. 51A is a side cross-sectional view of a hand vacuum cleaner with a dirt collection chamber in front of the cyclone chamber.

In some embodiments, for example as exemplified in FIG. 51A, plate 156 is mounted (fixedly or rotationally) to and supported, optionally, spaced from dirt collection bottom wall 150 by a support member 158. Support member 158 may be of any suitable configuration and may be formed from any suitable material that is capable of supporting plate 156 and resisting stresses exerted on plate 156 by the air flow in cyclone chamber 124 or dirt particles exiting cyclone chamber 124. Alternatively, plate 156 may be mounted (fixedly or rotationally) to cyclone sidewall 132 (or any other portion of the surface cleaning apparatus 100).

In some embodiments, the external dirt collection chamber may not be positioned axially from the cyclone chamber (e.g., below as exemplified in FIG. 14). In such a case, the dirt outlet 142 may be provided by a gap between the cyclone side wall and the second cyclone end wall 131. Accordingly, the dirt outlet may be a slot in the cyclone side wall.

Optionally, one or more pre-motor filters may be placed in the air flow path between air treatment assembly 104 and motor and fan assembly 118. In the illustrated embodiment of FIG. 1A, surface cleaning apparatus 100 includes a pre-motor filter housing 160 provided in the air flow path 109 upstream of air treatment assembly 104 and motor and fan assembly 118. In other embodiments, for example as exemplified in FIG. 10, the pre-motor filter housing 160 may be provided in the air flow path 109 downstream of air treatment assembly 104 and upstream of motor and fan assembly 118. As exemplified, pre-motor filter housing 160 may be provided as a portion of main body 102.

Pre-motor filter housing 160 may be of any suitable construction, including any of those exemplified herein. One or more pre-motor filters 162 may be removably positionable within pre-motor filter housing 160. Pre-motor filter(s) 162 may be formed from any suitable physical, porous filter media and may have any suitable shape, including the examples disclosed herein with respect to a removable pre-motor filter assembly. For example, pre-motor filter 162 may be one or more of a foam filter, felt filter, HEPA filter, other physical filter media, electrostatic filter, and the like.

Optionally, one or more post-motor filters may be positioned in the air flow path between motor and fan assembly 118 and clean air outlet 108 to help further treat the air passing through the hand vacuum cleaner 100. As exemplified for example in FIG. 1A, surface cleaning apparatus 100 may include an optional post-motor filter 172 provided in the air flow path downstream of motor and fan assembly 118 and upstream of clean air outlet 108. Post-motor filter 172 may be formed from any suitable physical, porous filter media for filtering air in the airflow path downstream of motor and fan assembly 118 and may be of any suitable shape. Post-motor filter 172 may be any suitable type of filter such as one or more of a foam filter, felt filter, HEPA filter, other physical filter media, electrostatic filter, and the like. Clean air outlet 108 may form part of an optional post-motor filter housing.

In the illustrated embodiments, dirty air inlet 106 of hand vacuum cleaner 100 comprises an inlet port in an inlet end 174 of inlet conduit 138. Optionally, inlet end 174 of inlet conduit 138 can be used as a nozzle to directly clean a surface. Inlet conduit 138 is, in this example, a generally linear hollow member that extends along an inlet conduit axis 176 that is oriented in a longitudinal forward/rearward direction and is generally horizontal when surface cleaning apparatus 100 is oriented with the upper end 114 above lower end 116. Alternatively, or in addition to functioning as a nozzle, inlet conduit 138 may be connectable, e.g., directly connectable, to the downstream end of any suitable accessory tool such as a rigid air flow conduit (e.g., an above floor cleaning wand), a crevice tool, a mini brush, and the like.

Optionally, hand vacuum cleaner 100 may be removably mountable on a base (e.g., a surface or floor cleaning head and an upright housing or wand that is pivotally mounted to the surface cleaning head) so as to form, for example, an upright vacuum cleaner or a stick vacuum cleaner, or, if the base is a canister body, then it may be part of a canister vacuum cleaner. The base and the hand vacuum cleaner may provide a surface cleaning apparatus that is a vacuum cleaner, a wet-dry vacuum cleaner and the like. The base of surface cleaning apparatus 100 may include a surface cleaning head and an elongate wand that can be connected to surface cleaning apparatus 100 so as to provide a stick vacuum cleaner. In this configuration, the surface cleaning apparatus may be used to clean a floor or other surface in a manner analogous to a conventional upright-style vacuum cleaner.

Inlet end 174 of inlet conduit 138 may include any suitable connector that is operable to connect to, and preferably detachably connect to, a hose, cleaning tool, the upright section (e.g., rigid wand) of a base of an upright or stick vacuum cleaner or other accessory cleaning tool.

Optionally, in addition to providing an air flow connection, inlet conduit 138 may also include an electrical connection. Providing an electrical connection may allow cleaning tools, accessories and the like that are coupled to inlet conduit 138 to be powered by hand vacuum cleaner 100. For example, hand vacuum cleaner 100 can be used to provide both power and suction to the surface cleaning head. Accordingly, an electrical connector, which may be a female electrical connector, may be provided adjacent the inlet end of the inlet conduit 138.

Figure 65:
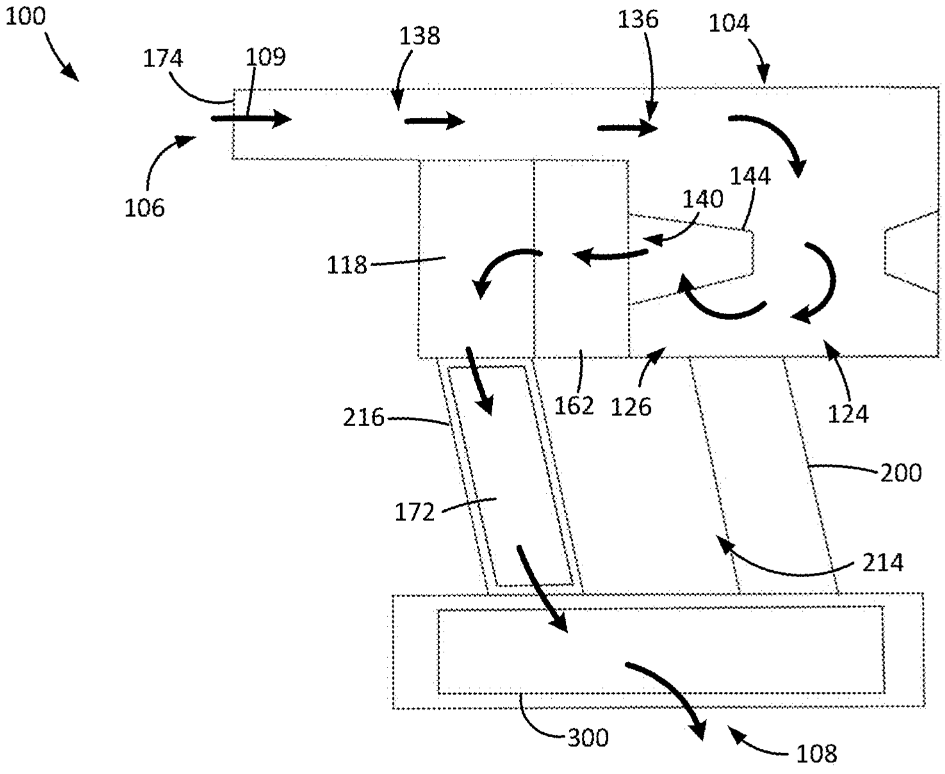

Clean air outlet 108 may be any outlet, at any location, that allows the air flow to exit surface cleaning apparatus 100. In the illustrated embodiment of FIG. 1A, for example, clean air outlet 108 is provided as part of the main body 102 and is configured as a grill. A clean air outlet 108 may be provided on each lateral side of main body 102. In this embodiment, the grill is oriented so that air exiting clean air outlet 108 travels laterally outward from main body 102. This may ensure that the exhausted air is directed away from a user's hand when they are holding a handle 200, which may be rearward of the clean air outlet 108 in some embodiments. In some embodiments, as exemplified for example in FIG. 1A, the laterally-facing clean air outlets 108 may be located towards the rear end 112. In other embodiments, for example as exemplified in FIG. 19, the laterally-facing clean air outlets 108 may be located towards the front end 110. Alternatively, as exemplified in FIG. 2, for example, clean air outlet 108 may be a grill provided on upper end 114 of surface cleaning apparatus 100 so that the exhausted air travels generally upwardly from upper end 114. Alternatively, as exemplified in FIG. 14 for example, clean air outlet 108 may be provided on lower end 116 of surface cleaning apparatus so that the exhausted air travels generally downwardly from lower end 116. Alternatively, as exemplified in FIG. 11, clean air outlets 108 may be provided on both upper and lower ends 114, 116, of surface cleaning apparatus. Alternatively, as exemplified in FIG. 10, clean air outlet 108 may be a plurality of openings provided at rear end 112 of hand vacuum cleaner 100 so that the exhausted air travels generally rearwardly from rear end 112. Alternatively, as exemplified for example in FIG. 65, clean air outlet 108 may be provided in a handle 200 (discussed further below).

It will be appreciated that hand vacuum cleaner 100 may include a user interface 218 (see, e.g., FIG. 14). The user interface 218 may provide information about an operating mode of the surface cleaning apparatus 100 and/or an actuator (e.g., a button or touch screen control) that a user may press to toggle between, e.g., operational states of the surface cleaning apparatus 100 (e.g., one or more of a main on/off control, a brush roll on/off control, a suction motor speed hi and/or medium and/or low and brush rotation speed hi and/or medium and/or low). For example, the user may toggle between a floor cleaning mode in which the motor and fan assembly 118 is provided with a first power level and an above floor cleaning mode in which the motor and fan assembly 118 is provided with a second power level that is higher than the first power level (i.e., to rotate the fan faster). In some embodiments, the user interface 218 may provide information about a charge level of the energy storage member 300.

The user interface 218 may be communicatively coupled to a control system of the hand vacuum cleaner 100. The control system may include one or more onboard processors communicatively coupled to one or more on board data storage systems storing instructions. The instructions include routines or schedules for operating the surface cleaning apparatus 100, and may include routines or schedules for operating the surface cleaning apparatus 100 in response to input. The input may be user input (e.g., via the user interface 218), such as turning the apparatus on or off or selecting an operational mode (e.g., carpet or bare floor). The input may be from one or more components of the surface cleaning apparatus 100, such as from an on-board sensor. The surface cleaning apparatus may include one or more sensors. It will be appreciated that any suitable sensor may be included, including any of the sensors described herein. The control system (e.g., the one or more processors) may be communicatively coupled to one or more sensors and/or actuators to receive input and/or provide operation commands based on the received input.

The control system (e.g., the one or more processors) may be communicatively coupled to the user interface 218 to receive user input and/or provide information. Accordingly, the user interface 218 may provide information to the user and/or include at least one control operable by the user (e.g., an on/off control, which may be a button or touch sensitive area of the user interface). The user interface 218 may provide information about at least one operating mode of the surface cleaning apparatus 100 (e.g., information about which mode is active). The user interface 218 may provide information about a charge level of an energy storage member 300. The user interface may include at least one interface toggle. The interface toggle 362 may be referred to as a control of the surface cleaning apparatus. The interface toggle may be a soft toggle (e.g., a touch sensitive area of the touchscreen) or a physically moveable toggle such as a slider, a rocker switch, or a depressible button. The user interface may include an information display, such as an illuminable touchscreen, a display screen, or an illuminable icon or icons.

It will be appreciated that the control system may be communicatively coupled to one or more powered component of the surface cleaning apparatus to control operations thereof (e.g., to activate, deactivate, and/or change a setting such as a mode thereof). A powered component may be, e.g., a powered valve, a powered actuator, or a powered interface (e.g., a display screen, a touchscreen or illuminated icon), such as any of the powered components described subsequently herein. A powered component may be coupled to a power supply of the surface cleaning apparatus, such as a power supply member or a power cord, to receive power therefrom.

It will be appreciated that the user interface 218 may be provided at any suitable location on the surface cleaning apparatus 100, and may be any suitable user interface. Optionally, one or more user interfaces 218 may be provided on one or more of the handle 200, at the rear end 112, such as a rear facing wall of the hand vacuum cleaner as exemplified in FIG. 49B and/or an upper surface of the surface cleaning apparatus 100 for ease of access or visibility. For example, the user interface 218 may be located on a rear surface of the handle 200 (e.g., FIG. 14) or an upper surface of the handle (e.g., FIG. 15A) or a rear portion of the upper wall of the hand vacuum cleaner.

Handle

As exemplified herein, hand vacuum cleaner 100 includes a handle 200 with a hand grip portion 208. Various options for a handle configuration and positioning are discussed. Any such handle may be used by itself or in combination with one or more of the position of one or more energy storage packs, the air flow path, the position of a dirt collection chamber, the openable and removable portions, the tangential inlet with ramp, the air treatment assembly, the position of the suction motor, the position of a pre-motor filter, the position of a post-motor filter, a telescoping inlet and the corner screen as disclosed herein.

Handle 200 may have various positional arrangements and configurations, which may improve the ergonomics of hand vacuum cleaner 100.

Figure 59A:
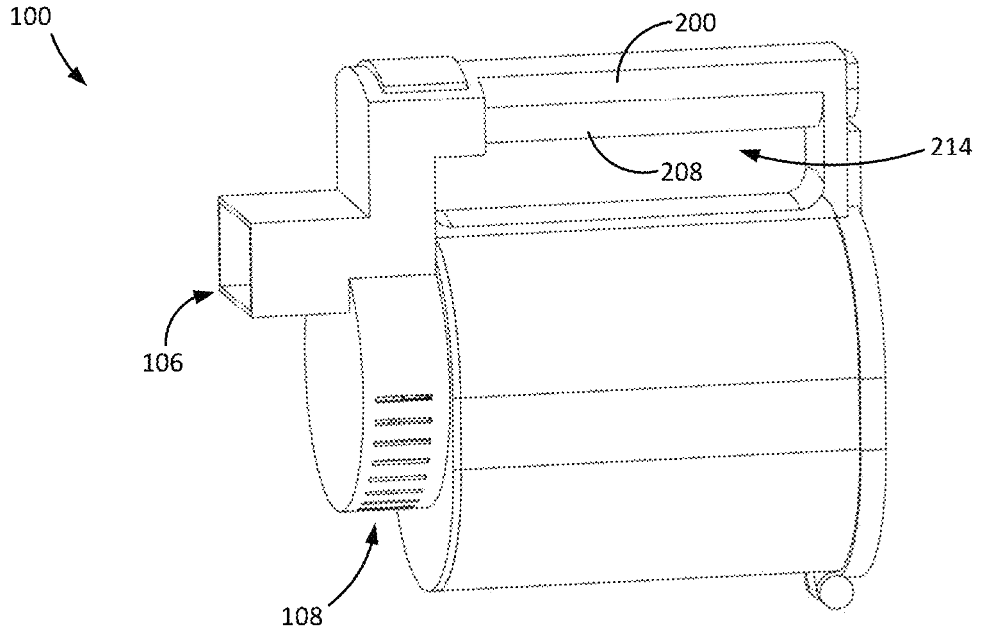
FIG. 59A is a side perspective view of a hand vacuum cleaner with an openable portion in a closed position.
Figure 59B:
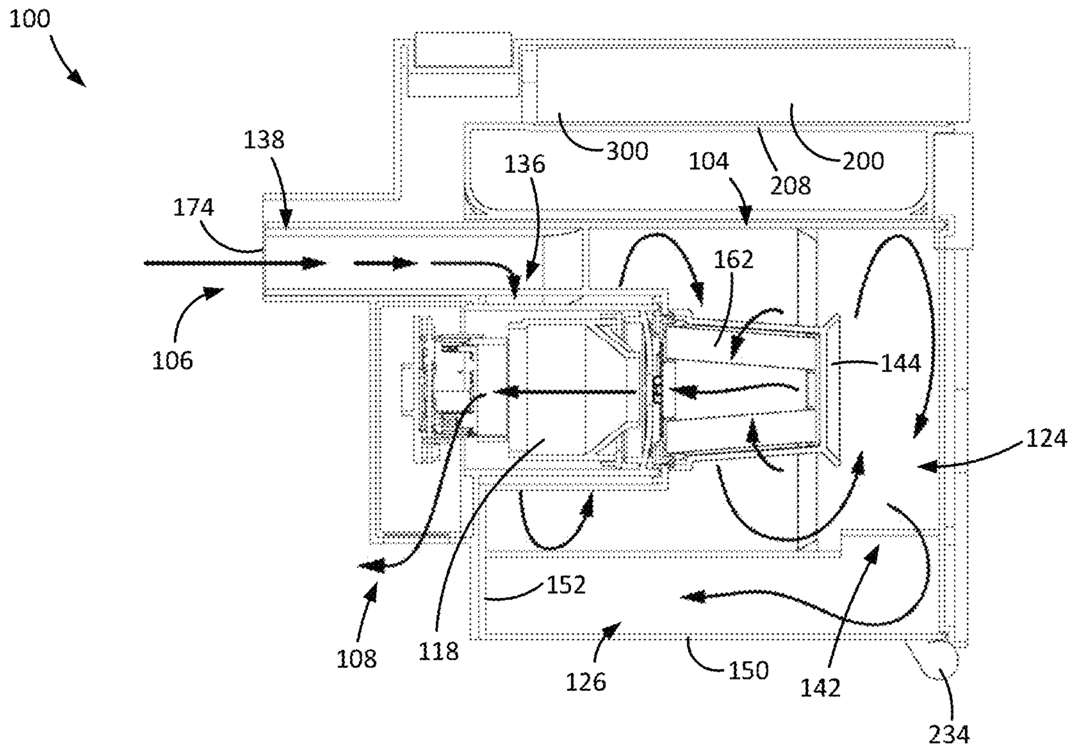
FIG. 59B is a side cross-sectional view of the hand vacuum cleaner of FIG. 59A.
Figure 70A:
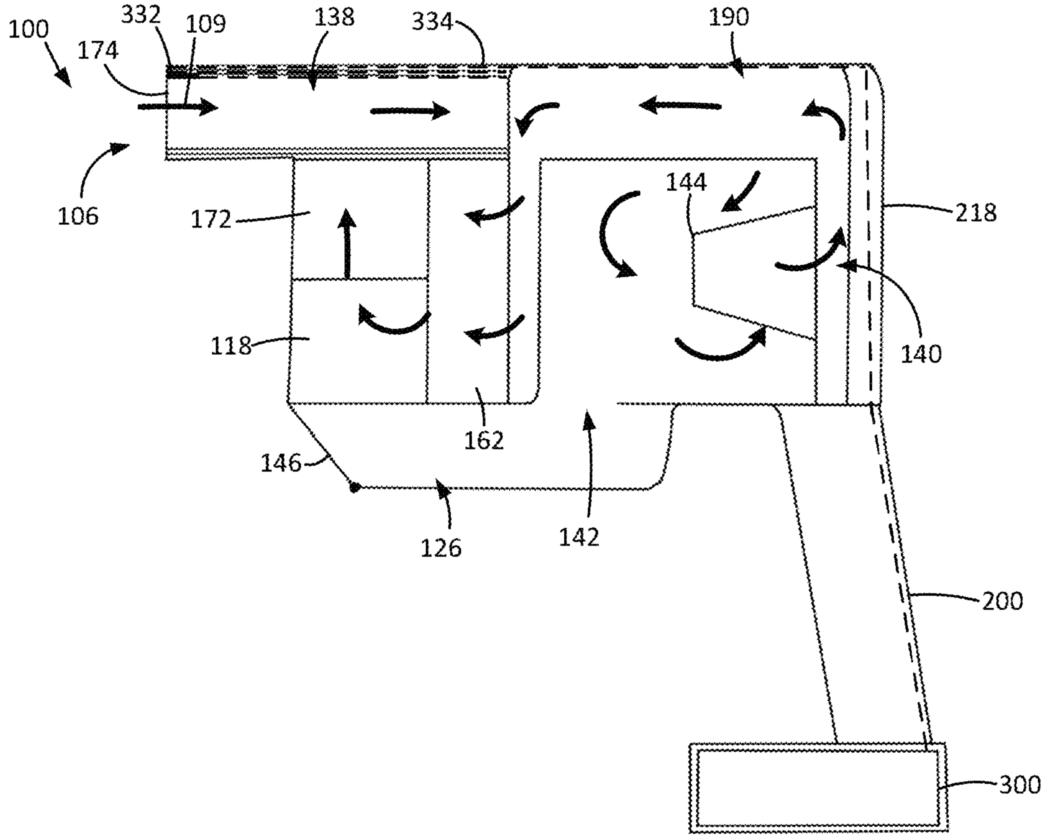
FIG. 70A is a side cross-sectional view of a hand vacuum cleaner with a telescoping inlet in a retracted position.
Figure 71A:
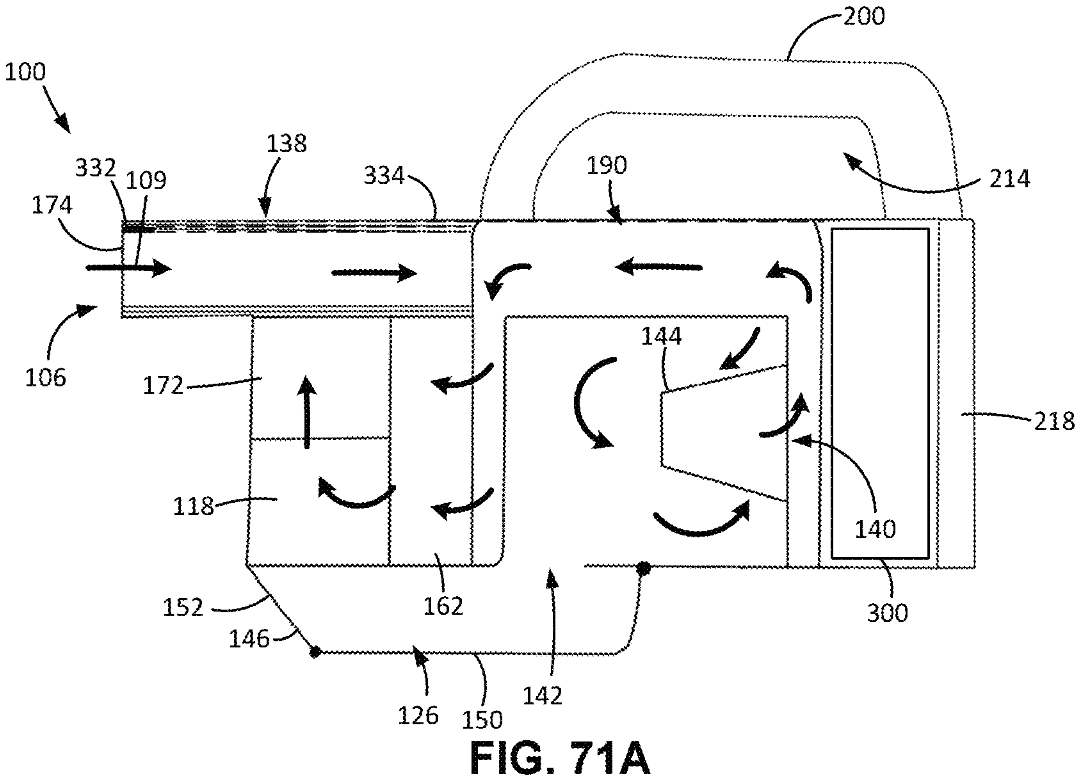
Figure 71B:
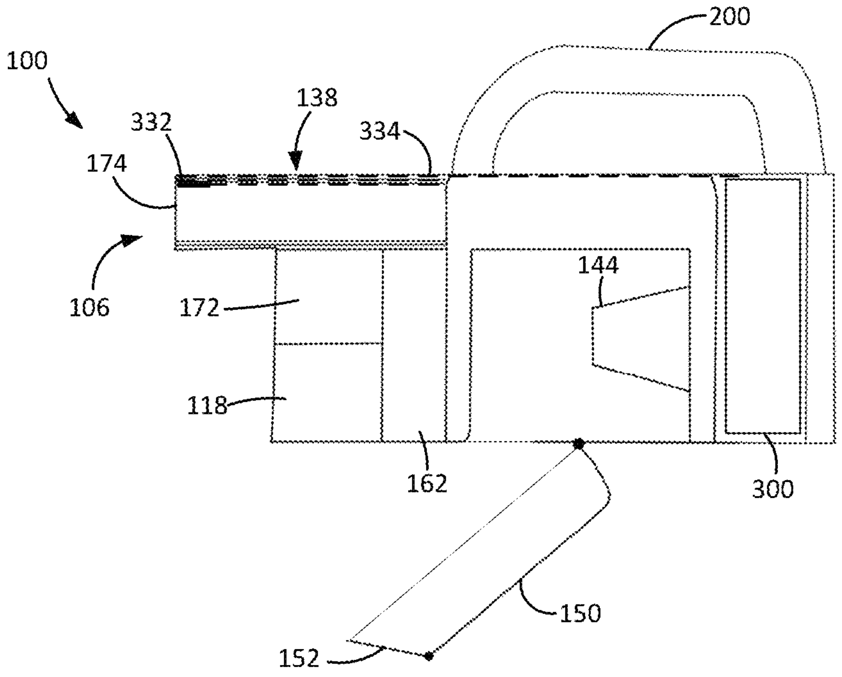
Figure 72A:
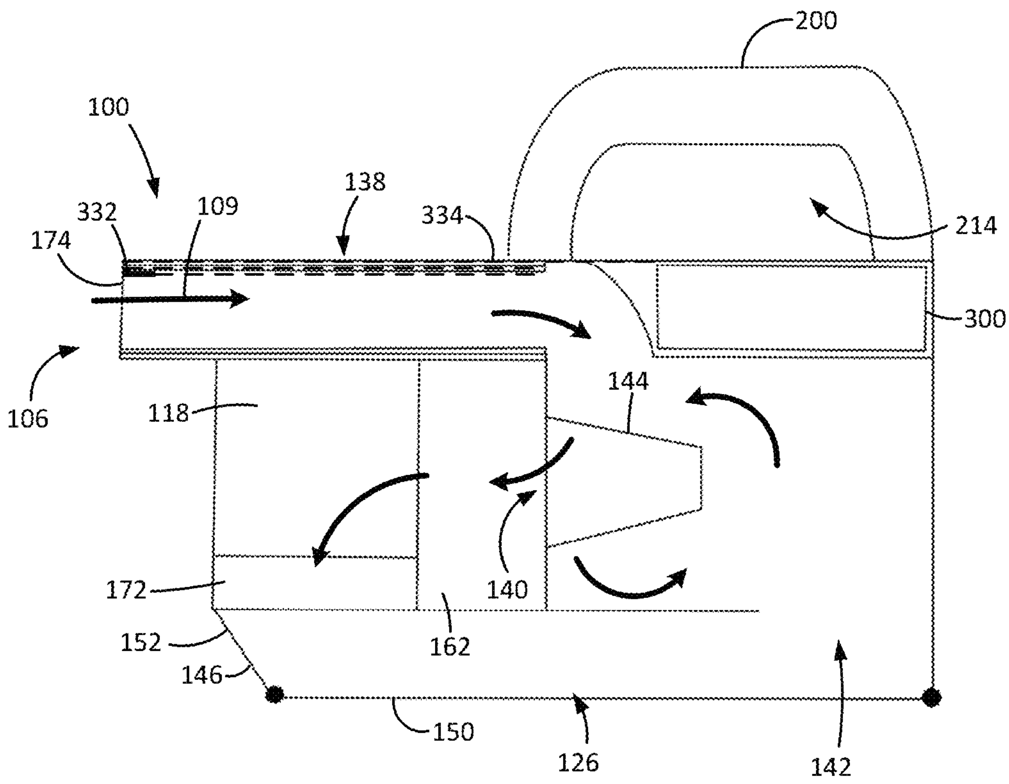
Figure 79:
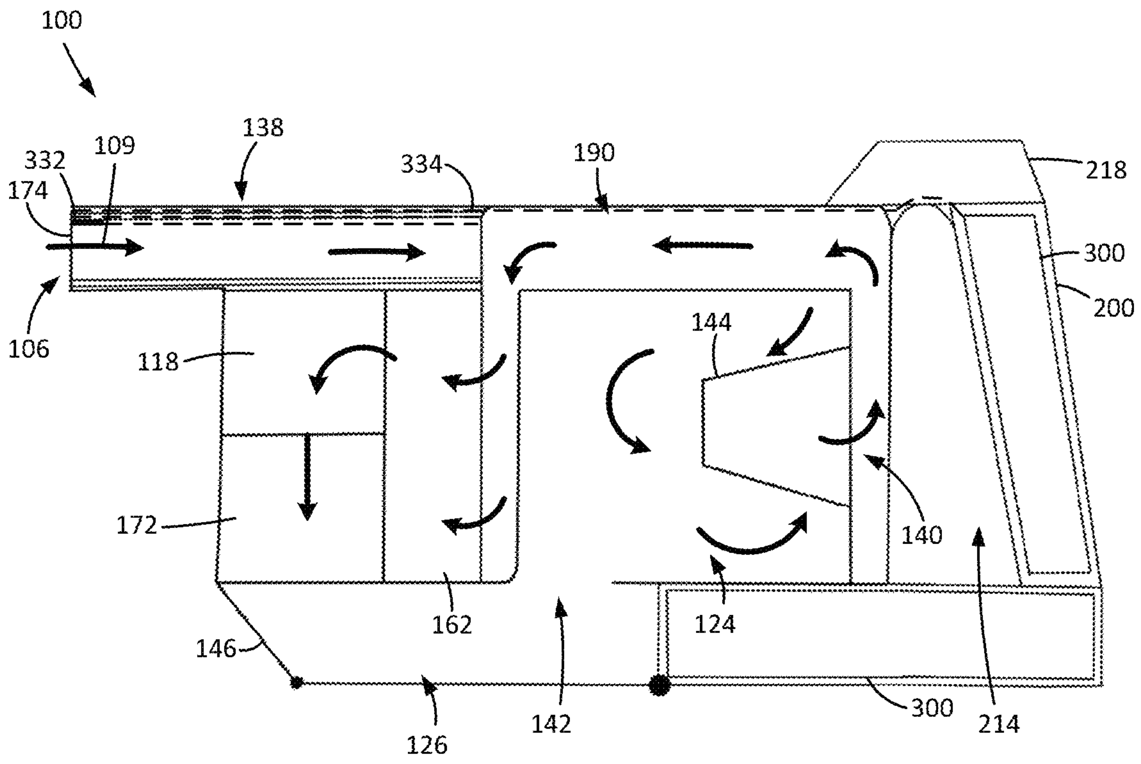
Figure 80:
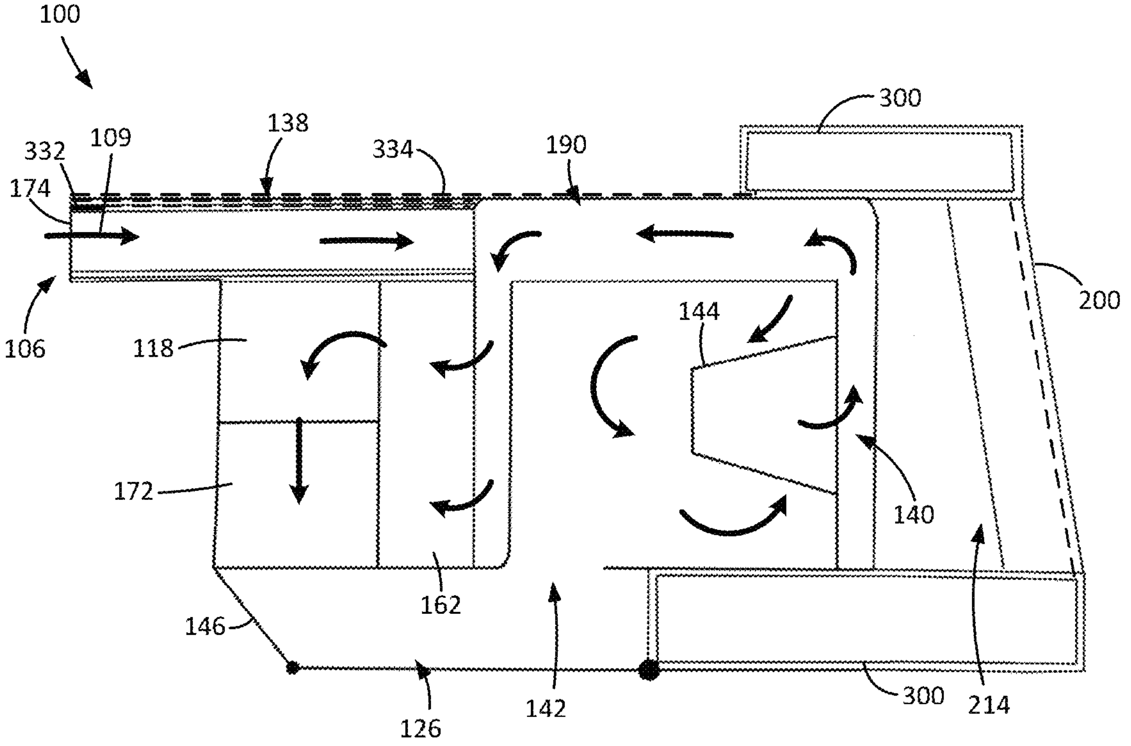
Figure 81:
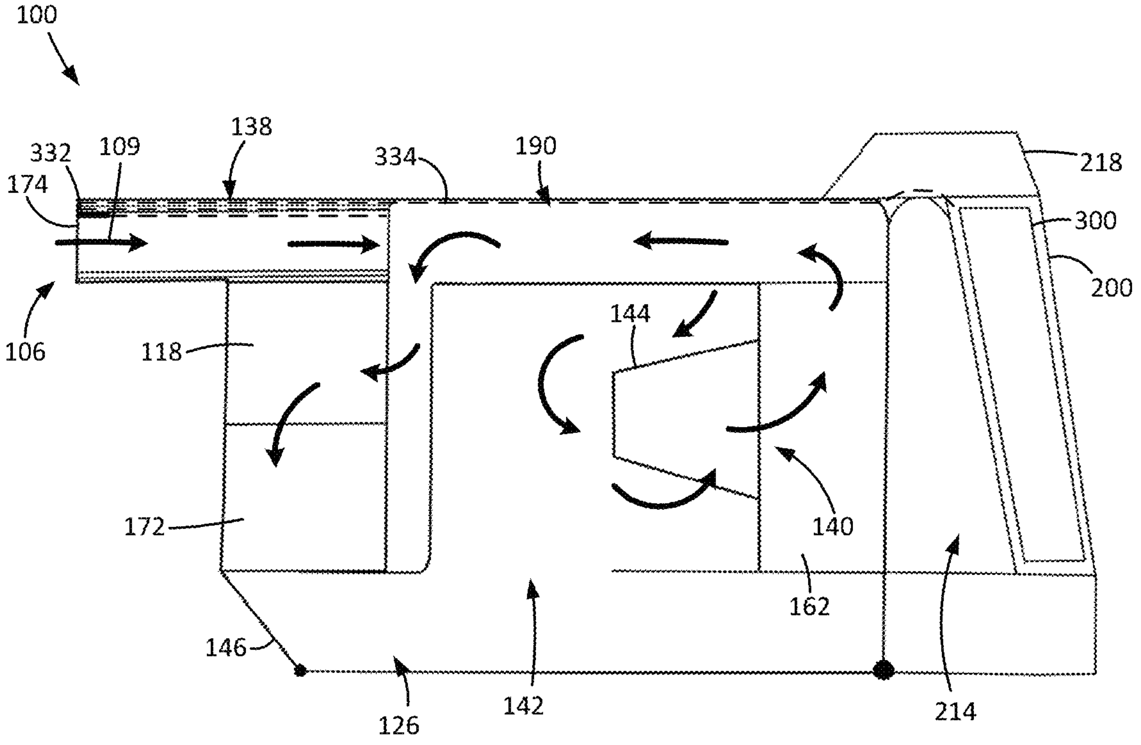
Figure 82:
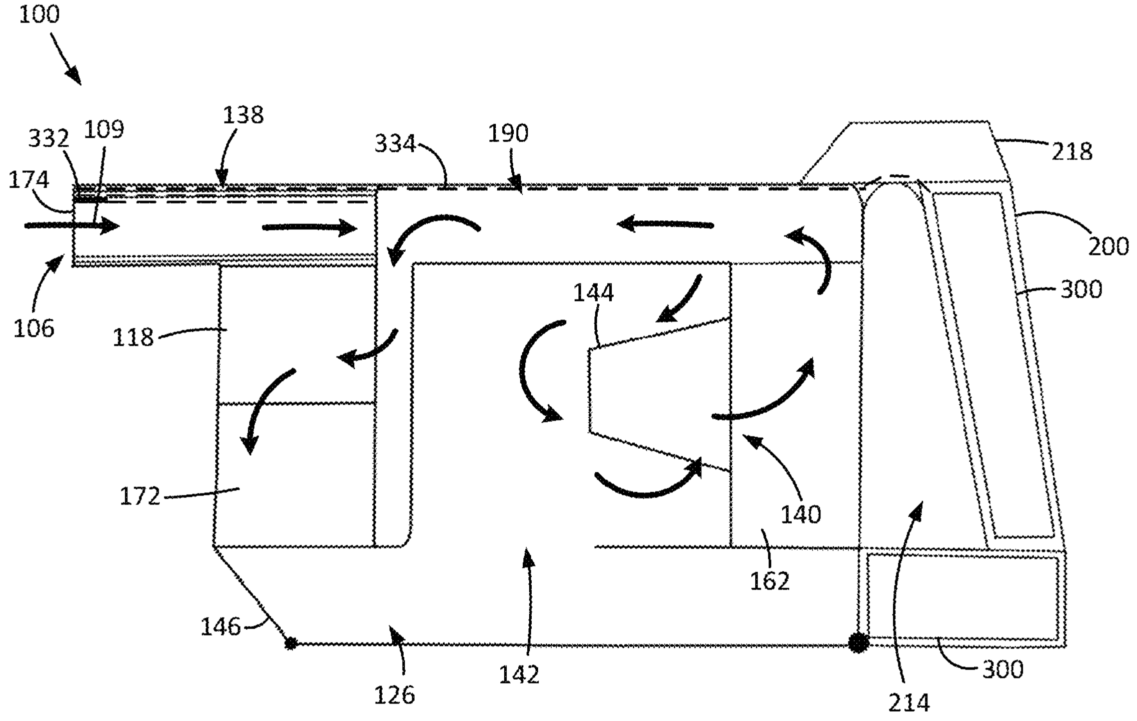
Figure 83:
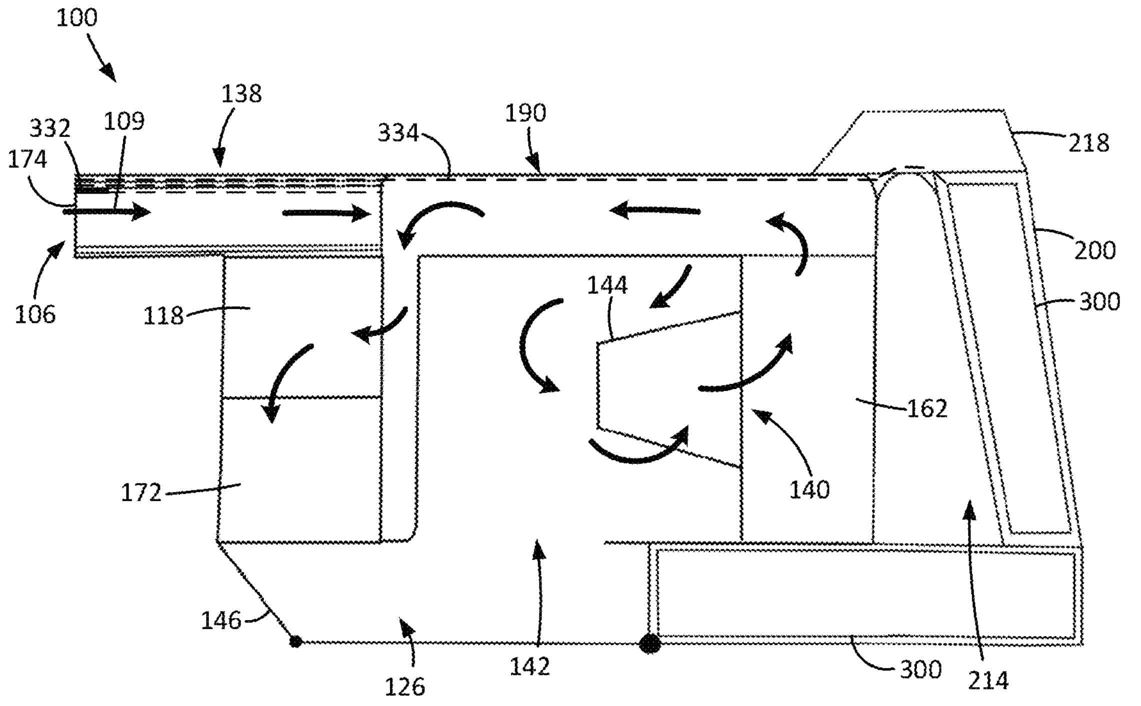

The handle may be mounted to one or more of the lower end 116 of the hand vacuum cleaner (e.g., FIG. 1B), the rear end 112 of the hand vacuum cleaner (e.g., FIG. 14) and the upper end 114 of the hand vacuum cleaner 100 (e.g., FIG. 59A). Accordingly, handle 200 may be located at rear end 112 of hand vacuum cleaner 100 (see, e.g., FIGS. 14, 15A, 16A, 18). As another example, handle 200 may be located on upper end 114 of hand vacuum cleaner 100 (see, e.g., FIGS. 59A, 71A, 72A). As yet another example, handle 200 may be located on lower end 116 of hand vacuum cleaner 100 (see, e.g., FIGS. 1B, 5, 49A, 70A). As yet another example, handle 200 may be located on both the upper end 114 and rear end 112 of hand vacuum cleaner 100 (see, e.g., FIGS. 79-80), on both the rear end 112 and the lower end 116 of hand vacuum cleaner 100 or on both the upper end 114 and the lower end 116 of hand vacuum cleaner 100.

Figure 16B:
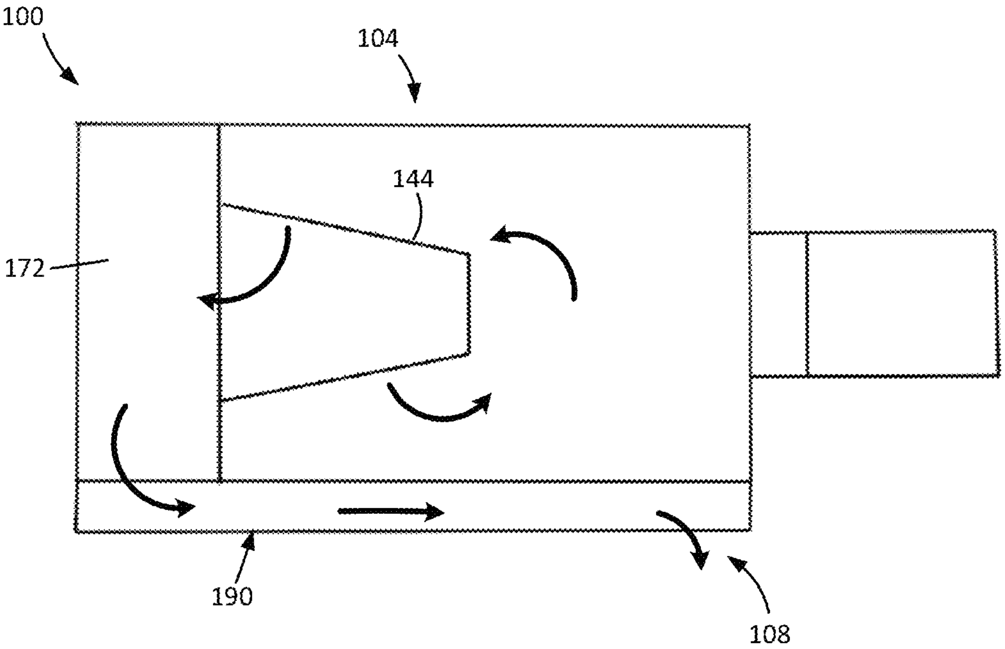
FIG. 16B is a top view of the hand vacuum cleaner of FIG. 16A.
Figure 16C:
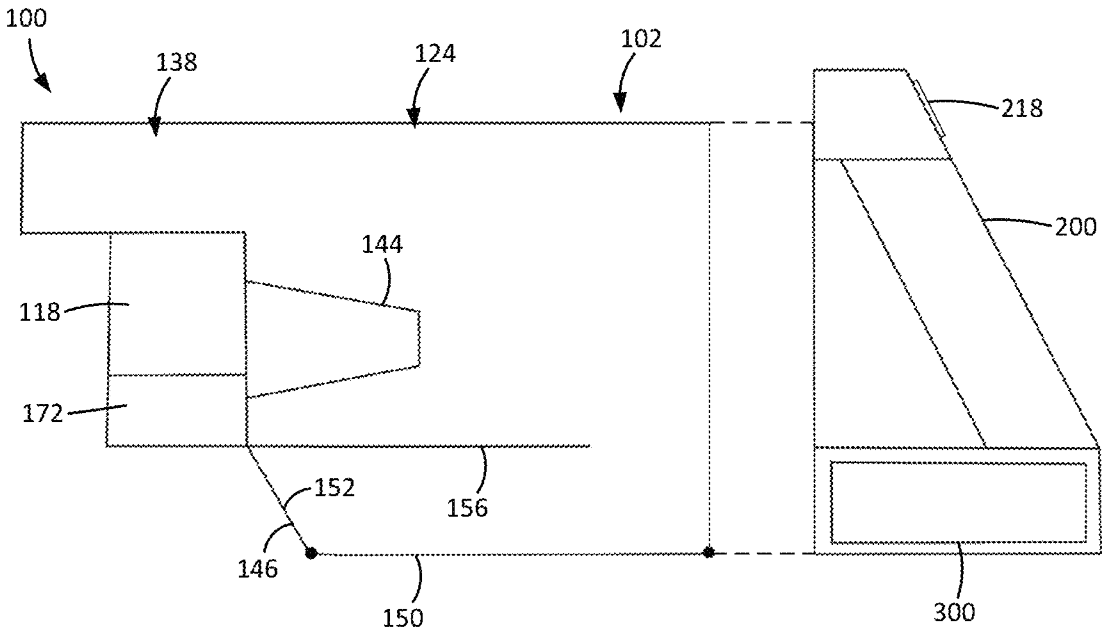
FIG. 16C is a side cross-sectional view of the hand vacuum cleaner of FIG. 16A with the removable handle moved rearwardly from a remainder of the hand vacuum cleaner.

Optionally, handle 200 may be removable from main body 102. For example, FIG. 16C exemplifies a removable handle 200 mounted rearwardly of cyclone chamber 124. Handle 200 can be removably mounted to main body 102 in any suitable fashion (e.g., dove-tail locking members, clips, etc.). Removing handle 200 may facilitate charging or replacement of energy storage members 300 (described further below) that are removed with handle 200.

Figure 17:
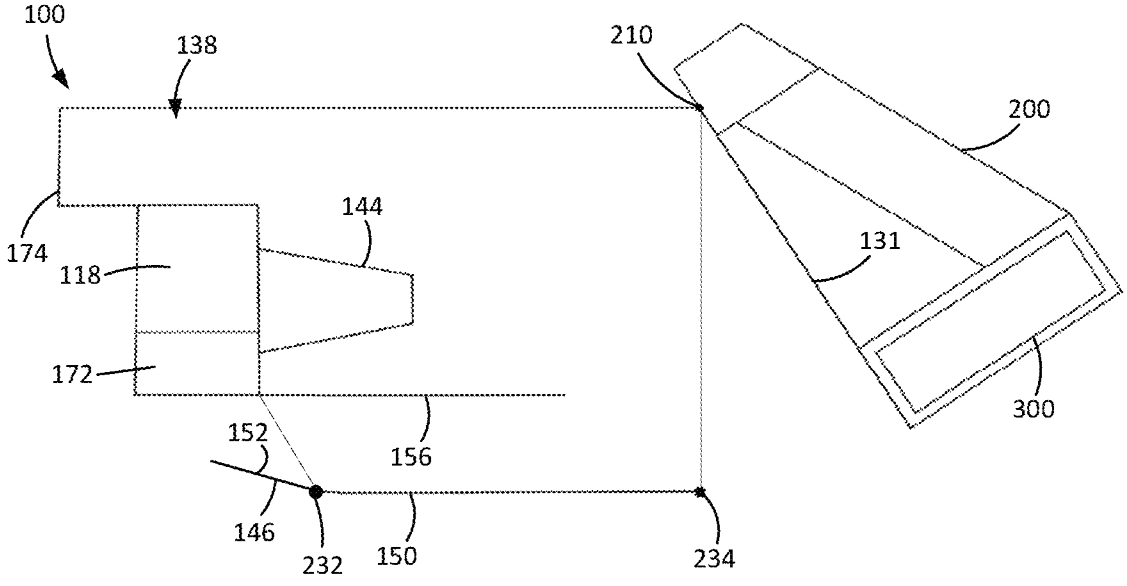
FIG. 17 is a side cross-sectional view of an example hand vacuum cleaner with an openable door in an opened position and a rotatable handle in a rotated position.

In other embodiments, the handle 200 may rotate about a rotational mount by itself or concurrently with other parts of the hand vacuum cleaner. Optionally, the rotation of the handle, by itself or in combination with other parts of the hand vacuum cleaner may open an air treatment chamber. For example, the second cyclone end wall 131 may also pivot with the handle 200 about the handle hinge 210 so as to open a cyclone chamber and an external dirt collection chamber (see, e.g., FIGS. 17 and 26 wherein the dirt collection chamber is below the cyclone chamber or FIG. 34B wherein the cyclone chamber is axially spaced from the cyclone chamber) or to just open a cyclone chamber (see, e.g., FIGS. 27B, 33B and 35C-D). As exemplified in FIG. 26, the dirt collection bottom wall 150, second cyclone end wall 131, and energy storage pack 300 may rotate with the handle 200 about the handle hinge 210. As exemplified in FIGS. 34A-B, a plate 156 may rotate with the handle 200 about the handle hinge 210. As exemplified in FIGS. 35C-D, the handle 200 and second cyclone end wall 131 containing door 146 may rotate together or separately about handle hinge 210.

It will be appreciated that the rotation of the handle may alternately not open an air treatment chamber, e.g., the rear wall of the air treatment chamber may remain in a closed position when the handle rotates. The rear wall may be rotatable subsequent to the rotation of the handle or the rear wall may be fixed in a closed position and not openable.

Figure 33A:
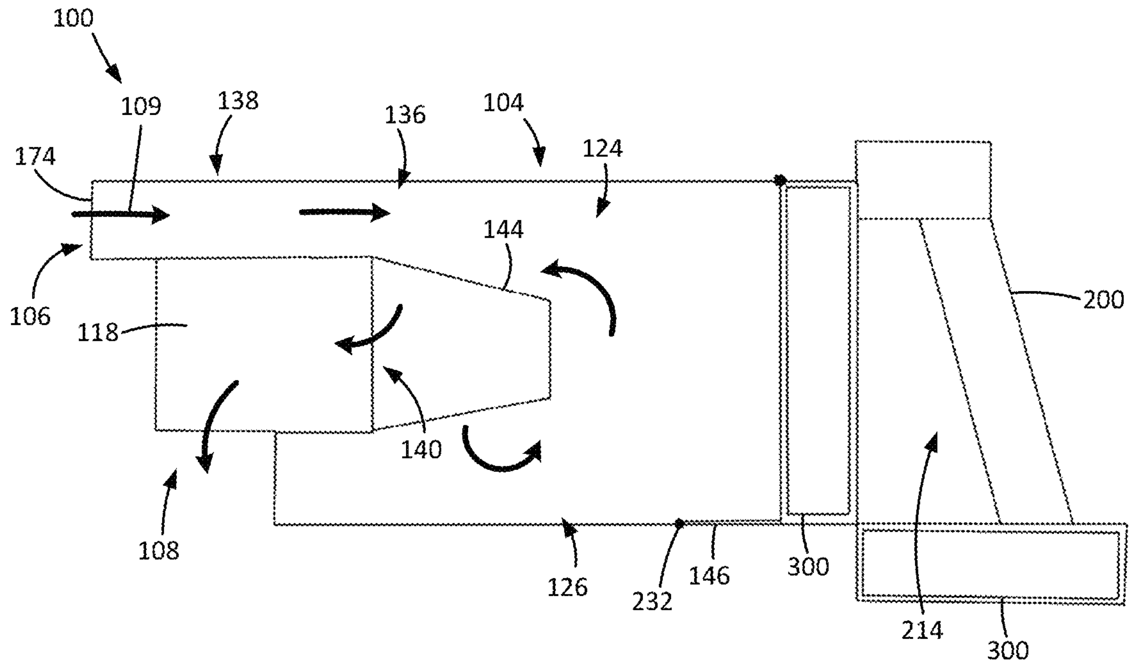
FIG. 33A is a side cross-sectional view of a hand vacuum cleaner with a rotatable rear end in a closed position.
Figure 33B:
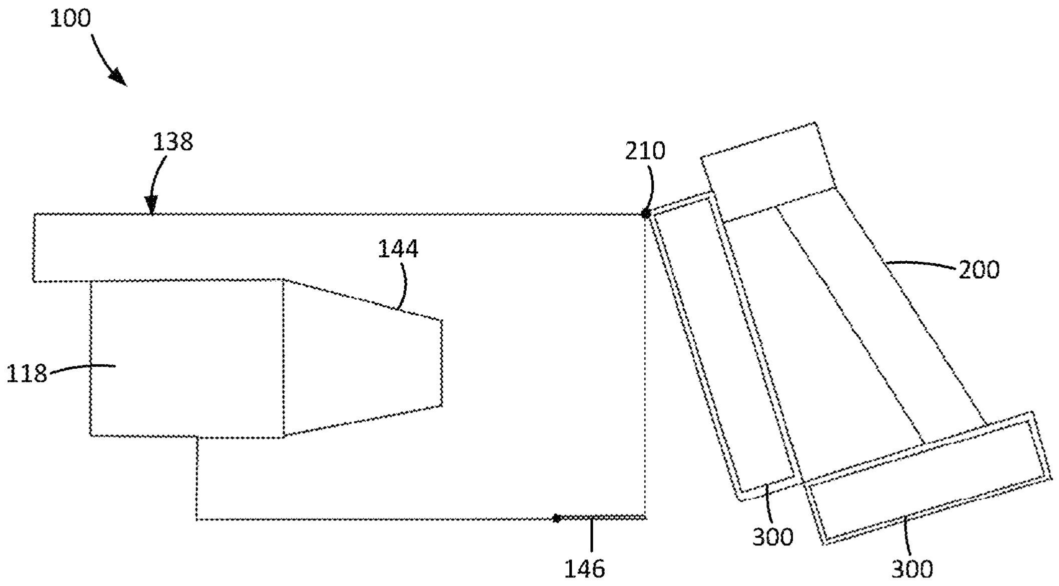
FIG. 33B is a side cross-sectional view of the hand vacuum cleaner of FIG. 33A with the rotatable rear end in an open position.
Figure 34B:
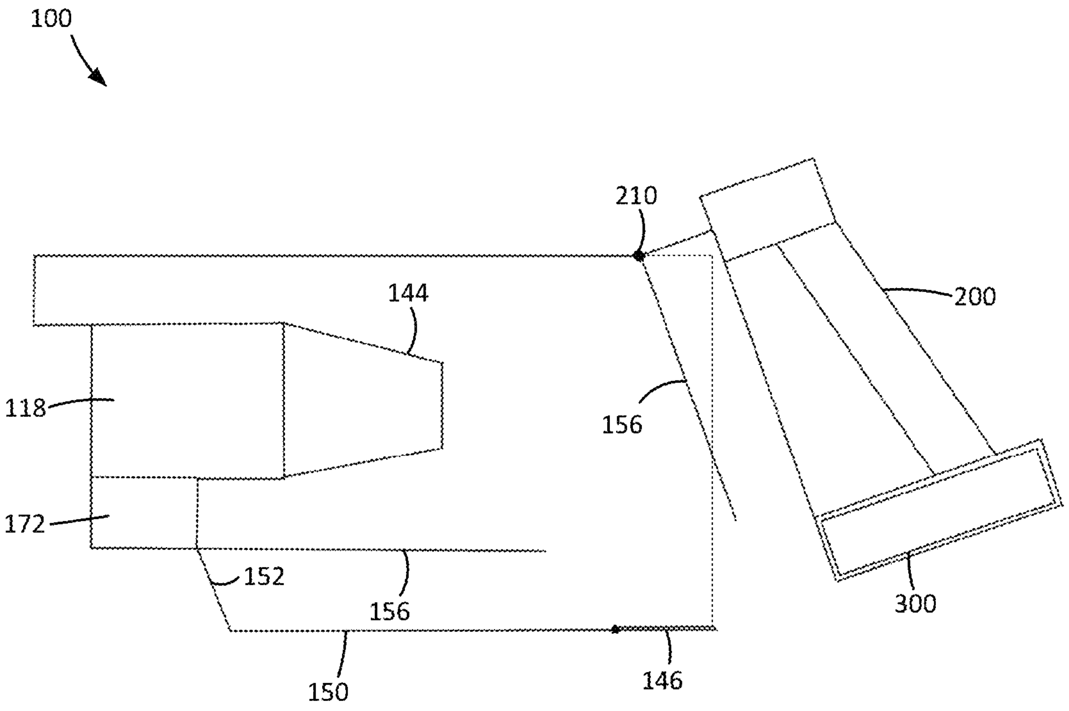
FIG. 34B is a side cross-sectional view of the hand vacuum cleaner of FIG. 34A with the rotatable rear end in an open position.

In any embodiment using a rotatable handle, another component of the hand vacuum cleaner, such as a filter or an energy storage pack 300, e.g., FIG. 33B, may rotate with the handle 200 about the handle hinge 210.

Figure 2:
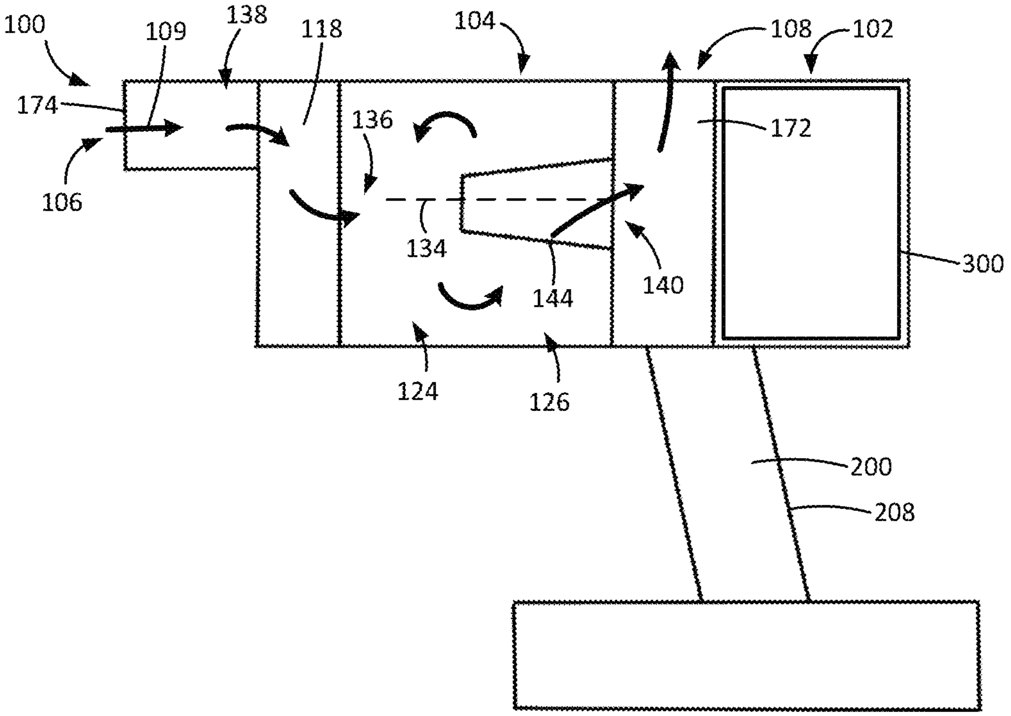
FIGS. 2-6 are side cross-sectional views of other example hand vacuum cleaners with motor and fan assemblies and energy storage packs at opposite axial ends thereof.
Figure 20A:
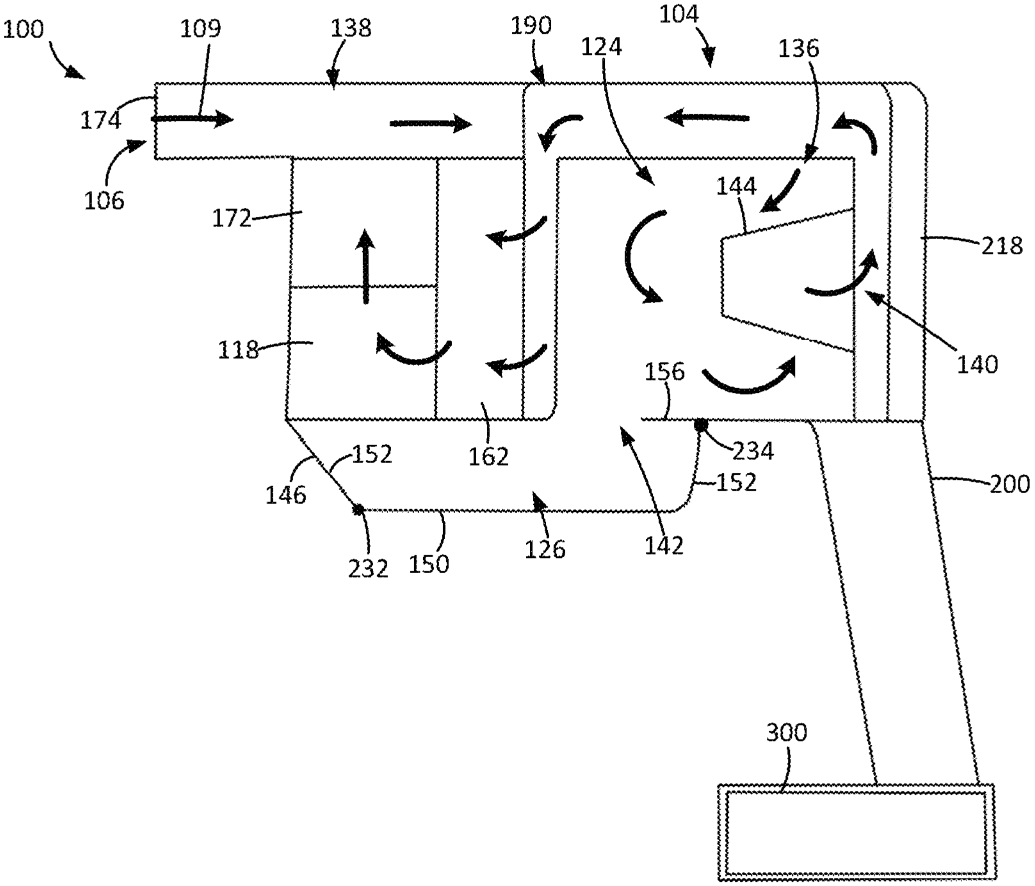
FIG. 20A is a side cross-sectional view of a hand vacuum cleaner with an openable portion in a closed position.
Figure 20B:
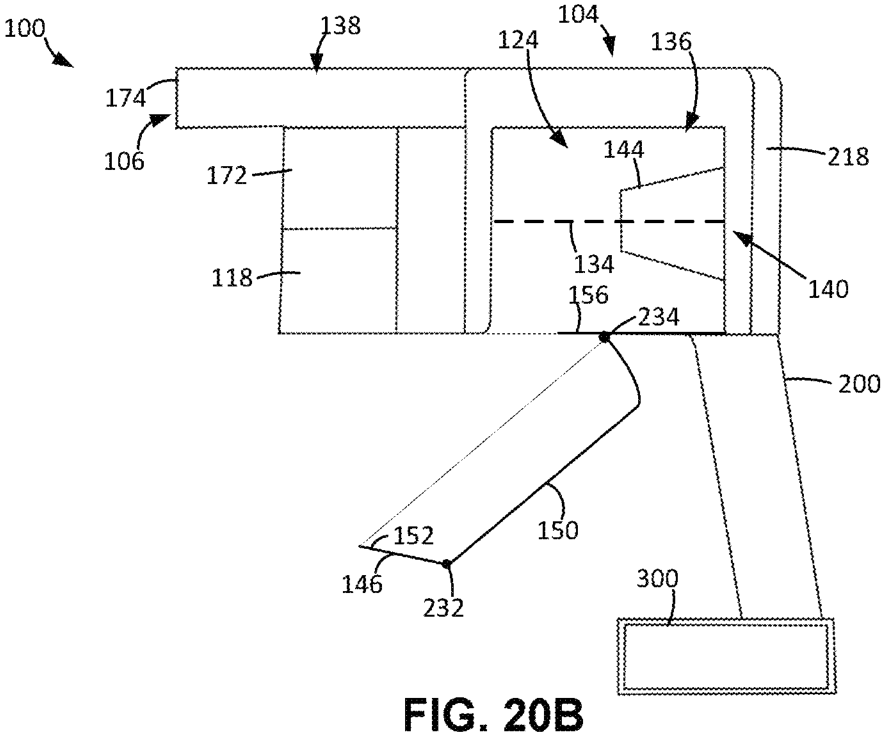
FIG. 20B is a side cross-sectional view of the hand vacuum cleaner of FIG. 20A with the openable portion in an open position.

Whether or not the handle rotates, the handle 200 may have various configurations. For example, in the illustrated embodiments of FIG. 1A, handle 200 is configured as a pistol grip type handle that extends upwardly and forwardly along a handle axis 202 (also referred to as a pistol grip axis) between first and second handle ends 204, 206, when hand vacuum cleaner 100 is oriented so that upper end 114 is above the lower end 116. When the handle 200 is configured as a pistol grip handle, the hand grip portion 208 may be referred to as a pistol grip portion. In this orientation, the first handle end 204 may be an upper end of the handle 200, and the second handle end 206 may be a lower end of the handle 200. The handle axis 202 may extend through the energy storage pack 300. The handle, which may be a pistol grip handle 200, may be mounted at various locations to the surface cleaning apparatus, including, for example, to lower end 116 (e.g., FIG. 20B) or rear end 112 (e.g., FIG. 14). For example, upper end 204 may be mounted below the cyclone chamber 124 and post-motor filter 172 (FIG. 1B), below the post-motor filter and energy storage pack 300 (FIG. 2).

Figure 35A:
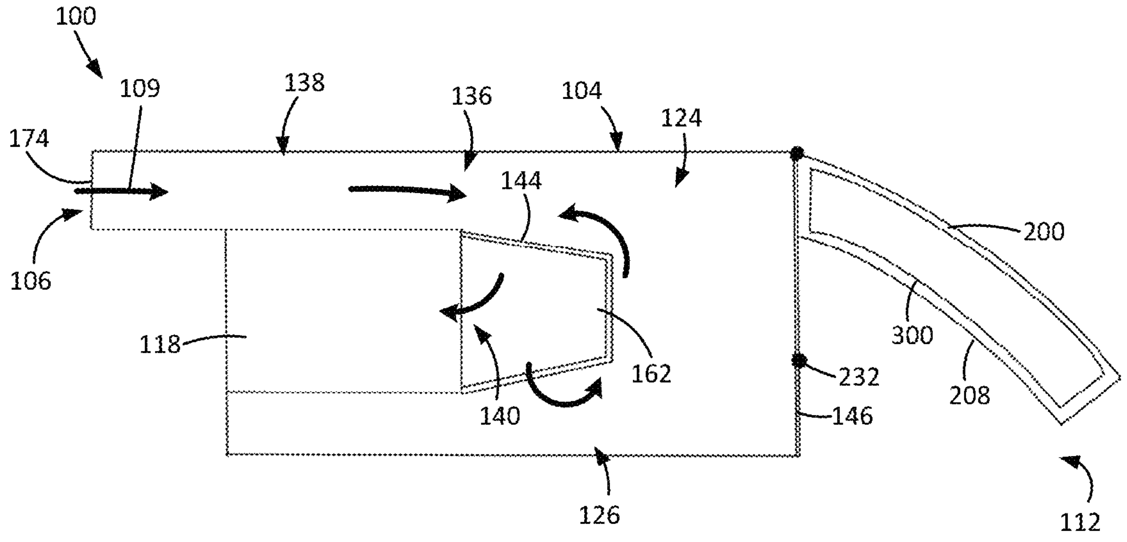
FIG. 35A is a side cross-sectional view of a hand vacuum cleaner with an openable door within an openable end, and a rotatable handle, all in closed positions.
Figure 35B:
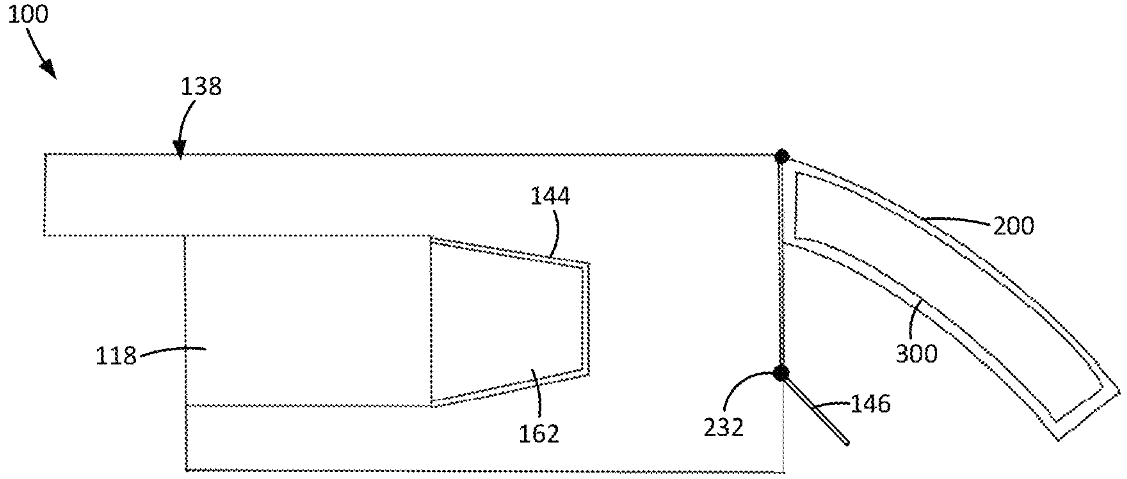
FIG. 35B is a side cross-sectional view of the hand vacuum cleaner of FIG. 35A with the openable door in an open position.
Figure 35C:
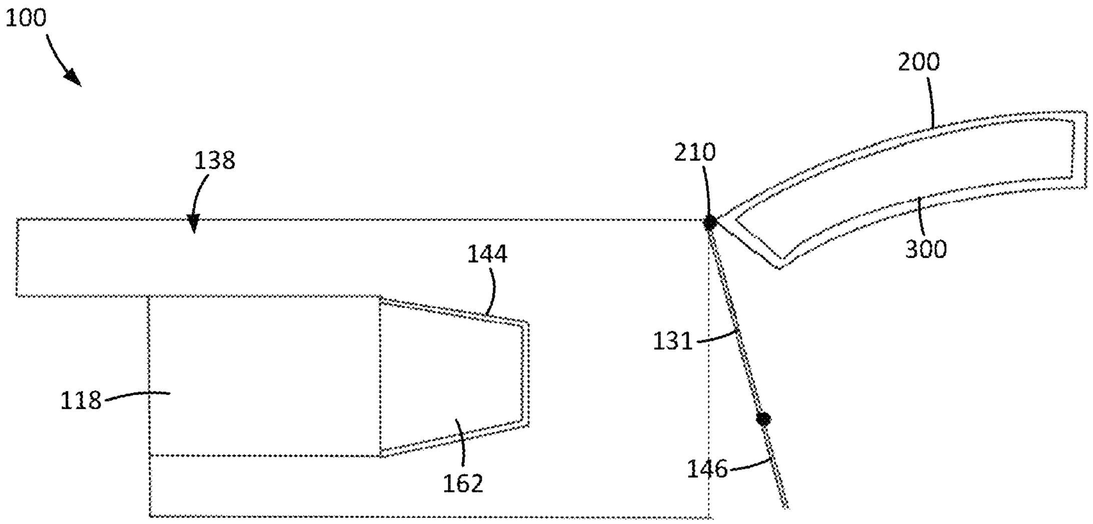
FIG. 35C is a side cross-sectional view of the hand vacuum cleaner of FIG. 35A with the handle rotated and the openable end opened and the openable door in a closed position.
Figure 35D:
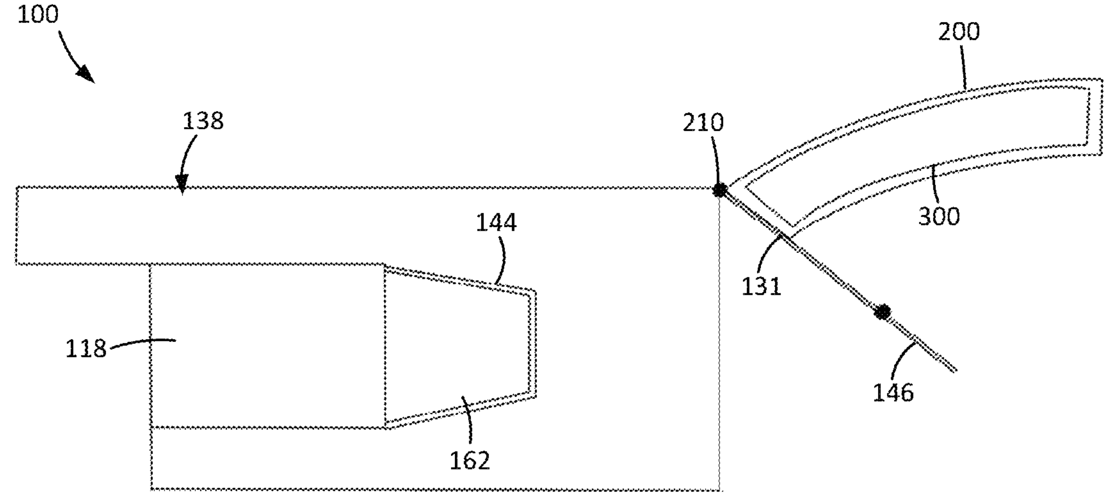
FIG. 35D is a side cross-sectional view of the hand vacuum cleaner of FIG. 35A with the handle rotated and the openable end opened together and the openable door in a closed position.

Alternately, as exemplified in FIGS. 35A-D, handle 200 may be configured as a curved or arcuate handle or, alternately a linearly extending handle (not exemplified). Such a handle may be mounted to the main body 102 or the air treatment assembly 104. As exemplified in FIG. 35A, handle 200 includes the hand grip portion 208 that extends rearwardly from rear end 112. FIG. 35A shows the handle 200 mounted to the rear upper end of the air treatment assembly 104.

Figure 76:
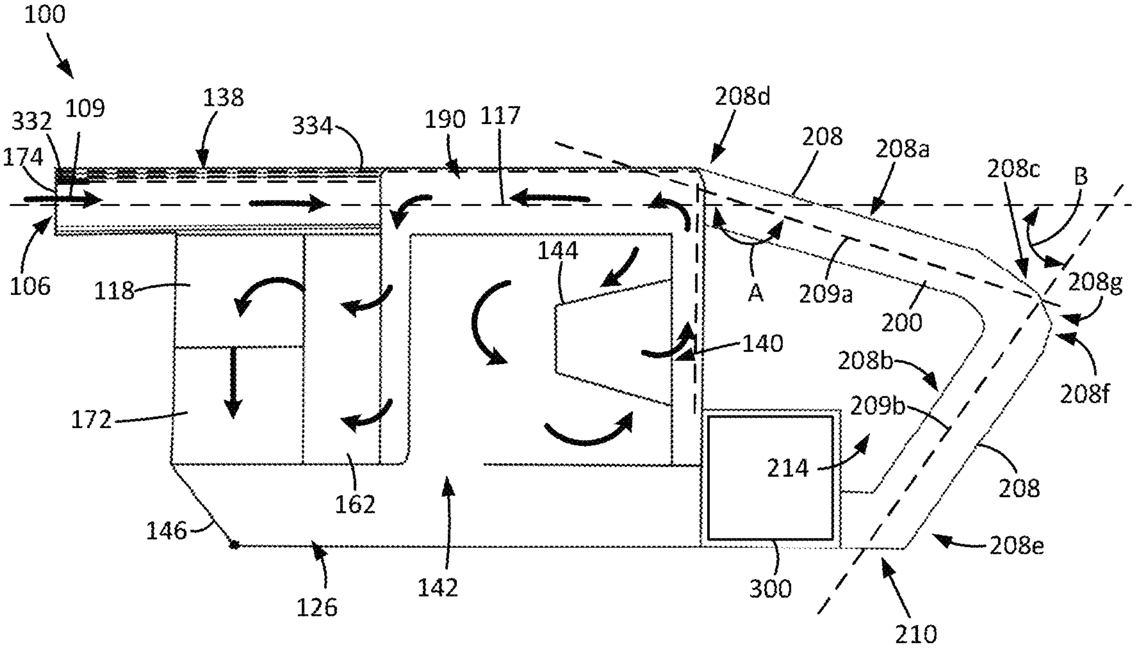
Figure 77:
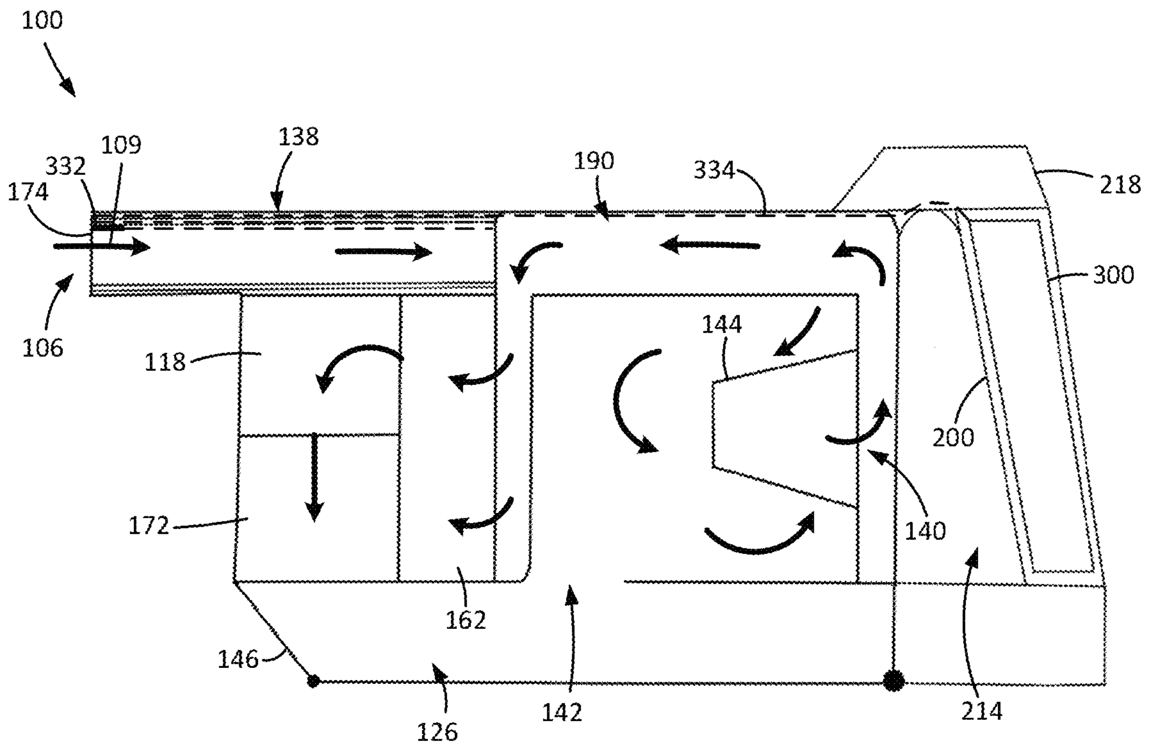
Figure 78:
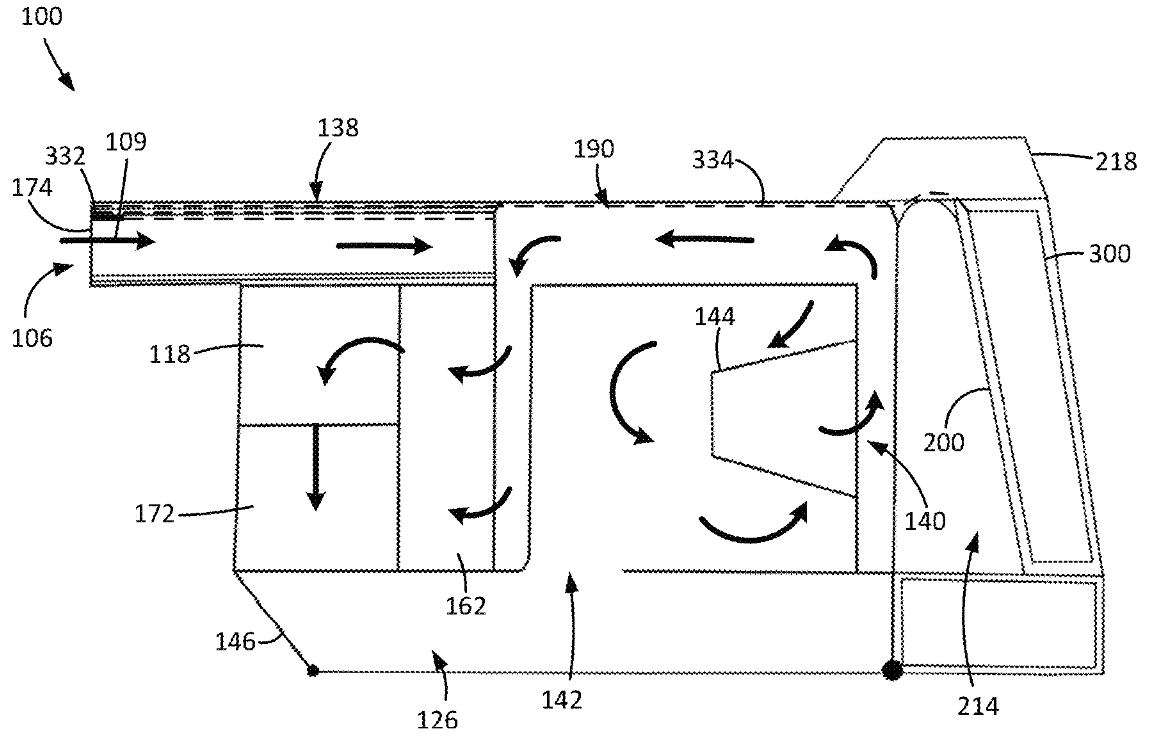

As exemplified in FIG. 76, the handle 200 may have both a forwardly extending hand grip portion 208*a* and a rearwardly extending hand grip portion 208*b* when the surface cleaning apparatus is arranged with the upper end 114 above the lower end 116. In other words, the handle 200 may be a multi-grip handle, providing multiple gripping options. As such, the handle 200 may include two hand grip portions 208. The forwardly extending hand grip portion 208*a* extends from a rear end 208*c* to a forward end 208*d* and the rearwardly extending hand grip portion 208*b* extends from a front end 208*e* to a rear end 208*f*. The forwardly extending hand grip portion 208*a* and the rearwardly extending hand grip portion 208*b* meet at a juncture 208*g*. It will be appreciated that one or both of the forwardly extending hand grip portion 208*a* and the rearwardly extending hand grip portion 208*b* may extend linearly or they may be arcuate. As exemplified the forwardly extending hand grip portion 208*a* has an axis 209*a* extending from rear end 208*c* to forward end 208*d* and the rearwardly extending hand grip portion 208*b* has an axis 209*b* extending from front end 208*e* to rear end 208*f*. Axis 209*a* may be at an angle to the axis 117 from 140° to 175° or 150° to 165°. Axis 209*b* may be at an angle to the axis 117 from 45° to 85°, 55° to 755° or 55° to 65°. Further, the forwardly extending hand grip portion 208*a* and the rearwardly extending hand grip portion 208*b* may meet at an angle of the juncture may be an arcuate section of the multi-grip handle. As discussed subsequently, a bridging portion 210 may connect wither end of the multi-grip handle to the hand vacuum cleaner.

The two ends of the multi-grip handle 200 may be mounted on the same wall or different walls. For example, the multi-grip handle 200 may connect at both ends to the rear end 112 (e.g., FIG. 76). In other embodiments, one end of the multi-grip handle 200 may connect at rear end 112 and the other at upper end 114 (e.g., FIGS. 85A-B).

The two ends of the multi-grip handle 200 may be mounted on the same component or different components. As exemplified in FIG. 85A, both ends of the multi-grip handle 200 may connect to the motor and fan assembly housing 119. As exemplified in FIG. 85B, one end of the multi-grip handle 200 may connect to the motor and fan assembly in FIG. 76, one end of the multi-grip handle 200 may connect to the air treatment assembly, while the other end connects to the energy storage pack 300.

Figure 28:
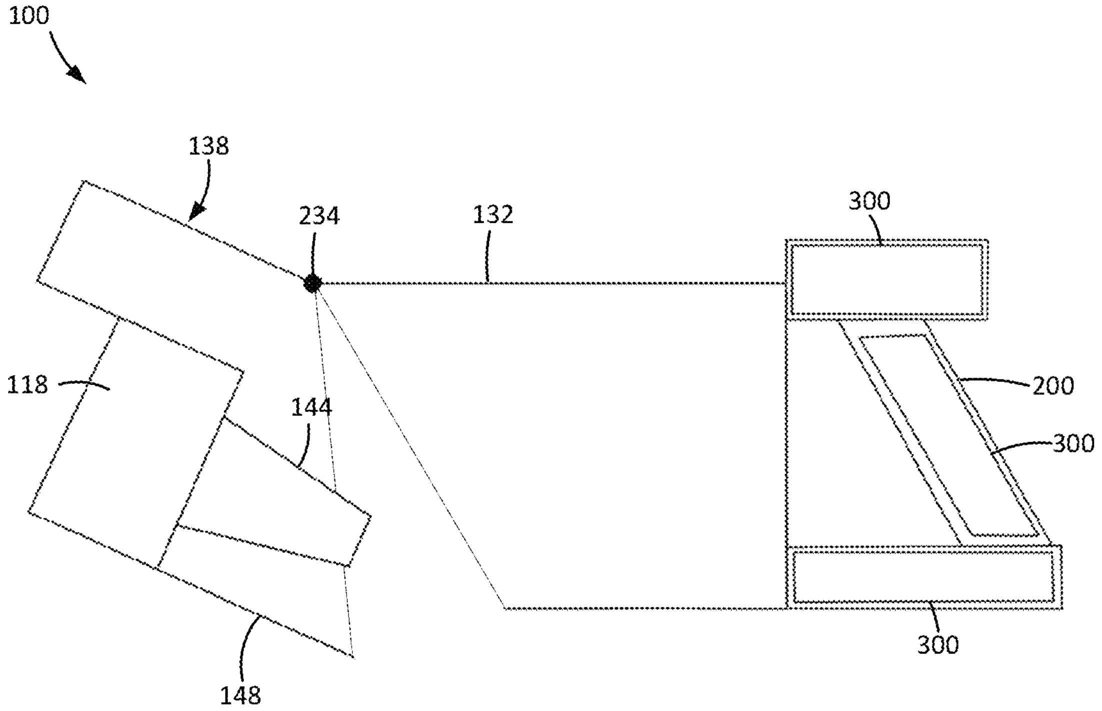
FIGS. 28-29 are side cross-sectional views of other example hand vacuum cleaners with openable portions in open positions.

One or more portions of the handle 200 may be attached to the hand vacuum cleaner 100 directly or via intermediary components. For example, the first handle end 204 (e.g., FIG. 1B) or second handle end 206, or both the first and second handle ends 204, 206 (e.g., FIG. 61A) of the handle 200 may be attached directly to the hand vacuum cleaner 100. In other embodiments, for example as exemplified in FIG. 18, one or more bridging portions 210 may connect handle 200 to the hand vacuum cleaner 100. Accordingly, the bridging portions may extend forwardly from an upper and/or lower end of a hand grip portion to secure the handle to the hand vacuum cleaner. The bridging component may be an arm member that extends forwardly without any operating component therein. Alternately any bridging component may have an operating component therein such as an energy storage pack (See, e.g., FIG. 28) a filter or the motor and fan assembly.

Figure 45A:
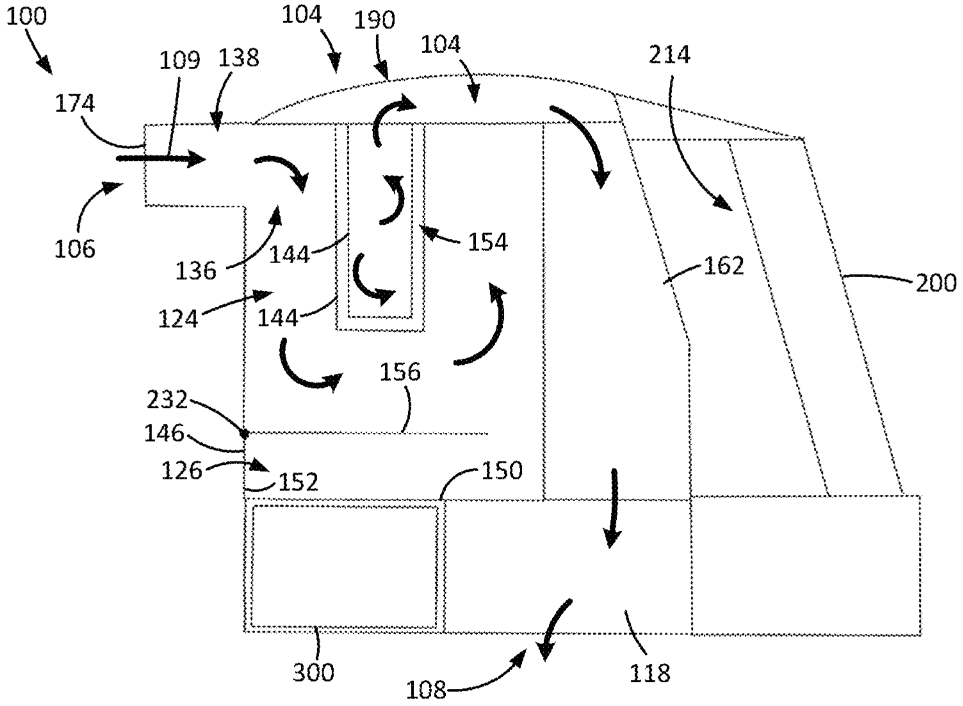
FIG. 45A is a side cross-sectional view of a hand vacuum cleaner with an openable portion in a closed position.

A finger grip area 214 (i.e., a finger receiving area) may be provided between the handle 200 (the hand grip portion) and the hand vacuum cleaner (e.g., the main body and/or the air treatment assembly). As exemplified, for example, in FIG. 14, an enclosed finger grip area 214 for receiving the fingers of a user is formed between handle 200 and the rear side of air treatment assembly 104. As exemplified, for example, in FIG. 18, the finger grip area 214 may be formed between the handle 200 and the energy storage pack 300. As exemplified, for example, in FIG. 45A, the finger grip area 214 may be formed between the handle 200 and the pre-motor filter 162.

Figure 56A:
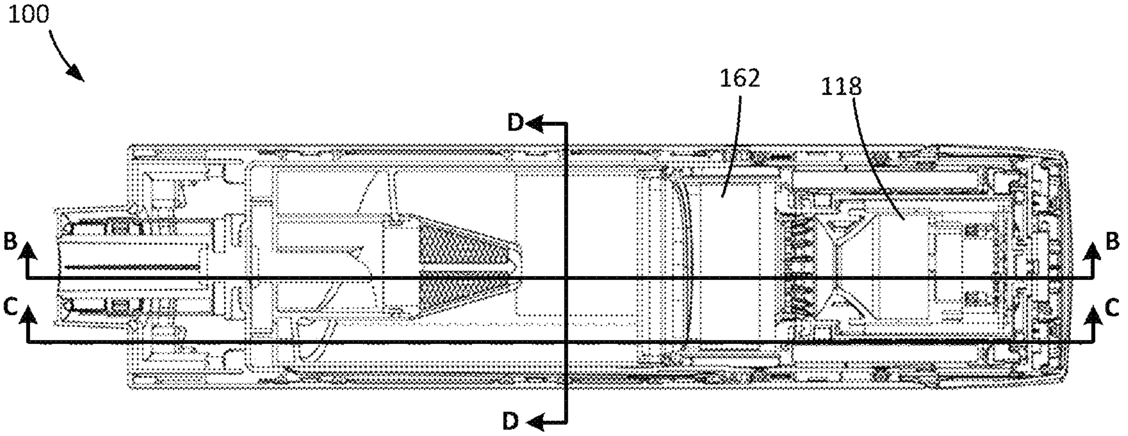
FIG. 56A is a top cross-sectional view of a hand vacuum cleaner with an openable door in a closed position and a removable portion in an attached position.
Figure 56B:
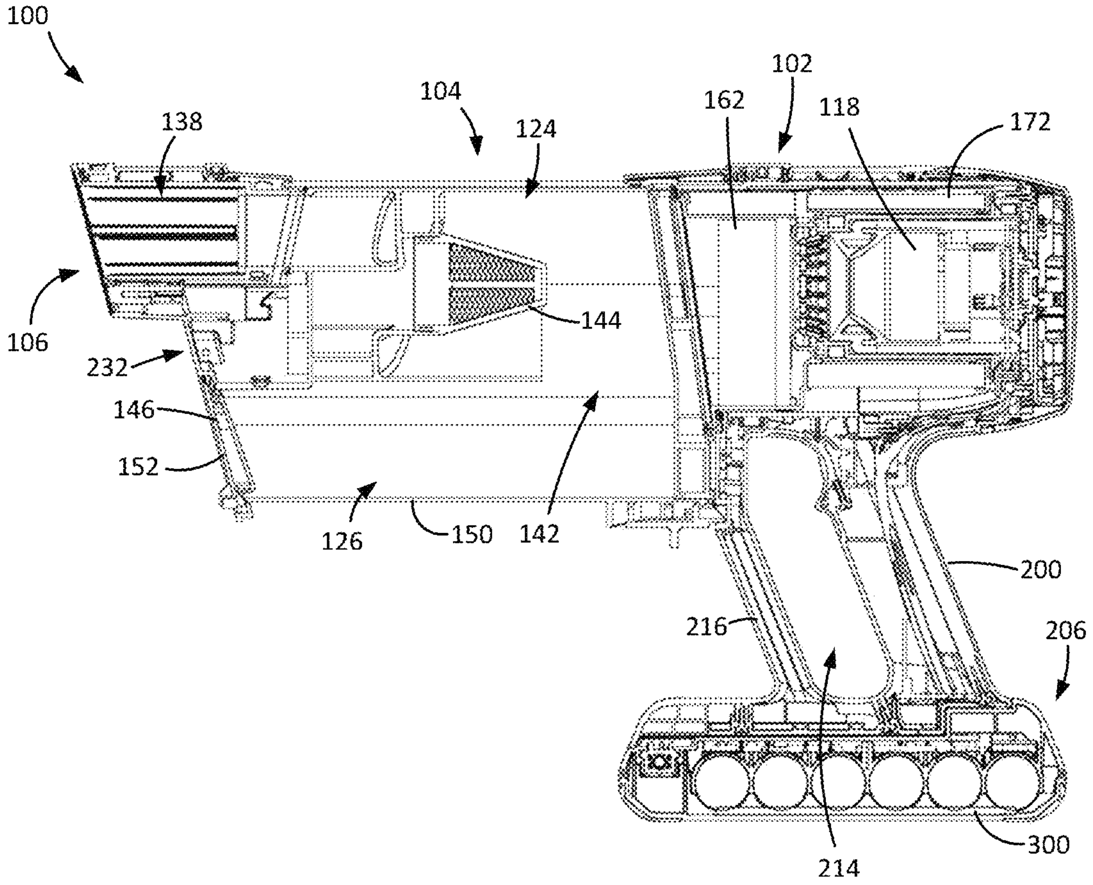
FIG. 56B is a side cross-sectional view of the hand vacuum cleaner of FIG. 56A taken along the line B-B in FIG. 56A.
Figure 56C:
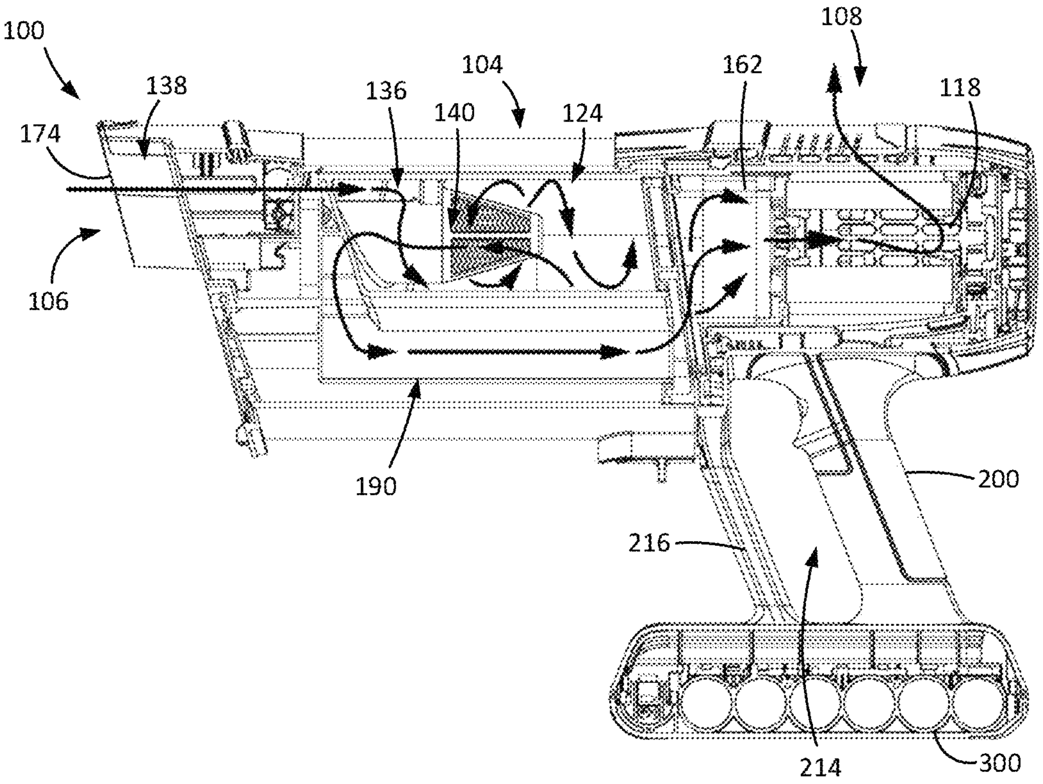
FIG. 56C is a side cross-sectional view of the hand vacuum cleaner of FIG. 56A taken along the line C-C in FIG. 56A.

In some embodiments, for example as exemplified in FIG. 56B, the finger grip area 214 may be formed between the handle 200 and a finger guard 216. The finger guard 216 may be a member which extends, for example, from the second handle end 216 to the main body 102, thereby providing a closed finger grip area 214.

Power

Any hand vacuum cleaner disclosed herein may be connectable to household mains by a power cable or it may be provided with an on board power source, such as one or more energy storage members. Accordingly, power may be supplied to motor and fan assembly 118 by an electrical cord connected to hand vacuum cleaner 100. The electrical cord can be connected to main power at a standard wall electrical outlet.

Alternately, power may be supplied to motor and fan assembly 118 and other electrical components of hand vacuum cleaner 100 from one or more energy storage members. Energy storage member may include, for example, batteries, supercapacitors or the like. The energy storage member may be provided in one or more energy storage packs 300 (i.e., energy storage member housings), which comprise one or more batteries, supercapacitors or the like. As used herein, "energy storage pack" 300 may refer to a single energy storage member or a plurality of energy storage members that are secured together, such as by an energy storage member housing. If the energy storage members are batteries, then the energy storage pack may be referred to as a battery pack. Any such energy storage member housing known in the art may be used and it may be of any configuration.

The energy storage members may be permanently mounted in hand vacuum cleaner 100 and rechargeable in-situ, and/or removable from hand vacuum cleaner 100 (e.g., one or more of the energy storage packs may be removably mounted to the hand vacuum cleaner).

Figure 3:
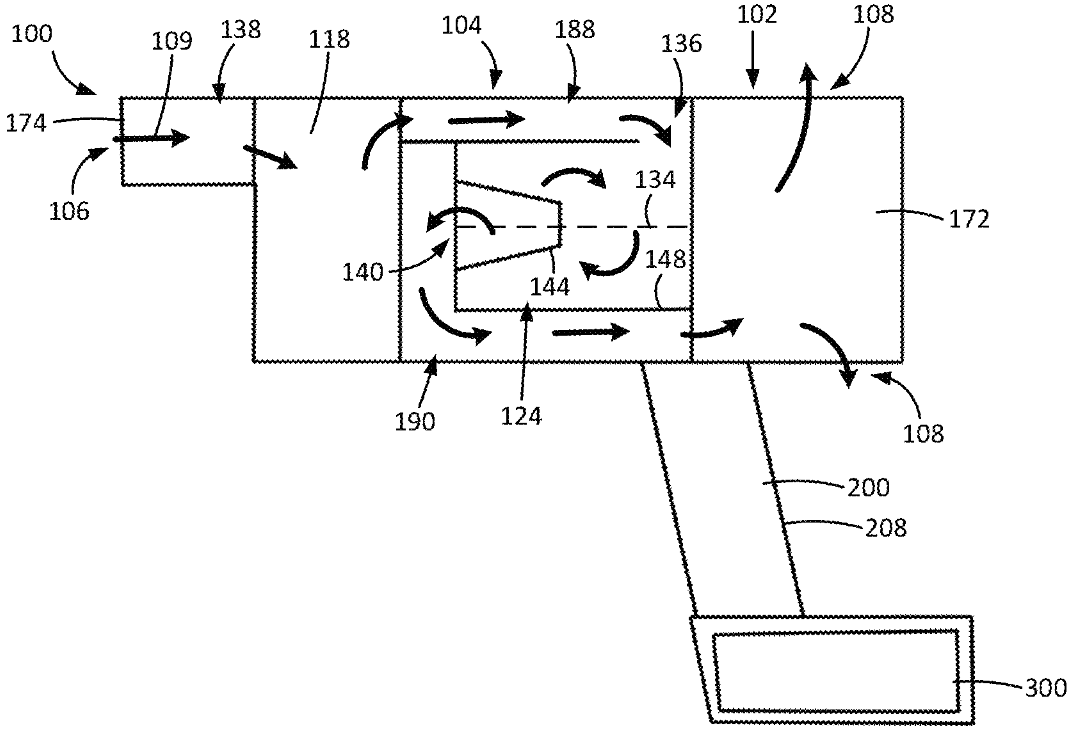

As exemplified in FIG. 3, a single energy storage pack may be provided. As exemplified therein, power is supplied to motor and fan assembly 118 by energy storage pack 300. Alternately, two or more energy storage packs may be provided. As exemplified in FIG. 1B, an optional second or supplemental energy storage pack 300 is provided. Alternately multiple supplemental energy storage packs 300 may be provided (e.g., see the illustrated embodiment of FIG. 4). One or more supplemental energy storage packs 300 may be provided to, for example, increase the power supplied to motor and fan assembly 118 and/or lengthen the duration hand vacuum cleaner 100 can operate without recharging.

Figure 7A:
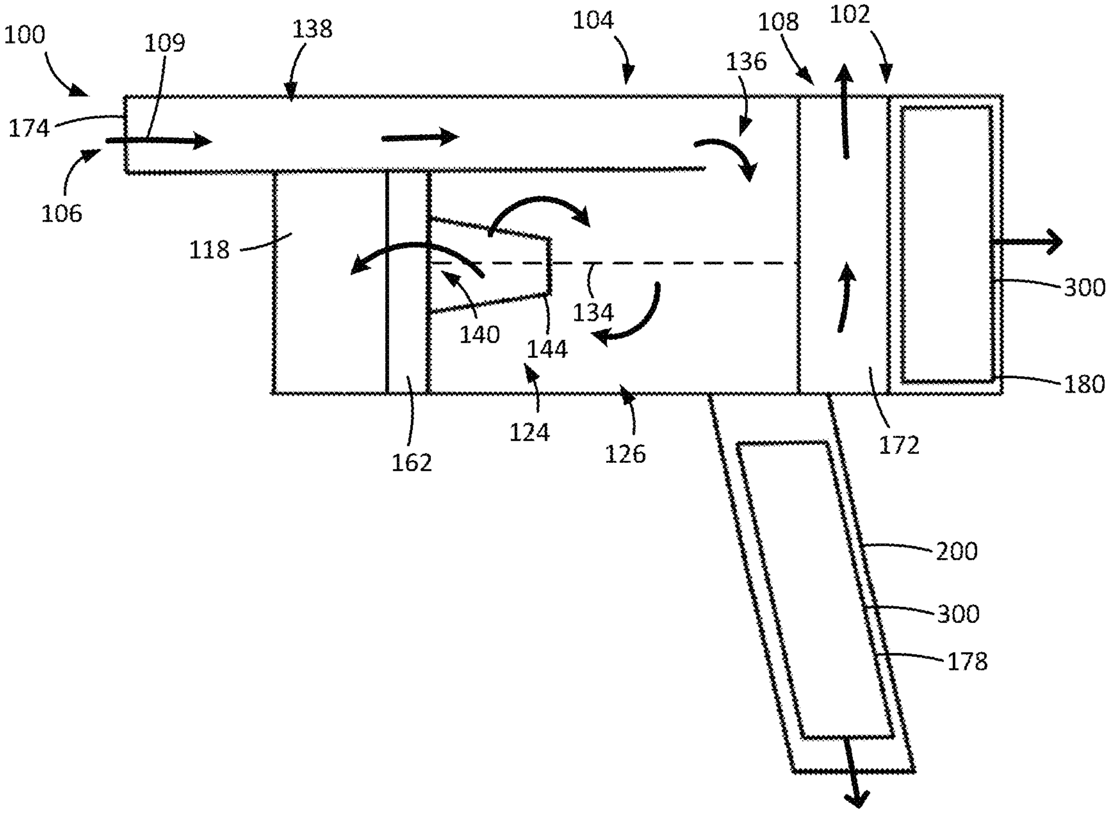
FIG. 7A is a side cross-sectional view of an example hand vacuum cleaner with a motor and fan assembly and an energy storage pack at opposite axial ends thereof.

Removing energy storage packs 300 may facilitate the replacement of discharged batteries within energy storage packs 300. Energy storage packs may be removably connected to hand vacuum cleaner 100 in any suitable fashion. As an example, FIG. 7A shows recess 178 provided in handle 200 for receiving a first energy storage pack 300 and recess 180 in the main body 102 for receiving a second energy storage pack 300. As indicated by the arrow, the first energy storage pack 300 is removable downwardly from recess 178, and the second energy storage pack 302 is removable rearwardly from recess 180.

Figure 8A:
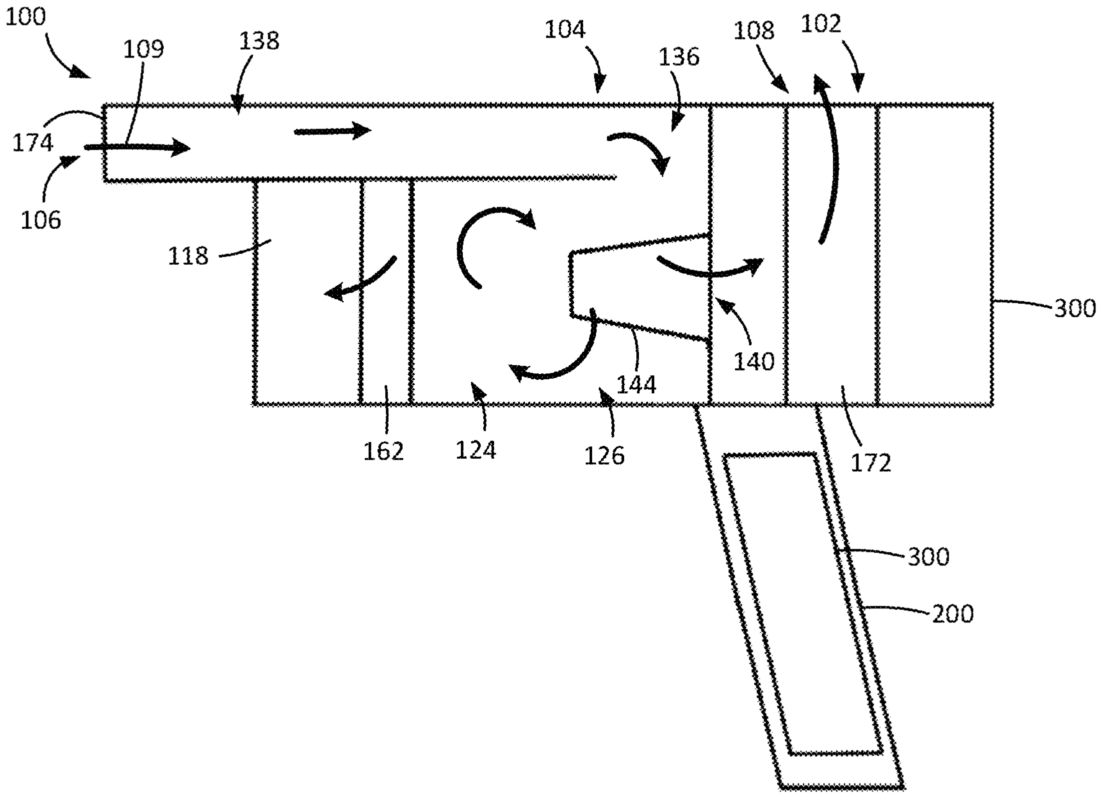
FIG. 8A is a side cross-sectional view of an example hand vacuum cleaner with a motor and fan assembly and an energy storage pack at opposite axial ends thereof.

Alternatively, as exemplified in FIG. 8A, a first energy storage pack 300 may be connected directly to the exterior of (mounted to an outer surface of) main body 102 (i.e., not received within a body recess). In the illustrated embodiment, top, bottom and rear surfaces of first energy storage pack 300 form part of the exterior of hand vacuum cleaner 100 when first energy storage pack 300 is connected. In alternative embodiments, energy pack(s) 300 may be permanently connected to hand vacuum cleaner 100.

Energy storage pack(s) 300 may be recharged in-situ by connecting one end of an electrical cord to a cord port 184 (shown, e.g., in FIG. 1A) while the other end of the electrical cord is connected to main power at a standard wall electrical outlet. Cord port 184 may be provided in any suitable location, although it may be convenient to locate cord port 184 proximate the energy storage member(s). As an example, FIG. 1A shows cord port 184 provided on handle 200 at second handle end 206.

Hand vacuum cleaner 100 may include a power switch 308 that is provided to selectively control the operation of the motor and fan assembly (e.g., either on/off or variable power levels or both), for example by establishing a power connection between energy storage pack 300, 302 and motor and fan assembly 118. Power switch 308 may be provided in any suitable configuration and location, including a button, rotary switch, sliding switch, trigger-type actuator, toggle, rocker switch and the like. As an example, the illustrated embodiment of FIG. 1A shows power switch 308 provided as a trigger-type actuator. The illustrated embodiment of FIG. 51A shows the power switch 308 as a toggle.

As described subsequently, energy storage packs 300 may have various positional arrangements, which may improve the ergonomics of the hand vacuum cleaner 100 (e.g., reduced weight, better weight balance, or greater portability).

Position of One or More Energy Storage Packs

A hand vacuum cleaner may have one or more energy storage packs 300 positioned at any location discussed herein. Any such positioning may be used by itself or in combination with one or more of the handle, the air flow path, the position of a dirt collection chamber, the openable and removable portions, the tangential inlet with ramp, the air treatment assembly, the position of the suction motor, the position of a pre-motor filter, the position of a post-motor filter, a telescoping inlet and a corner screen as disclosed herein.

Energy storage packs 300 may be provided in various positions. While the position of energy storage packs 300 with respect to other components is discussed separately with respect to each other component, it will be appreciated that any embodiment of a hand vacuum cleaner may utilize the positioning of the energy storage packs 300 with respect to one or more of the other components discussed herein.

Figure 4:
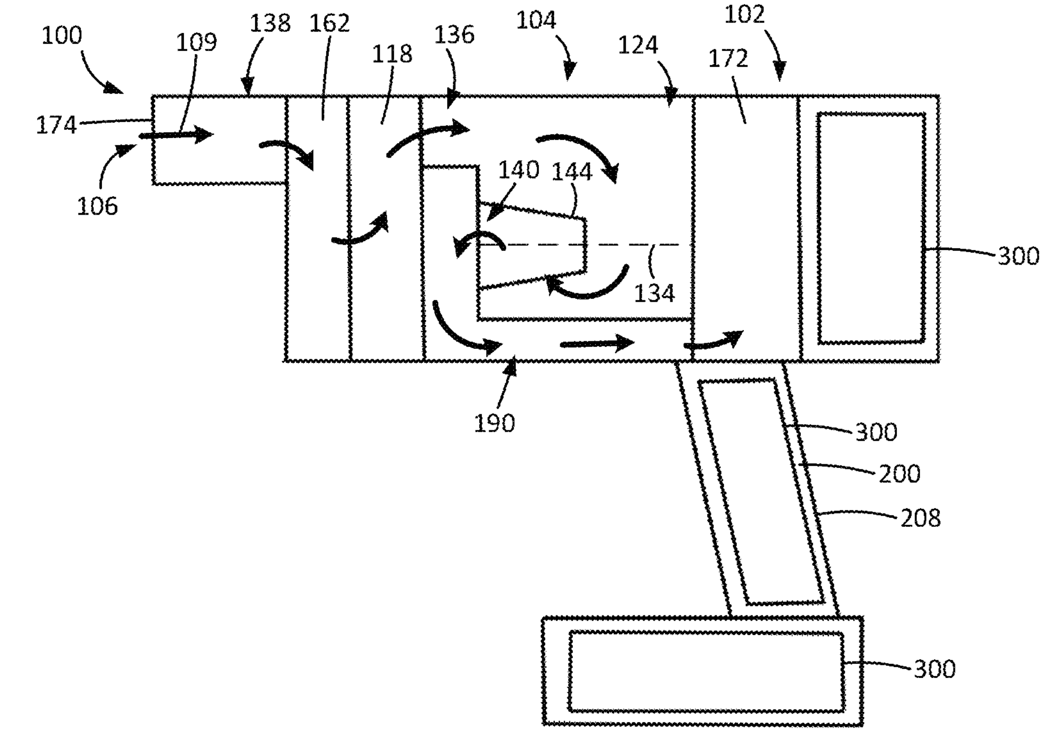

The hand vacuum cleaner 100 may include one or more energy storage packs 300. For example, hand vacuum cleaner 100 may include one energy storage pack 300 (e.g., FIG. 3), two energy storage packs 300 (FIG. 1B), or three energy storage packs 300 (FIG. 4). It will be appreciated that hand vacuum cleaner 100 may operate with one energy storage pack 300, and any additional energy storage packs 300 are optional. Additionally, for any figure showing multiple energy storage packs 300, any of the illustrated energy storage packs 300 may be deemed as the optional energy storage packs 300. For example, the embodiment of FIG. 1B has two energy storage packs 300, and either of these energy storage packs may be optional (i.e., not provided).

Energy storage pack 300 may be removably mounted to the hand vacuum cleaner 100. Removing energy storage pack 300 may facilitate the replacement of a depleted battery with a charged one or the off board charging of the energy storage member pack 300. Alternately, energy storage pack 300 may be permanently connected to the hand vacuum cleaner 100. If a plurality of energy storage packs are provided then one or more or all of the energy storage packs may be removably mounted.

Energy storage pack 300 may be positioned partially or fully within handle 200. For example, energy storage pack 300 may be positioned partially or fully within hand grip portion 208, first handle end 204, and/or second handle end 206 and/or a bridging portion 210. For example, the embodiment of FIG. 1B has energy storage packs located fully within the hand grip portion 208 and second handle end 206.

Energy storage pack 300 may be positioned within main body 102. For example, energy storage pack 300 may be positioned towards rear end 112 (e.g., FIG. 2). Energy storage pack 300 may also or alternatively be positioned towards front end 110 (e.g., FIG. 10). In some embodiments, energy storage pack 300 is positioned rearwardly of cyclone chamber 124 (e.g., FIG. 18).

Optionally, the energy storage pack (or if one or more or all energy storage packs 300 is provided) the energy storage pack(s) may be positioned at an end of the hand vacuum cleaner opposite to that of the motor and fan assembly 118 and they may be axially spaced apart (in the direction of axis 117) partially or fully on opposed sides or adjacent opposed sides of the air treatment assembly 104 or the air treatment chamber. For example, the energy storage pack 300 may be provided towards front end 110 and motor and fan assembly 118 may be provided towards rear end 112. Alternatively, as exemplified in FIG. 18, energy storage pack 300 may be provided towards rear end 112 and motor and fan assembly 118 may be provided towards front end 110. Since the energy storage pack 300 and motor and fan assembly 118 are typically the heaviest components of the hand vacuum cleaner 100, providing these components at opposite ends of the hand vacuum cleaner 100 may provide a comfortable weight distribution for a user.

Figure 11:
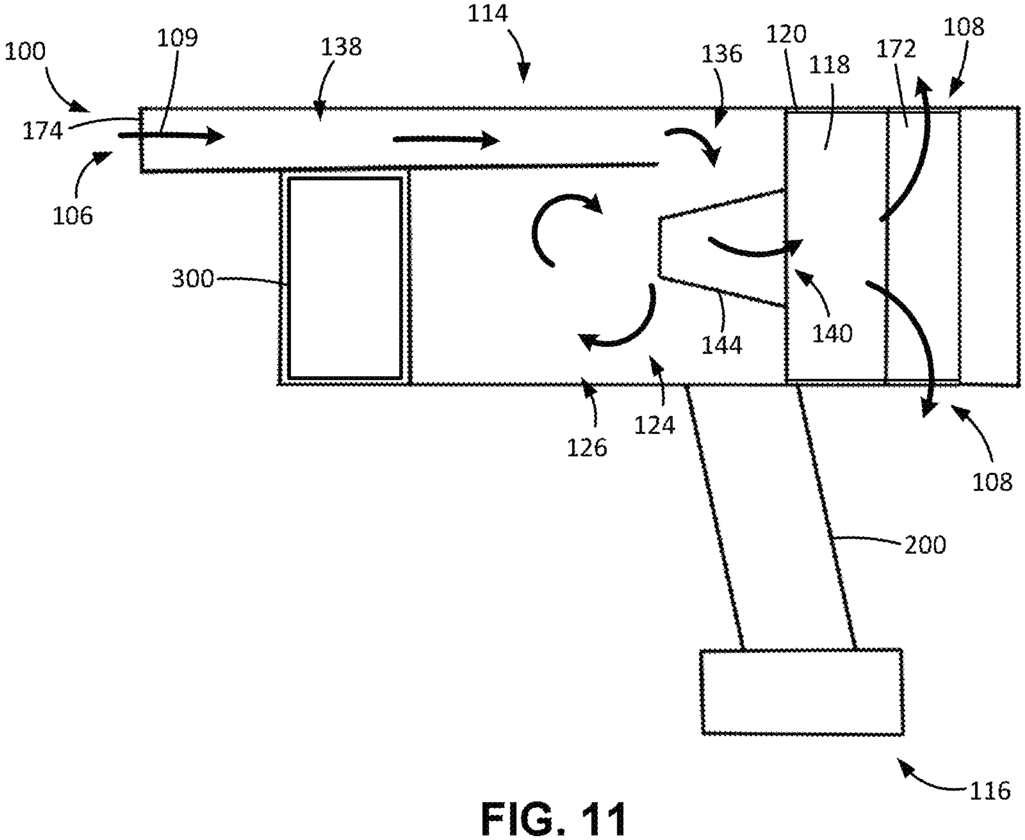

The energy storage pack 300 may be positioned rearward of the cyclone chamber 124 in which case the motor and fan assembly 118 may be positioned forward of the cyclone chamber or any other location disclosed herein (e.g., FIGS. 24A, 86) below the cyclone chamber 124 in which case the motor and fan assembly 118 may be positioned partially or fully below the cyclone chamber or at an elevation below the cyclone chamber are any other location disclosed herein (e.g., FIG. 45A), above the cyclone chamber 124 in which case the motor and fan assembly 118 may be positioned partially or fully above the cyclone chamber or at an elevation above the cyclone chamber or any other location disclosed herein (e.g., FIG. 72A), or in front of the cyclone chamber 124 in which case the motor and fan assembly 118 may be positioned rearward of the cyclone chamber or any other location disclosed herein (e.g., FIG. 11).

Figure 47A:
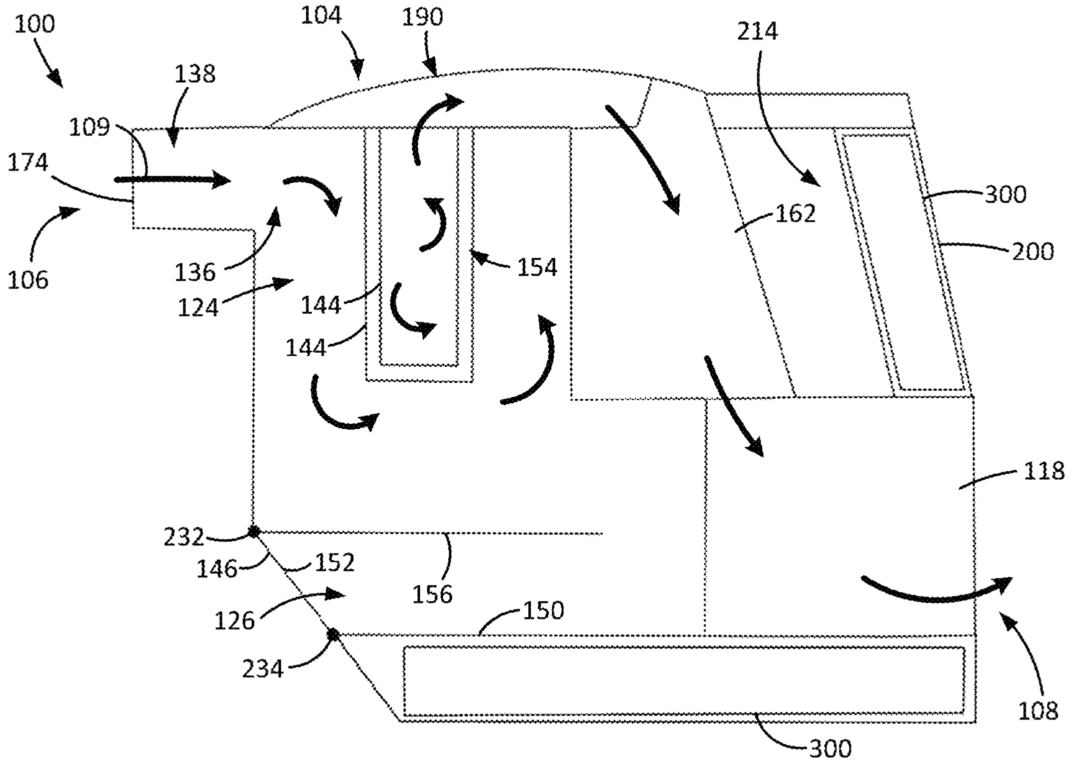
FIG. 47A is a side cross-sectional view of a hand vacuum cleaner with an openable portion in a closed position.

The energy storage pack may provide part or all of the lower surface of the hand vacuum cleaner. Accordingly, the energy storage pack 300 may be provided at the lower end 116, below both the treatment assembly 104, handle 200, motor and fan assembly 118, and pre-motor filter 162 (e.g., FIG. 47A) or below the motor and fan assembly 118 and handle 200 (e.g., FIG. 86) or partially within the handle 200 and below the cyclone chamber 124 (e.g., FIG. 79), If two or more battery packs are provided, they may be provided at different locations and optionally at opposed ends of the hand vacuum cleaner or opposed sides of a component of the hand vacuum cleaner. For example, if two battery packs are provided, they may be located above and below a component of the hand vacuum cleaner or at upper and lower ends of the hand vacuum cleaner. Alternately, they may be provided forward and rearward of a component of the hand vacuum cleaner or at the front and rear ends of the hand vacuum cleaner. In such a case, the motor and fan assembly 118 may be provided adjacent one of the energy storage packs or at a location spaced from both energy storage packs. For example, the energy storage pack 300 may also be positioned above and below the cyclone chamber 124 (e.g., FIG. 84).

Figure 67:
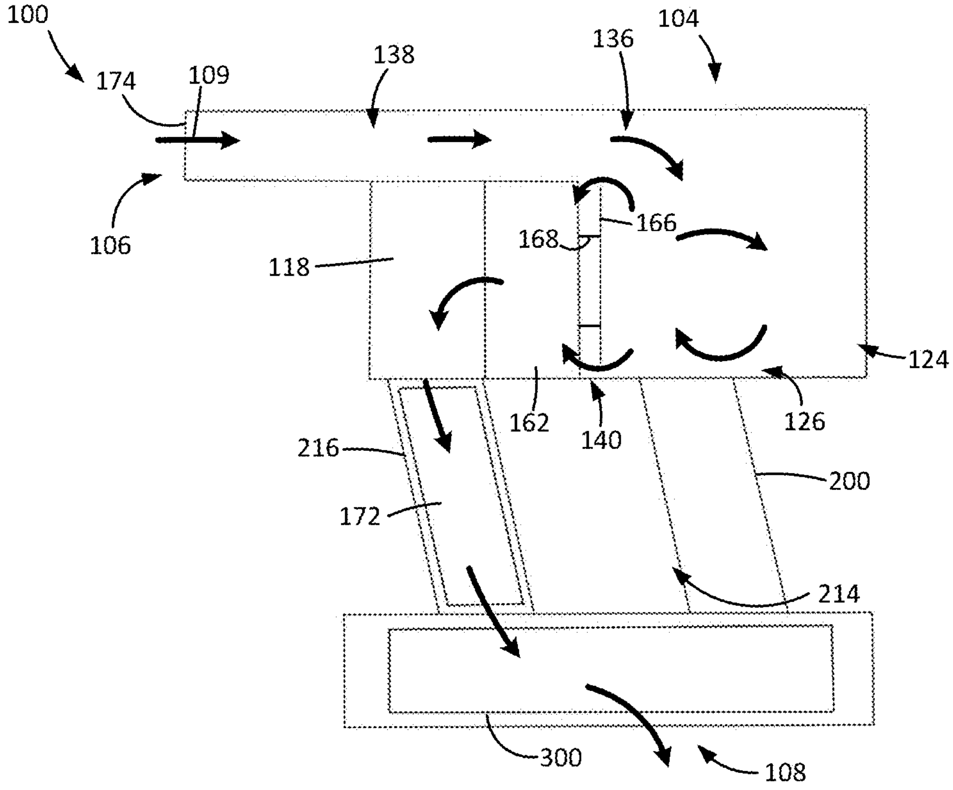

In some embodiments, energy storage pack 300 may be positioned within air flow path 109 (e.g., FIG. 67) such that the air flow through the hand vacuum cleaner contacts the energy storage pack as it flows thereby. Air flowing over or through the energy storage pack 300 may help with cooling the energy storage pack 300.

Air Flow Path

An air flow path extends from a dirty air inlet to a clean air outlet. The air inlet is provided at a front end and may function as a nozzle of the hand vacuum cleaner and/or be connectable to an accessory cleaning tool as discussed previously. The clean air outlet is typically rearward of the dirty air inlet and is optionally positioned and configured to direct air away from a user's hand and/or the surface to be cleaned. As disclosed herein, depending upon the position of the motor and fan assembly, the clean air outlet may be provided forward of the air treatment chamber and/or at a front end of the hand vacuum cleaner. Any such air flow path disclosed herein may be used by itself or in combination with one or more of the handle, the position of the energy storage member packs, the position of a dirt collection chamber, the openable and removable portions, the tangential inlet with ramp, the air treatment assembly, the position of the suction motor, the position of a pre-motor filter, the position of a post-motor filter, a telescoping inlet and a corner screen as disclosed herein.

Inlet conduit 138 extends from dirty air inlet 106 rearward and may be positioned at least partially forward of air treatment assembly 104. In some embodiments, for example as exemplified in FIG. 7A, the inlet conduit 138 extends from the dirty air inlet 106 to cyclone air inlet 136, such that the air flow path 109 extends from the dirty air inlet 106 to cyclone air inlet 136. In other embodiments, the inlet conduit 138 may extend from the dirty air inlet 106 to any other component, such as dirty air motor 118 (e.g., FIG. 2) in which case a pre-motor filter 162 (e.g., a coarse screen to collect large debris) may be provided upstream thereof (e.g., FIG. 4).

The cyclone air inlet 136 may be located at any suitable location on the cyclone chamber such as at or towards front end of the cyclone chamber (e.g., FIG. 9A) or at or towards the rear end of the cyclone chamber (e.g., FIG. 8A). Optionally a portion of conduit 136 may extend through the cyclone chamber. The location of the cyclone air inlet may be selected based upon the location of the cyclone air outlet and whether the cyclone air inlet is to be on the same end of the cyclone chamber as the cyclone air outlet or if the cyclone air inlet is to be on the opposite side of the cyclone chamber from the cyclone air outlet.

It will be appreciated that the cyclone air outlet may be on the same side of the air treatment chamber or air treatment assembly as the motor and fan assembly 118. For example, the inlet of the motor and fan assembly may face towards the air treatment chamber air outlet with an optional pre-motor filter located axially therebetween. Alternately, the motor and fan assembly may be located on the front or rear end of the air treatment chamber or air treatment assembly, regardless of the location of the air treatment chamber air outlet. If the motor and fan assembly is located on the opposite side of the air treatment chamber or air treatment assembly as the air treatment chamber air outlet, then a portion of the air flow path will extend through or radially outwardly of the air treatment chamber or air treatment assembly to the motor and fan assembly.

Accordingly, as exemplified herein, the surface cleaning apparatus 100 may contain various passages. The passages may include one or more pre-air treatment passages 188 (i.e., the portion of the air flow path from the dirty air inlet to the air treatment chamber air inlet) and/or one or more post-air treatment passages 190 (i.e., the portion of the air flow path from the air treatment chamber air outlet to the clean air outlet). The passages 188, 190 may have various configurations as discussed herein and one or more may be internal (i.e., extend through) or external to the air treatment chamber 124.

For example, as exemplified in FIGS. 1B and 2, a pre-air treatment passage 188 is located toward the upper end 114. The pre-air treatment passage 188 extends from the motor and fan assembly 118 (located towards the front end 110) rearwardly to the cyclone air inlet (located towards the rear end 112). Air may travel from the motor and fan assembly 118, through the pre-air treatment passage 188, and to the cyclone chamber 124 via the cyclone air inlet 136.

In embodiments in which the cyclone air outlet 140 is provided towards the front end 110, a post-air treatment passage 190 may be used to direct the airflow from the cyclone air outlet 140 rearwardly. In other words, the post-air treatment passage 190 may include a passage that extends from the front end of the cyclone chamber 124 to the rear end of the cyclone chamber 124. Such an embodiment may be used if the motor and fan assembly is at a front end of the air treatment chamber (e.g., FIGS. 3, 4 and 5) or at a rear end of the air treatment chamber or an opposite end of the air treatment chamber from the air treatment chamber air outlet (e.g., FIG. 8B).

Figure 5:
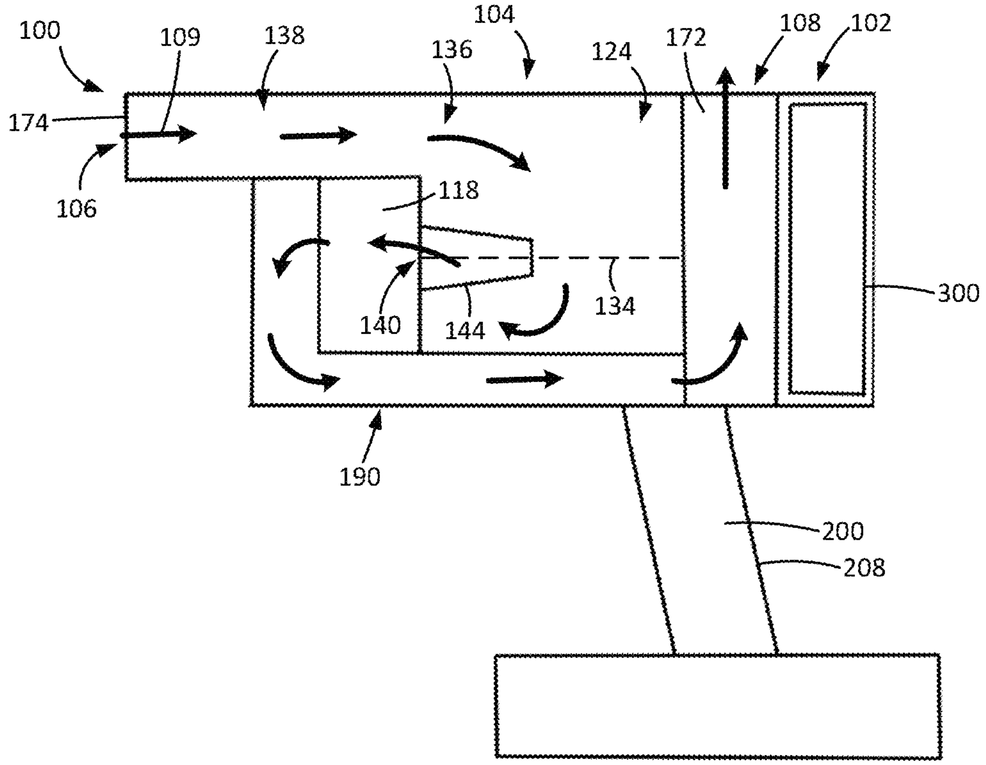
Figure 6:
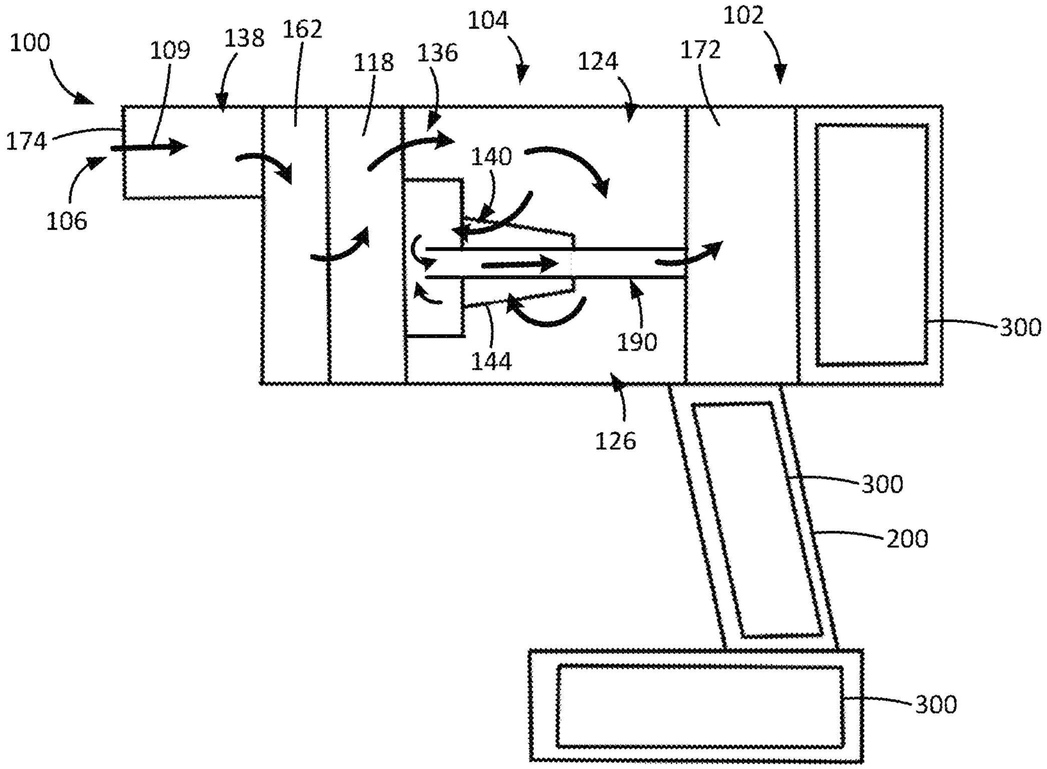

For example, as exemplified in FIGS. 3 and 4, a first portion of the post-air treatment passage 190 is located forward of the cyclone air outlet 140, such that air may exit the outlet 140 and enter the passage 190. A second portion of the post-air treatment passage is located towards the lower end 116 radially outwardly of the air treatment chamber and extends from the first portion rearwardly to the post-motor filter 172, such that air may travel through the passage 190 to the post-motor filter 172. The embodiment of FIG. 5 shows a similar configuration, with the motor and fan assembly 118 located between the cyclone air outlet 140 and post-air treatment passage 190. The embodiment of FIG. 6 shows another similar configuration, with the second portion of the post-air treatment passage 190 located centrally within the cyclone chamber 124.

Figure 7B:
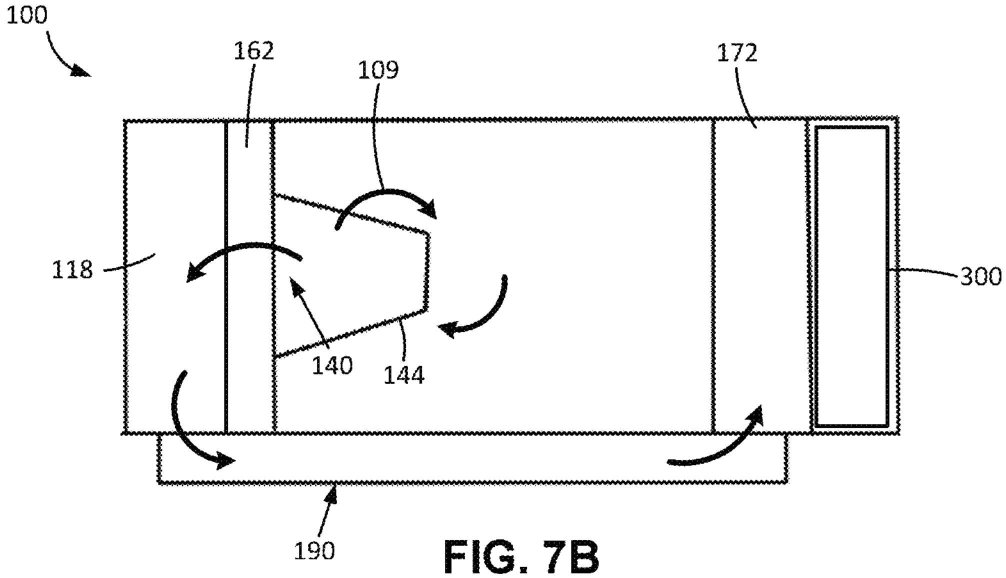
FIG. 7B is a top view of the hand vacuum cleaner of FIG. 7A.

The post-air treatment passage 190 may also be located externally to cyclone chamber 124. For example, the embodiment of FIG. 7B has an external post-air treatment passage 190, which extends axially exterior to the cyclone chamber 124. The external post-air treatment passage 190 may extend on either side of the cyclone chamber 124.

The surface cleaning apparatus 100 may include more than one post-air treatment passage 190. For example, one post-air treatment passage 190 may direct air from the rear of the surface cleaning apparatus 100 towards the front end, while another directs air from the front to the rear end. For example, the embodiment exemplified in FIGS. 8A-8B and 9B has two post-air treatment passages 190, which extend axially on both sides of the cyclone chamber 124. A first post-air treatment passage 190 extends between the cyclone air outlet 140 (located towards the rear end 112) towards the pre-motor filter 162 (located towards the front end 110). A second post-air treatment passage 190 extends between the motor and fan assembly 118 (located towards the front end 110) and the post-motor filter 172 (located towards the rear end 112).

The post-air treatment passage 190 directs air towards clean air outlet 108. For example, the embodiment exemplified in FIG. 16B has a post-air treatment passage 190 which extends between the post-motor filter 172 (located towards the front end 110) and the clean air outlet 108 (located towards the rear end 112).

Figure 13:
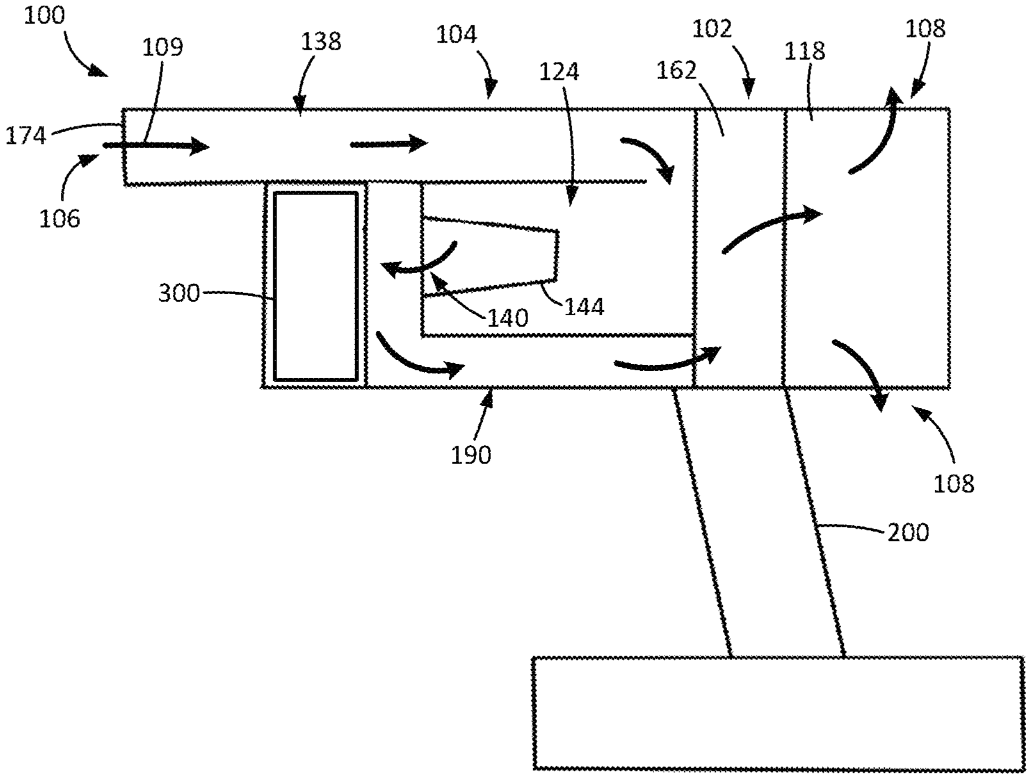

It will be appreciated that a post-air treatment passage 190 that extends radially outwardly of and/or through an air treatment chamber is useable in embodiments, such as FIG. 13 wherein the air treatment chamber air outlet and the motor and fan assembly are provided on opposite sides of the air treatment chamber. If the air treatment chamber air outlet and the motor and fan assembly are provided on opposite sides of the air treatment chamber then, optionally, any optional pre-motor filter, any optional post motor filter and the clean air outlet are located on the same side of the hand vacuum cleaner as the motor and fan assembly.

In some embodiments, a portion of the post-air treatment passage 190 may be located towards the upper end 114. For example, the embodiments exemplified in FIGS. 19 and 20A have post-air treatment passages 190 which extend from the cyclone air outlet 140 (located towards rear end 112), forwardly along upper end 114, to pre-motor filter 162 (located towards front end 110). The post-air treatment passage 190 may extend axially on either side of inlet conduit 138.

In some embodiments, a portion of the air flow path 109 may extend through the finger guard 216. For example, as exemplified in FIGS. 61A, air may flow from the pre-motor filter 162 through the finger guard 216, to the second handle end 216.

Position of Dirt Collection Chamber

A hand vacuum cleaner using any aspect discussed herein has a dirt collection area 126 which may be positioned at any location discussed herein. While the position of the dirt collection area 126 with respect to other components is discussed separately with respect to each other component, it will be appreciated that any embodiment of a hand vacuum cleaner may utilize the positioning of the dirt collection area 126 with respect to one or more of the other components discussed herein. Accordingly, any such position of the dirt collection area disclosed herein may be used by itself or in combination with one or more of the handle, the position of the energy storage member packs, the air flow path, the openable and removable portions, the tangential inlet with ramp, the air treatment assembly, the position of the suction motor, the position of a pre-motor filter, the position of a post-motor filter, a telescoping inlet and a corner screen as disclosed herein.

Cyclone chamber 124 and dirt collection chamber 126 may be of any configuration suitable for collecting separated dirt, and the air treatment chamber air inlet 136 and the air treatment chamber air outlet 140 may be of any design and position known in the art.

The dirt collection area may be a dirt collection chamber that is external to the air treatment chamber and in communication therewith by a dirt outlet of the air treatment chamber. As exemplified in FIG. 14, for example, dirt collection chamber 126 may be positioned below cyclone chamber 124 when hand vacuum cleaner 100 is oriented with the upper end 114 above the lower end 116. Alternatively, or in addition, dirt collection chamber 126 may surround part of all of cyclone chamber 124 (i.e. be radially outward of the sidewall of the cyclone chamber and extend angularly around some or all of the sidewall of the cyclone chamber). As exemplified in FIG. 69A, the dirt collection chamber may be axially spaced from the cyclone chamber (e.g., plate 156 may have a first surface which is an end surface of the cyclone chamber and the opposed second surface may form an end surface of the dirt collection chamber). In such an embodiment, the cyclone axis of rotation extends through the cyclone chamber the first surface, the second surface and the dirt collection chamber.

In some embodiments, some or all of the dirt collection chamber may be located axially (in the direction of axis 117) from the cyclone chamber wherein the cyclone axis of rotation is oriented at an angle to and, optionally transverse to axis 117. Optionally, some or all of the dirt collection chamber may be located axially forwardly (in the direction of axis 117) from the cyclone chamber. In any such case, a portion of the dirt collection chamber may be posited below the cyclone chamber such that the cyclone axis or rotation extends through a portion of the dirt collection chamber (see, e.g., FIG. 49C).

Figure 49B:
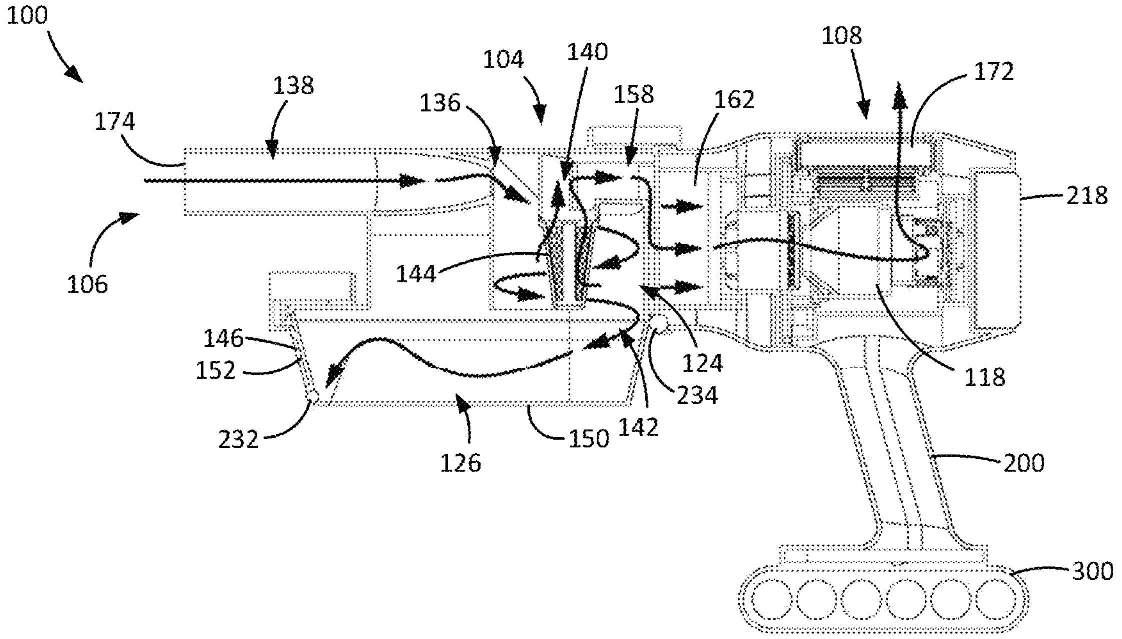
FIGS. 49B and 49C are side cross-sectional views of the hand vacuum cleaner of FIG. 49A.
Figure 49C:
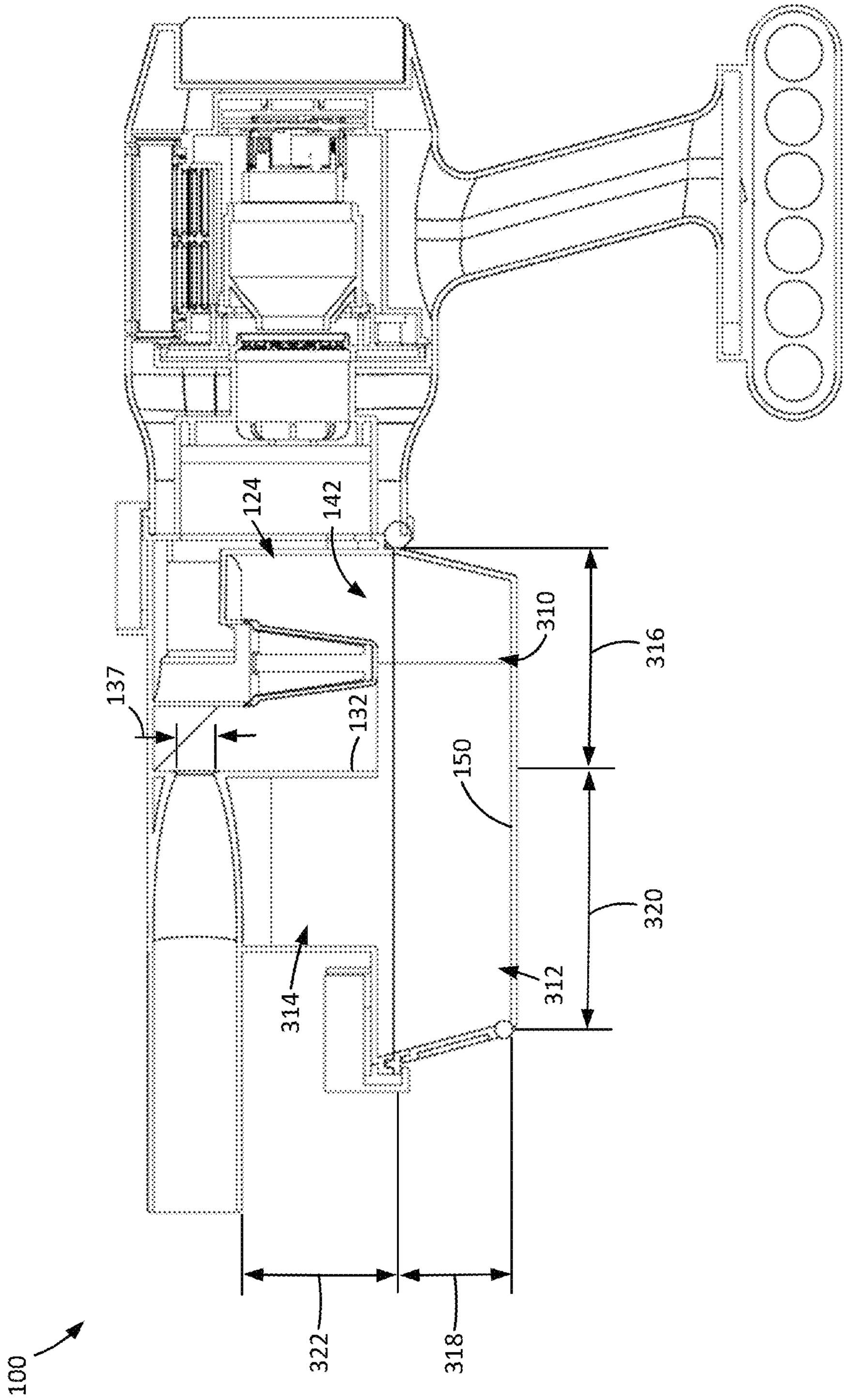

As exemplified in FIG. 49C, a line that extends in a common direction with the hand vacuum cleaner axis 117 extends through the cyclone chamber 124 and the dirt collection area 126. In other words, at least a portion of the dirt collection area 126 may be forward of the cyclone chamber 124. Further, the cyclone axis or rotation extends the dirt collection chamber.

The dirt collection area 126 may comprise a first portion 310, a second portion 312, and a third portion 314 (see, e.g., FIG. 49C). The first portion 310 underlies some or all of the cyclone chamber 124. The first portion 310 has a first portion length 316. In the orientation of FIG. 49C, the first portion length is in a horizontal direction of the hand vacuum cleaner axis 117. The second portion 312 is forward of the cyclone chamber 124. The second portion 312 has a second portion height 318 in a vertical direction of the cyclone axis 134 from a lower end of the dirt collection area 126 (i.e., from dirt collection bottom wall 150) to a lower plane that is both transverse to the cyclone axis 134 and at a lower end of the cyclone sidewall 132. The second portion 312 has a second portion length 320 in the horizontal direction. The third portion 314 is forward of the cyclone chamber 124. The third portion 314 has a third portion height 322 in the vertical direction from the lower plane to an upper end of the dirt collection area 126.

The ratio of the second portion height 320 to the cyclone air inlet height 137 may be any suitable ratio. The second portion height 320 may be about half the cyclone air inlet height 137, equal to the air inlet height 137, 1.5 or 2 times the cyclone inlet height.

The ratio of the second portion length 320 to the first portion length 316 may be any suitable ratio. The longer the length of the second portion to the diameter of the cyclone, the less air will move within the part of the second portion that is distal (e.g., forward in the orientation of FIG. 49C) from the cyclone chamber. Accordingly, the ratio of the second portion length 320 to the first portion length 316 may be from 1 to 3, 1.25 to 3, 1.5 to 3, 1.25 to 2.5, 1.25 to 2.25, 1.1 to 1.5 (e.g., 1.25), 1.5 to 2 or 1.75.

Optionally, as exemplified in FIG. 49C, a plate 156 is not located at the lower end (open end) of the cyclone chamber. Accordingly, the lower end of the cyclone chamber is open and essentially comprises the location at which dirt exits the cyclone chamber into the dirt collection chamber.

Openable and Removable Portions

Hand vacuum cleaner 100 can include one or more openable or removable portion. Various options for the configuration and positioning of the openable and removable portions are discussed. Accordingly, any such openable or removable portion disclosed herein may be used by itself or in combination with one or more of the handle, the position of the energy storage member packs, the air flow path, the position of the dirt collection area, the tangential inlet with ramp, the air treatment assembly, the position of the suction motor, the position of a pre-motor filter, the position of a post-motor filter, a telescoping inlet and a corner screen as disclosed herein.

At least a portion of surface cleaning apparatus 100 may be openable for emptying of or access to the air treatment assembly 104. Accordingly, the surface cleaning apparatus may have one or more openable portions and optionally a stationary portion. The openable portion or portions may be part of the air treatment assembly and/or the air treatment chamber and the stationary portion may be a remainder of the air treatment assembly and/or the air treatment chamber (i.e., the rest of the air treatment assembly and/or the air treatment chamber other than the openable portion(s)). For example, at least one end (e.g., the rear end as exemplified in FIG. 59C or the bottom end as exemplified in FIG. 54B) may be openable. Optionally both ends of treatment assembly 104 may be openable for emptying.

Any suitable type of locking mechanism may be used for keeping the openable portion in a closed position (e.g., a manually operable latch) Any latching mechanism known in the art may be used.

The openable portion may open the dirt collection area and/or the air treatment chamber 124. Accordingly, an openable portion may open the dirt collection chamber 126, the air treatment chamber or both.

As exemplified herein, the openable portion is openable by rotating about a rotational mount (e.g., a hinge). Alternately, the openable portion may move in any other manner such as translation in any direction.

Figure 21:
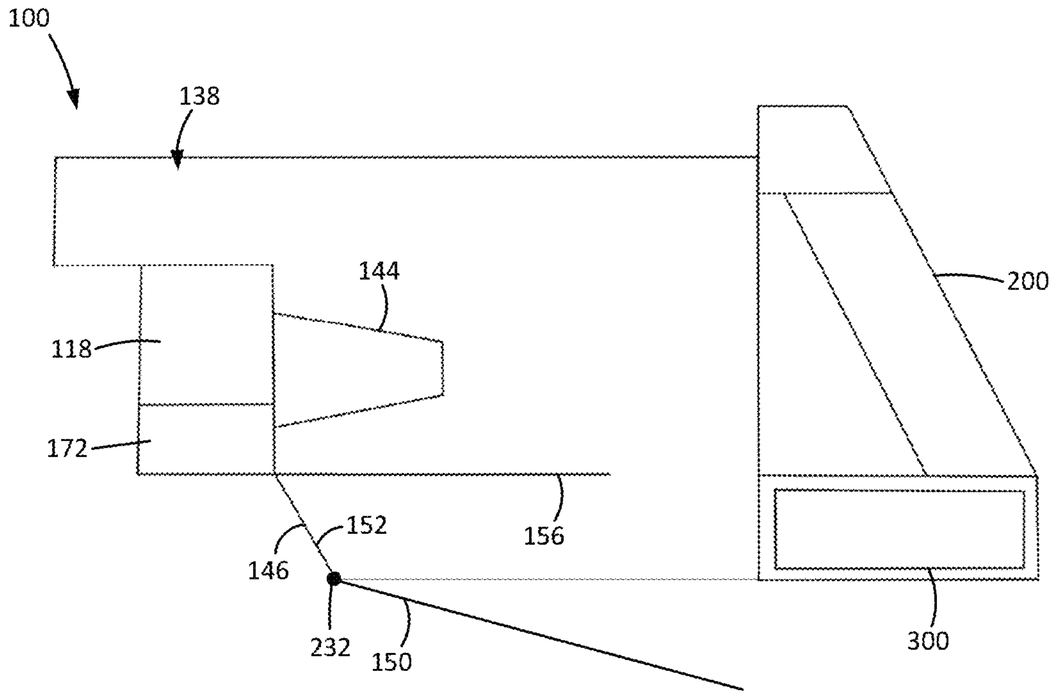
FIGS. 21-22 are side cross-sectional views of hand vacuum cleaners with openable portions in open positions.

The openable portion may be a portion towards the lower end 116, such as the dirt collection bottom wall 150. Rotating open a lower portion, such as the bottom wall of the hand vacuum cleaner, which may be a lower wall of an external dirt collection chamber and/or a lower wall of the air treatment chamber, may open one or both of the dirt collection chamber and/or the air treatment chamber Accordingly, for example, the dirt collection bottom wall 150 may open by rotating about dirt collection hinge 234 (see, e.g., FIGS. 21 and 36C). The dirt collection hinge 234 may be located towards the rear of dirt collection bottom wall 150 such that the dirt collection wall 150 pivots rearwardly and, as exemplified in FIG. 36C, the open side faces forwardly (e.g., FIG. 36C). Such an embodiment may be used, e.g., if the dirt outlet for the cyclone chamber is at a forward side of the cyclone chamber. Accordingly, in the orientation of FIG. 36C, the hand vacuum cleaner may be rotated counter clockwise downwardly such that the open side of the air treatment chamber (the dirt outlet) and the open side of the dirt collection chamber face downwardly whereby dirt may travel out of the air treatment chamber and dirt collection chamber by gravity. Alternately, the dirt collection hinge may alternatively be located towards the front of dirt collection bottom wall 150 such that the dirt collection wall 150 rotates forwardly and the open sides faces rearwardly (e.g., FIGS. 21 and 41C). Such an embodiment may be used, e.g., if the dirt outlet for the cyclone chamber is at a rearward side of the cyclone chamber. Accordingly, in the orientation of FIG. 41C, the hand vacuum cleaner may be rotated clockwise downwardly such that the open side of the air treatment chamber (the dirt outlet) and the open side of the dirt collection chamber face downwardly whereby dirt may travel out of the air treatment chamber and dirt collection chamber by gravity.

Figure 24B:
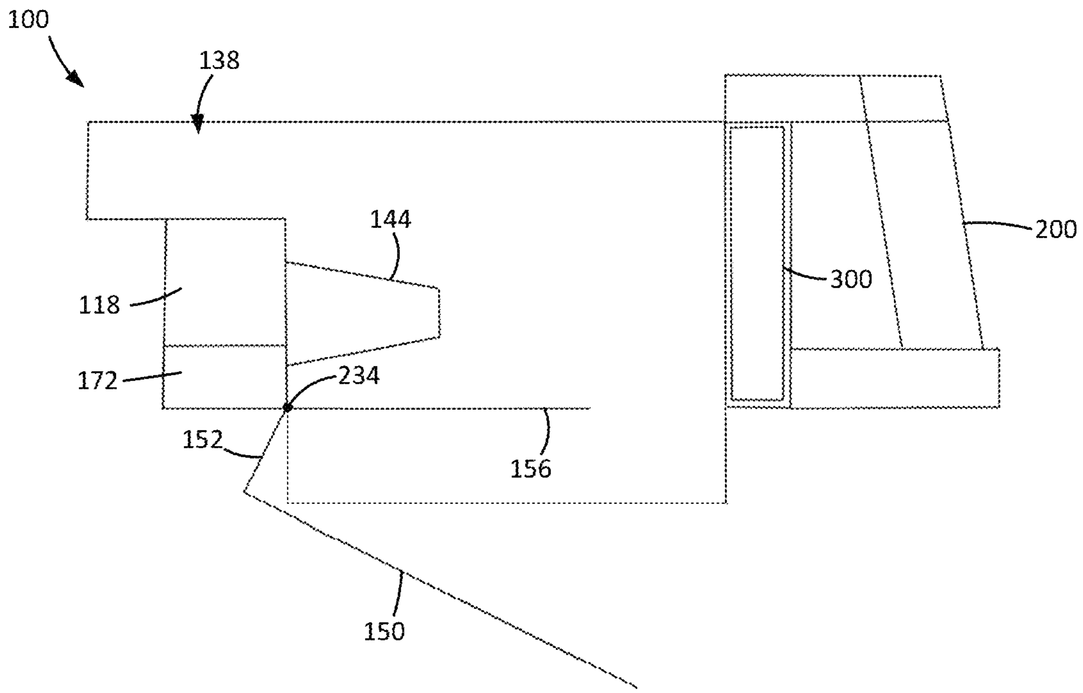
FIG. 24B is a side cross-sectional view of the hand vacuum cleaner of FIG. 24A with the openable portion in an open position.
Figure 25:
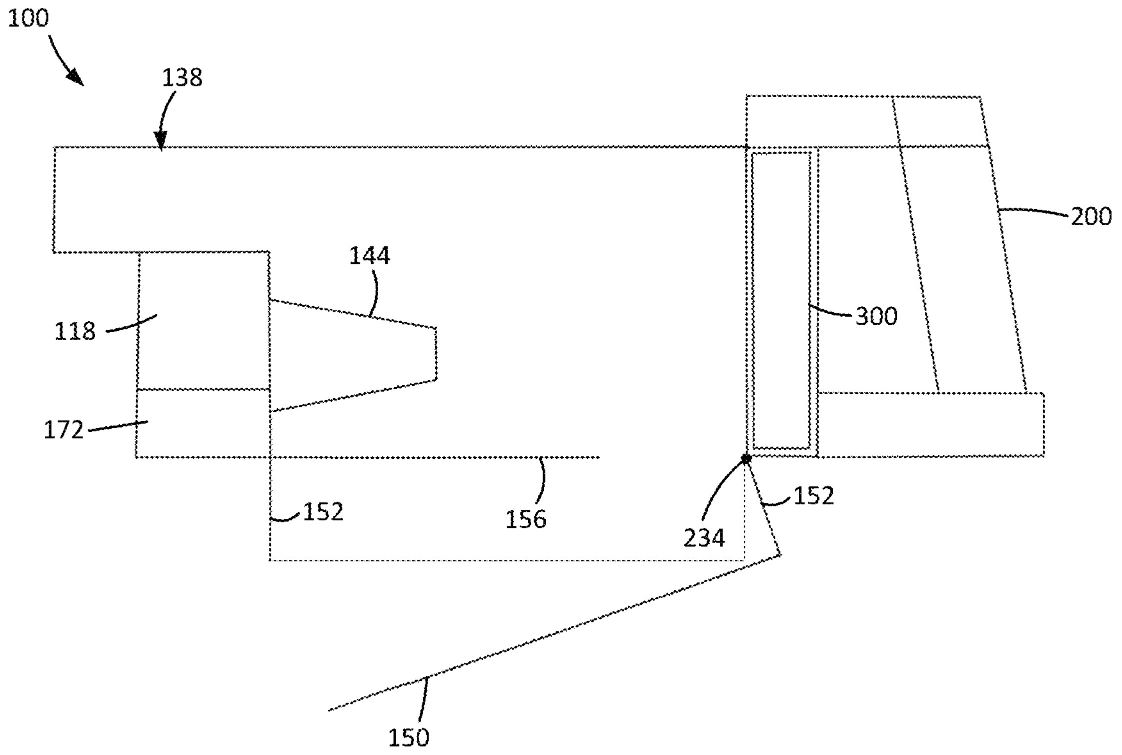
FIGS. 25-26 are side cross-sectional views of other example hand vacuum cleaners with openable portions in open positions.

As an alternative to moving just the lower wall, a portion of one or more end walls and/or sidewalls may be concurrently openable with the lower wall. In such as case, the portion of one or more end walls and/or sidewalls may be permanently fixed in position with respect to the lower wall (e.g., part of a single molded member as exemplified in FIGS. 24B and 25) or the portion of one or more sidewalls may be separately openable if the air treatment assembly has two openable portions as discussed subsequently. Accordingly, as exemplified in FIGS. 15B, 20B, 24B, and 25, the openable portion may include both the dirt collection bottom wall 150 and one or more dirt collection end walls (part or all of a front wall or part or all of a rear wall). As exemplified, the openable portion may be generally U-shaped in a plane that is transverse to the cyclone axis 134 (in which case the openable portion may include a portion of the axially extending side walls) or generally U-shaped in a plane that is parallel to the cyclone axis (in which case part or all of the front and/or rear wall may be concurrently moveable, see, e.g., FIG. 20B). As discussed previously, the dirt collection hinge 234 may be located towards the rear of dirt collection bottom wall 150 such that components open forwardly (e.g., FIG. 25), or towards the front of dirt collection bottom wall 150 such that the components open rearwardly (e.g., FIG. 24B).

Figure 22:
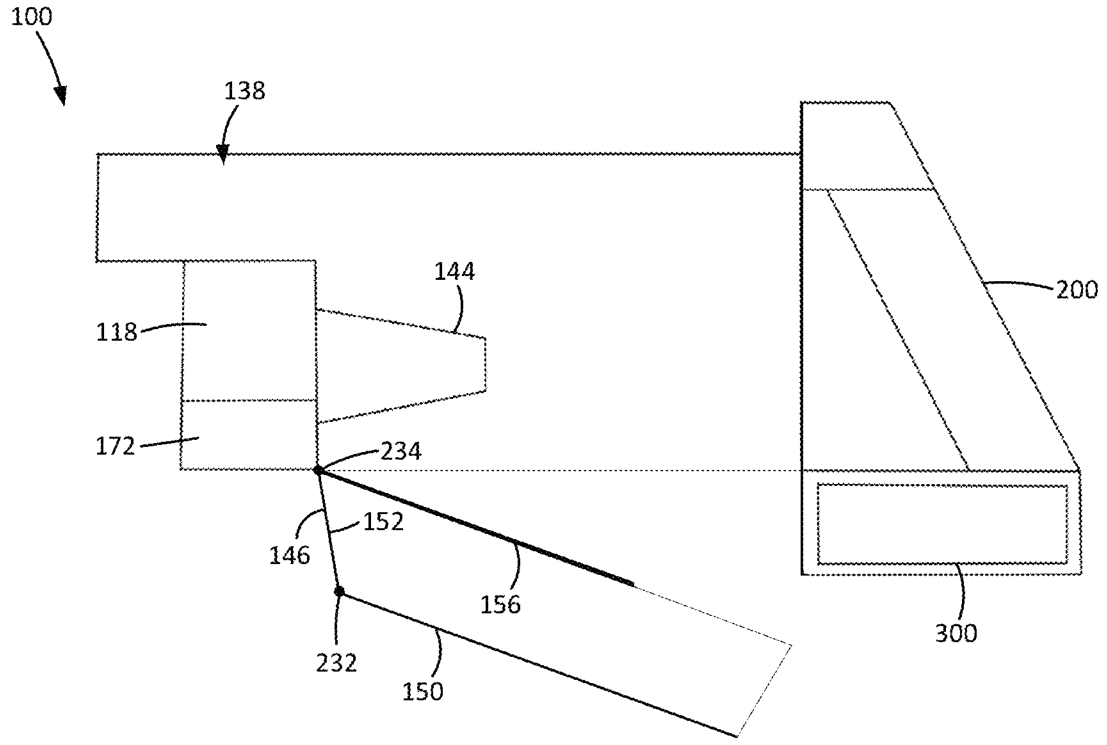

As discussed previously, two openable portions may be provided. In such a case, both openable portions may move in the same direction (e.g., rotate in the same direction, see e.g., FIG. 22), or they move in different directions (e.g., rotate in different directions, see e.g., FIG. 36B). Alternately, they may move in different patterns, e.g., one may rotate and one may translate or they move in the same pattern, e.g., they may both rotate or translate. The two openable portions may move concurrently or sequentially. Accordingly, a first openable portion may partially or fully open and then a second openable portion may partially or fully open. Alternately, both openable portions may move concurrently (see e.g., FIG. 22). In such a case, the two openable portions may be secured together as a unit and a single, e.g., rotational mount, may be used. Alternately, each of the openable portions may be moveable mounted, e.g., by a rotational mount, in which case the moveable portions may open different amounts and/or sequentially. One openable portion may open a dirt collection chamber and the other may open an air treatment chamber (e.g., see FIG. 22). One of the openable portions may be part or all of a front or rear wall and may be referred to as a door. Accordingly, door 146 is openable and may open with the openable portion. In other words, when the openable portion moves to the open position, door 146 moves as a unit with the openable portion while door 146 is in its closed position (see, e.g., FIG. 39C). As exemplified in FIG. 22, the dirt collection bottom wall 50 may open by rotating about hinge 234 and door 146 may be openable by rotating about door hinge 232. Door 146 may remain closed when lower wall 150 rotates open and cyclone sidewall may rotate concurrently with lower wall whereby the air treatment chamber and the dirt collection chamber are concurrently opened. If door 146 is opened by itself, the front end of the dirt collection area 126 is opened.

Accordingly, door 146 is openable and may open with the openable portion. In other words, when the openable portion moves to the open position, door 146 moves as a unit with the openable portion while door 146 is in its closed position (see, e.g., FIG. 39C).

It will be appreciated that one or more operating components of the hand vacuum cleaner may be moveable with the openable portion. Accordingly, the openable portion may be part of a main body of the hand vacuum cleaner. As exemplified in FIG. 26, the openable portion may include the dirt collection bottom wall 150, the second cyclone end wall 131, an energy storage pack 300, and the handle 200. These components may all rotate about handle hinge 210, located adjacent an upper end of the handle 200.

Figure 26:
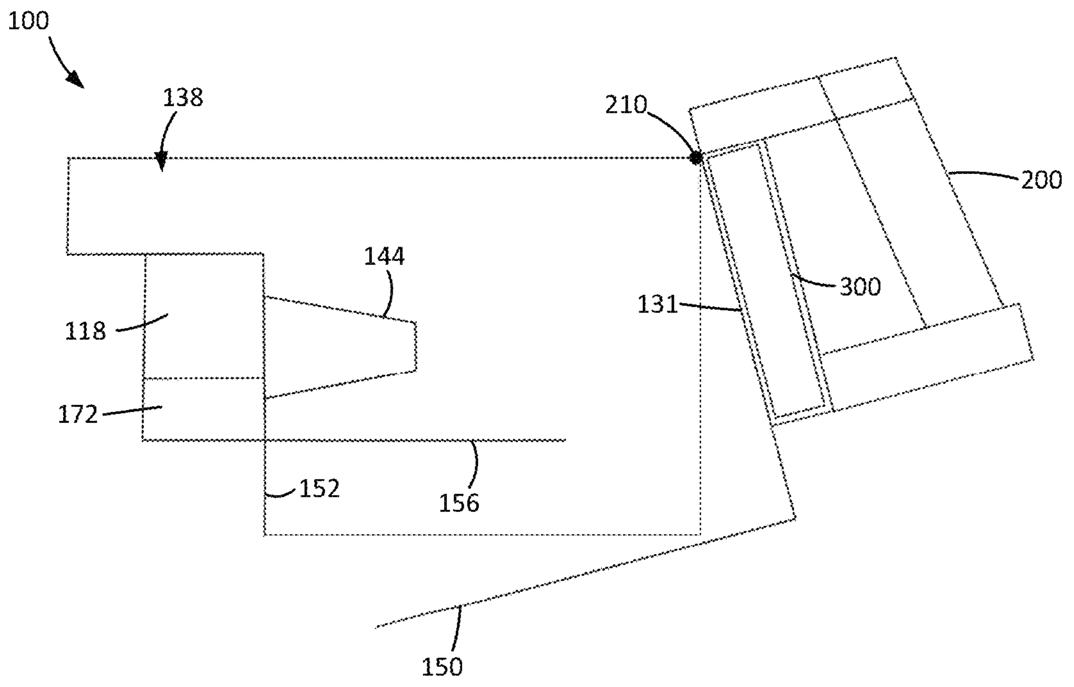
Figure 29:
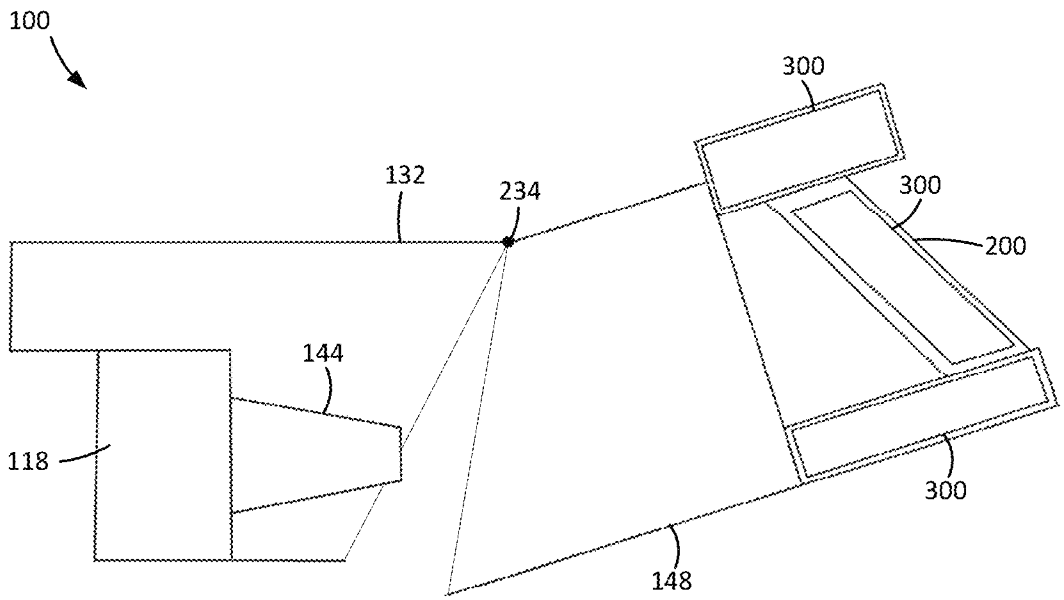

It will be appreciated that, as exemplified in FIG. 26, a rotational mount may be provided at an upper end of the hand vacuum cleaner and still enable the lower end of the hand vacuum cleaner to open. For example, part or all of a lower wall may be mounted, optionally fixedly mounted in position, with respect to an end wall (e.g., end wall 131) of the air treatment assembly. Accordingly, the dirt collection hinge 234 may be located towards the upper end 114. For example, the dirt collection hinge 234 may be located along cyclone sidewall 132 at or towards upper end 114. As exemplified in FIG. 28, the dirt collection hinge 234 may be located towards the front end of cyclone sidewall 132, and the openable portion may include the inlet conduit 138, motor and fan assembly 118, vortex finder 144, and a forward portion of the cyclone chamber bottom wall 148. As exemplified in FIG. 26, the rotational mount is located at the rear end of the side wall 132. As exemplified in FIG. 29, the dirt collection hinge 234 may be located midway along the side wall 132, and the openable portion may include the handle 200 (optionally containing energy storage packs 300), and a rearward portion of the cyclone chamber bottom wall 148.

Figure 39A:
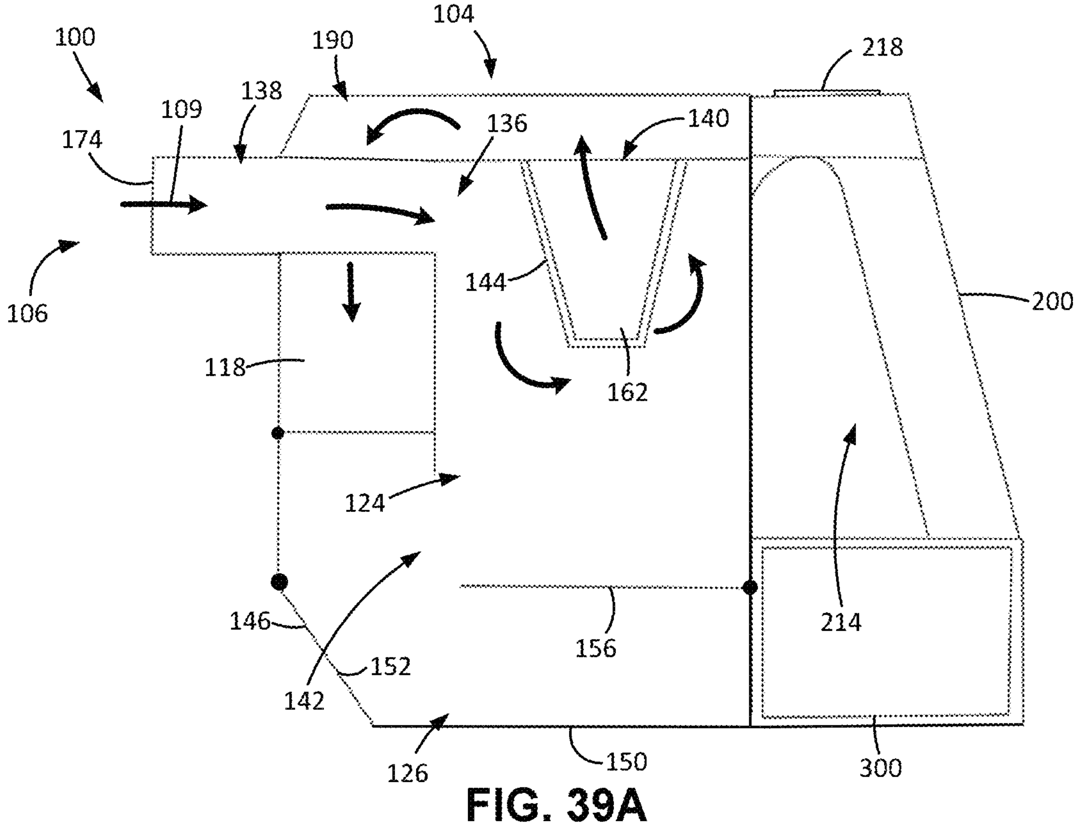
FIG. 39A is a side cross-sectional view of a hand vacuum cleaner with an openable door and an openable portion in closed positions and a rotating plate in an original position.
Figure 39B:
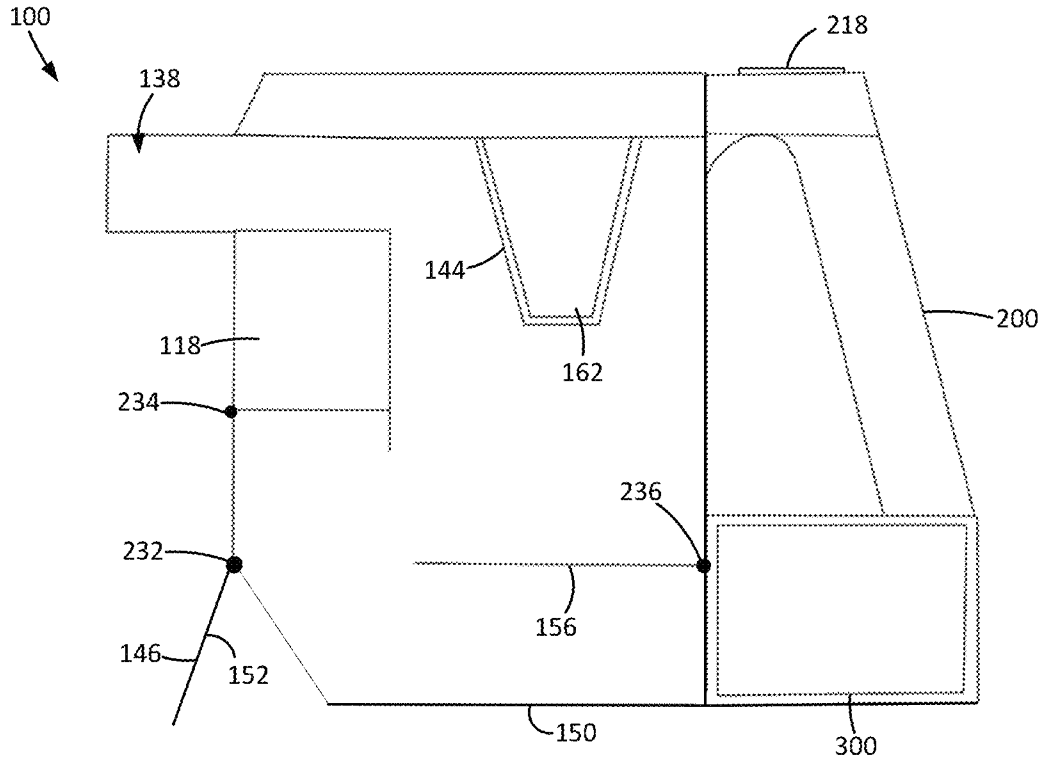
FIG. 39B is a side cross-sectional view of the hand vacuum cleaner of FIG. 39A with the openable door in an open position and the openable portion in a closed position.
Figure 39C:
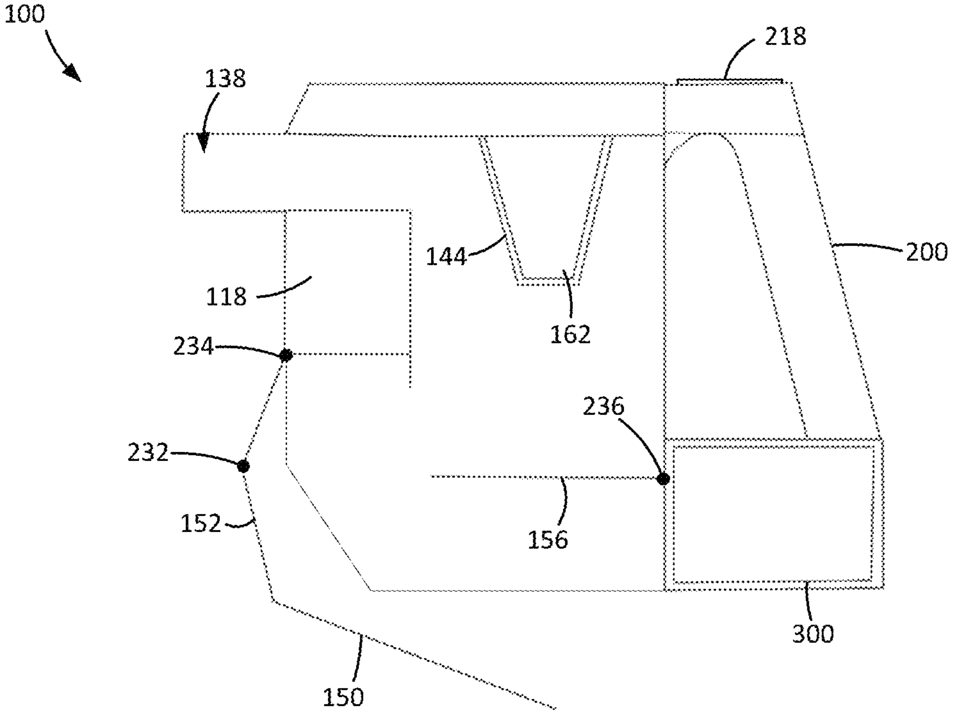
FIG. 39C is a side cross-sectional view of the hand vacuum cleaner of FIG. 39A with the openable portion in an open position and the openable door in a closed position.
Figure 42A:
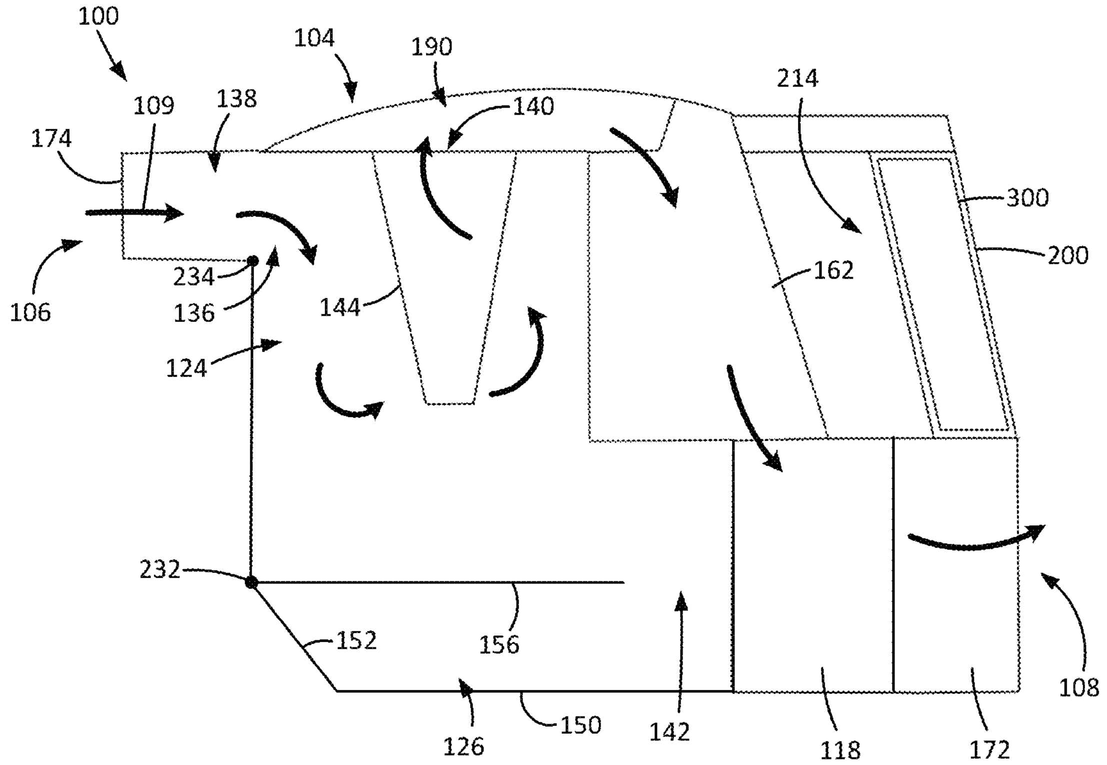
FIG. 42A is a side cross-sectional view of a hand vacuum cleaner with an openable door and an openable portion in closed positions.
Figure 42B:
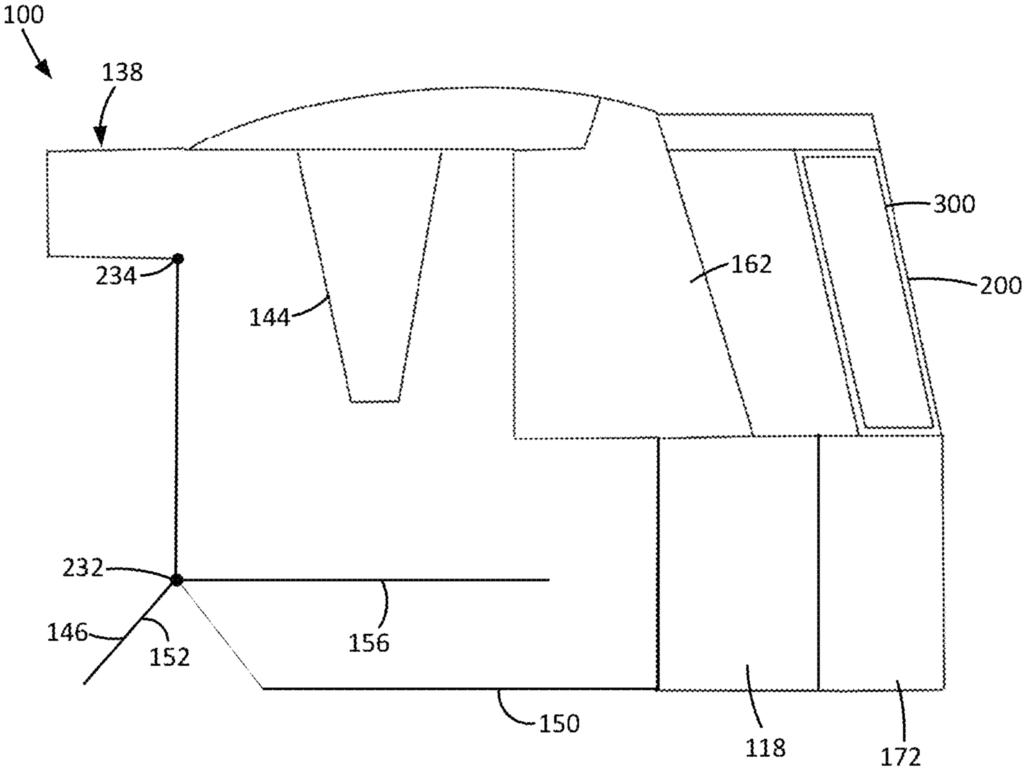
FIG. 42B is a side cross-sectional view of the hand vacuum cleaner of FIG. 42A with the openable door in an open position and the openable portion in a closed position.
Figure 42C:
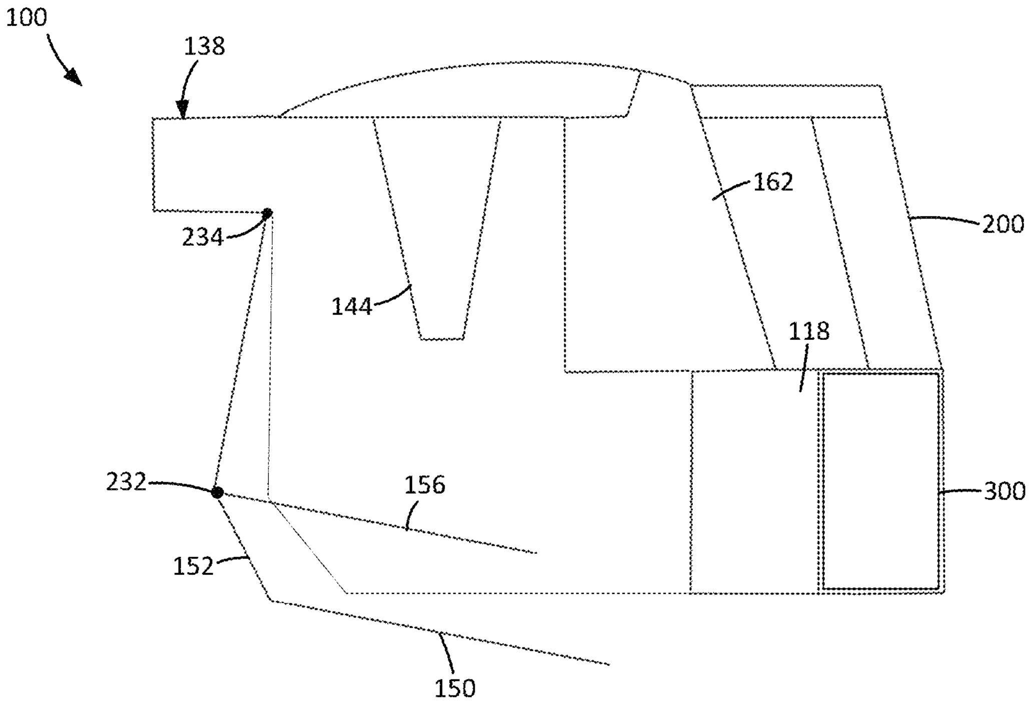
FIG. 42C is a side cross-sectional view of the hand vacuum cleaner of FIG. 42A with the openable portion in an open position and the openable door in a closed position.
Figure 43A:
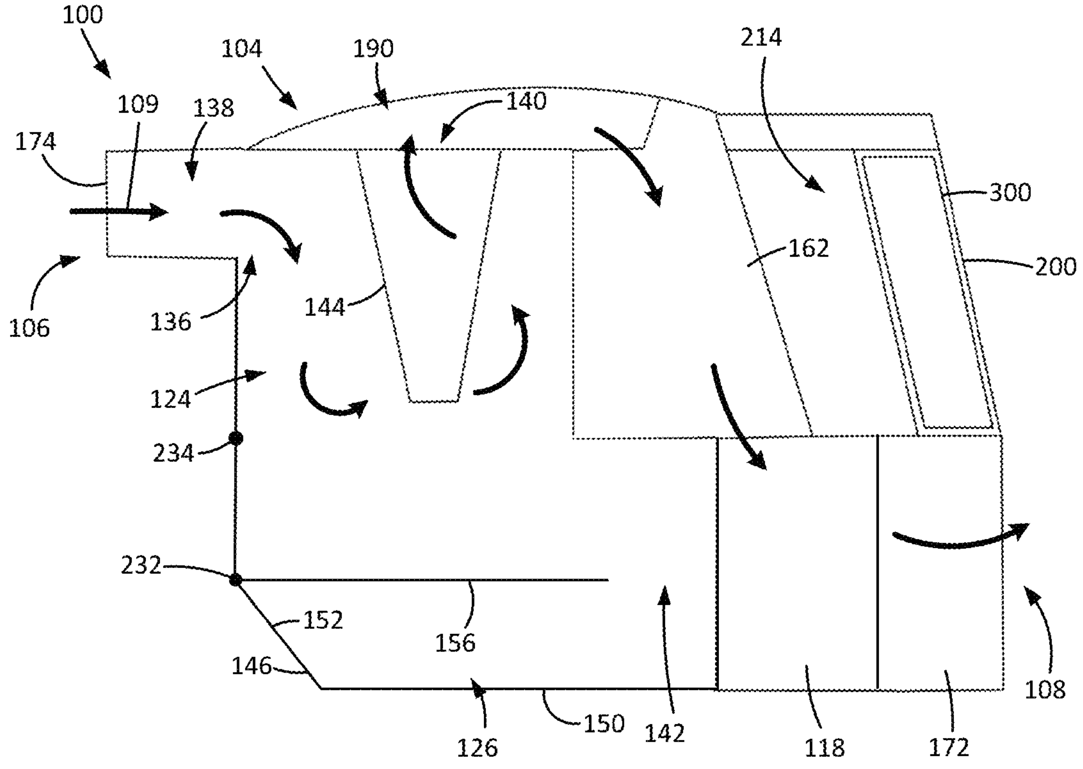
FIG. 43A is a side cross-sectional view of a hand vacuum cleaner with an openable door and an openable portion in closed positions.
Figure 43B:
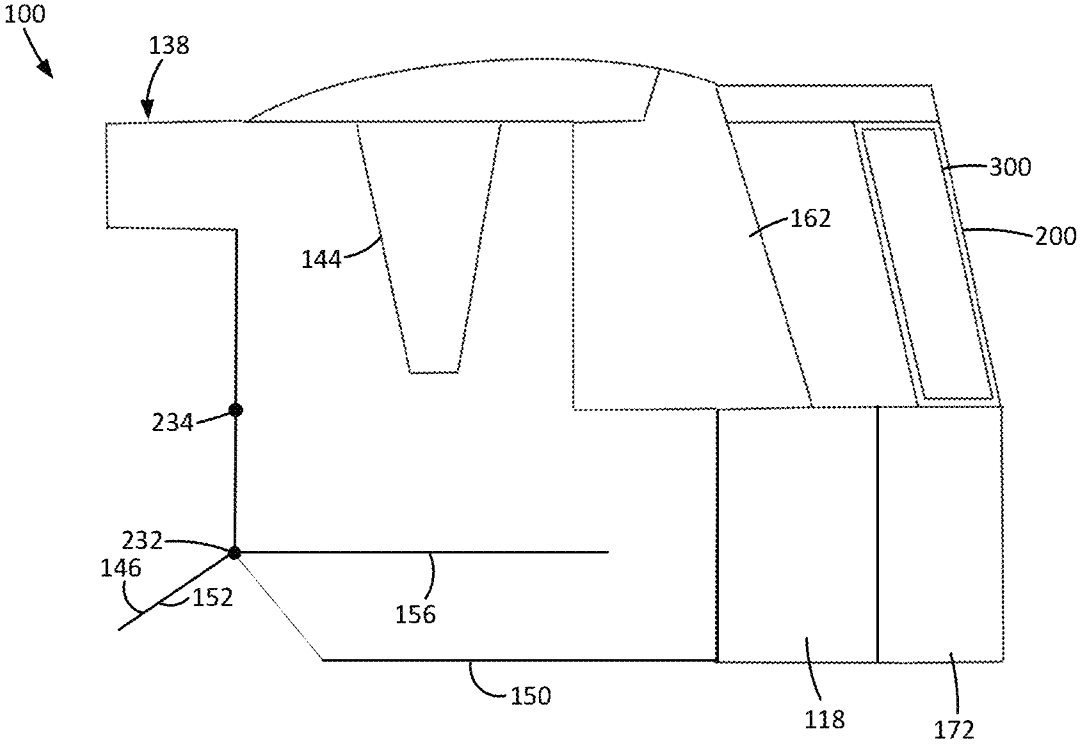
FIG. 43B is a side cross-sectional view of the hand vacuum cleaner of FIG. 43A with the openable door in an open position and the openable portion in a closed position.
Figure 43C:
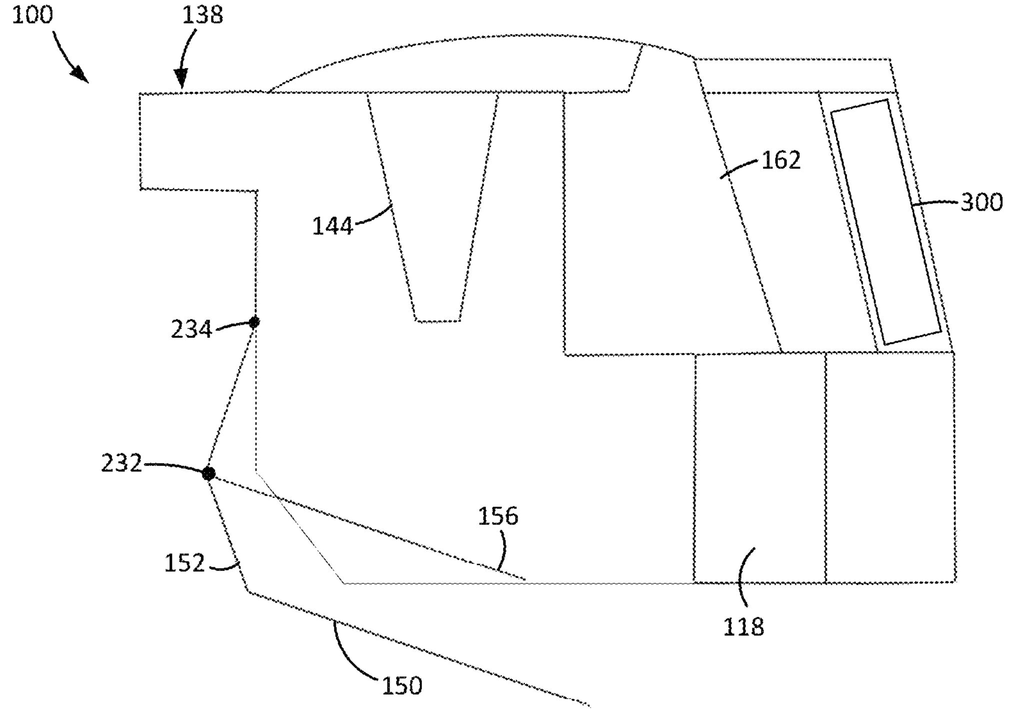
FIG. 43C is a side cross-sectional view of the hand vacuum cleaner of FIG. 43A with the openable portion in an open position and the openable door in a closed position.

The openable portion may include at least a portion of a front wall of the air treatment assembly 104. Accordingly part or all of the front wall may move when an axially extending wall is opened. For example, as exemplified in FIG. 42C, dirt collection hinge 234 is located on the front end wall such that when the front end wall pivots forwardly, the lower end is opened. In FIG. 42C, the dirt collection hinge 234 is located towards an upper end of the front wall of the air treatment assembly 104, adjacent inlet conduit 138. The front wall of the air treatment assembly 104, as well as the plate 156, dirt collection bottom wall 150 and dirt collection side wall 152 rotate together about dirt collection hinge 234. In other embodiments, only a portion of the front wall of the air treatment assembly 104 may be openable. For example, as exemplified in FIG. 43C, the dirt collection hinge 234 may be located towards the vertical center of the front wall of the air treatment assembly 104. A lower portion of the front wall of the air treatment assembly 104, the plate 156, dirt collection bottom wall 150 and dirt collection side wall 152 rotate together about dirt collection hinge 234. In the embodiment of FIG. 39C, the openable portion includes a portion of the front wall of the air treatment assembly 104, the dirt collection side wall 152, and the dirt collection bottom wall 150, such that when the openable portion rotates about dirt collection hinge 234, a lower end of the dirt collection area is opened 126.

Figure 55:
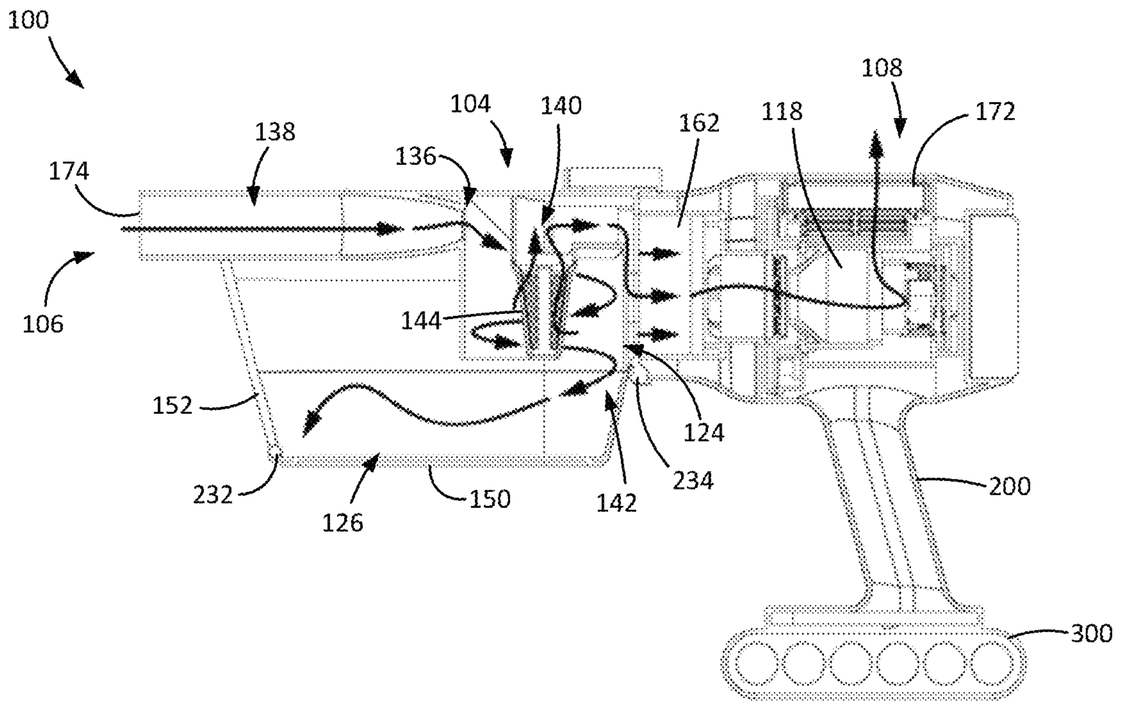
FIG. 55 is a side cross-sectional view of a hand vacuum cleaner with two openable portions in closed positions.

Alternately, part or all of the front wall may be moveable to open the air treatment chamber and/or the dirt collection chamber. For example, in FIG. 55, a front wall of the air treatment assembly (e.g., dirt collection chamber front end wall), may open forwardly by rotating about door hinge 232 located towards the upper end of dirt collection front end wall. In the embodiment exemplified in FIG. 55, the dirt collection bottom wall 150 may also optionally open by rotating about door hinge 232 if the lower wall is fixed to the moveable front end wall.

Figure 59C:
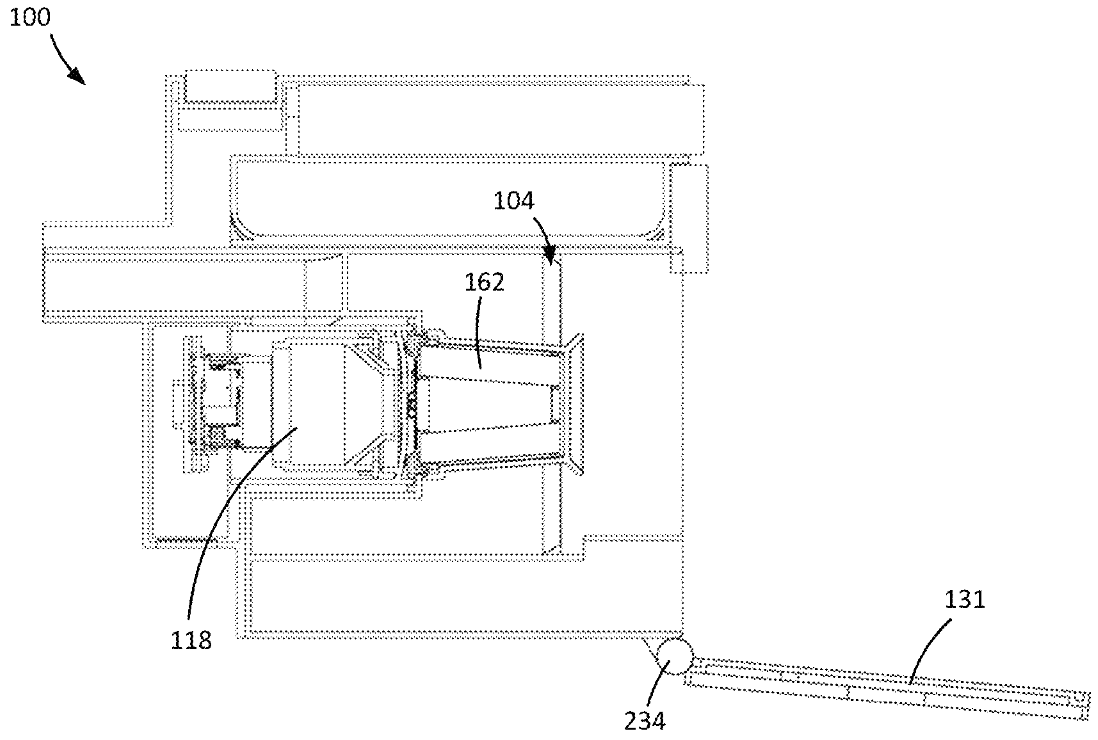
FIG. 59C is a side cross-sectional view of the hand vacuum cleaner of FIG. 59A with the openable portion in an open position.

Similarly to the front wall, the openable portion may include at least a portion of a rear wall of the air treatment assembly 104. Accordingly part or all of the rear wall may move when an axially extending wall is opened. As exemplified in FIG. 59C, the openable portion may include at least a portion of a rear wall of the air treatment assembly 104. As exemplified in FIG. 59C, the second cyclone end wall 131 may rotate about dirt collection hinge 234 to provide access to the air treatment assembly 104. FIG. 59C shows the dirt collection hinge 234 located towards the lower end 116, such that the openable portion opens upwardly. In other embodiments, as with the front wall, the dirt collection hinge 234 may be located towards the upper end 114 such that the openable portion opens downwardly.

Figure 60A:
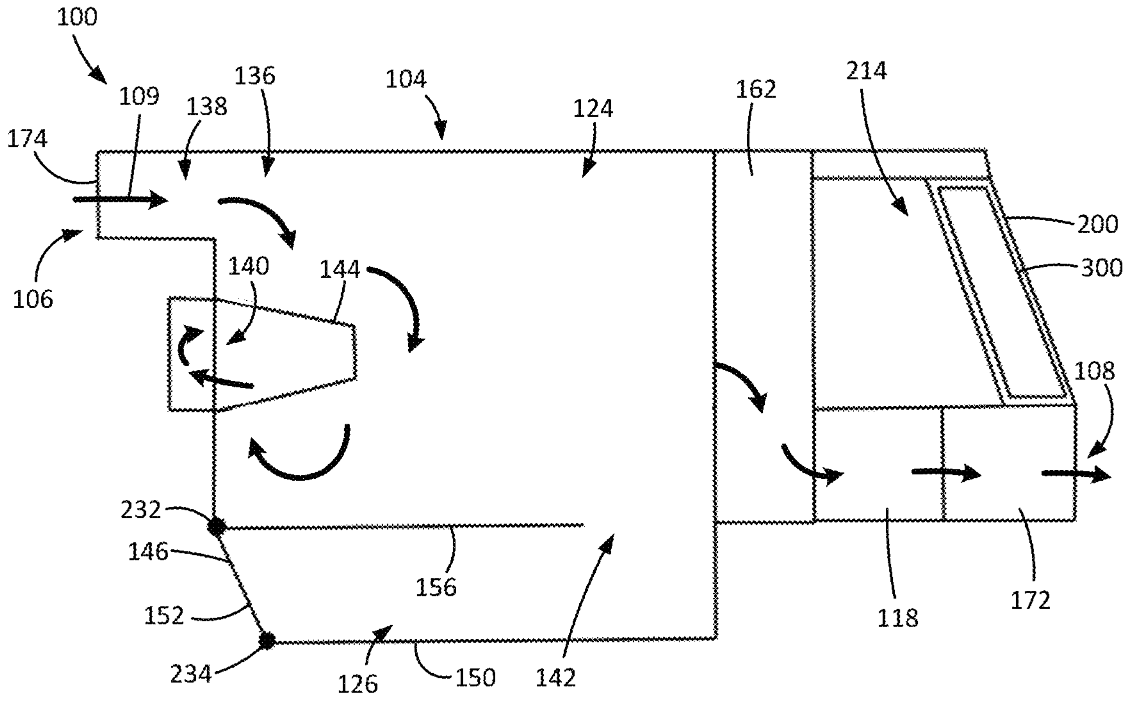
FIG. 60A is a side cross-sectional view of a hand vacuum cleaner with an openable door and an openable portion in closed positions.
Figure 60B:
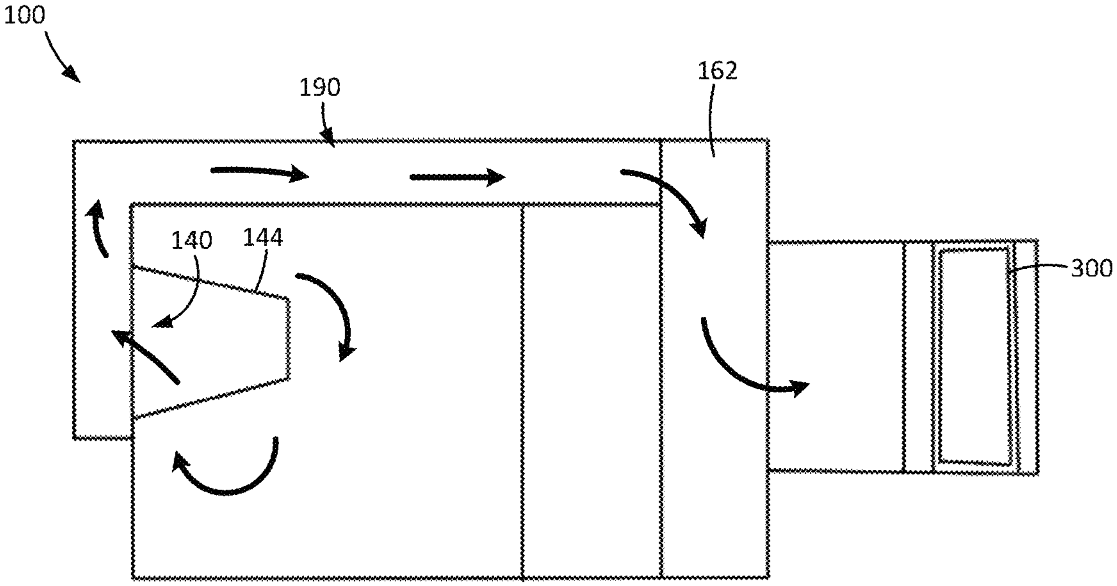
FIG. 60B is a top perspective view of the hand vacuum cleaner of FIG. 60A.
Figure 60C:
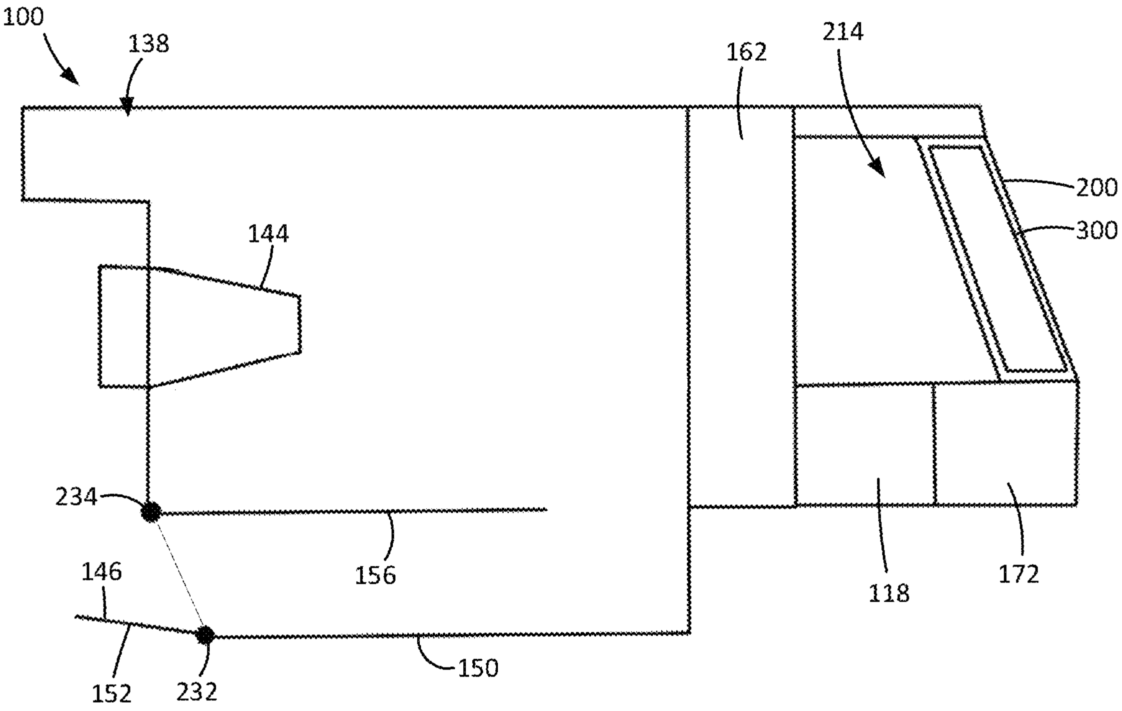
FIG. 60C is a side cross-sectional view of the hand vacuum cleaner of FIG. 60A with the openable door in an open position and the openable portion in a closed position.
Figure 60D:
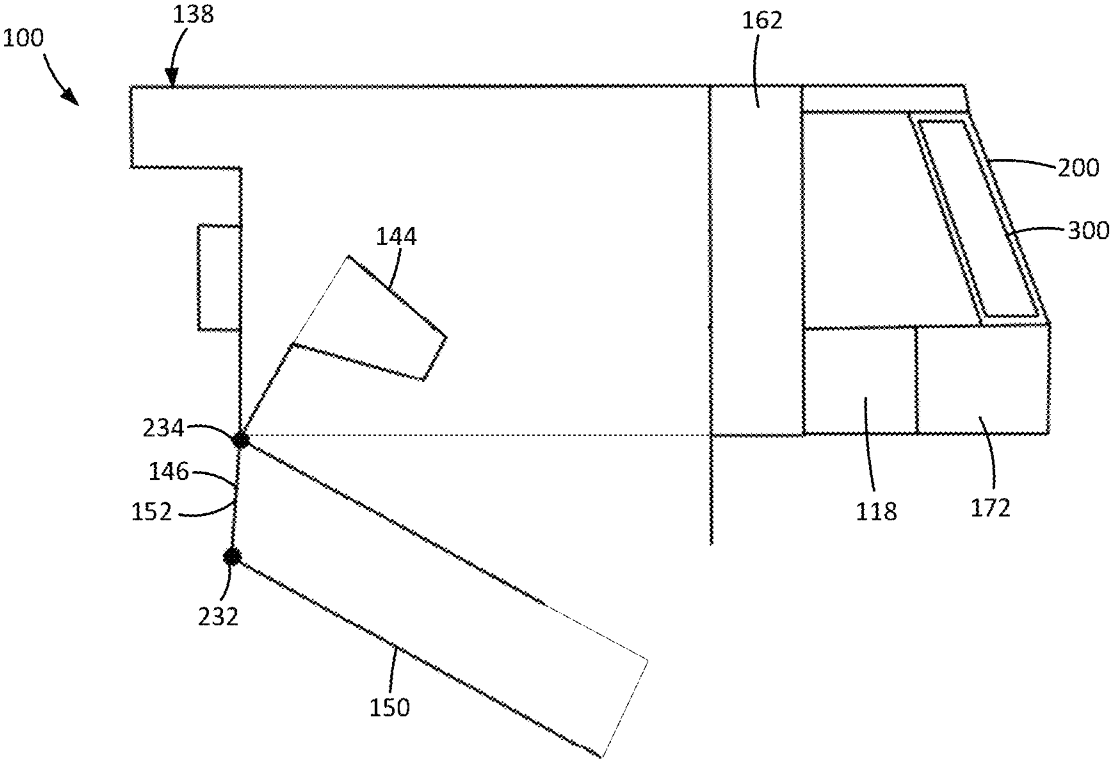
FIG. 60D is a side cross-sectional view of the hand vacuum cleaner of FIG. 60A with the openable portion in an open position and the openable door in a closed position.

As exemplified in FIG. 60D, the openable portion may include the vortex finder 144. The vortex finder 144 may rotate about dirt collection hinge 234, or hinge 232, optionally along with portions of the dirt collection chamber 126 in order to empty the air treatment assembly 104.

Figure 45B:
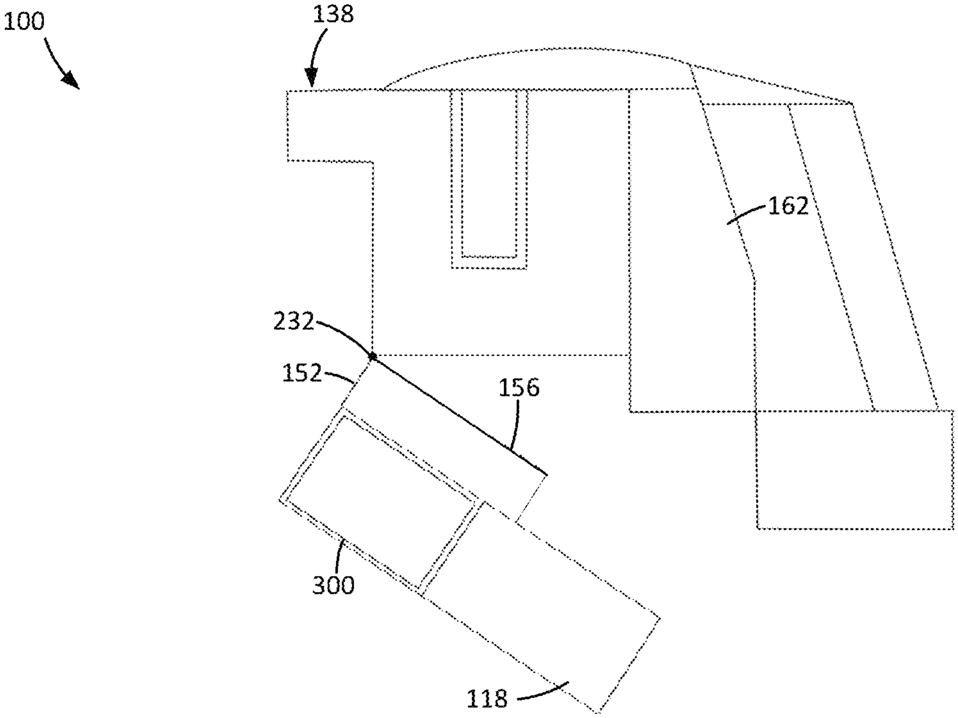
FIG. 45B is a side cross-sectional view of the hand vacuum cleaner of FIG. 45A with the openable portion in an open position.
Figure 47B:
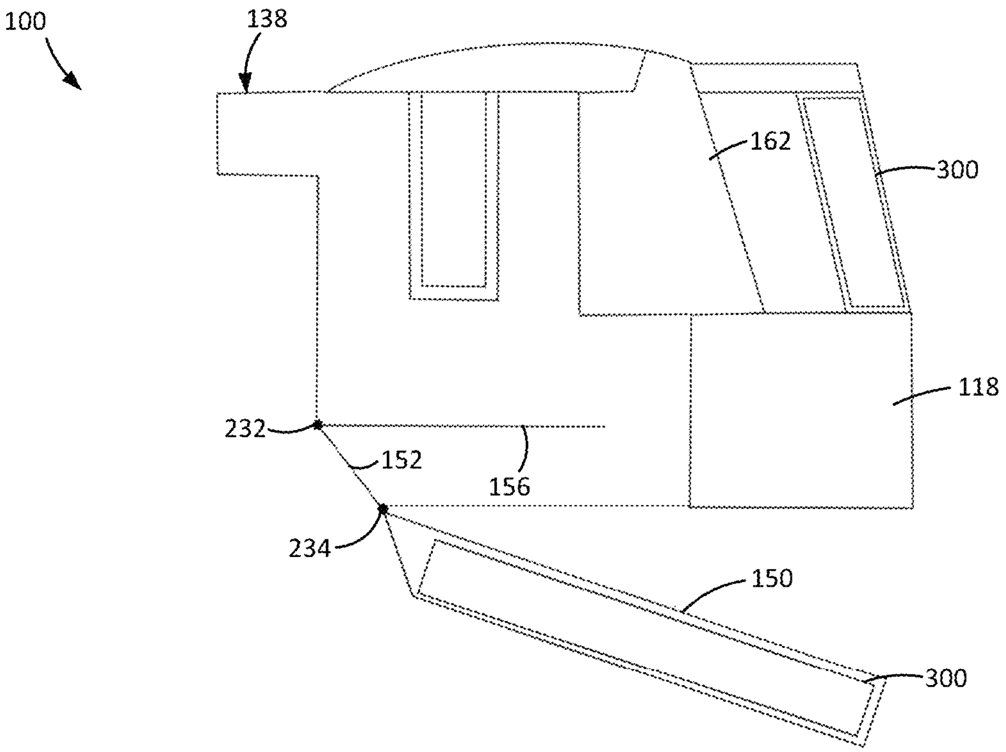
FIG. 47B is a side cross-sectional view of the hand vacuum cleaner of FIG. 47A with the openable portion in an open position.
Figure 48:
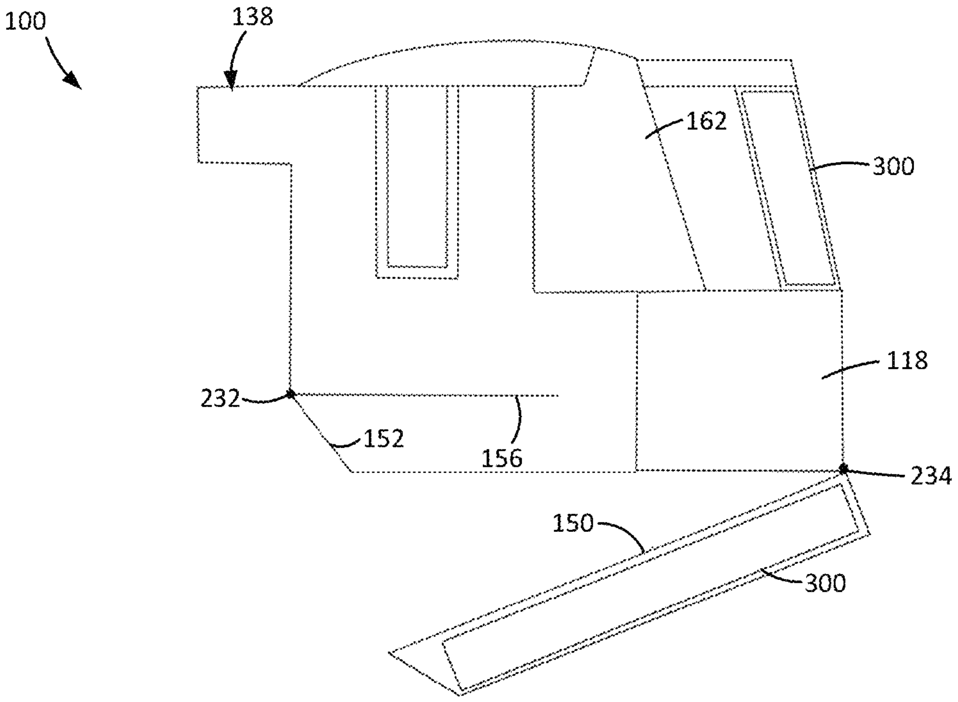
FIG. 48 is a side cross-sectional view of a hand vacuum cleaner with an openable portion in an open position.

In other embodiments, for example as exemplified in FIG. 47B, the openable portion may include an energy storage pack 300. The openable portion containing the energy storage pack may rotate about dirt collection hinge 234 or hinge 232. The dirt collection hinge may be located at any location discussed herein such as towards front end 110 such that the openable portion opens rearwardly, or towards the rear such that the openable portion opens forwardly (e.g., FIG. 48). As exemplified in FIG. 45B, the openable portion may include an energy storage pack 300 as well as the motor and fan assembly 118.

Figure 38A:
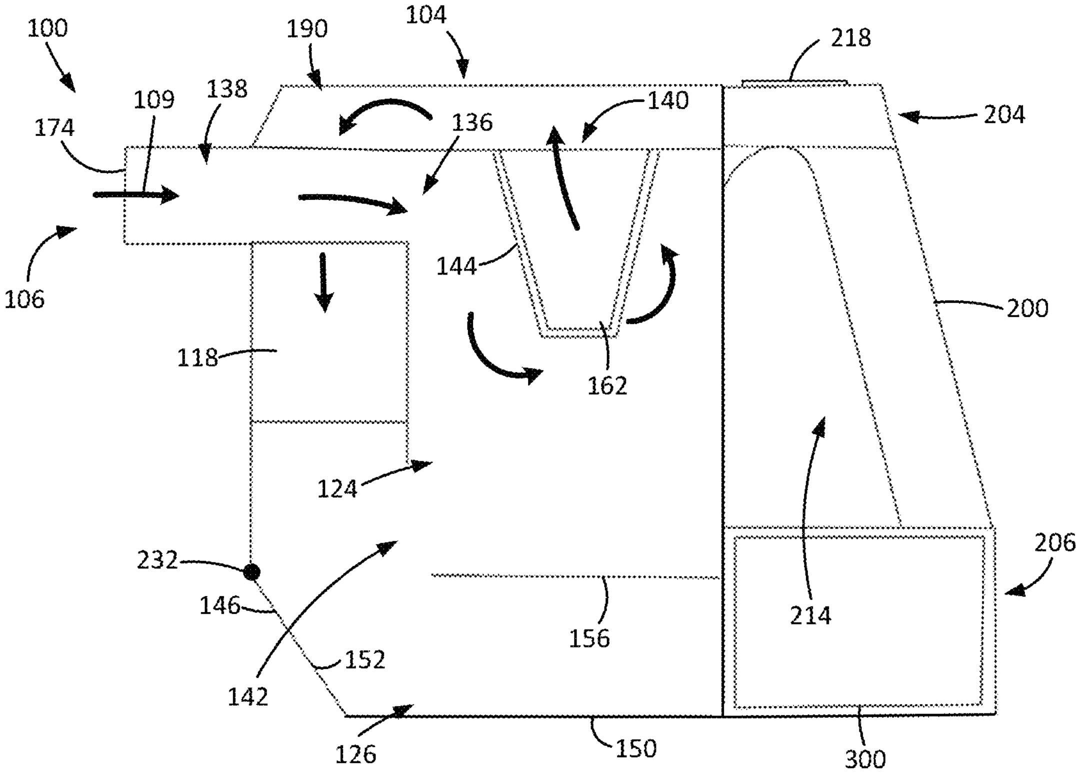
FIG. 38A is a side cross-sectional view of a hand vacuum cleaner with an openable door and an openable portion in closed positions.
Figure 38B:
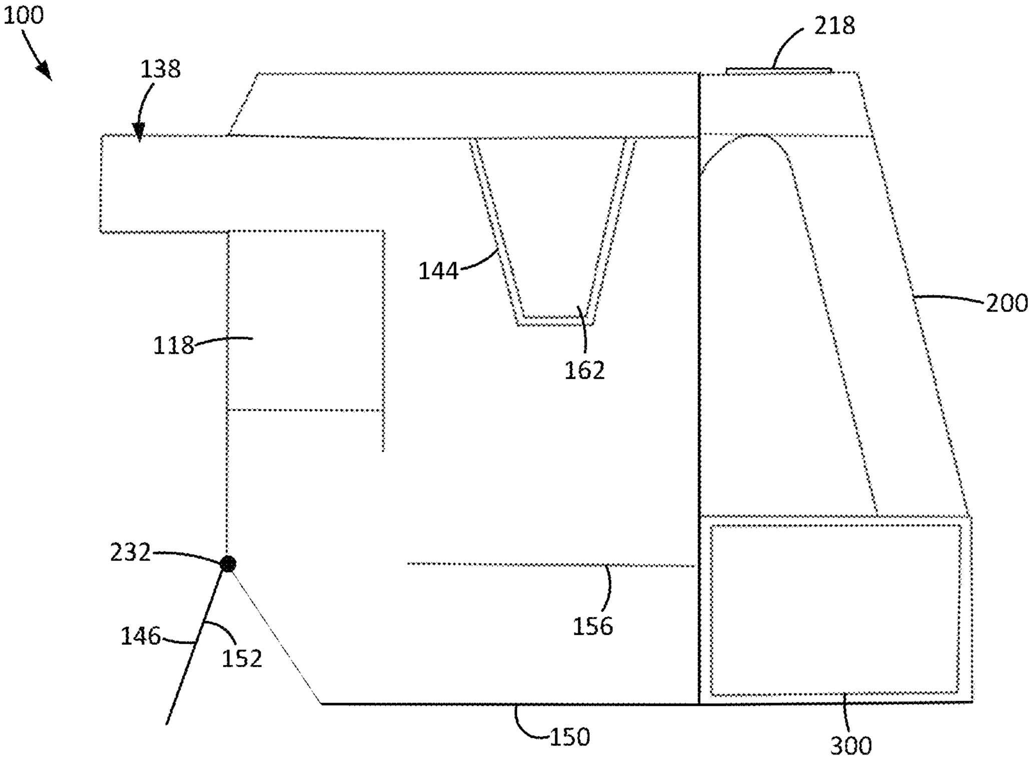
FIG. 38B is the hand vacuum cleaner of FIG. 38A with the openable door in an open position and the openable portion in a closed position.
Figure 39D:
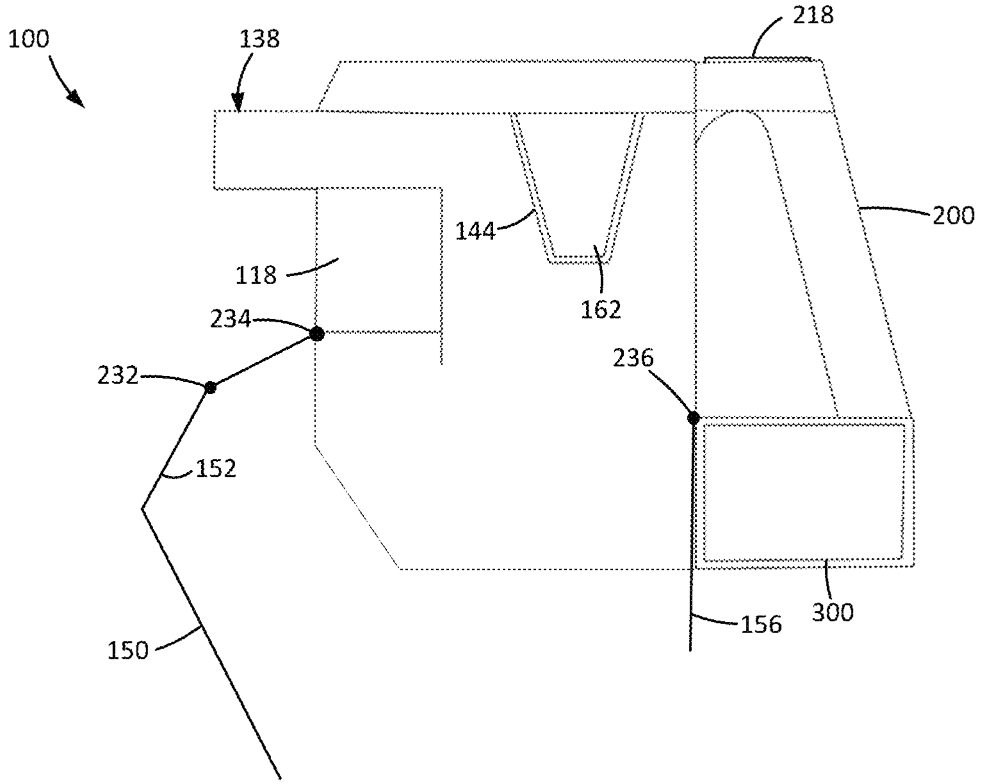
FIG. 39D is a side cross-sectional view of the hand vacuum cleaner of FIG. 39A with the openable portion in an open position, the openable portion in an open position and the rotating plate in a rotated position.
Figure 40A:
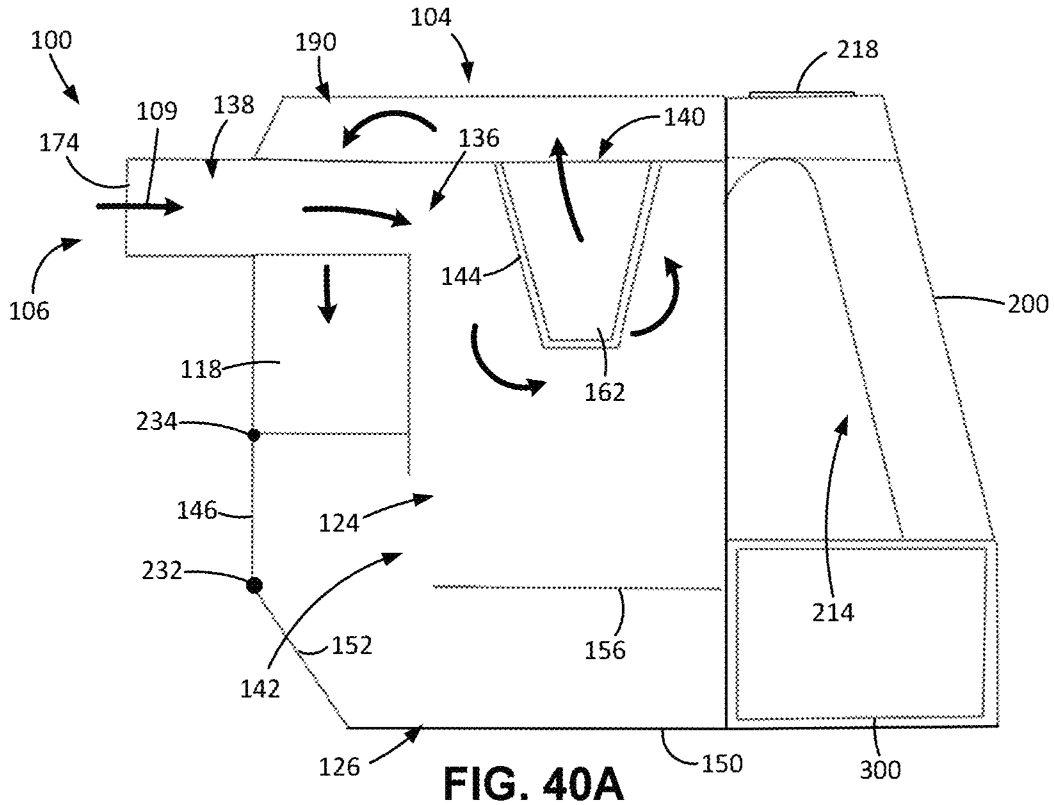
FIG. 40A is a side cross-sectional view of a hand vacuum cleaner with an openable door and an openable portion in closed positions.
Figure 40B:
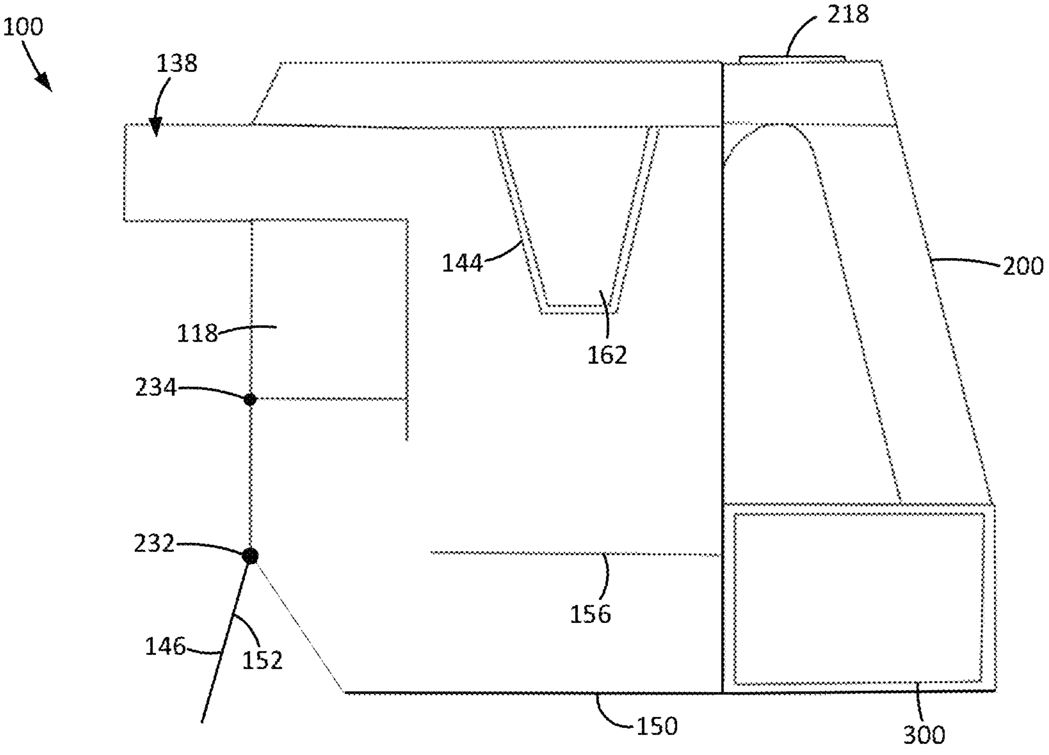
FIG. 40B is a side cross-sectional view of the hand vacuum cleaner of FIG. 40A with the openable door in an open position and the openable portion in a closed position.
Figure 40C:
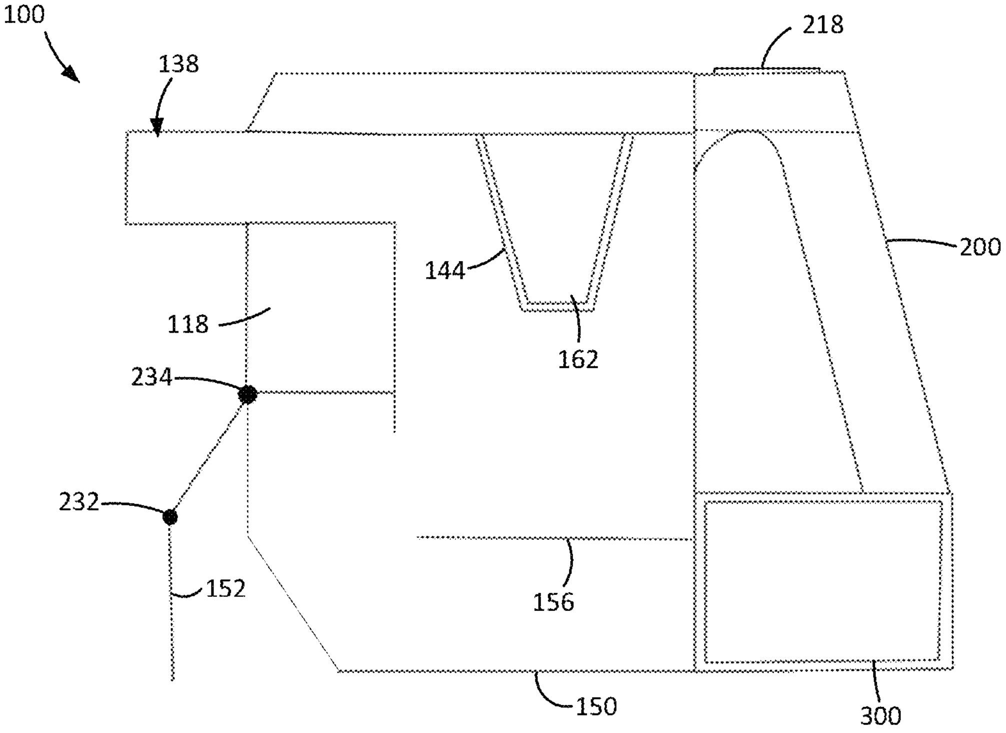
FIG. 40C is a side cross-sectional view of the hand vacuum cleaner of FIG. 40A with the openable portion in an open position.

Optionally, plate 156 may be fixed in its position with respect to, e.g., cyclone sidewall 132 or first or second cyclone end walls 129, 131, or it may be separately moveable or openable. As exemplified in FIG. 38B, the plate 156 is fixed in position and is mounted to a stationary portion of the air treatment assembly. As exemplified in FIG. 39D, the plate 156 is moveable mounted to a stationary portion of the air treatment assembly (cyclone chamber side wall) and is moveably mounted about plate hinge 236. The plate 156 may rotate about plate hinge 236 (FIG. 39D). Providing an openable plate 156 may help facilitate emptying of cyclone chamber 124.

Figure 38C:
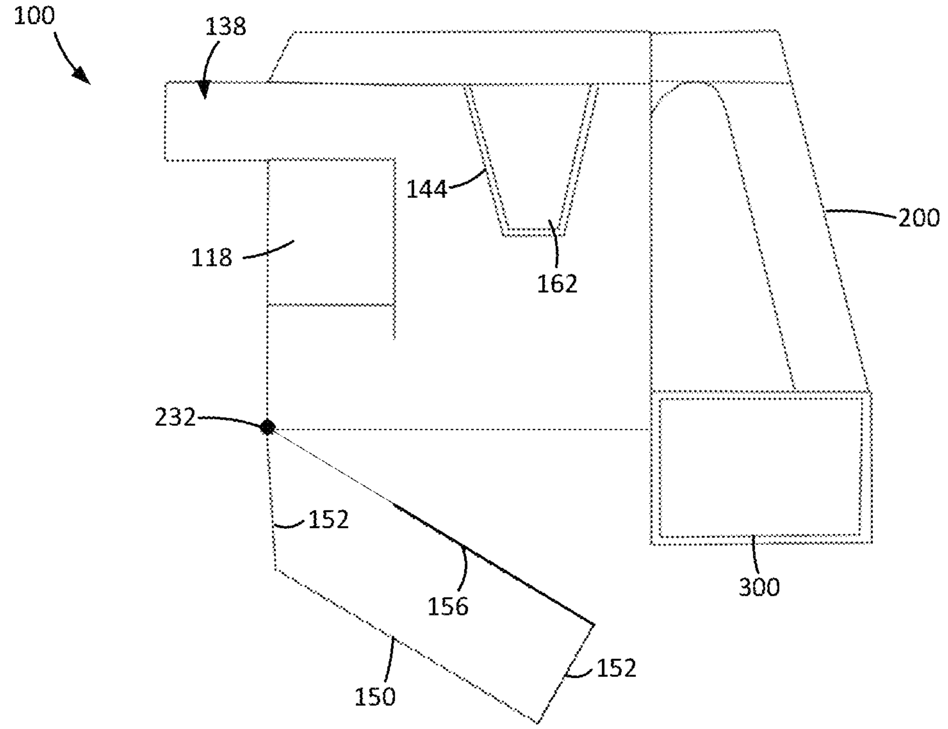
FIG. 38C is the hand vacuum cleaner of FIG. 38A with the openable portion in an open position and the openable door in a closed position.

Optionally, plate 156 may be openable with another portion of the surface cleaning apparatus, including, for example, dirt collection chamber 126, as exemplified in FIG. 39D. In the embodiment exemplified in FIG. 39D, plate 156 may be movable sequentially after bottom end wall 150 of dirt collection chamber 126, or concurrently therewith so that opening bottom end wall 150 simultaneously opens cyclone chamber 124 and dirt collection chamber 126. Alternately, the plate 156 may be fixed in position with respect to the openable portion, e.g., the lower wall as exemplified in FIG. 38C.

In some embodiments, the openable portion includes at least a portion of the finger guard 216. The openable portion may open using a rotational mount, such as a hinge. For example, the openable portion containing at least a portion of the finger guard 216 may rotate about finger guard hinge 240. The finger guard hinge 240 may be located towards the lower end of the finger guard 216, such that the openable portion opens upwardly. In the embodiment exemplified in FIG. 61B, the openable portion includes a forward portion of the finger guard 216, as well as the pre-motor filter 162. This embodiment may be used if, for example, an operating component such as a filter is located in the finger guard.

Figure 72B:
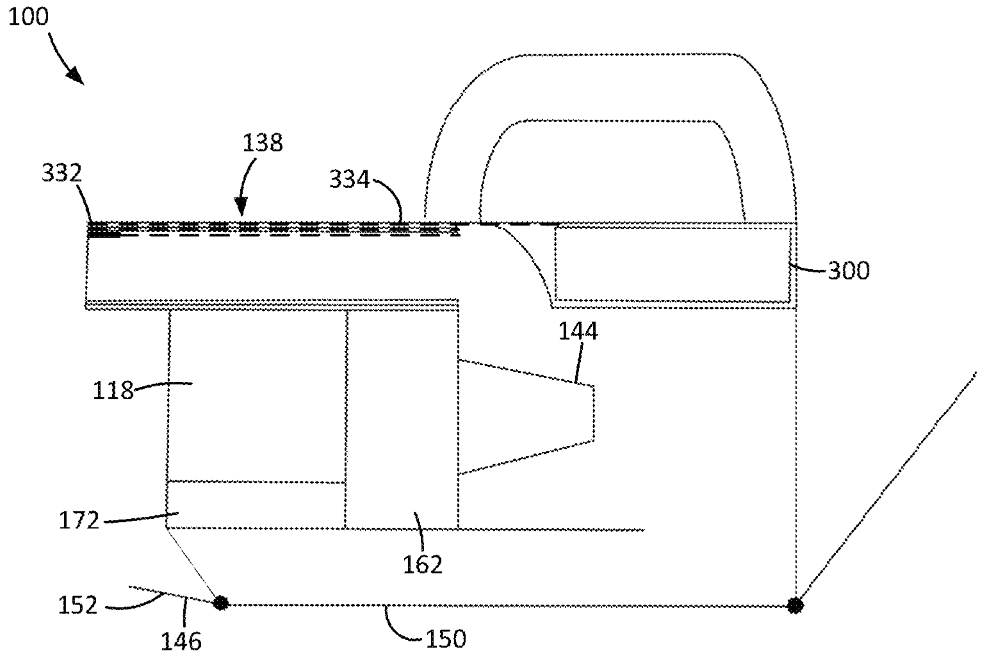
Figure 73A:
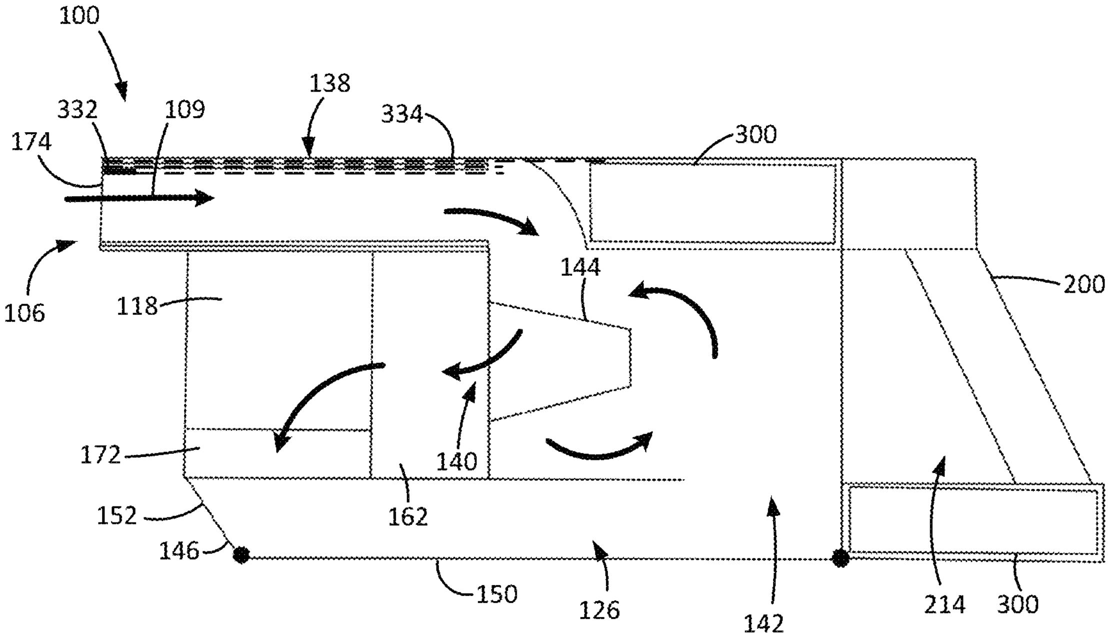
Figure 73B:
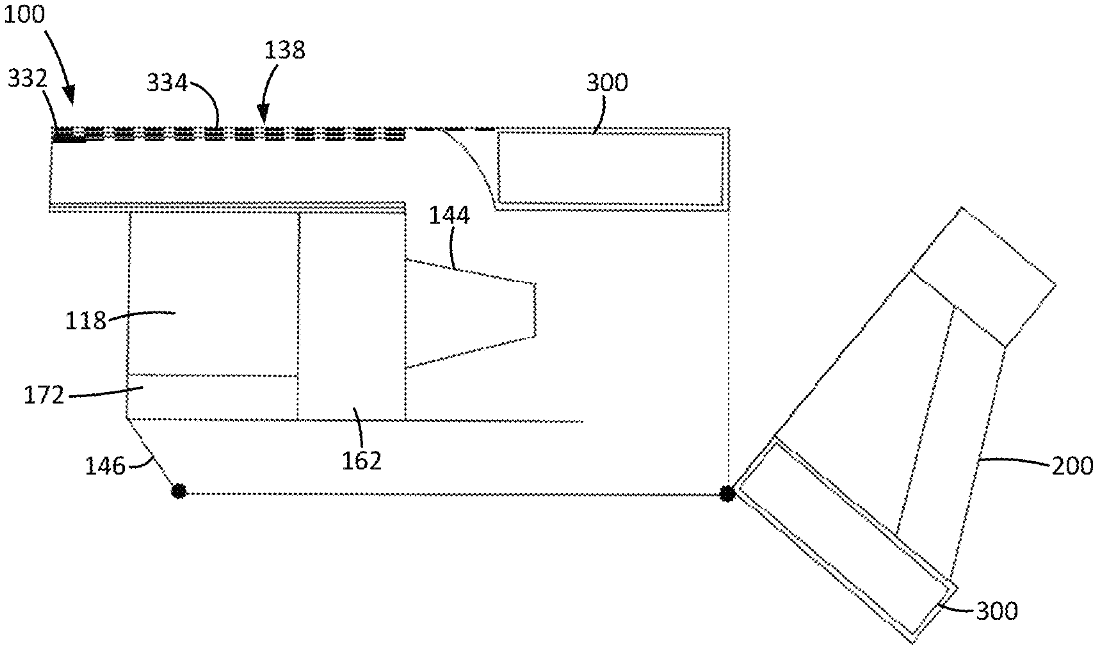
Figure 74A:
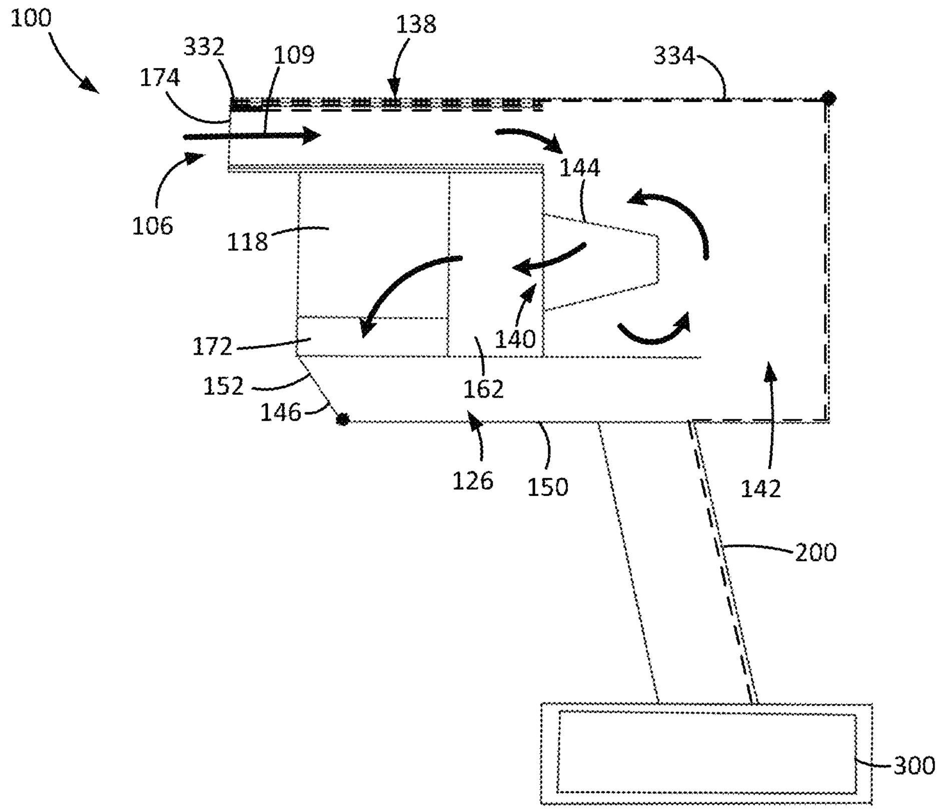
Figure 74B:
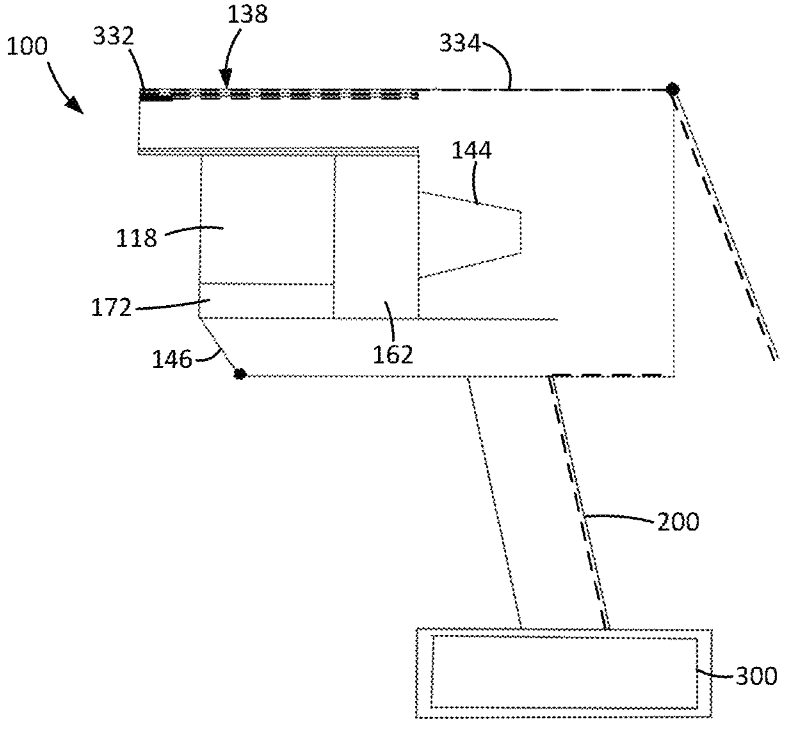
Figure 74C:
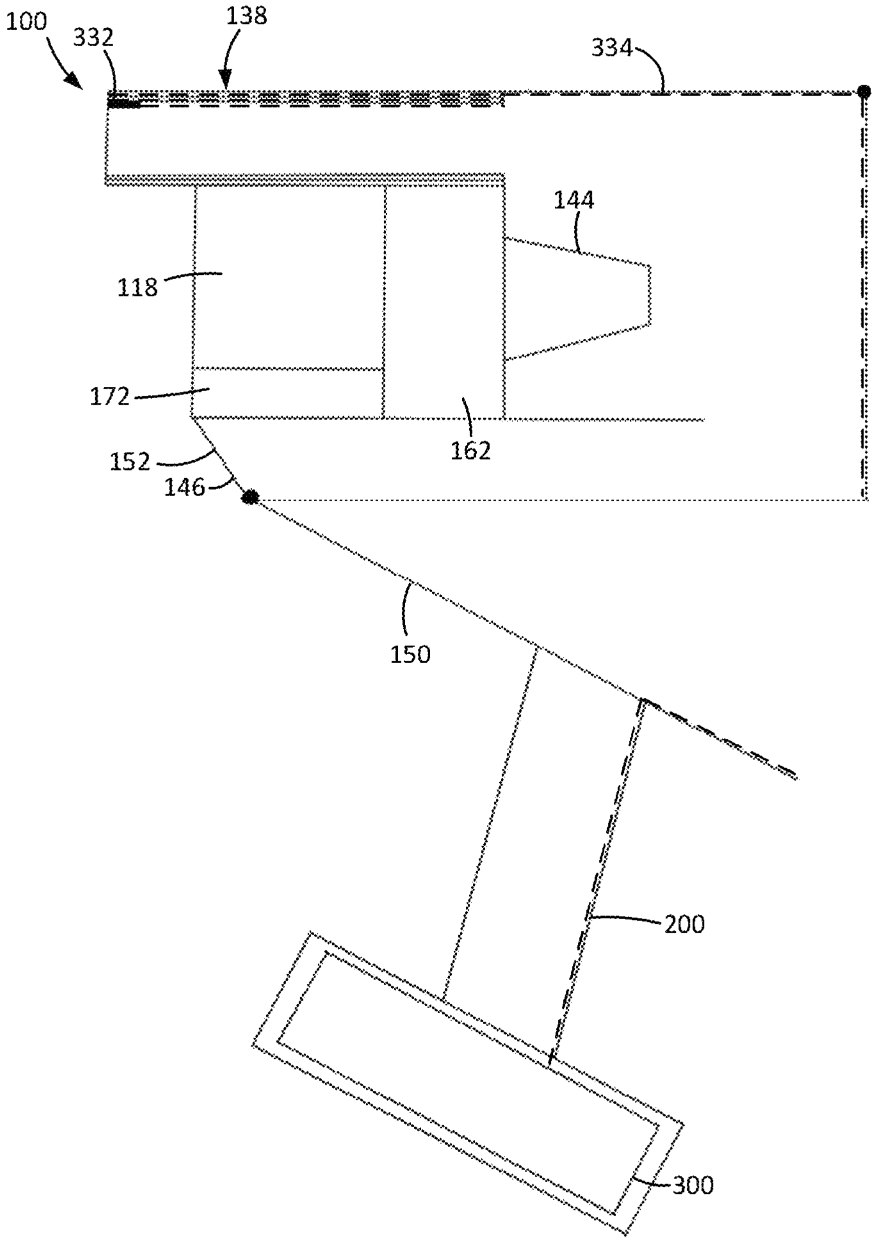
Figure 75:
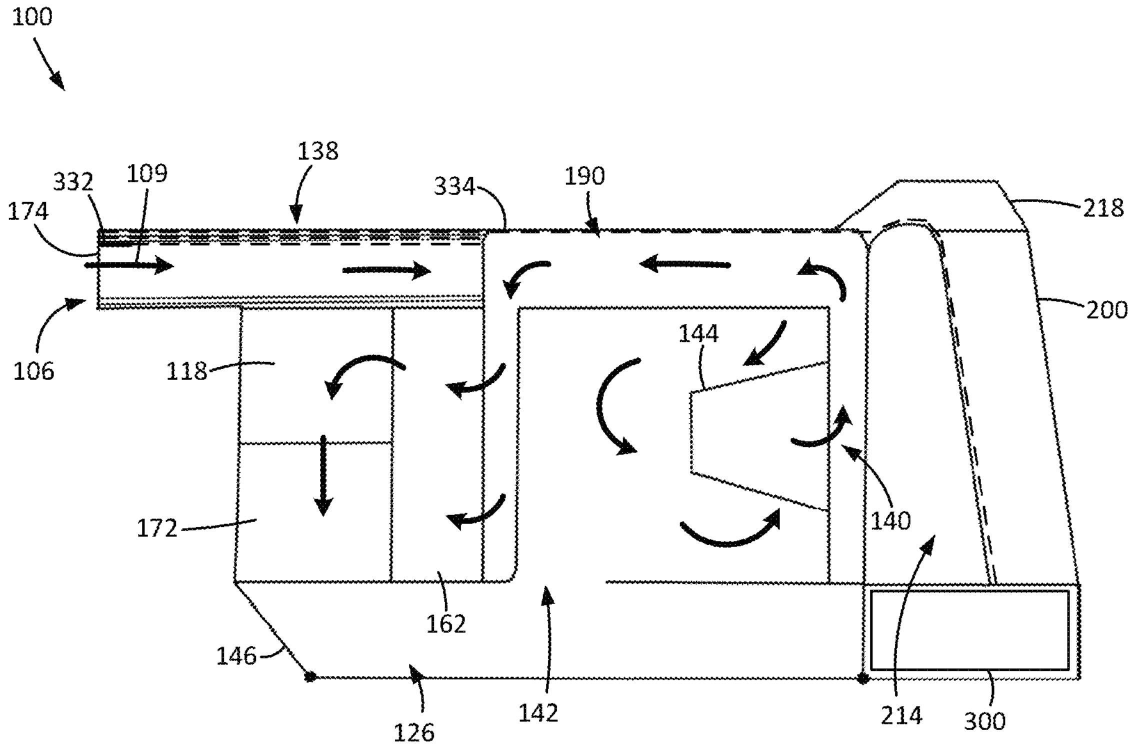

In some embodiments, the openable portion may include the entire finger guard 216, as exemplified in FIG. 72B. In FIG. 72B, the finger guard hinge 240 is located toward the lower end of the second handle end 206, such that the openable portion opens upwardly. The openable portion includes the finger guard 216, the pre-motor filter 162, and a forward portion of the second handle end 206. It will be appreciated that finger guard hinge 240 may be located at or towards an upper end of the finger guard.

Figure 56F:
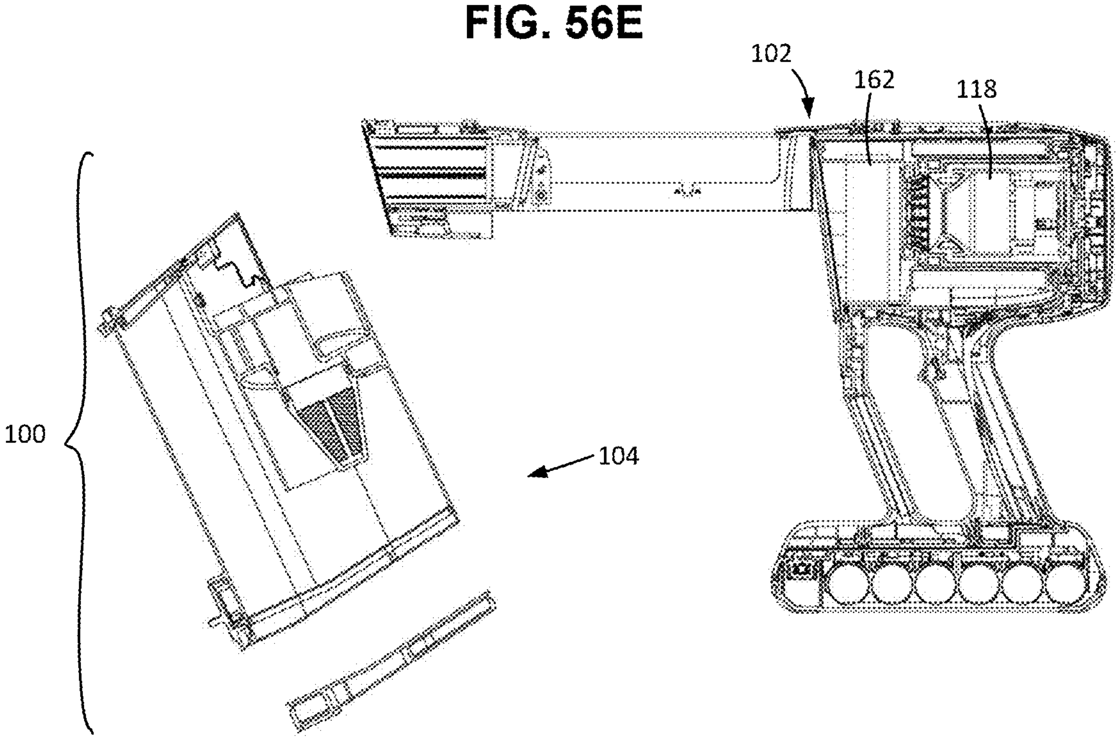
FIG. 56F is a side cross-sectional view of the hand vacuum cleaner of FIG. 56A taken along the line B-B in FIG. 56A with the removable portion removed.
Figure 57A:
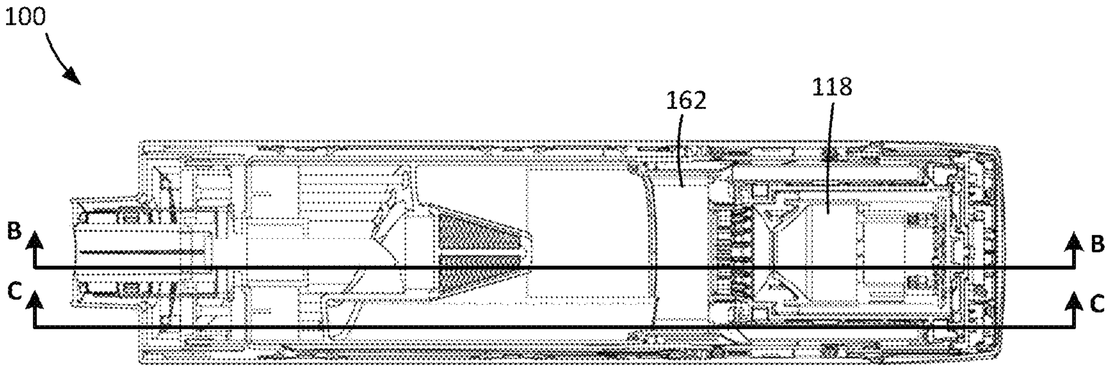
FIG. 57A is a top cross-sectional view of a hand vacuum cleaner with an openable door in a closed position and a removable portion in an attached position.
Figure 57B:
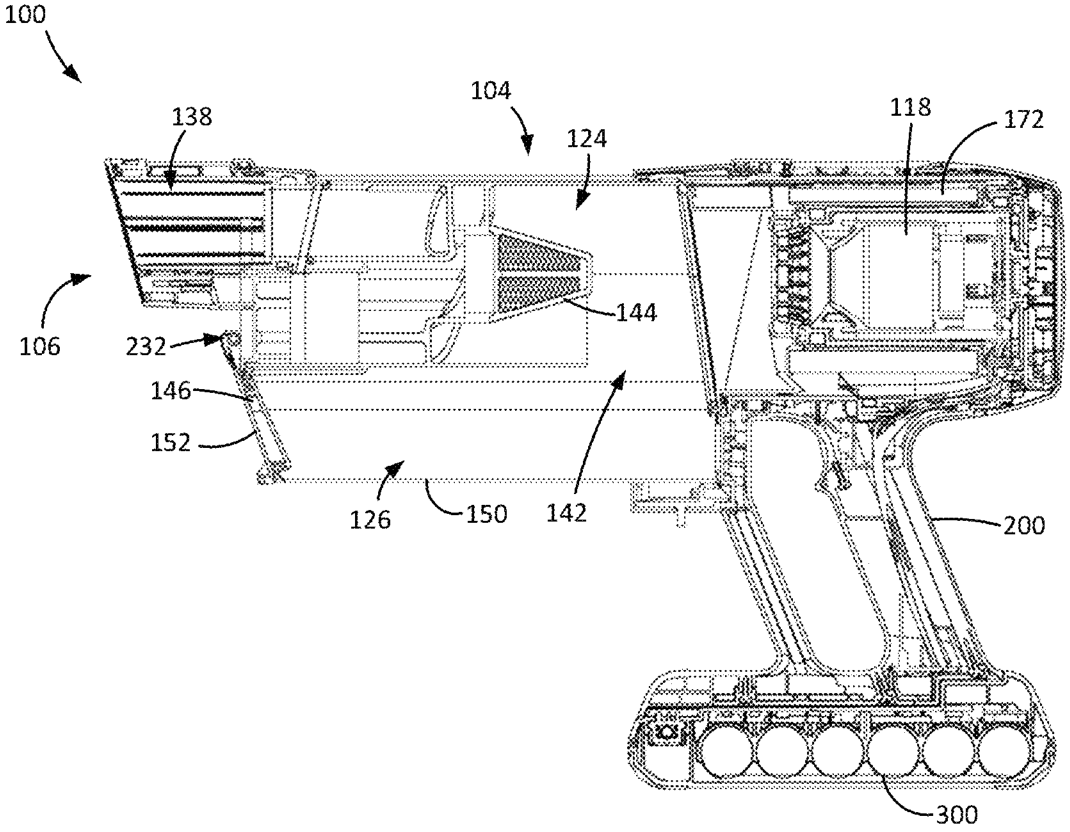
FIG. 57B is a side cross-sectional view of the hand vacuum cleaner of FIG. 57A taken along the line B-B in FIG. 57A.
Figure 57C:
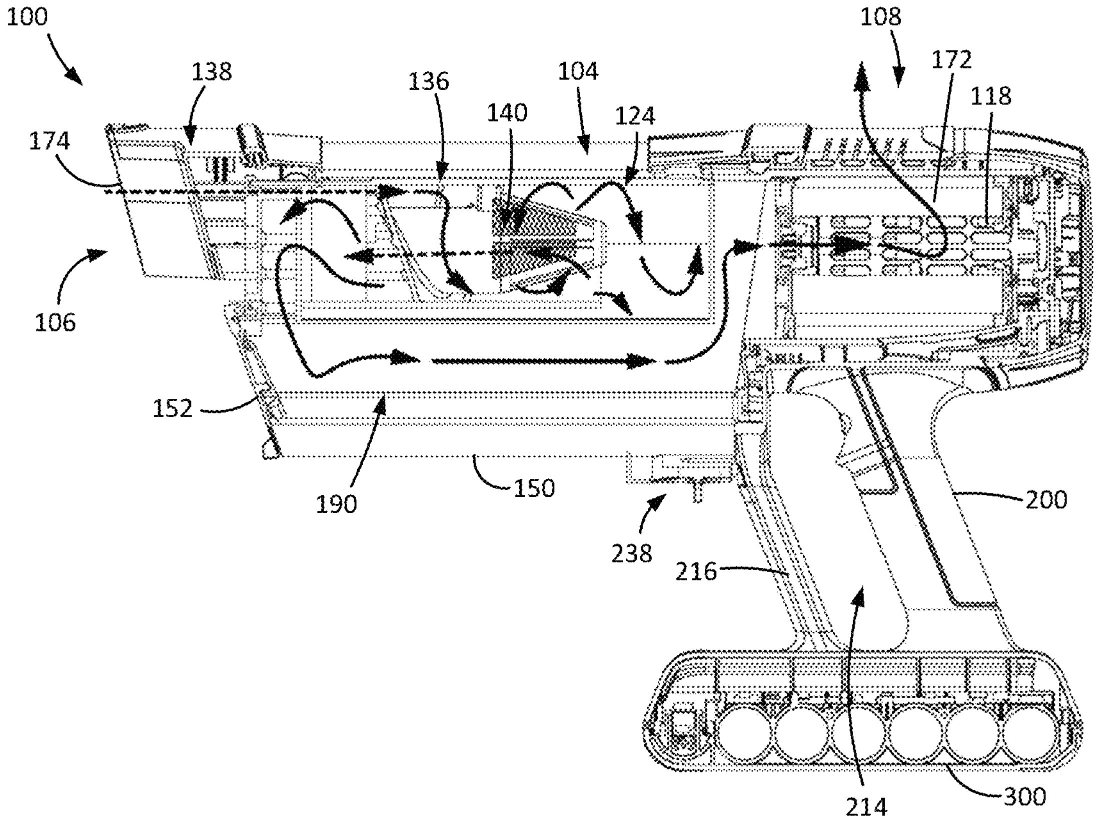
FIG. 57C is a side cross-sectional view of the hand vacuum cleaner of FIG. 57A taken along the line C-C in FIG. 57A.
Figure 57D:
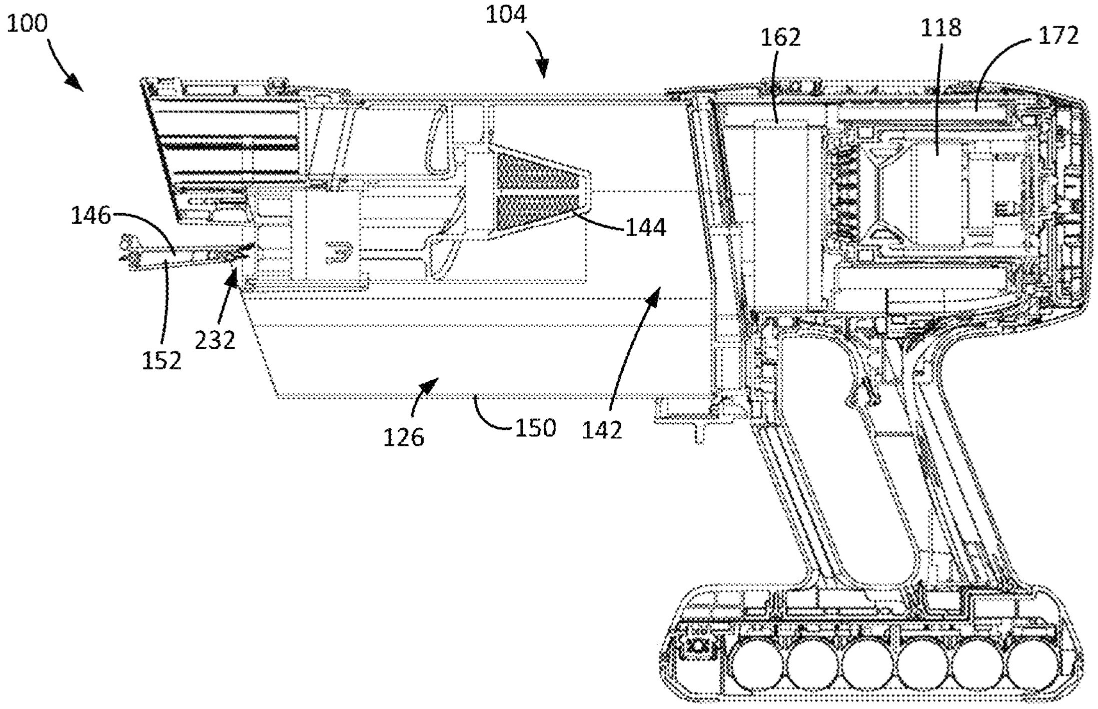
FIG. 57D is a side cross-sectional view of the hand vacuum cleaner of FIG. 57A taken along the line B-B in FIG. 57A with the openable door in an open position.
Figure 57E:
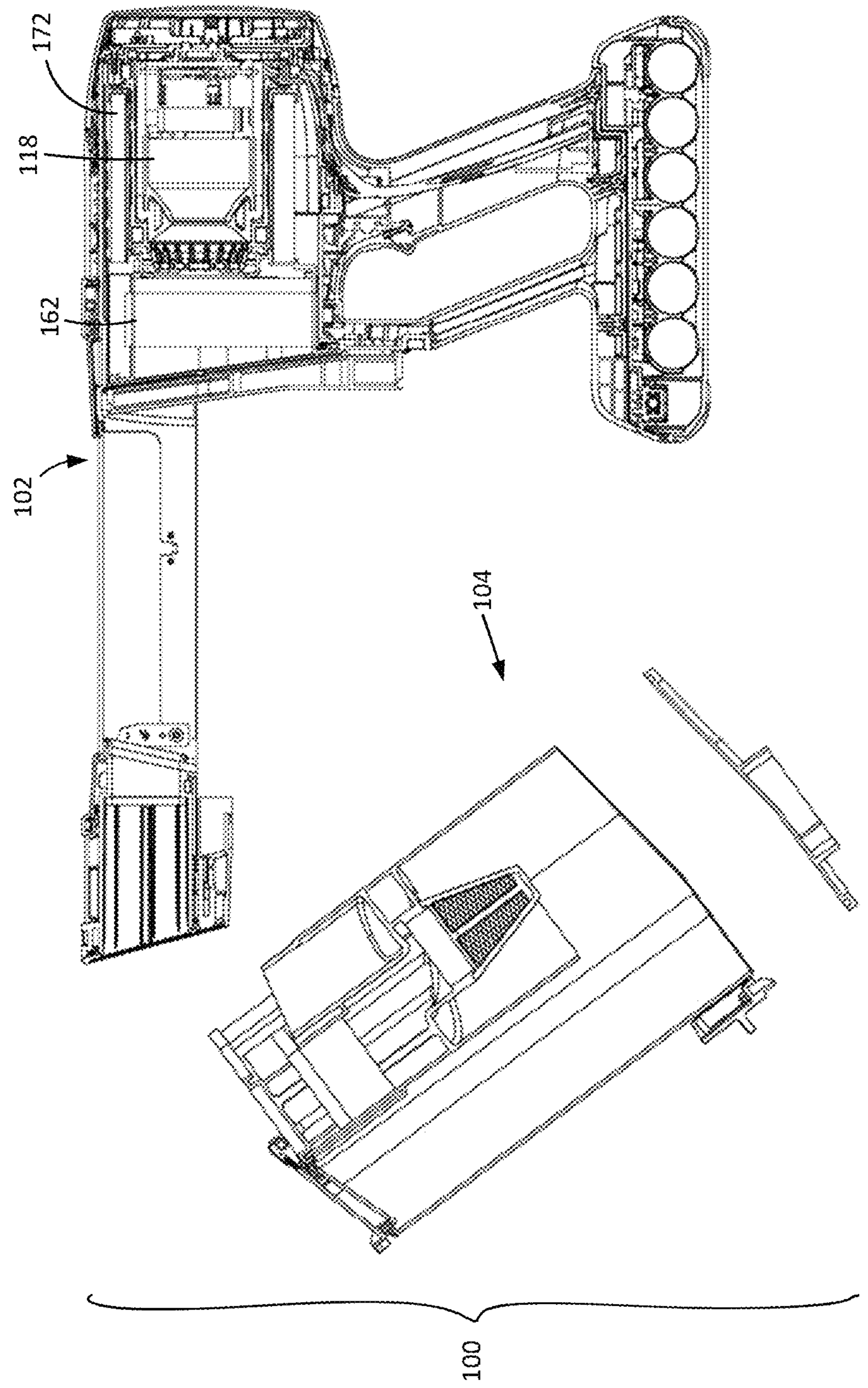
FIG. 57E is a side cross-sectional view of the hand vacuum cleaner of FIG. 57A taken along the line B-B in FIG. 57A with the removable portion removed.
Figure 58A:
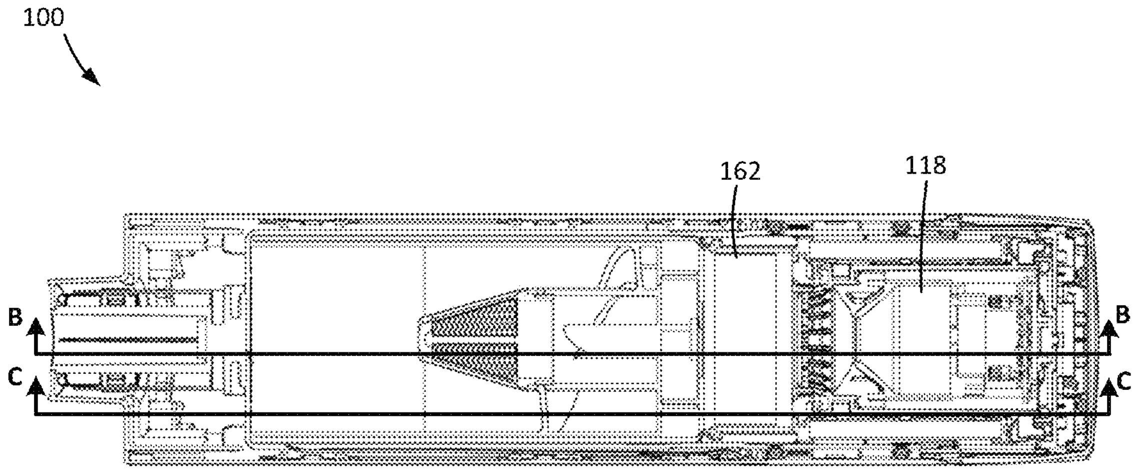
FIG. 58A is a top cross-sectional view of a hand vacuum cleaner.
Figure 58B:
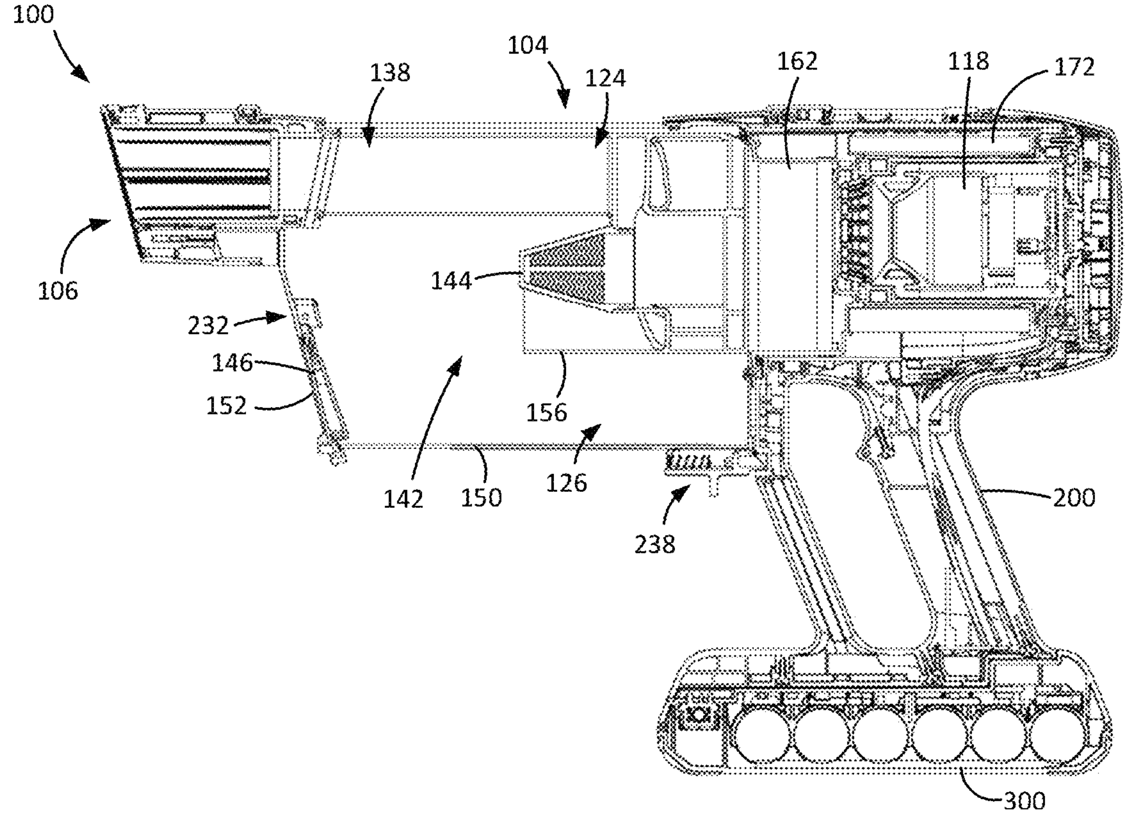
FIG. 58B is a side cross-sectional view of the hand vacuum cleaner of FIG. 58A taken along the line B-B in FIG. 58A.
Figure 58C:
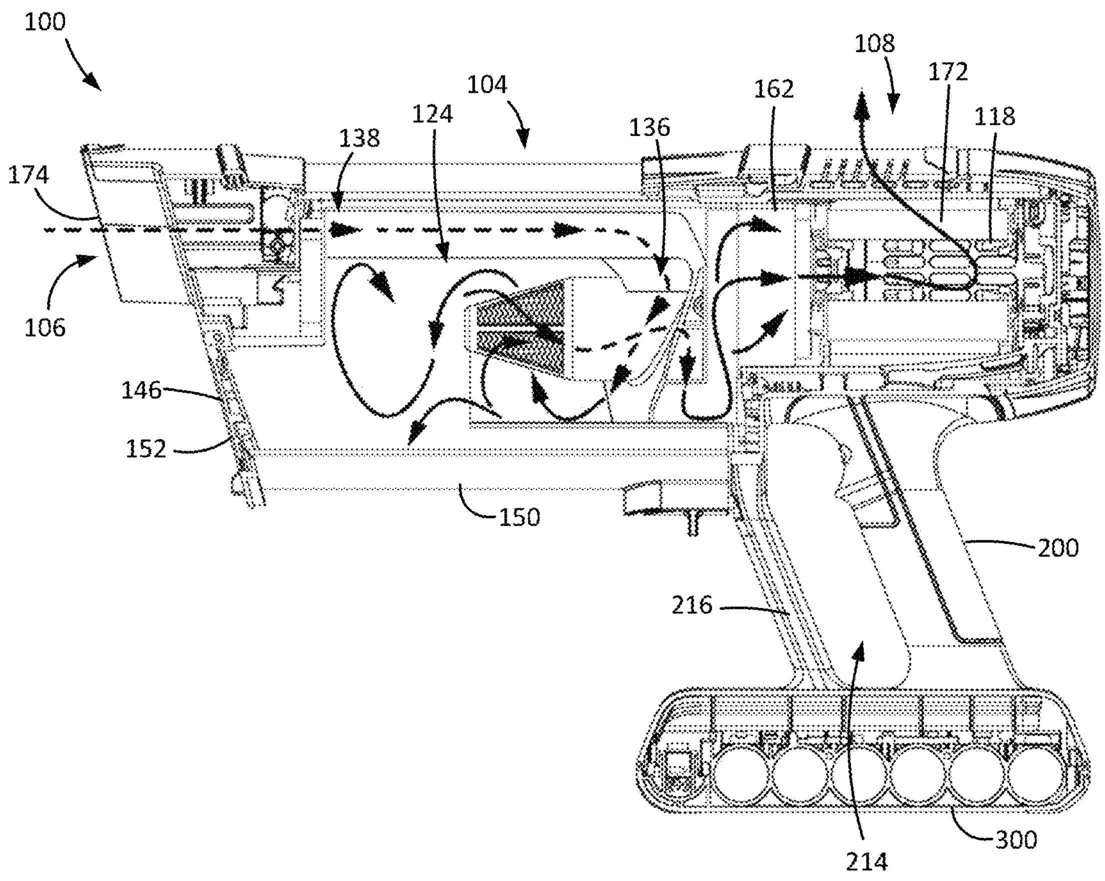
FIG. 58C is a side cross-sectional view of the hand vacuum cleaner of FIG. 58A taken along the line C-C in FIG. 58A.
Figure 62:
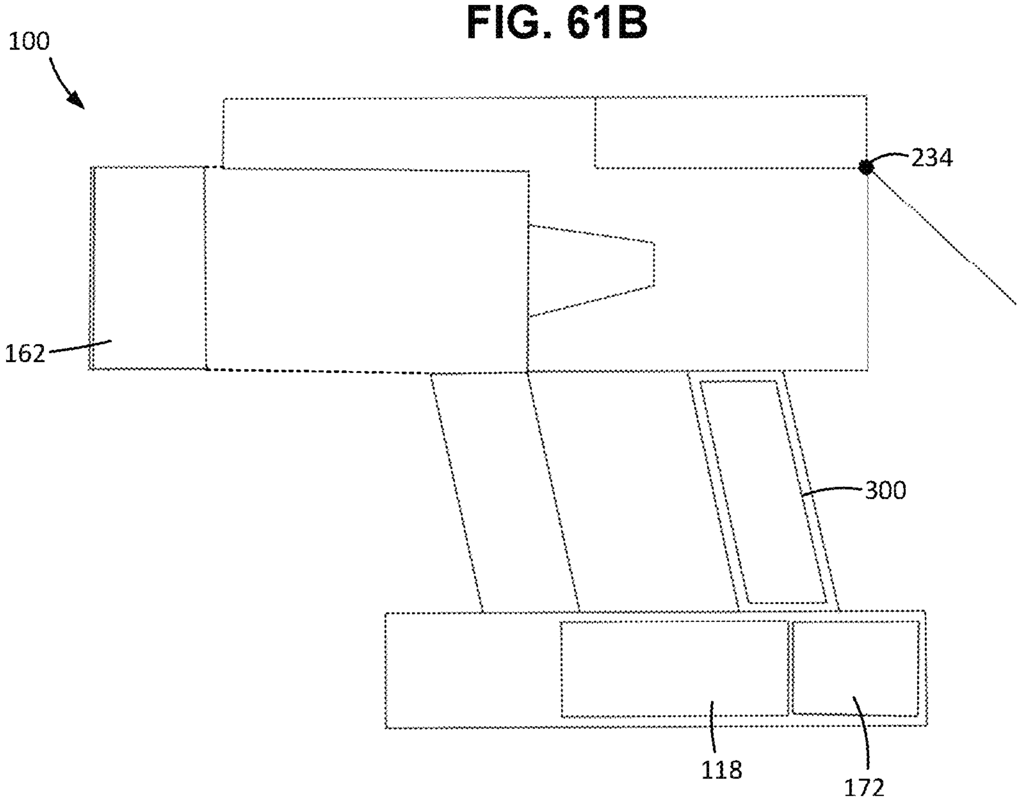
FIG. 62 is a side cross-sectional view of a hand vacuum cleaner with an openable portion in an open position and a removable filter in a removed position.
Figure 63A:
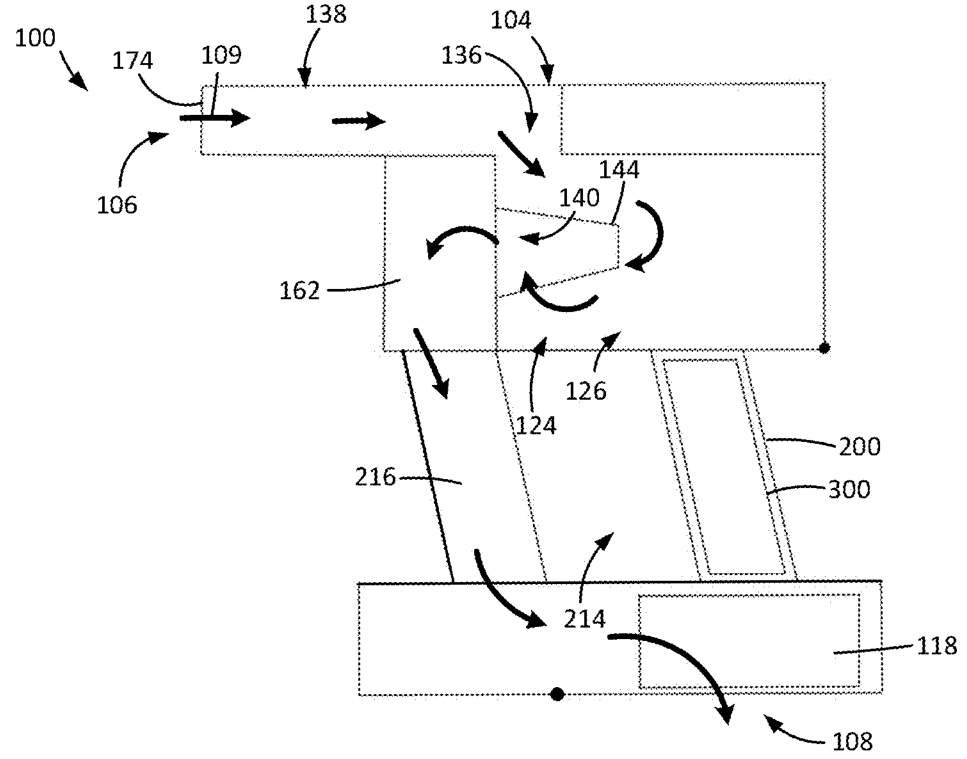
FIG. 63A is a side cross-sectional view of a hand vacuum cleaner with an openable portion and a rotatable finger guard in closed positions.
Figure 63B:
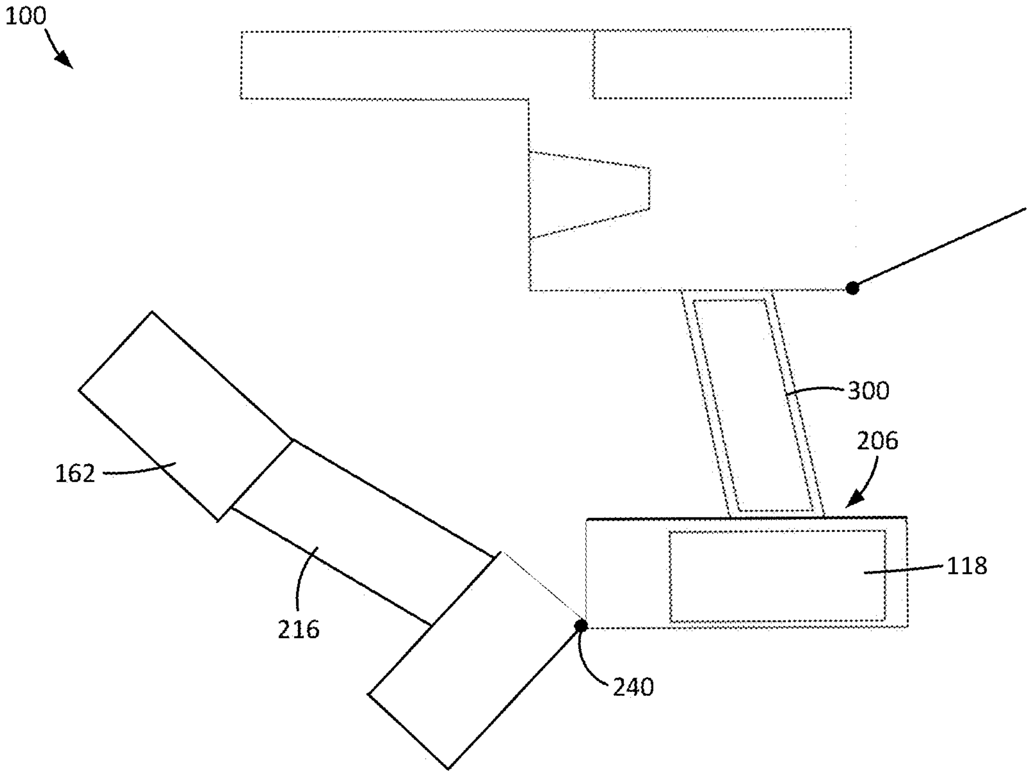
FIG. 63B is a side cross-sectional view of the hand vacuum cleaner of FIG. 63A with the openable portion and rotatable finger guard in open positions.

In some embodiments, portions of the surface cleaning apparatus 100 may be removable. For example, in the illustrated embodiment of FIG. 62, the pre-motor filter 162 is removable (e.g., forwardly as shown in FIG. 62). In the illustrated embodiment of FIG. 56F, the air treatment assembly 104 is removable from main body 102. The removable portion may be held in place by, e.g., a latch 238 (see, e.g., FIG. 57C). The latch 238 may be released by a user, which allows for the removable portion of the surface cleaning apparatus 100 to be removed.

Tangential Inlet with Ramp

A surface cleaning apparatus, such as a hand vacuum cleaner 100 may include an air treatment chamber wherein the air outlet comprises an internal conduit that extends through the air treatment chamber and the pre-air treatment passage 188 is configured to direct air into the air treatment chamber at a location below part or all of the internal conduit. This aspect as disclosed herein may be used by itself or in combination with one or more of the handle, the position of the energy storage member packs, the air flow path, the position of the dirt collection area, the openable or removable portion, the air treatment assembly, the position of the suction motor, the position of a pre-motor filter, the position of a post-motor filter, a telescoping inlet and a corner screen as disclosed herein.

In accordance with this aspect, the air treatment chamber may be a cyclone chamber and the cyclone chamber air outlet may comprise an internal conduit that extends through the cyclone chamber in a direction generally transverse to the cyclone axis. An advantage of such a design is that the height of the air treatment assembly, in the direction of the cyclone axis, may be reduced as the air outlet need not extend through an end wall. Accordingly, in a hand vacuum cleaner wherein the cyclone axis is generally transverse to the axis 117, the height of the hand vacuum cleaner in the direction of the cyclone axis may be reduced since the post-air treatment passage may include an internal conduit that is located in the cyclone chamber and not above the cyclone chamber. However, if the pre-air treatment passage 188 extends rearwardly from the dirty air inlet at an upper end of the cyclone chamber, e.g., an elevation of the internal conduit, then the outlet of a tangential air inlet may be at the elevation of the internal conduit. Some or all of the air exiting the tangential air inlet may impact the internal conduit thereby partially or fully interrupting the formation of a swirling or cyclonic flow in the chamber. Accordingly, part or all of the pre-air treatment passage 188 may include a portion (a ramp portion) that extends, e.g., rearwardly and downwardly to the cyclone chamber such that some or all of the air, when is rotates in the chamber, does not impact the internal conduit. It will be appreciated that the outlet port of the tangential air inlet may be at an elevation that is below part or all of the internal conduit. Alternately, as the air may rotate in the chamber prior to travelling to the side of the chamber having the internal conduit and, due to such rotation, the air travels downwardly, the outlet port of the tangential air inlet may be at an elevation such that when the air travels to the side of the chamber having the internal conduit, part or all of the air is at an elevation below part or all of the internal conduit.

It will be appreciated that if the air outlet is at a lower end of the chamber, then the pre-air treatment passage 188 may be configured such that the outlet port of the tangential air inlet may be at an elevation such that when the air travels to the side of the chamber having the internal conduit, part or all of the air is at an elevation above part or all of the internal conduit.

It will be appreciated that the ramp portion may be part or all of the pre-air treatment passage 188 and optionally, the ramp portion may be less than 50%, 40% or 30% of the length of the pre-air treatment passage 188.

For example, as exemplified in FIGS. 49B and 87D, the cyclone air inlet 136 comprises an outlet port that is in a side wall of the cyclone chamber. The dirty air inlet 106 comprises an inlet port. A rearward projection of the inlet port of the dirty air inlet 106 intersects the cyclone air outlet 140 (e.g., FIGS. 49B and 87D). Further, the cyclone air outlet 140 comprises a downstream cyclone air outlet portion (internal conduit) 158 that extends generally rearwardly at the upper end of the cyclone chamber. Accordingly, if the outlet port of the tangential air inlet were at the elevation of internal conduit 158, then at least a portion of the incoming air would contact the internal conduit 158, which would interfere with the cyclonic flow in the cyclone chamber.

In accordance with this aspect, the end, e.g., outlet port, of the cyclone air inlet 136 is located partially or fully be located below the downstream cyclone air outlet portion 158. In other words, the pre-air treatment passage 188 comprises or consists of a ramp portion that extends downwardly towards the cyclone chamber 124. The rearward projection of the inlet port may intersect both the vortex finder 144 and the downstream cyclone air outlet portion 158. The rearward projection of the inlet port may also intersect the pre-motor filter 162, the motor and fan assembly 118, and/or post-motor filter 172. However, due to the ramp portion, air may exit the tangential air inlet at an elevation such that it substantially or fully does not contact the internal conduit.

The portion of the air flow path 109 which extends from the dirty air inlet 106 to the cyclone air inlet 136 may be referred to as an inlet segment of the air flow path 109. In accordance with this aspect, at least a portion of the inlet segment may extend downwardly, e.g., downwardly and rearwardly. In some embodiments, at least a portion of the inlet segment may extend laterally (see for example FIGS. 49D and 87H), e.g., concurrently laterally and also downwardly and rearwardly. The transition of the pre-air treatment passage 188 from extending generally axially to downwardly and rearwardly may be gradual. For example, the juncture of the inlet end of the ramp portion and the portion of the pre-air treatment passage 188 upstream thereof may be curved. Alternately, or in addition, the juncture of the air treatment chamber air inlet and the downstream end of the ramp portion may be curved.

It will be appreciated that the cyclone air inlet 136 may be a tangential air inlet. As discussed previously, the tangential air inlet 136, or at least the outlet port thereof, may be provided at an elevation below the downstream cyclone air outlet portion 158. As such, at least a portion of the inlet segment may extend downwardly and rearwardly to the tangential air inlet 136.

Accordingly, the inlet segment may have an upstream portion (i.e., a portion towards dirty air inlet 106) and a downstream portion (i.e., a portion towards cyclone air inlet 136). The upstream portion may have a conduit axis that extends in a common direction to the hand vacuum cleaner axis 117. The downstream portion of the inlet segment may extend downwardly and rearwardly to the tangential air inlet 136. The internal conduit may extend rearwardly from an outlet (upper) end of the vortex finder 144 (i.e., cyclone air outlet 140), and at least a portion of the downstream cyclone air outlet portion 158 may be positioned below the upper end of the cyclone chamber 124.

Alternately, as exemplified in FIG. 49C, the pre-air treatment passage 188 may extend linearly rearwardly to the cyclone air inlet 136. The cyclone air inlet may extend downwardly such that at least the outlet port of the cyclone air inlet 136 may be provided at an elevation below part or all of the downstream cyclone air outlet portion 158.

Figure 49D:
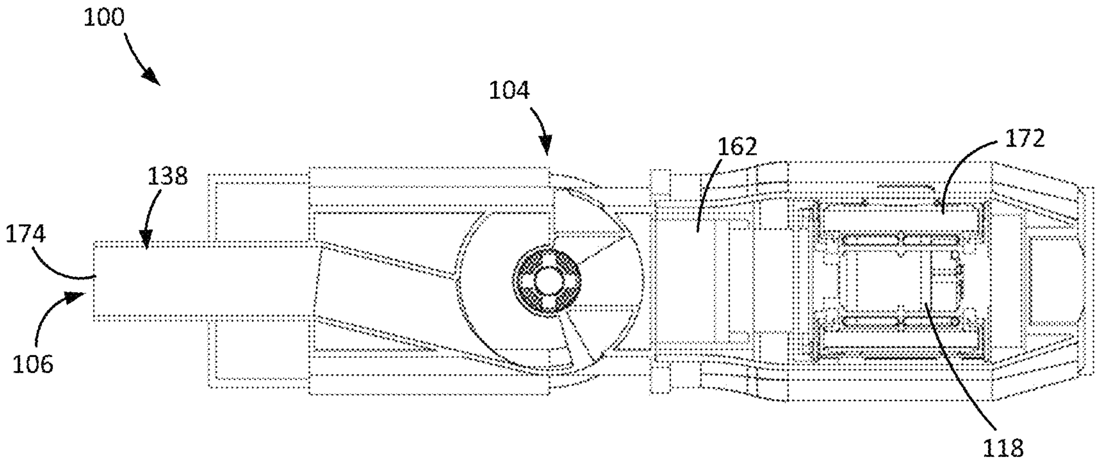
FIG. 49D is a top cross-sectional view of the hand vacuum cleaner of FIG. 49A.
Figure 49E:
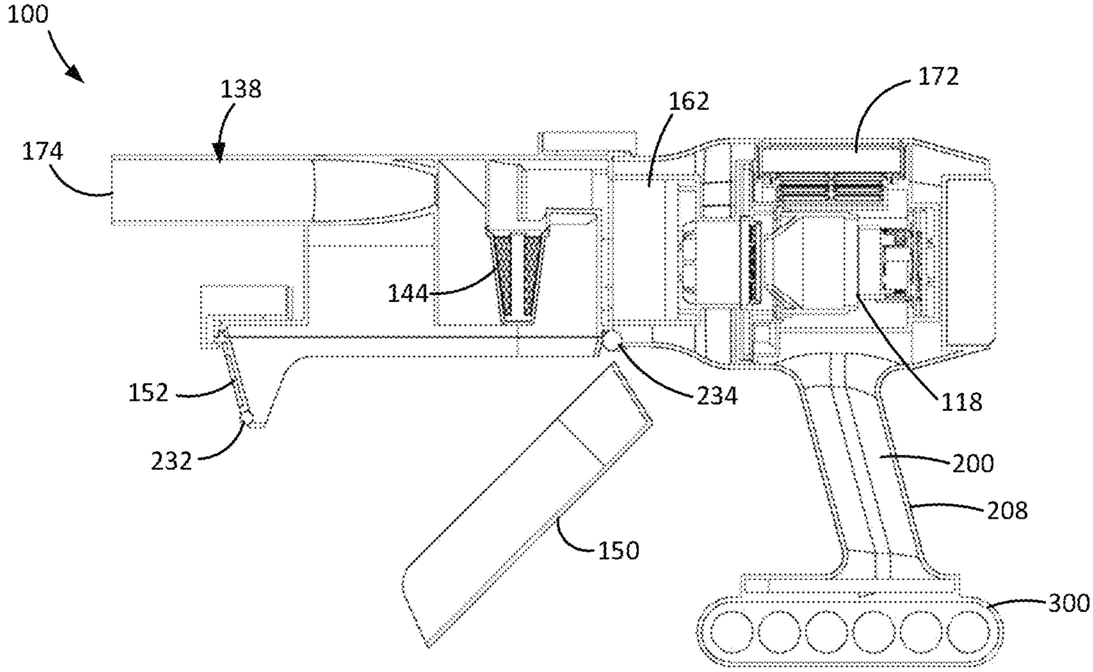
FIG. 49E is a side cross-sectional view of the hand vacuum cleaner of FIG. 49A with an openable portion in an open position.
Figure 50A:
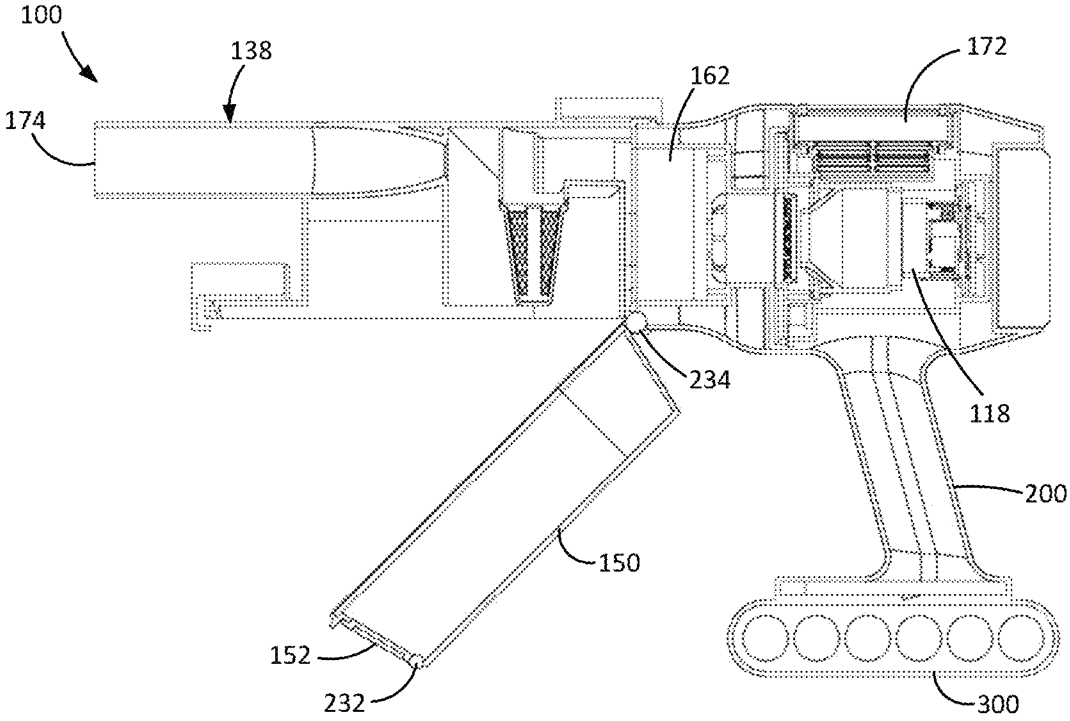
FIG. 50A is a right side cross-sectional view of a hand vacuum cleaner with an openable door in a closed position and an openable portion in an open position.
Figure 50B:
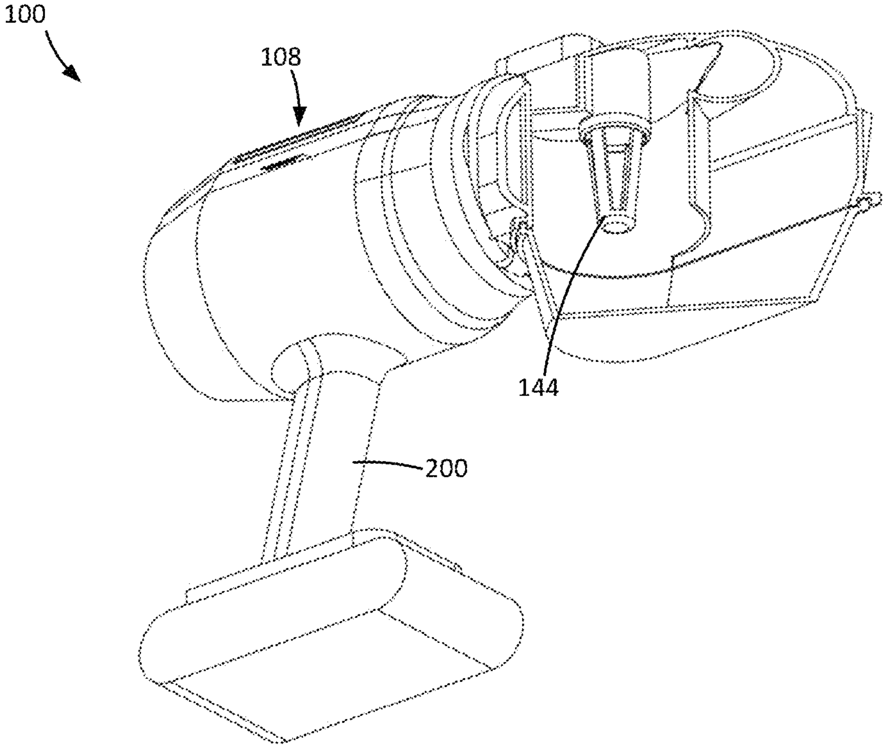
FIG. 50B is left side cutaway perspective view of the hand vacuum cleaner of FIG. 50A.
Figure 50C:
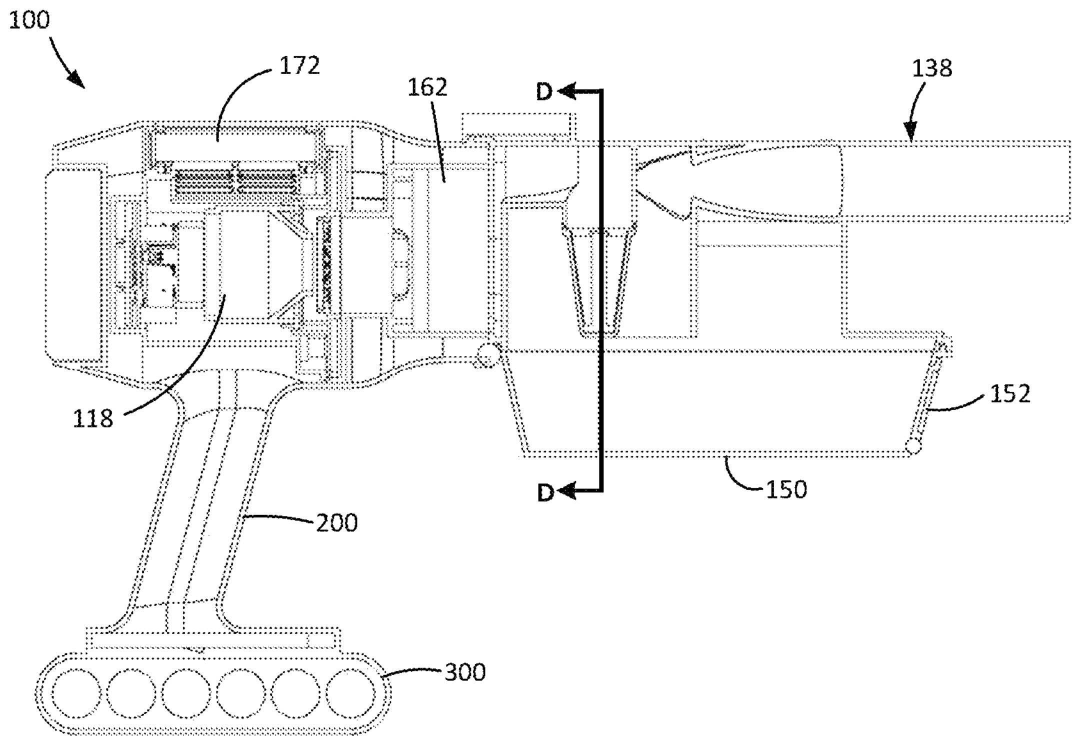
FIG. 50C is a left side cross-sectional view of the hand vacuum cleaner of FIG. 50A.
Figure 50D:
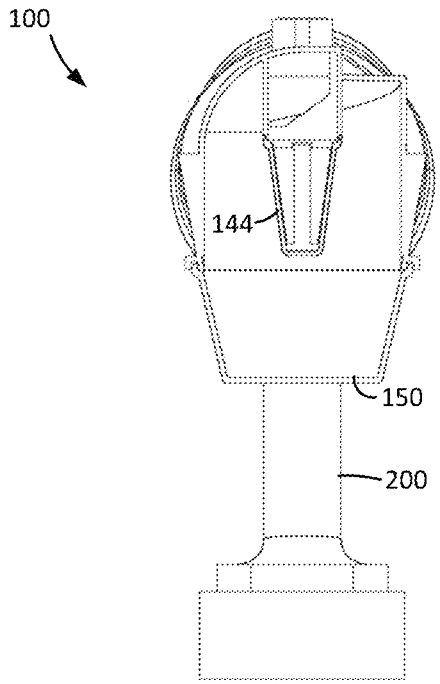
FIG. 50D is a vertical cross-sectional of the hand vacuum cleaner of FIG. 50A taken along the line D-D in FIG. 50C.
Figure 50E:
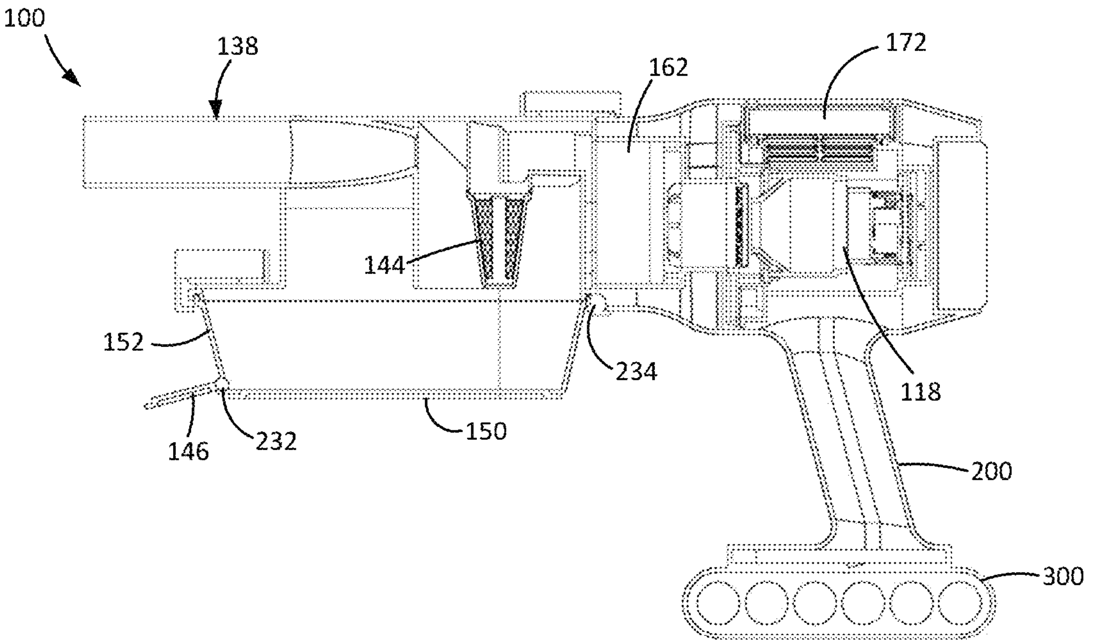
FIG. 50E is a left side cross-sectional view of the hand vacuum cleaner of FIG. 50A with the openable door in an open position.
Figure 50F:
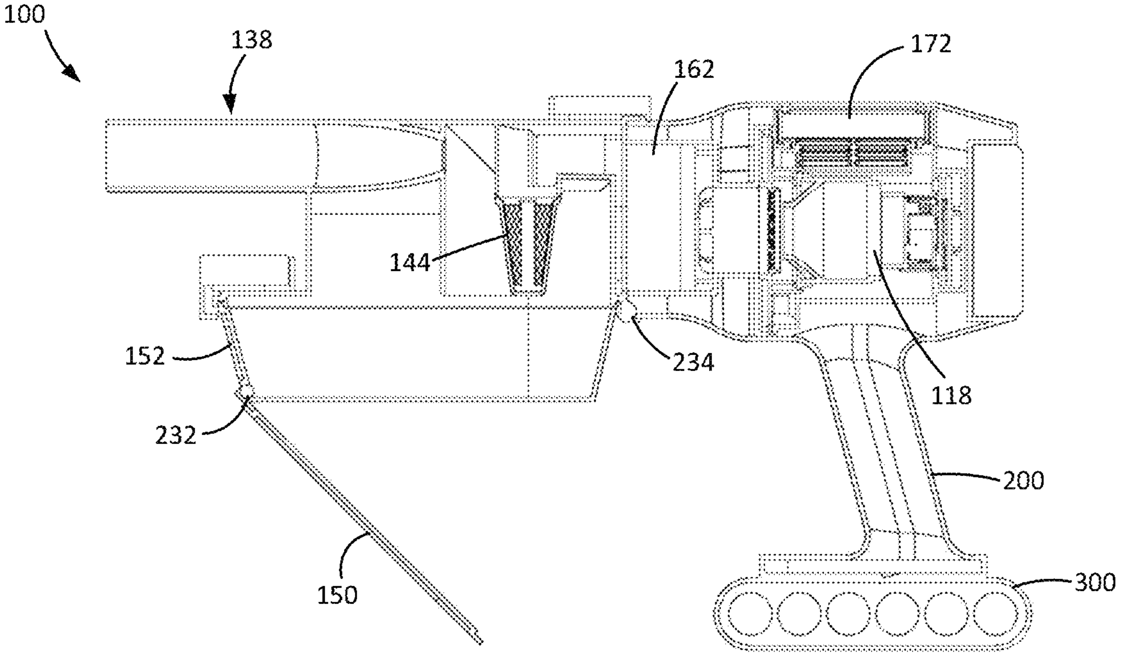
FIG. 50F is a side cross-sectional view of the hand vacuum cleaner of FIG. 50A with an alternate openable portion in an open position.

It will be appreciated that the downstream cyclone air outlet portion 158 may be centrally located between opposed lateral sides of the hand vacuum cleaner 100 as exemplified in FIG. 49D and the downstream cyclone air outlet portion 158 may extend axially rearwardly. Alternately, the downstream cyclone air outlet portion 158 may be located laterally off center and/or extend rearwardly and laterally.

As exemplified in FIG. 49C, the cyclone axis 134 extends in a vertical plane, the vertical plane intersects the dirty air inlet 106, the vortex finder 144 and the downstream portion of the inlet segment. In some embodiments, the plane may additionally intersect the cyclone air inlet 136. In other embodiments, the vertical plane may intersect the dirty air inlet 106, the vortex finder 144 and the cyclone air inlet 136.

Figure 51B:
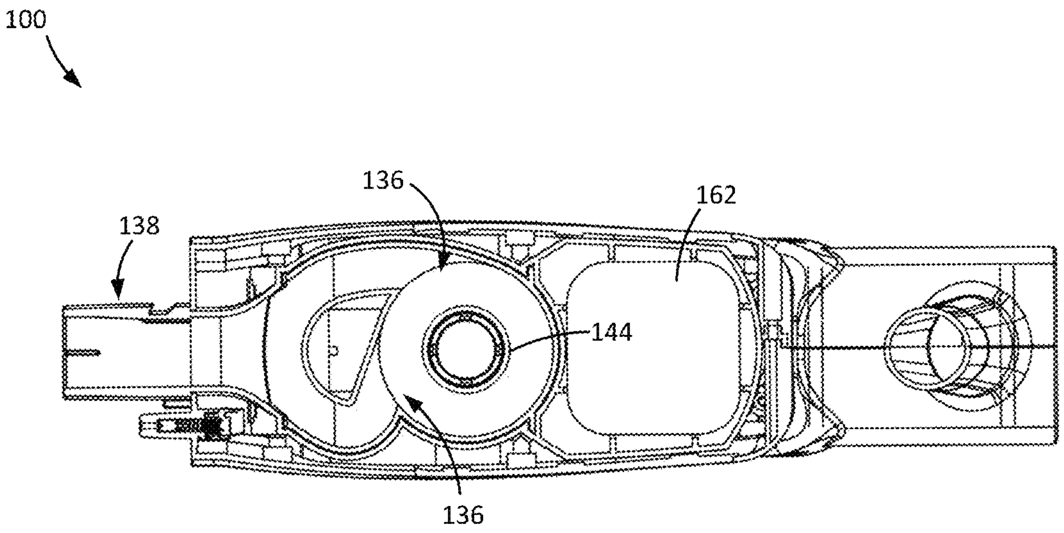
FIG. 51B is a top view of the hand vacuum cleaner of FIG. 51A.
Figure 52A:
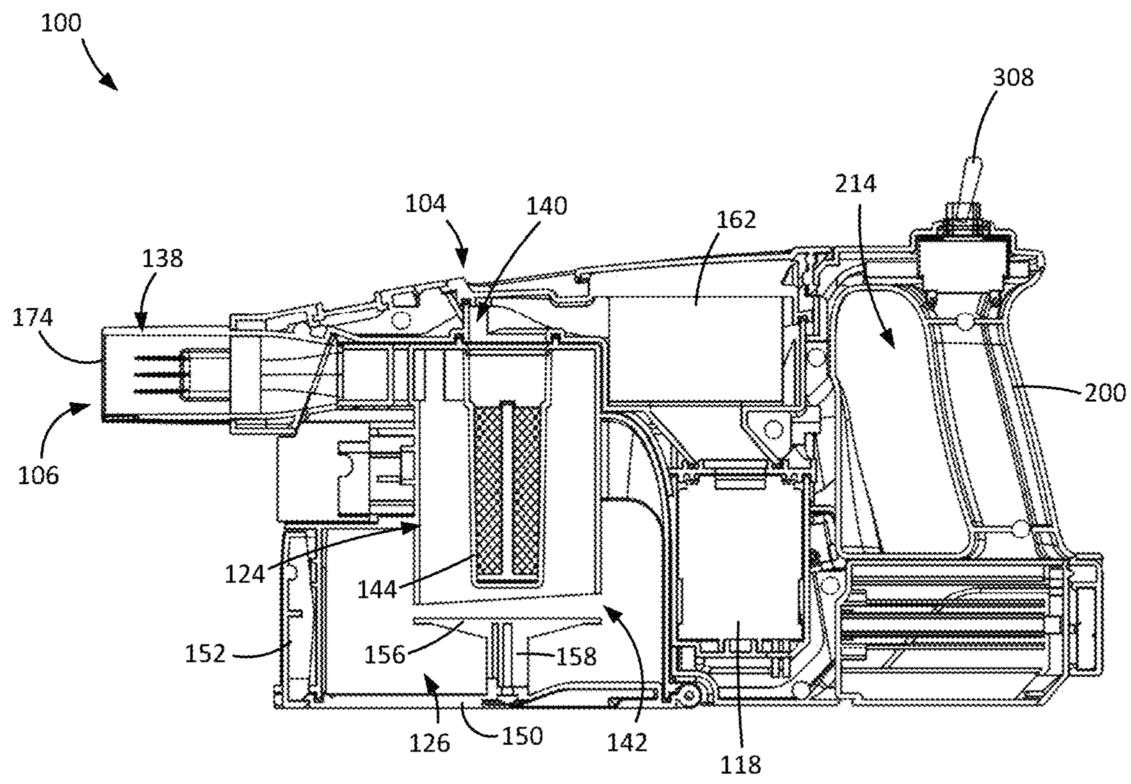
FIG. 52A is a side cross-sectional view of a hand vacuum cleaner with a dirt collection chamber in front of the cyclone chamber.
Figure 52B:
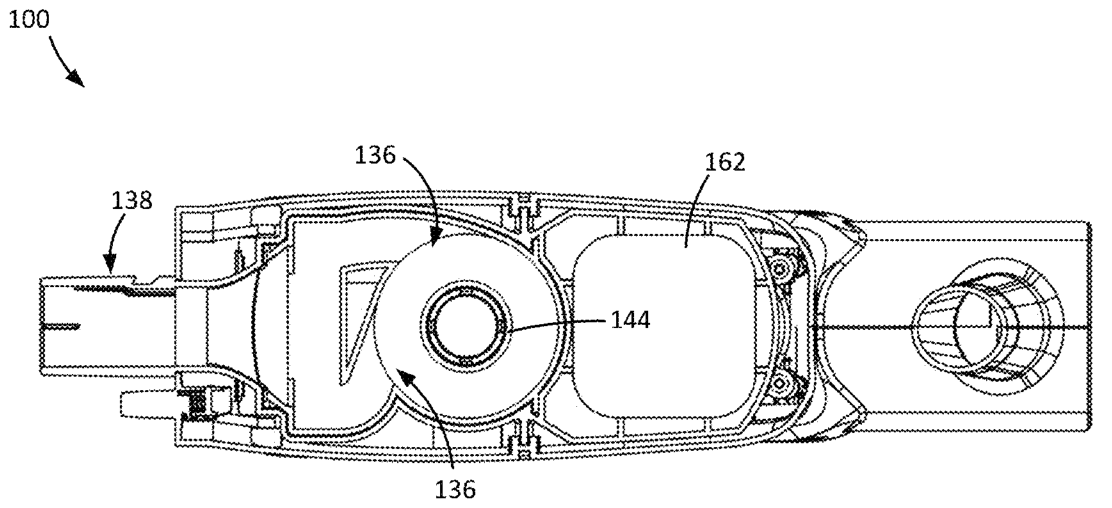
FIG. 52B is a top view of the hand vacuum cleaner of FIG. 52A.

It will be appreciated that the air treatment chamber may have a plurality of air inlets. Accordingly, the cyclone air inlet 136 may comprise a first and second tangential inlets. Each inlet may be at the same elevation. See for example FIGS. 51B and 52B. Alternately, an upper end of the second tangential inlet may be below a lower end of the first tangential inlet. A first portion of the inlet segment of the air flow path 109 may extend downwardly and rearwardly to the first tangential inlet. A second portion of the inlet segment may extend downwardly and rearwardly to the second tangential inlet. The second portion may extend downwardly at a greater angle than the first portion.

Air Treatment Assembly

The air treatment assembly disclosed herein may be used by itself or in combination with one or more of the handle, the position of the energy storage member packs, the air flow path, the position of the dirt collection area, the openable or removable portion, the tangential inlet with ramp, the position of the suction motor, the position of a pre-motor filter, the position of a post-motor filter, a telescoping inlet and a corner screen as disclosed herein.

As discussed herein, air treatment assembly 104 may comprise one or more cyclonic stages. For example, air treatment assembly 104 may comprise two cyclonic stages (e.g., a first cyclonic stage comprising or consisting of a first stage cyclone 124 and a second cyclonic stage comprising or consisting of a second stage cyclone 154). Each stage may comprise one or more cyclones in parallel. Optionally, the second cyclonic stage comprises a plurality of second stage cyclones 154 in parallel.

The second stage cyclone(s) 154 may be positioned in any suitable location in the surface cleaning apparatus downstream from the first stage cyclone 124. The second stage cyclone(s) 154 may be at least partially nested within the first stage cyclone 124 (i.e., at least partially surrounded by first stage cyclone 124). Nesting the second stage cyclone 154 within the first stage cyclone 124 may help reduce the overall length or height of the air treatment assembly 104 and the surface cleaning apparatus 100.

Figure 44:
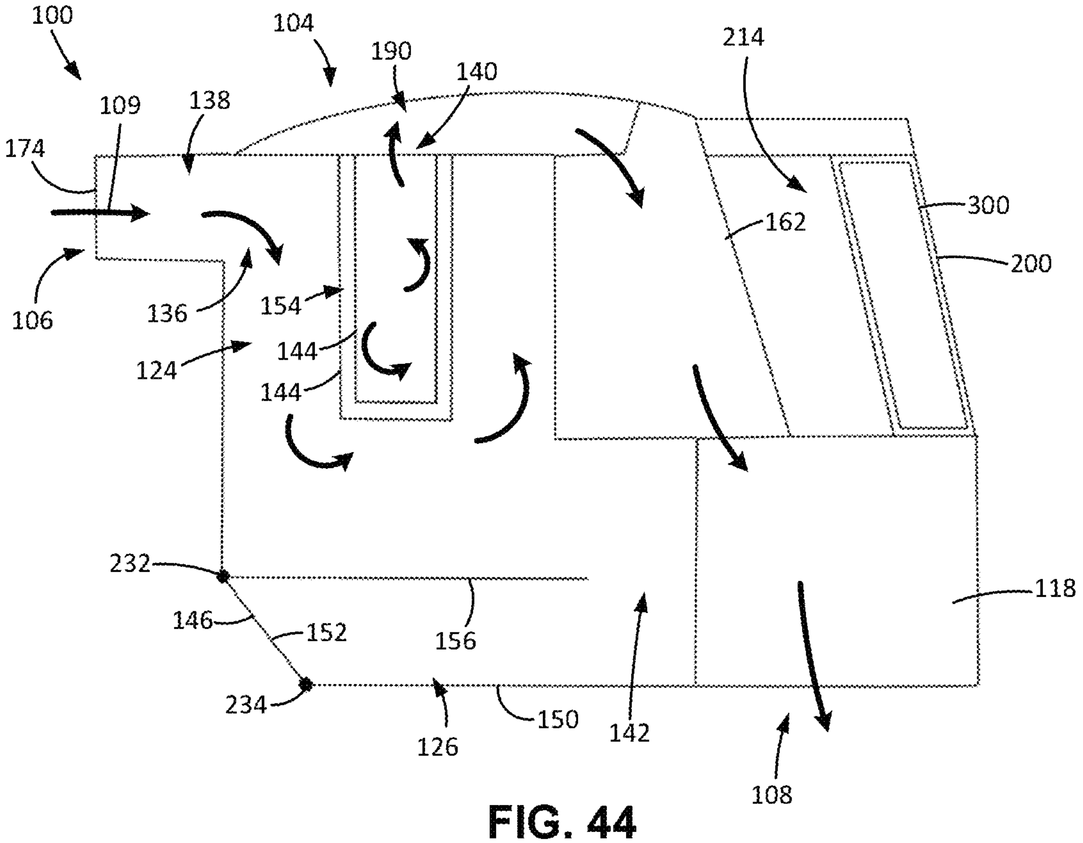
FIG. 44 is a side cross-sectional view of a hand vacuum cleaner with a second cyclonic stage.

For example, the second stage cyclone 154 may be oriented generally parallel to the first stage cyclone 124 and may be generally co-axial to the first stage cyclone 124. As exemplified for example in FIG. 44, the second stage cyclone 154 is oriented parallel to the first stage cyclone 124 and is positioned entirely within the first stage cyclone 124 and is co-axial therewith.

In other embodiments, the second stage cyclone 154 may not be nested within the first stage cyclone 124. The second stage cyclone 154 may be above the first stage cyclone 124. As exemplified for example in FIG. 46, the second stage cyclone 154 is above the first stage cyclone 125. Air exiting the first stage cyclone 124 at cyclone air outlet 140 may flow to second stage cyclone 154, before exiting towards pre-motor filter 162.

Alternately, the second cyclonic stage may partially or fully surround the first cyclonic stage. Accordingly, the first stage cyclone 154 may be at least partially nested within the second cyclonic stage.

In some embodiments, the air treatment assembly 104 may include an air impermeable member 166. The air impermeable member may be positioned in any suitable location. For example, the air impermeable member 166 may be located within the cyclone chamber 124. The air impermeable member 166 may be located adjacent to the vortex finder 144. For example, if the vortex finder 144 is located towards the front end 110, the air impermeable member 166 may be located forward of the vortex finder 144. If the vortex finder 144 is located towards the rear end 112, the air impermeable member 166 may be located rearward of the vortex finder 144. In some embodiments, the vortex finder 144 may be mounted to the air impermeable member 166. The air impermeable member 166 may be mounted to first or second cyclone end walls 129, 131 using mounting members 168. Air within the cyclone chamber 124 may travel around the air impermeable member 166 towards the cyclone air outlet 140.

Figure 66:
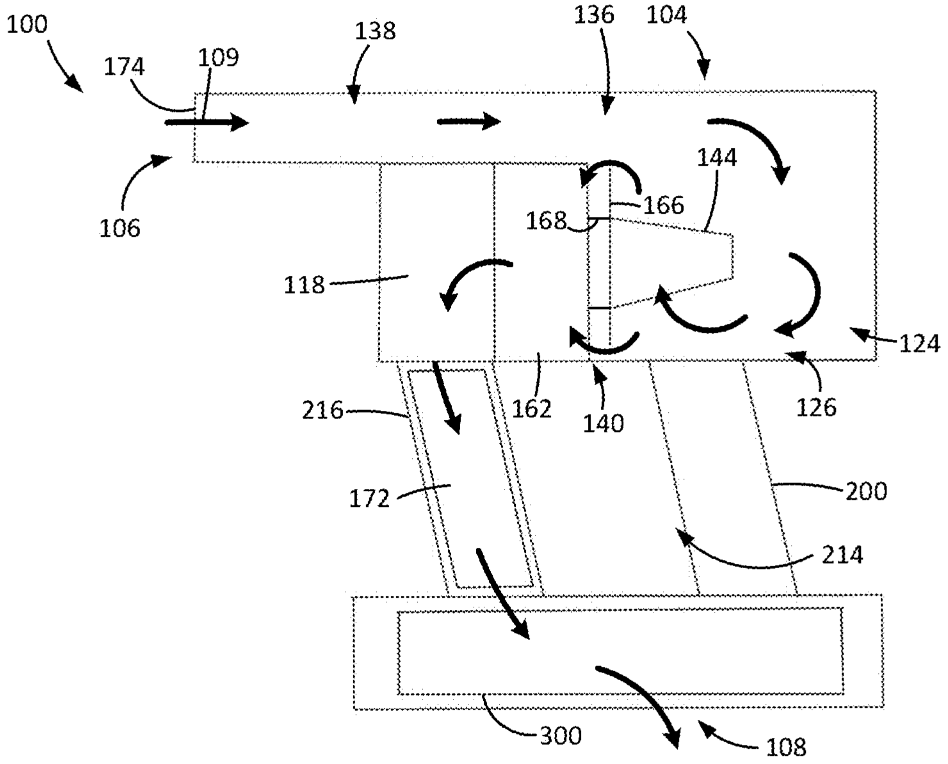

As exemplified in FIG. 66, for example, an air impermeable member 166 is mounted using mounting members 166 to first cyclone end wall 129, and the vortex finder 144 is mounted to the rear side of the air impermeable member 166. As exemplified in FIG. 67, for example, the cyclone chamber 124 may include an air impermeable member 166 without a vortex finder 144.

Optionally, surface cleaning apparatus 100 may include two vortex finders 144. A first vortex finder may be the cyclone air outlet and the second vortex finder may not be an air outlet and may be opposed to and face the first vortex finder. The second vortex finder may assist is redirecting air towards the first vortex finder. Accordingly, the two vortex finders 144 may be positioned at any suitable location within cyclone chamber 124. For example, as exemplified in FIG. 65, a first vortex finder 144 may be positioned towards the front of cyclone chamber 124, while a second vortex finder 144 is positioned towards the rear of cyclone chamber 124. The two vortex finders 144 may have any suitable shape and size, and may have the same or different dimensions. The two vortex finders may be parallel, as in FIG. 65 wherein they each extend in the same direction, or they may be positioned at an angle to each other. The two vortex finders may be vertically aligned, as in FIG. 65, wherein a line parallel to axis 117 extends through both vortex finders and, optionally, through a central portion of each vortex finder, or may be vertically offset. It will be appreciated that if the cyclone axis is vertical, then the two vortex finders may be similarly positioned as oriented but in a different orientation due to the different orientation of the cyclone.

Position of Motor and Fan Assembly

A hand vacuum cleaner using any aspect discussed herein may have a motor and fan assembly 118 positioned at any location discussed herein and optionally on an opposed side to an air treatment member or an air treatment assembly. While the position of motor and fan assembly 118 with respect to other components is discussed separately with respect to each other component, it will be appreciated that any embodiment of a hand vacuum cleaner may utilize the positioning of motor and fan assembly 118 with respect to one or more of the other components discussed herein. Accordingly, the position of the motor and fan assembly discussed in this aspect may be used by itself or in combination with one or more of the handle, the position of the energy storage member packs, the air flow path, the position of the dirt collection area, the openable and removable portion, the tangential inlet with ramp, the air treatment assembly, the position of a pre-motor filter, the position of a post-motor filter, a telescoping inlet and a corner screen as disclosed herein.

The motor and fan assembly 118 may be positioned in any suitable location within hand vacuum cleaner 100. For example, the motor and fan assembly 118 may be positioned forward of cyclone chamber 124 (or air treatment assembly) and optionally towards or at front end 110, (e.g., FIGS. 1B-6). In such an embodiment, e.g., the air treatment chamber air outlet is at a rear end of the air treatment chamber, the motor and fan assembly may be a dirty air motor. It will be appreciated that, regardless of the position of the operating components, if the motor and fan assembly 118 is positioned between the pre-motor filter 162 and the cyclone chamber 124 (e.g., FIG. 1B), then the motor and fan assembly may be a dirty air motor.

Figure 18:
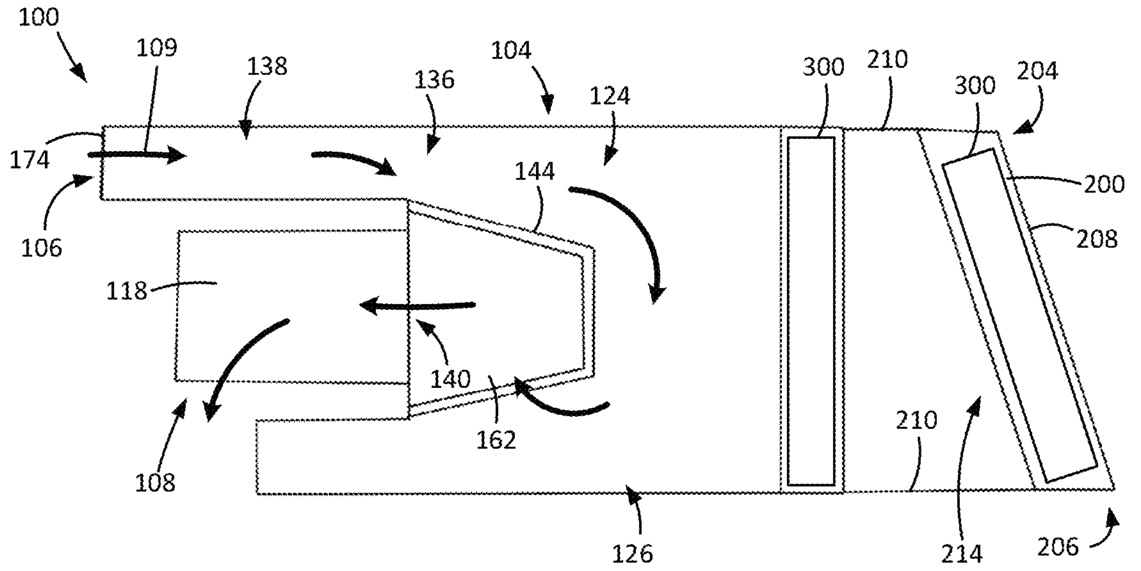
FIGS. 18-19 are side cross-sectional views of other example hand vacuum cleaners with motor and fan assemblies and energy storage packs at opposite axial ends thereof.

Alternately, as exemplified in FIGS. 4 and 18, the air treatment chamber air outlet (or air treatment assembly air outlet) may be at the front end of the air treatment chamber or air treatment assembly and the motor and fan assembly may be positioned forward thereof. In such a case, the motor and fan assembly may be a clean air suction motor.

Figure 10:
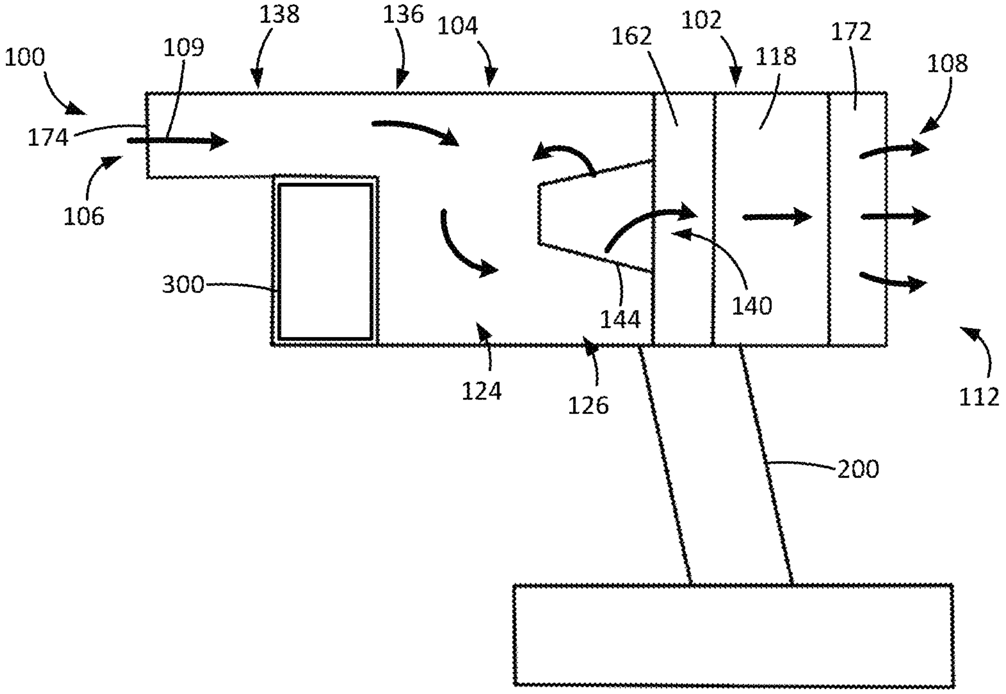
FIGS. 10-14 are side cross-sectional views of other example hand vacuum cleaners with motor and fan assemblies and energy storage packs at opposite axial ends thereof.

In other embodiments, the motor and fan assembly 118 may be positioned rearward of cyclone chamber 124 air outlet (or air treatment assembly air outlet) and optionally towards or at rear end 112 (e.g., FIG. 10). In such a case, the motor and fan assembly may be a clean air suction motor and the air outlet of the air treatment chamber may be axially aligned with the suction motor air inlet and optionally the central axis of the air outlet of the air treatment chamber may be coaxial with the motor axis of rotation It will be appreciated that, regardless of the position of the air treatment chamber air outlet of the air treatment assembly air outlet, the motor and fan assembly may be partially or fully nested in the air treatment chamber air outlet or the air treatment assembly air outlet.

It will also be appreciated that, regardless of the position of the air treatment chamber air outlet or the air treatment assembly air outlet, the motor and fan assembly may be axially aligned with the suction motor air inlet and optionally the central axis of the air outlet of the air treatment chamber may be coaxial with the motor axis of rotation.

An upper line that extends in a common horizontal direction with the hand vacuum cleaner axis 117 may extend through the cyclone chamber 124 and the motor and fan assembly 118.

Optionally, the motor and fan assembly 118 is axially aligned with the vortex finder 144 (i.e., the motor axis 122 and cyclone axis 134 are co-axial) (e.g., FIG. 14). Such an embodiment may be used if the motor and fan assembly is forward, rearward, above or below the air treatment chamber. If the motor and fan assembly is rearward of the air treatment chamber, then the motor and fan assembly 118 may be positioned rearward of both the pre-motor filter 162 and cyclone chamber 124 (e.g., FIG. 10). Similarly, if the motor and fan assembly is forward of the air treatment chamber, then the motor and fan assembly 118 may be positioned forward of both the pre-motor filter 162 and cyclone chamber 124.

In other embodiments, the motor and fan assembly 118 may be positioned at a lower end of the hand vacuum cleaner. For example, it may be positioned adjacent a lower end of the handle and it may be positioned below the handle (see, e.g. FIG. 41A wherein it underlies the pre-motor filter 162 and the finger grip area). Accordingly, it may underlie the handle, e.g., an axis extending through the hand grip portion between the upper and lower ends of the hand grip portion may extend through the motor and fan assembly. Accordingly, as exemplified in FIG. 41A, air may travel downwardly from the pre-motor filter, and then rearwardly through an optional post motor filter to the clean air outlet.

In some embodiments, the motor and fan assembly 118 may be located below inlet conduit 138 (e.g., FIG. 7A), e.g., the motor and fan assembly is forward of the air treatment chamber or the air treatment assembly. Accordingly, a plane that is transverse to the axis 117 may extend through the inlet conduit 138 and the motor and fan assembly 118.

As discussed previously, the energy storage pack and the motor and fan assembly may be at opposite sides of the air treatment chamber. As exemplified in FIG. 18, the motor and fan assembly 118 is positioned forward of air treatment chamber air outlet and the energy storage pack is positioned rearward of the air treatment chamber. IN such a case, they may be at the same elevation, e.g., the cyclone axis may extend through both the motor and fan assembly and the energy storage pack. Alternately, they may be at different elevations (e.g., FIGS. 20A and 41A).

Figure 19:
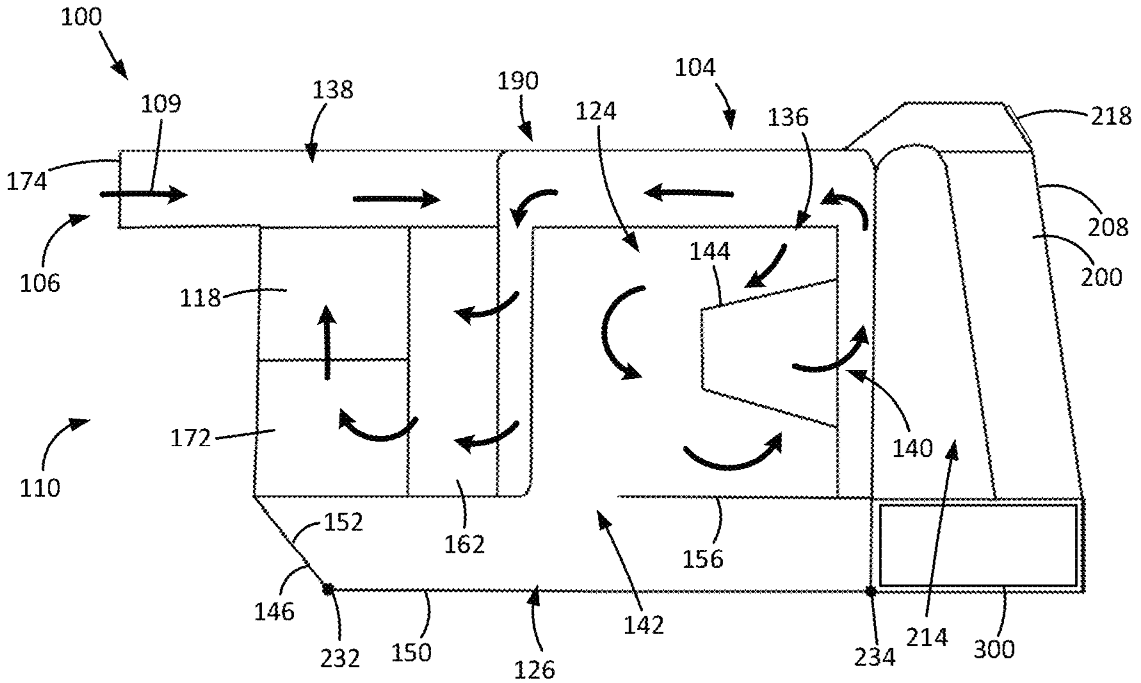

In some embodiments, the motor and fan assembly 118 is positioned above dirt collection area 126 (e.g., FIG. 19). In such a case, as exemplified, the motor and fan assembly may be positioned forward of the air treatment chamber or, alternately, rearwardly thereof.

Figure 41A:
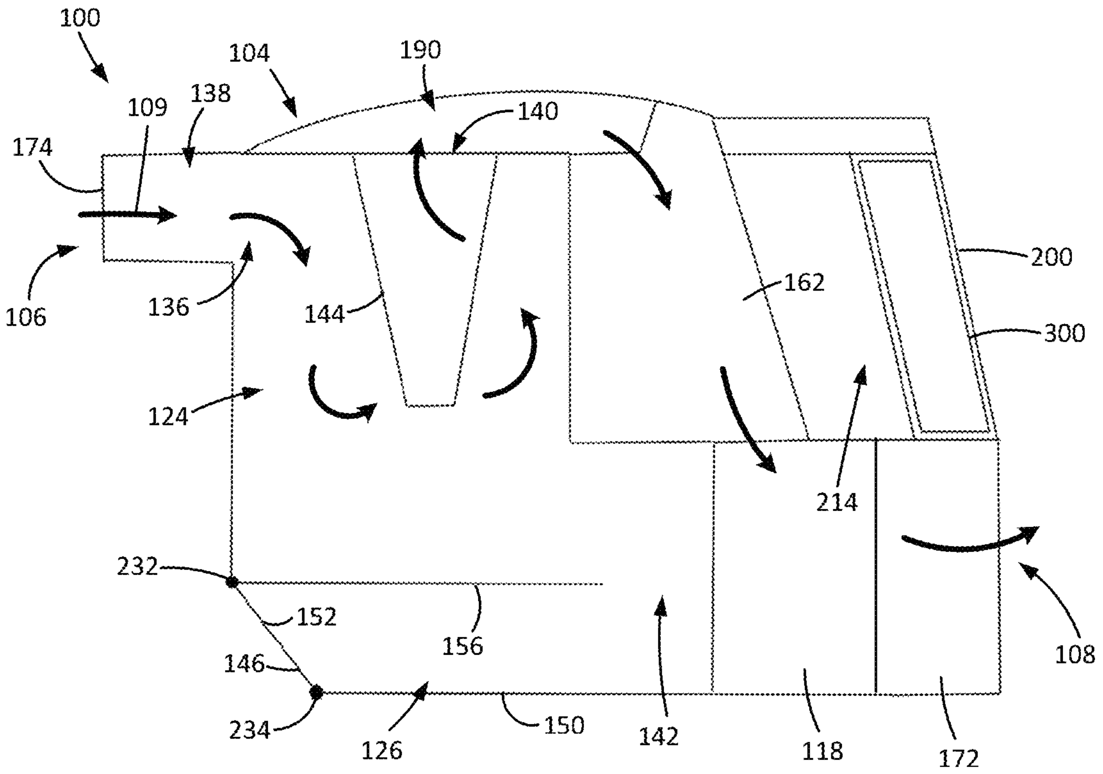
FIG. 41A is a side cross-sectional view of a hand vacuum cleaner with an openable door and an openable portion in closed positions.
Figure 41B:
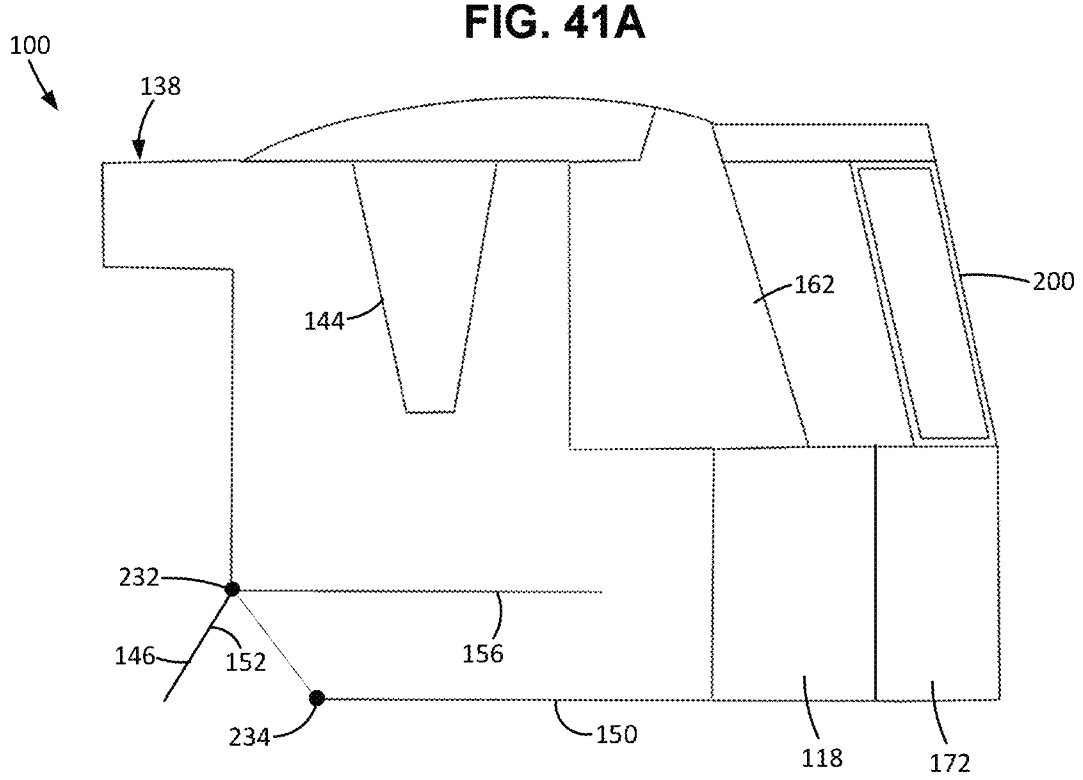
FIG. 41B is a side cross-sectional view of the hand vacuum cleaner of FIG. 41A with the openable door in an open position and the openable portion in a closed position.
Figure 41C:
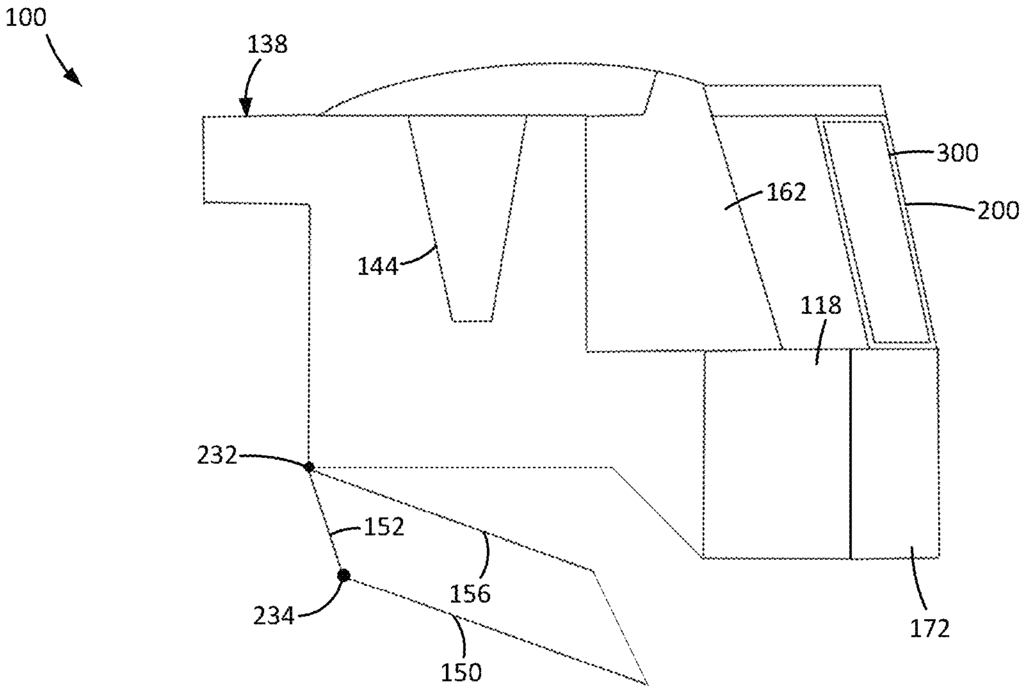
FIG. 41C is a side cross-sectional view of the hand vacuum cleaner of FIG. 41A with the openable portion in an open position and the openable door in a closed position.

In other embodiments, the motor and fan assembly 118 may be located rearward of dirt collection area 126 (e.g., FIG. 41A). In such a case, the motor and fan assembly may be at an elevation of the dirt collection chamber and a line parallel to axis 117 may extend through the dirt collection chamber and the motor and fan assembly.

Figure 53:
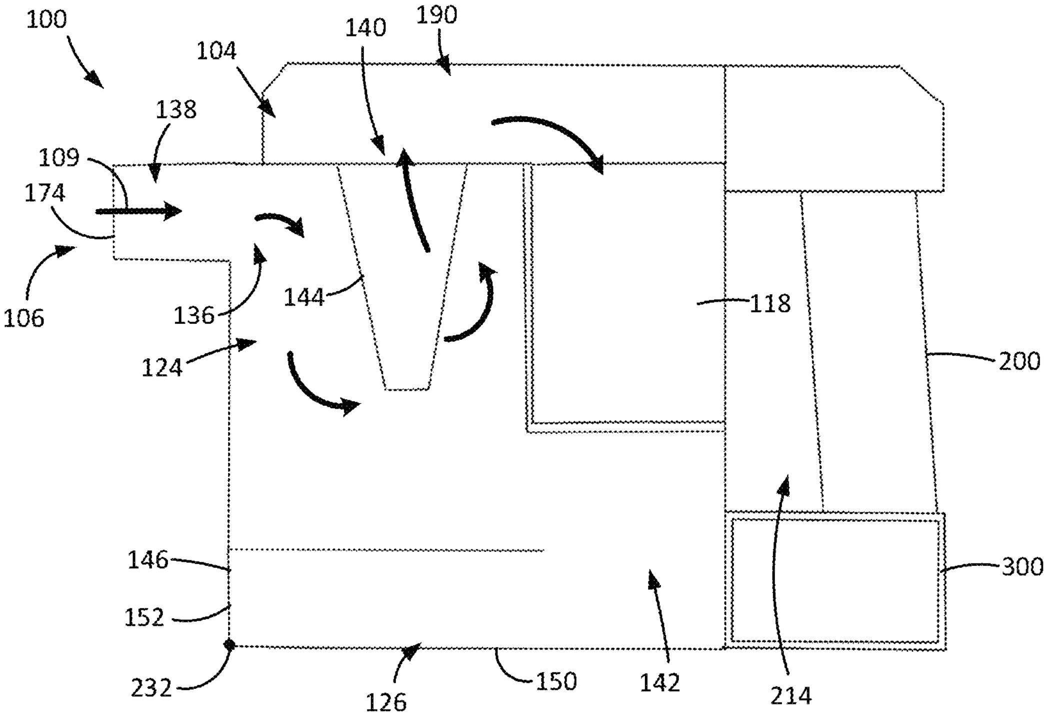
FIG. 53 is a side cross-sectional view of a hand vacuum cleaner.
Figure 54A:
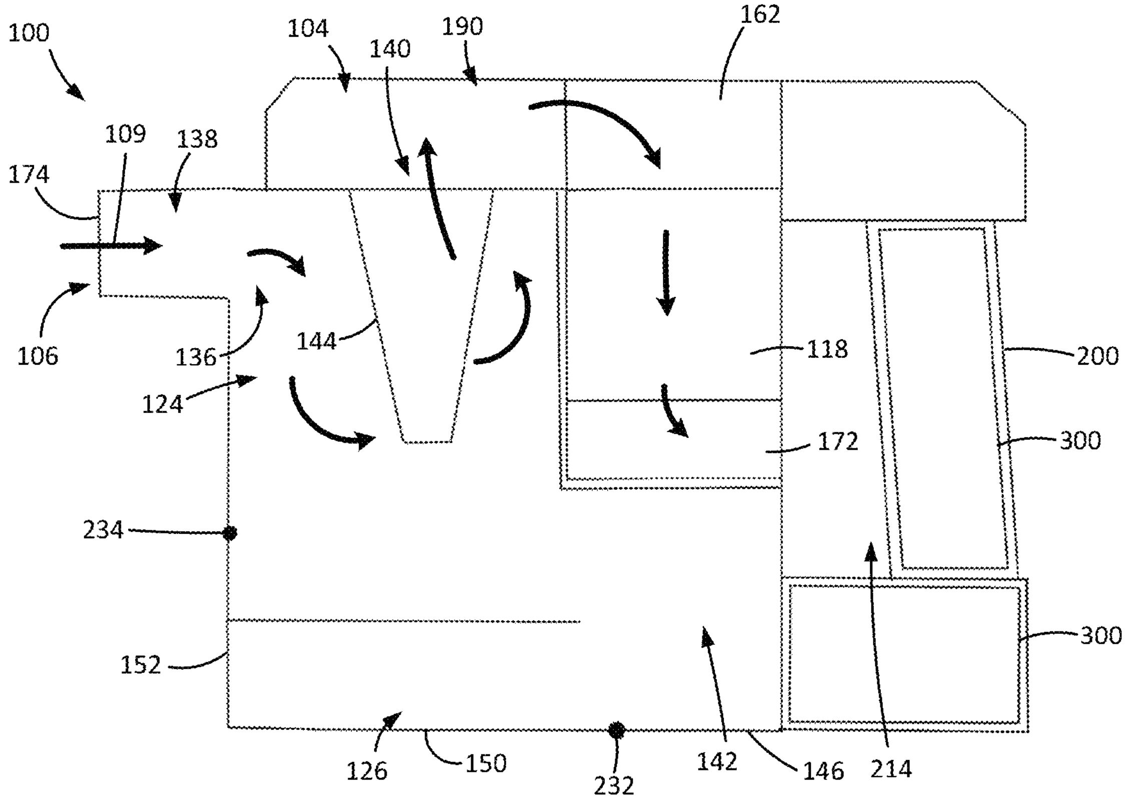
FIG. 54A is a side cross-sectional view of a hand vacuum cleaner with an openable portion in a closed position.
Figure 54B:
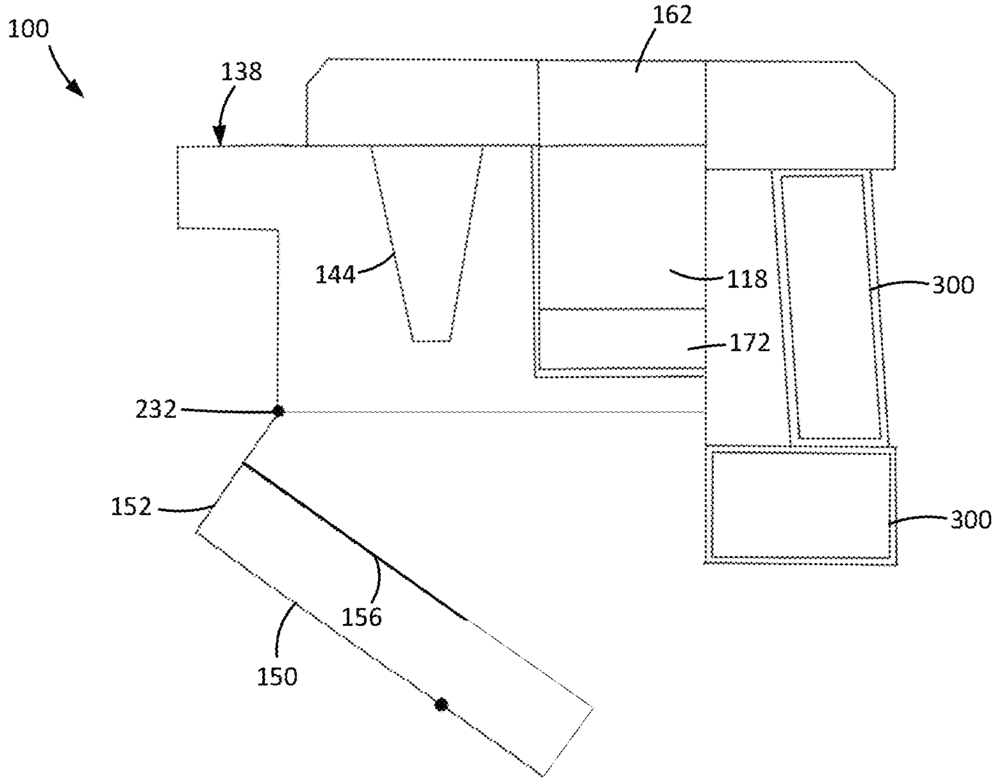
FIG. 54B is a side cross-sectional view of the hand vacuum cleaner of FIG. 54A with the openable portion in an open position.

In other embodiments, the motor and fan assembly 118 may at least partially overlie the dirt collection area 126 (e.g., FIGS. 53-54A). For example, the dirt collection chamber may extend rearwardly of the air treatment chamber and, optionally, the motor and fan assembly is positioned adjacent a rearward side of the air treatment chamber or air treatment assembly. If the air outlet of the air treatment chamber is in a rear end of the air treatment chamber, then a pre-motor filter may be positioned between the air treatment chamber and the motor and fan assembly.

As discussed herein in relation to energy storage packs 300, the motor and fan assembly 118 may be located at an end of the air treatment chamber or the air treatment assembly that is opposite to that of the energy storage pack 300.

In other embodiments, the energy storage pack 300 and motor and fan assembly 118 may be located adjacent to each other (e.g., FIG. 42C), optionally on any side of the air treatment chamber.

In some embodiments, the energy storage pack 300 and motor and fan assembly 188 may both be provided at the lower end of handle 200 (e.g., FIG. 60A).

Figure 61A:
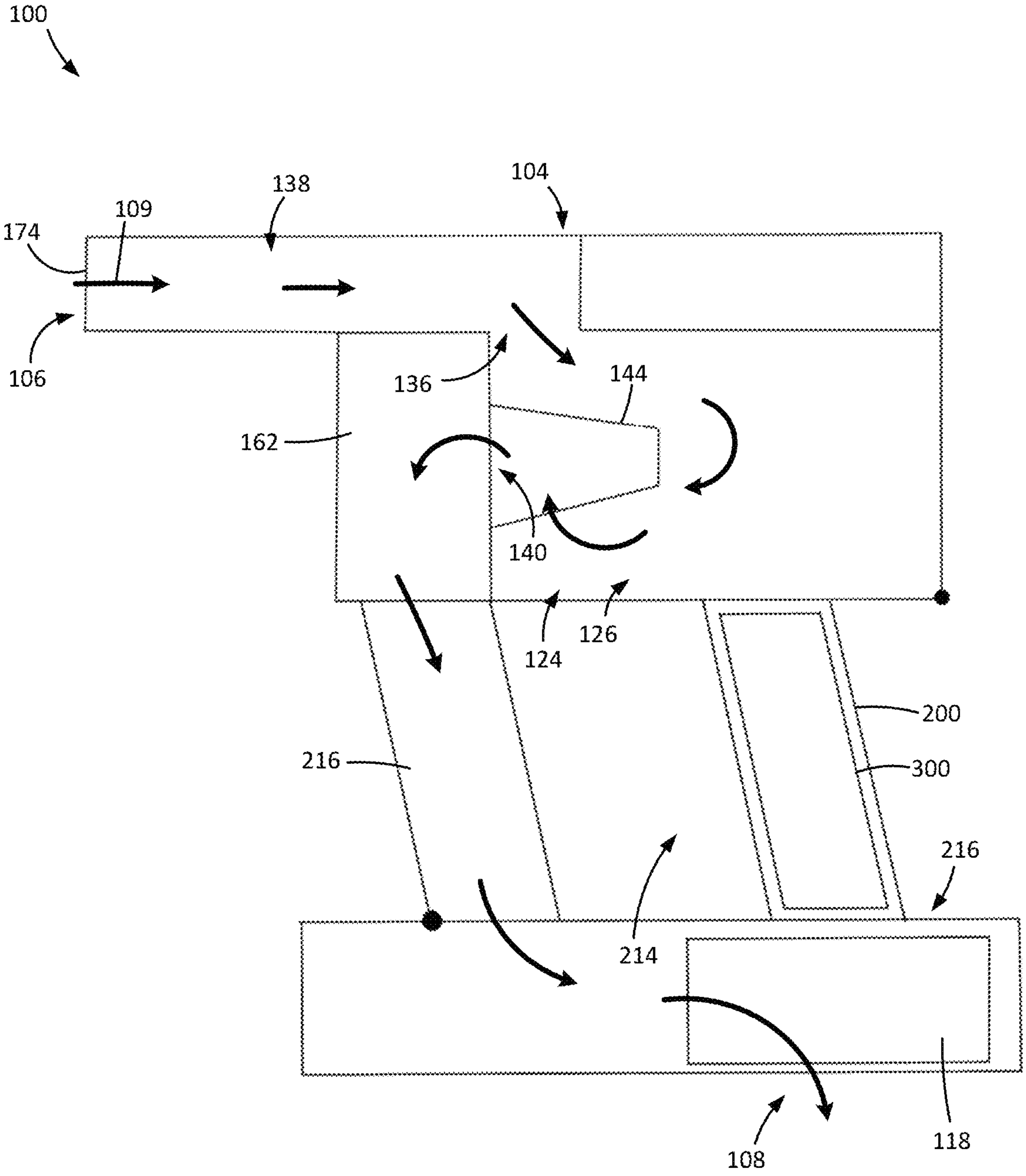
FIG. 61A is a side cross-sectional view of a vacuum cleaner with a rotatable finger guard and an openable portion in closed positions.
Figure 61B:
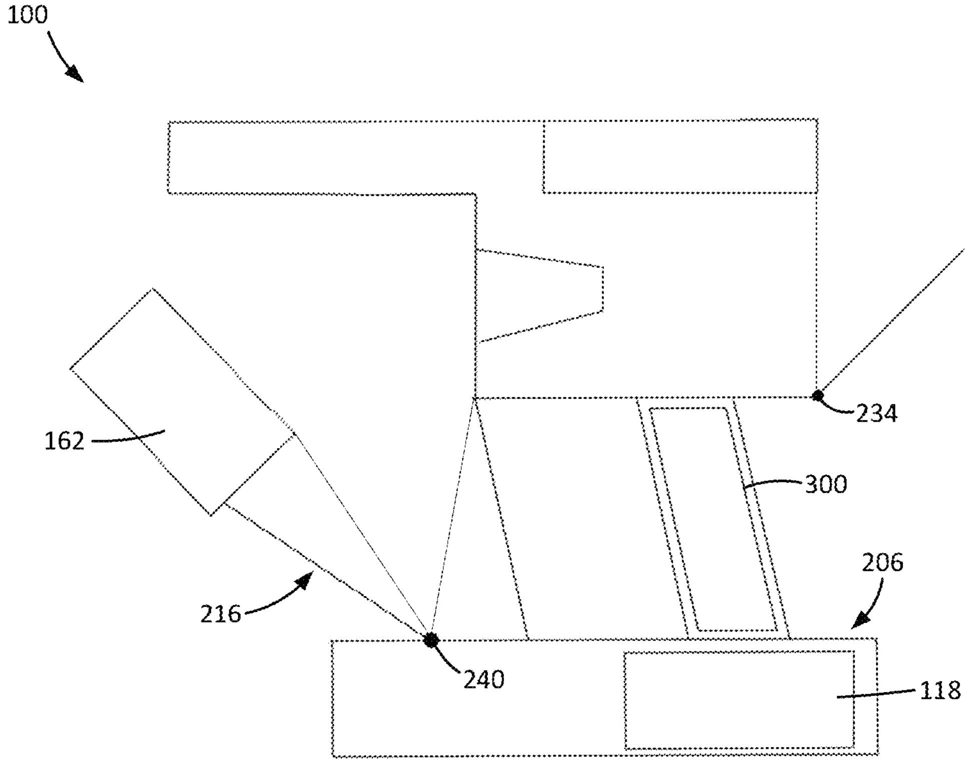
FIG. 61B is a side cross-sectional view of the vacuum cleaner of FIG. 61A with the rotatable finger guard and openable portions in open positions.
Figure 68A:
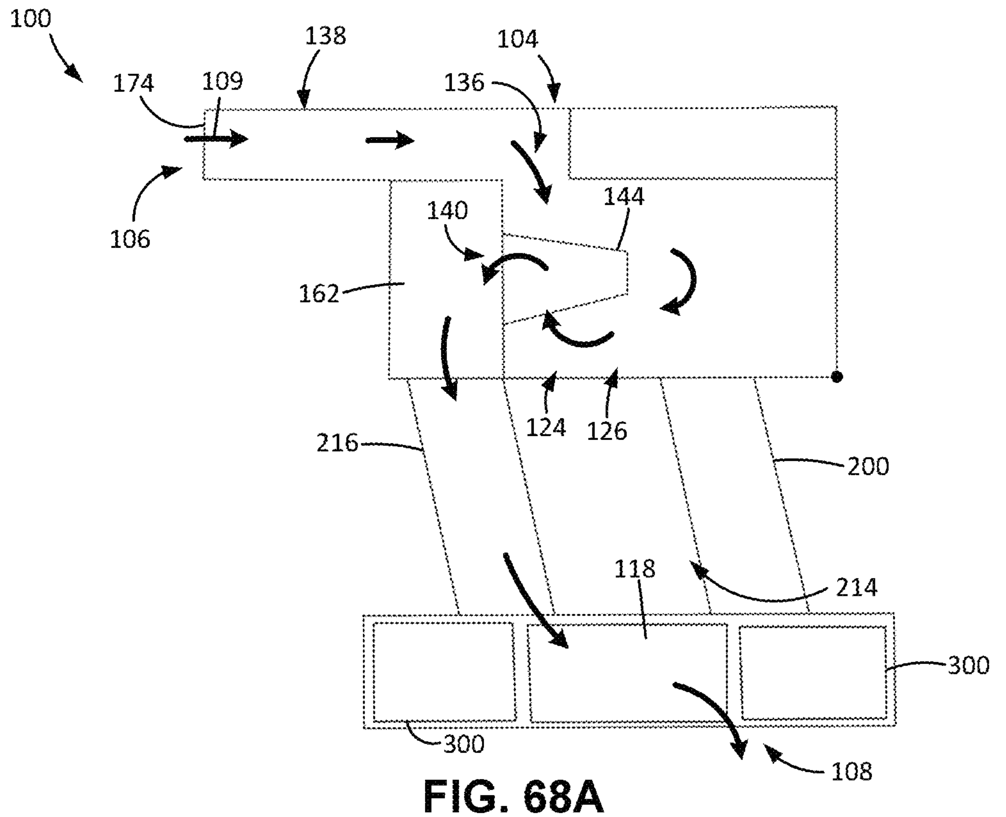
FIG. 68A is a side cross-sectional view of a hand vacuum cleaner with an openable portion in a closed position.
Figure 68B:
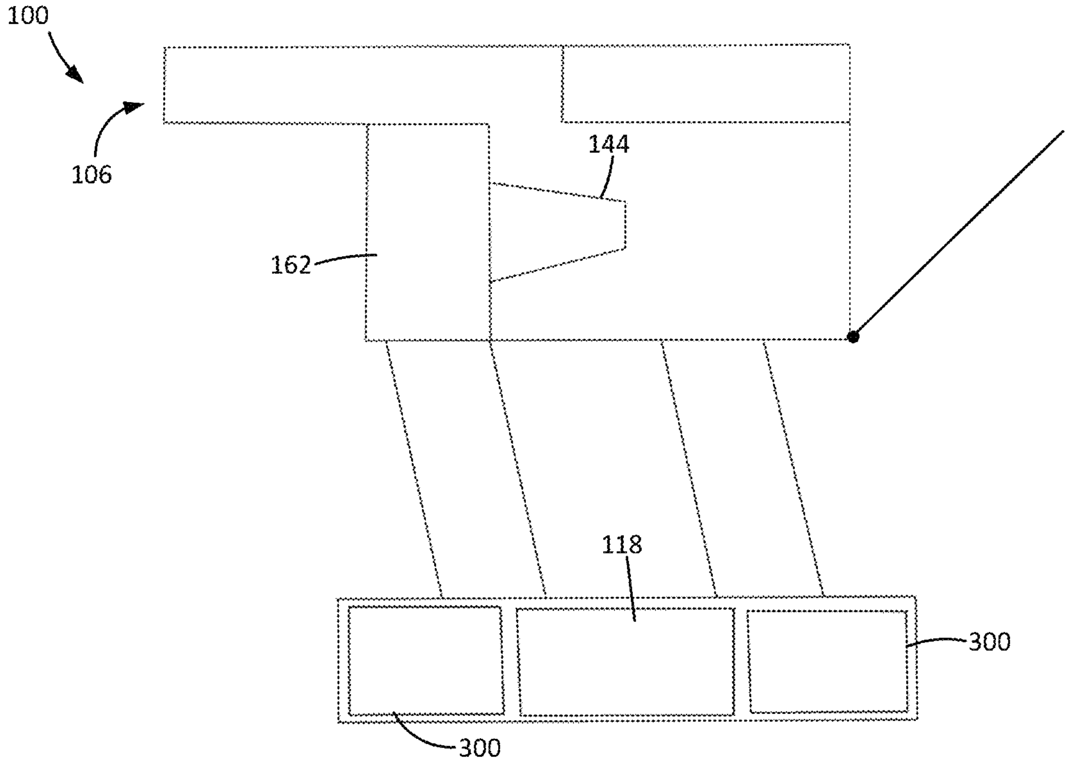
FIG. 68B is a side cross-sectional view of the hand vacuum cleaner of FIG. 68A with an openable portion in an open position.

In some embodiments, the motor and fan assembly 118 is provided in second handle end 206 (e.g., FIG. 61A). The motor and fan assembly 118 may be provided at the lower end of the finger guard 216 (e.g., FIG. 68A).

Position of Pre-Motor Filter

A hand vacuum cleaner using any aspect discussed herein may have one or more pre-motor filters 162 and, if so, the one or more pre-motor filters 162 may be positioned at any location discussed herein. While the position of the one or more pre-motor filters 162 with respect to other components is discussed separately with respect to each other component, it will be appreciated that any embodiment of a hand vacuum cleaner may utilize the positioning of the one or more pre-motor filters 162 with respect to one or more of the other components discussed herein. Accordingly, the position of the one or more pre-motor filters 162 discussed in this aspect may be used by itself or in combination with one or more of the handle, the position of the energy storage member packs, the air flow path, the position of the dirt collection area, the openable and removable portion, the tangential inlet with ramp, the air treatment assembly, the position of a motor and fan assembly, the position of a post-motor filter, a telescoping inlet and a corner screen as disclosed herein.

Optional pre-motor filter 162 may have any suitable location within surface cleaning apparatus 100. For example, pre-motor filter 162 may be located towards the front end 110, and it may be forward of cyclone chamber 124 (e.g., FIG. 1B). Alternatively, pre-motor filter 162 may be located towards the rear end 112, and it may be rearward of cyclone chamber 124 (e.g., FIG. 10). In some embodiments, the pre-motor filter may be located above cyclone chamber 124 or above the air treatment assembly (e.g., FIG. 54A) or below the cyclone chamber or below the air treatment assembly.

It will be appreciated that the pre-motor filter is provided (e.g., removably positionable) in a pre-motor filter housing that is upstream of the motor and fan assembly. The pre-motor filter housing need not be positioned adjacent the motor and fan assembly. Optionally, the inlet of the motor and fan assembly faces towards the air outlet of the pre-motor filter housing and it may directly face (i.e., with no intermediary component or all, the downstream face of the pre-motor filter. Optionally the motor axis may extend through the pre-motor filter housing and the air outlet of the pre-motor filter housing may face and be adjacent to the inlet of the motor and fan assembly. Accordingly, the pre-motor filter housing and the motor and fan assembly may have the same positioning.

Accordingly, as exemplified in FIG. 1B, the pre-motor filter 162 is located towards the front end 110, at a location that is forward of cyclone chamber 124. In this example, the motor and fan assembly is a dirty air motor and the dirty air motor 118 is located adjacent and downstream of the pre-motor filter 162. In this example, the pre-motor filter 162 is positioned forward of the motor and fan assembly 118.

As exemplified in FIG. 10, the pre-motor filter 162 is located towards the rear end 112, at a location that is rearward of cyclone chamber 124. In this example, the motor and fan assembly is a clean air motor and the clean air motor 118 is located adjacent and downstream of the pre-motor filter 162. In this example, the pre-motor filter 162 is positioned forward of the motor and fan assembly 118 and rearward of the cyclone chamber air outlet.

The embodiment of FIG. 7A is similar except that the cyclone air outlet is at the front end of the cyclone chamber. Accordingly, the pre-motor filter 162 is located towards the front end 110, at a location that is forward of cyclone chamber 124. In this example, the motor and fan assembly is a clean air motor and the clean air motor 118 is located adjacent and downstream of the pre-motor filter 162. In this example, the pre-motor filter 162 is positioned rearward of the motor and fan assembly 118 and forward of the cyclone chamber air outlet.

Figure 8B:
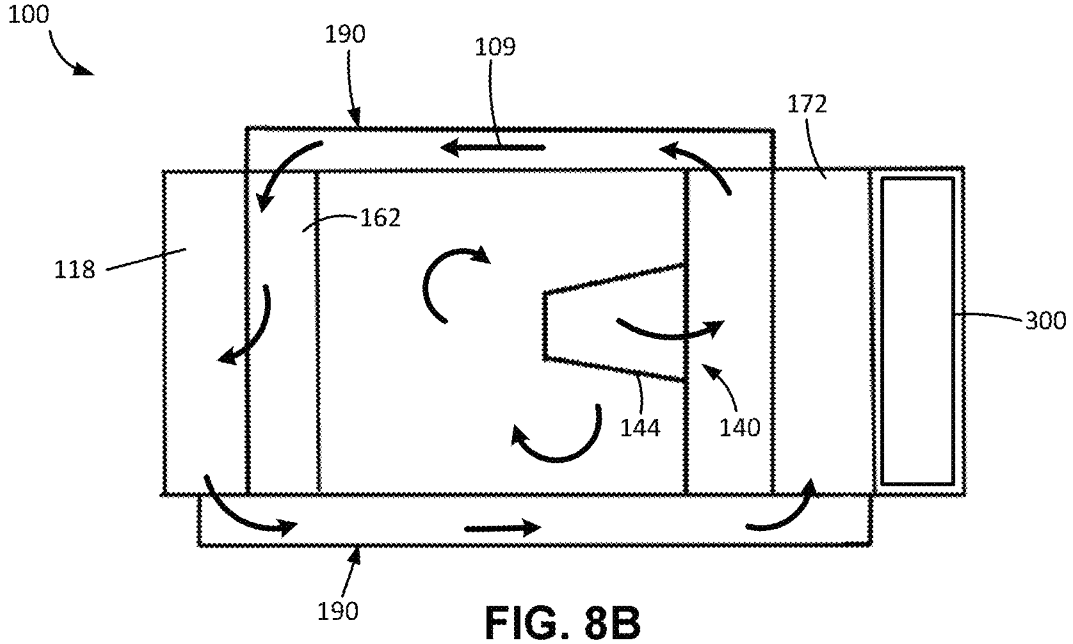
FIG. 8B is a top view of the hand vacuum cleaner of FIG. 8A.
Figure 9B:
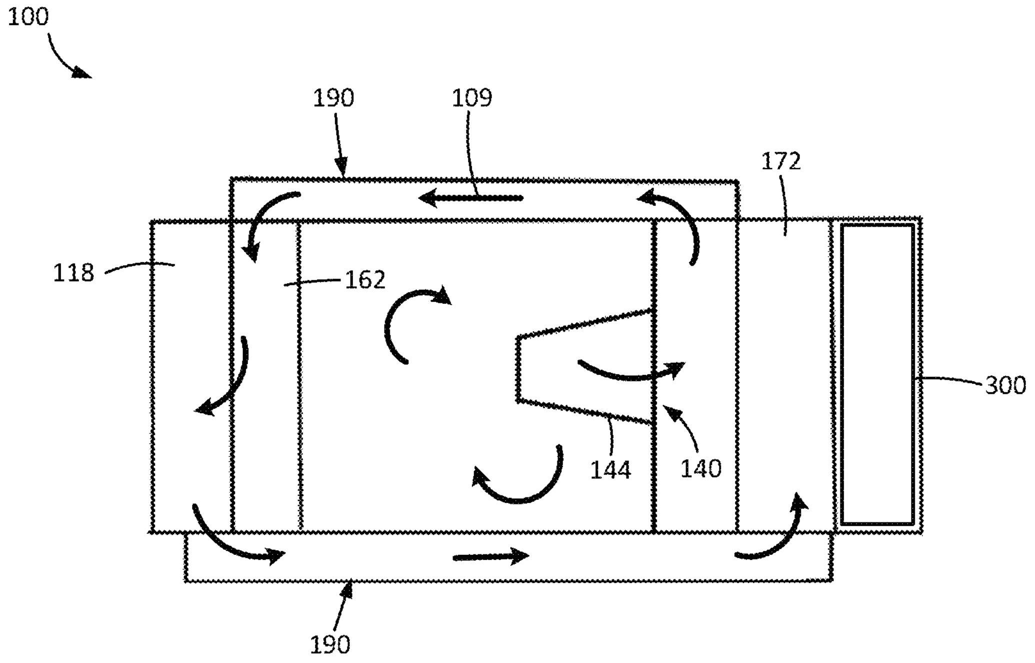
FIG. 9B is a top view of the hand vacuum cleaner of FIG. 9A.

FIG. 8B exemplifies a similar position of the pre-motor filter and the motor and fan assembly as in FIG. 7A except the cyclone chamber air outlet is located at a rear end of the cyclone chamber and post-air treatment passages 190 conveys air from the cyclone chamber air outlet to the pre-motor filter.

Figure 12:
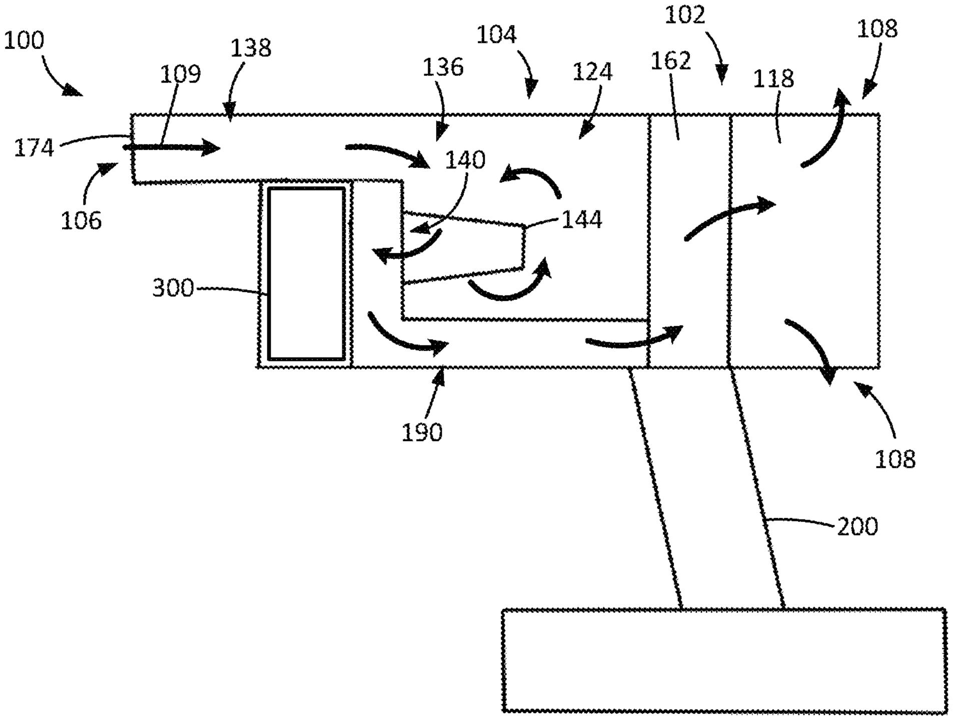

FIG. 12 exemplifies a similar position of the pre-motor filter and the motor and fan assembly as in FIG. 10 except the cyclone chamber air outlet is located at a front end of the cyclone chamber and post-air treatment passages 190 conveys air from the cyclone chamber air outlet to the pre-motor filter.

As exemplified in FIG. 54A, the motor and fan assembly 118 is laterally positioned from the cyclone chamber. As exemplified, a plane that is transverse to the cyclone axis extends through the motor and fan assembly 118 and, optionally the inlet conduit 138. The motor and fan assembly housing may be formed as a common wall with the cyclone chamber or be a separate wall. In this embodiment, the pre-motor filter 162 overlies the motor and fan assembly which the motor axis extending through the pre-motor filter, and is located at an elevation above the cyclone chamber. It will be appreciated that the pre-motor filter may partially overlie the motor and fan assembly and/or may partially or fully overlie the cyclone chamber.

It will be appreciated that the pre-motor filter and the motor and fan assembly may not be arranged such that the motor axis extends through the pre-motor filter housing. For example, as exemplified in FIG. 41A, the motor and fan assembly is located at a lower end of the hand vacuum cleaner, e.g., below the elevation of the hand grip portion. In this embodiment, the pre-motor filter is positioned laterally from the cyclone chamber. As exemplified, a plane that is transverse to the cyclone axis extends through the pre-motor filter housing and, optionally the inlet conduit 138. The pre-motor filter housing may be formed as a common wall with the cyclone chamber or be a separate wall. In this embodiment, the pre-motor filter is positioned above the motor and fan assembly.

It will be appreciated that the pre-motor filter may partially or fully overlie the motor and fan assembly or part or all of the pre-motor filter may be laterally spaced from the motor and fan assembly. As exemplified in FIG. 41A, the pre-motor filter partially overlies the motor and fan assembly and a plane that is parallel to the cyclone axis extends through the pre-motor filter and the motor and fan assembly. As exemplified in FIG. 61A, the pre-motor filter is above the motor and fan assembly but fully laterally spaced therefrom. In the embodiment of FIG. 61A, the finger guard provides part of the air flow path, which may be openable, as exemplified in FIG. 61B. Accordingly the pre-motor filter may partially or fully overlie the fingerguard.

It will be appreciated that, in a variation of FIG. 41A, the pre-motor filter may be positioned axially forwardly of the motor and fan assembly.

It will be appreciated that, if the pre-motor filter 162 is located forward of the air treatment chamber, then the pre-motor filter 162 may be located below inlet conduit 138, as exemplified in FIG. 8A.

If the handle is provided on a lower surface of the hand vacuum cleaner, then the handle may be located at an elevation below the pre-motor filter (see., e.g., FIG. 10). In such a case, a handle axis that extends through the hand grip portion between a lower end of the hand grip portion and an upper end of the hand grip portion may extend through the pre-motor filter. Alternately the handle axis may extend forward of the re-motor filter (see, e.g. FIG. 11) or alternately the motor and fan assembly.

Figure 46:
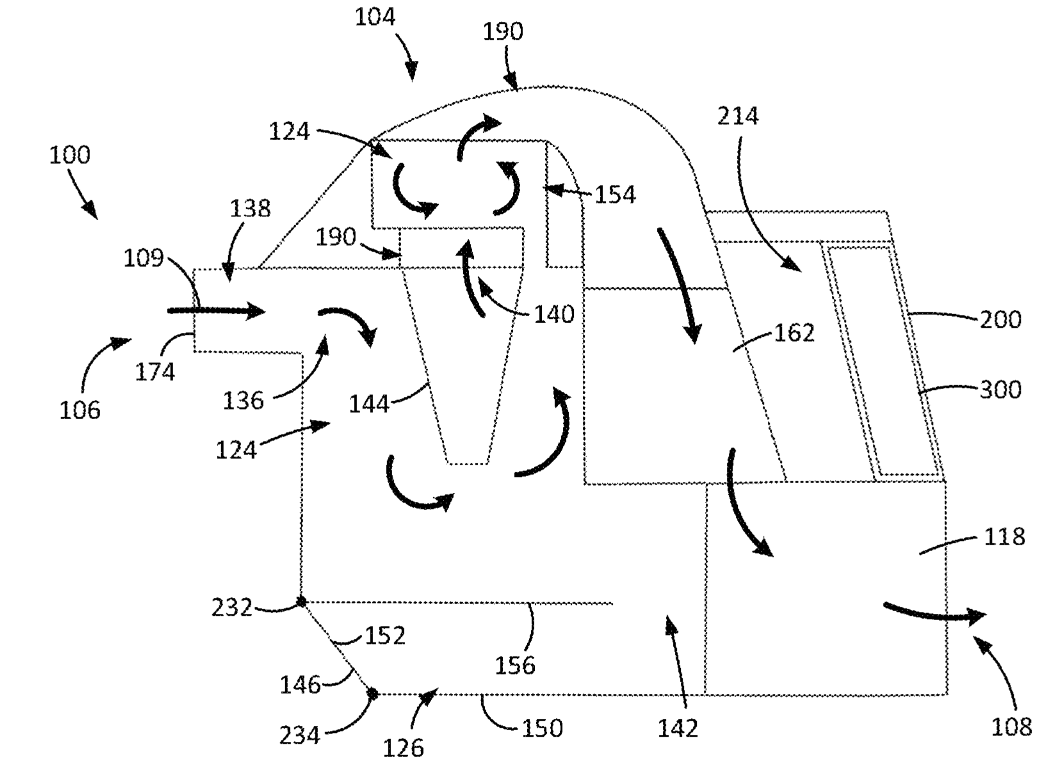
FIG. 46 is a side cross-sectional view of a hand vacuum cleaner with a second cyclonic stage.

If the handle is located on rear end 112, then pre-motor filter 162 may be positioned forward of handle 200 and axis 117 may extend through the handle and the pre-motor filter (e.g., FIG. 46). It will be appreciated that axis 117 may also extend through the motor and fan assembly and/or the air treatment chamber.

Alternately, the pre-motor filter may be at an elevation below handle 200. In such a case, a line the is parallel to axis 117 may extend through the handle and the pre-motor filter (e.g., FIG. 46). It will be appreciated that axis 117 may also extend through the motor and fan assembly and/or the air treatment chamber If the air flow is used to cool an energy storage pack, then the energy storage pack is optionally position in the air flow path downstream of the motor and fan assembly and therefore downstream of the pre-motor filter. In such an embodiment, the motor and fan assembly may be located towards or at the clean air outlet and optionally adjacent the motor and fan assembly. It will be appreciated that the energy storage pack 300 may be located close to the pre-motor filter or distal thereto. For example, pre-motor filter 162 may be positioned forward of optional energy storage pack 300 (e.g., FIG. 8A) or rearward of energy storage pack 300 (e.g., FIG. 10).

Figure 36A:
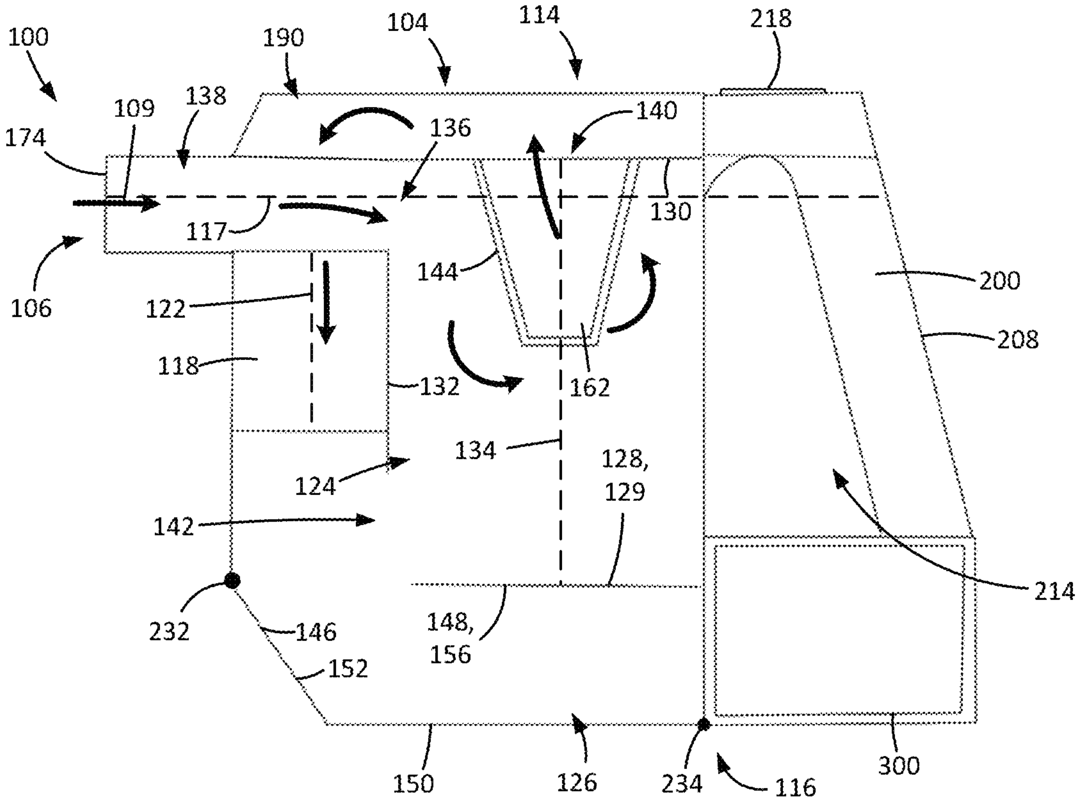
FIG. 36A is a side cross-sectional view of a hand vacuum cleaner with an openable door and an openable portion in closed positions.
Figure 36B:
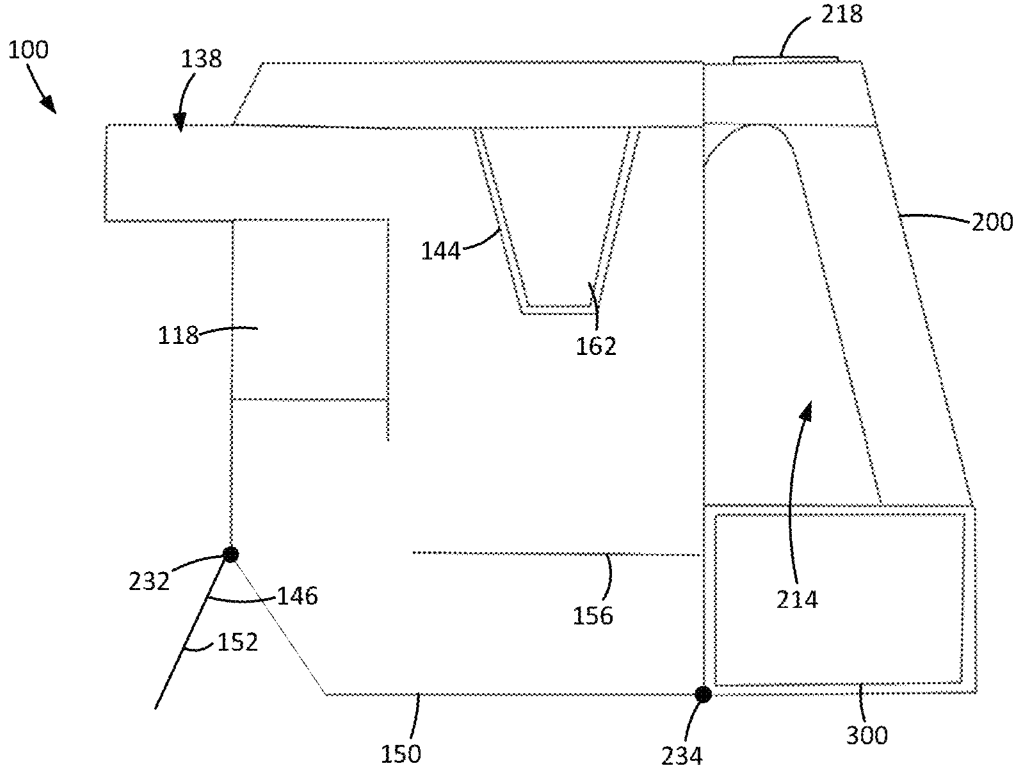
FIG. 36B is the hand vacuum cleaner of FIG. 36A with the openable door in an open position and the openable portion in the closed position.
Figure 36C:
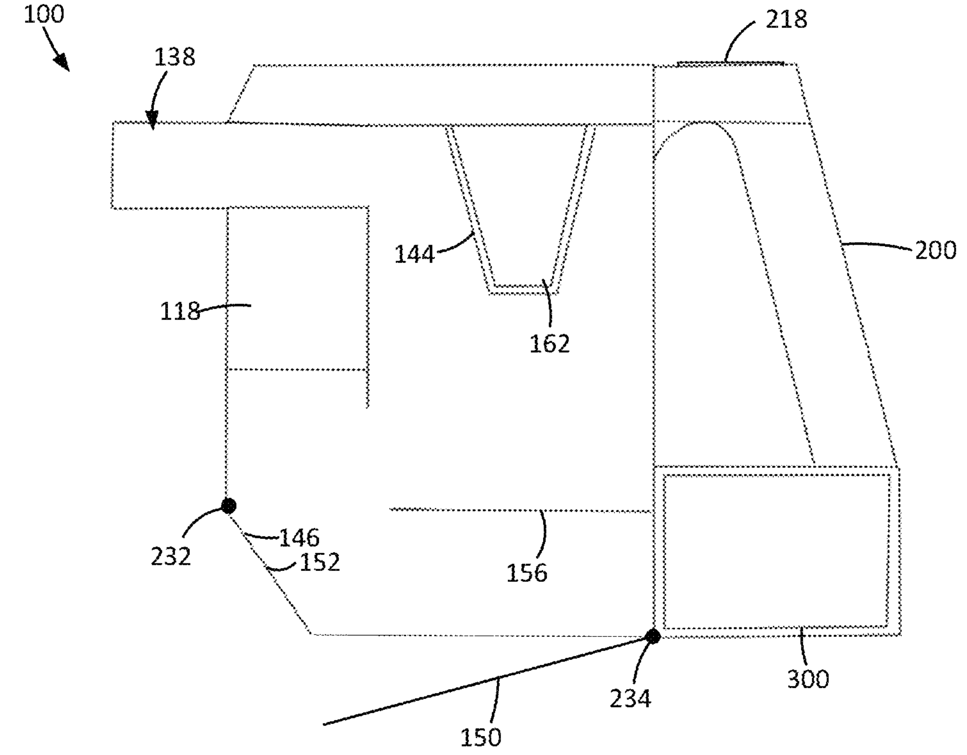
FIG. 36C is the hand vacuum cleaner of FIG. 36A with the openable portion in an open position.
Figure 36D:
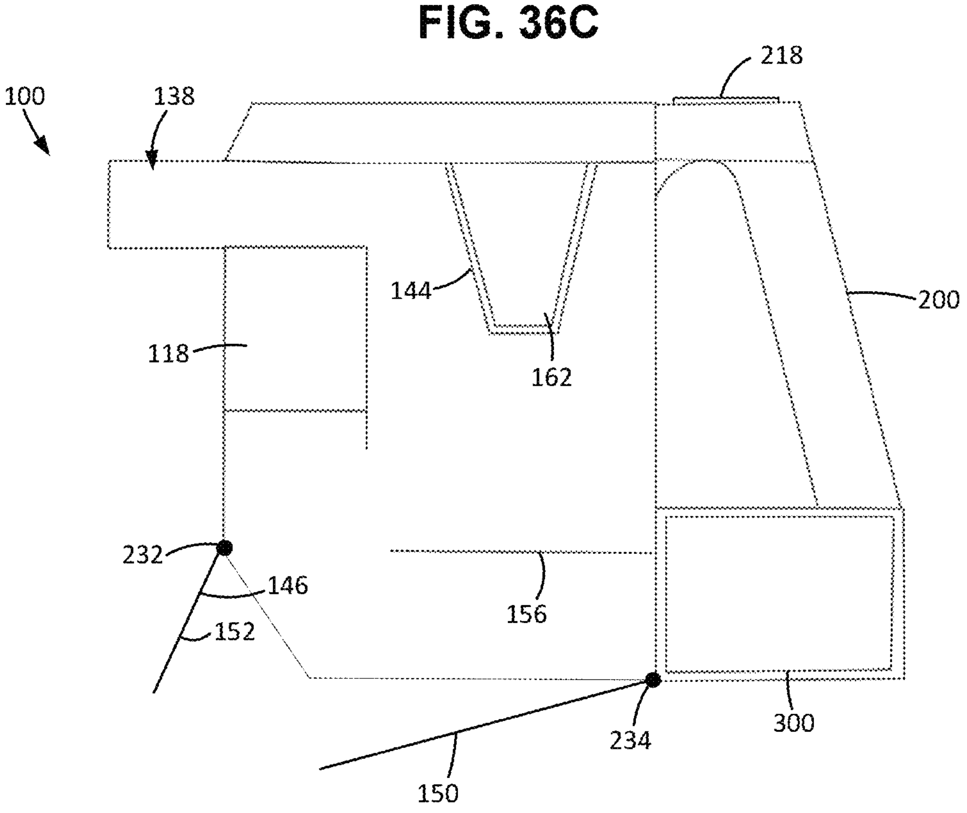
FIG. 36D is the hand vacuum cleaner of FIG. 36A with the openable portion and the openable door in open positions.
Figure 36E:
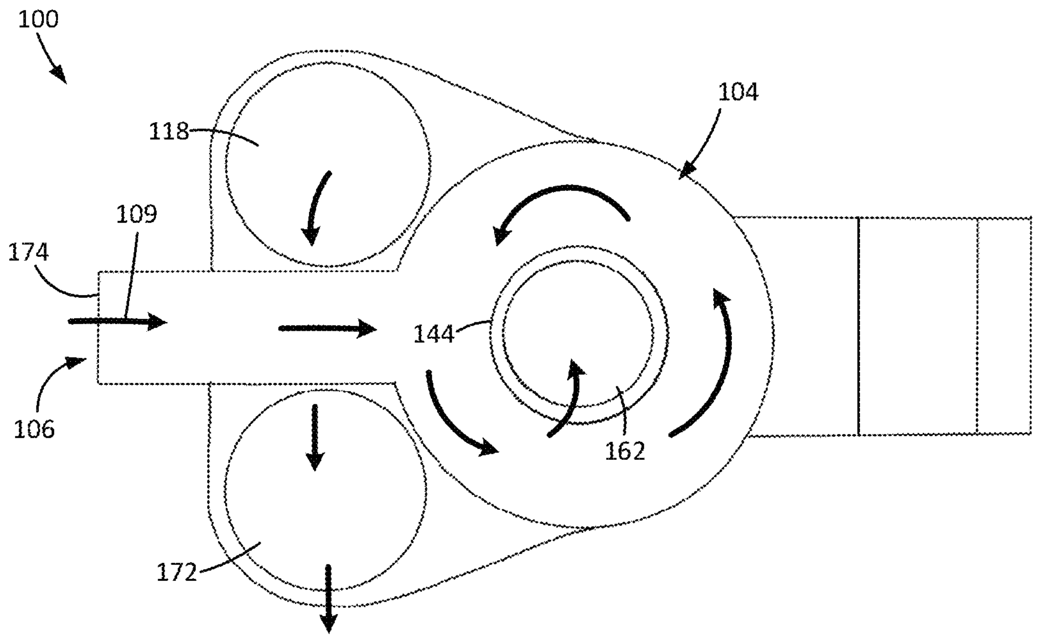
FIG. 36E is a top cross-sectional view of the hand vacuum cleaner of FIG. 36A.
Figure 37:
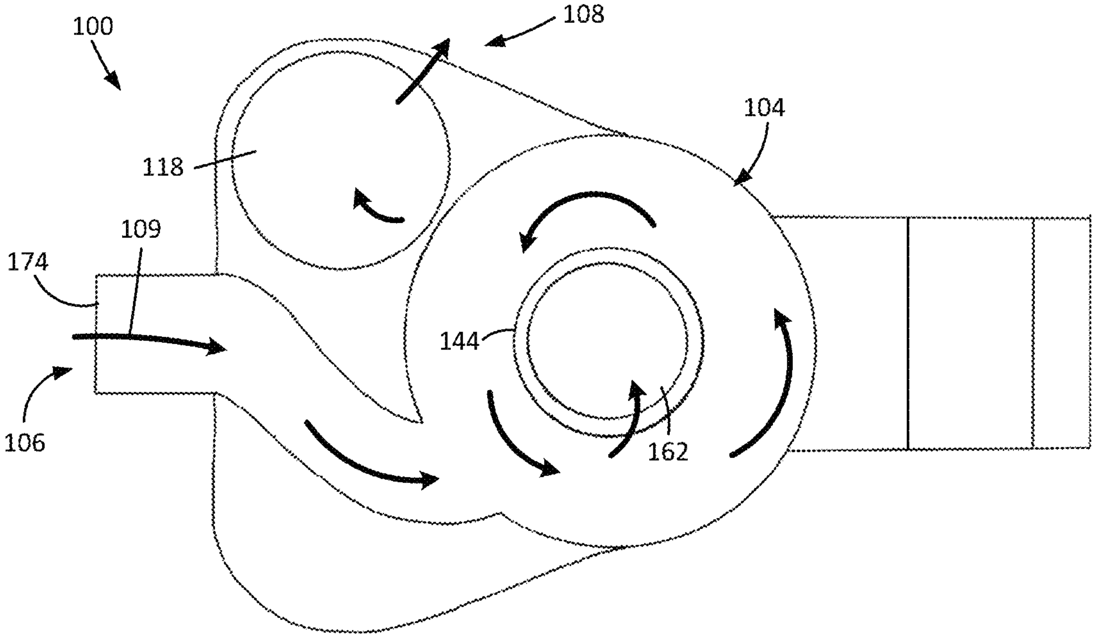
FIG. 37 is a top cross-sectional view of a hand vacuum cleaner.

In some embodiments, the pre-motor filter 162 may be nested within vortex finger 144 (i.e., within cyclone chamber 124) (e.g., FIGS. 18, 36A).

Position of Post-Motor Filter

A hand vacuum cleaner using any aspect discussed herein may have one or more post-motor filters 172 and, if so, the one or more post-motor filters 172 may be positioned at any location discussed herein. While the position of the one or more post-motor filters 172 with respect to other components is discussed separately with respect to each other component, it will be appreciated that any embodiment of a hand vacuum cleaner may utilize the positioning of the one or more post-motor filters 172 with respect to one or more of the other components discussed herein. Accordingly, the position of the one or more post-motor filters 172 discussed in this aspect may be used by itself or in combination with one or more of the handle, the position of the energy storage member packs, the air flow path, the position of the dirt collection area, the openable and removable portion, the tangential inlet with ramp, the air treatment assembly, the position of a motor and fan assembly, the position of a pre-motor filter, a telescoping inlet and a corner screen as disclosed herein.

Optional post-motor filter 172 may be positioned at any suitable location in surface cleaning apparatus 100, such as at or adjacent the clean air outlet. Some embodiments may include more than one post-motor filter 172.

In some embodiments, post-motor filter 172 is located towards rear end 112, rearward of the cyclone chamber 124 (e.g., FIG. 1B). Alternatively, post-motor filter 172 may be located towards front end 110, forward of the cyclone chamber 124 (e.g., FIG. 14).

The post-motor filter 172 may be located rearward of motor and fan assembly 118 (e.g., FIG. 1B). In other embodiments, the post-motor filter 172 may be located below motor and fan assembly 118 (e.g., FIG. 15A), or above motor and fan assembly 118 (e.g., FIG. 16A). In some embodiments, the post-motor filter may be an annular sector and at least partially surround motor and fan assembly 118 (e.g., FIGS. 49B, 85B).

Figure 64:
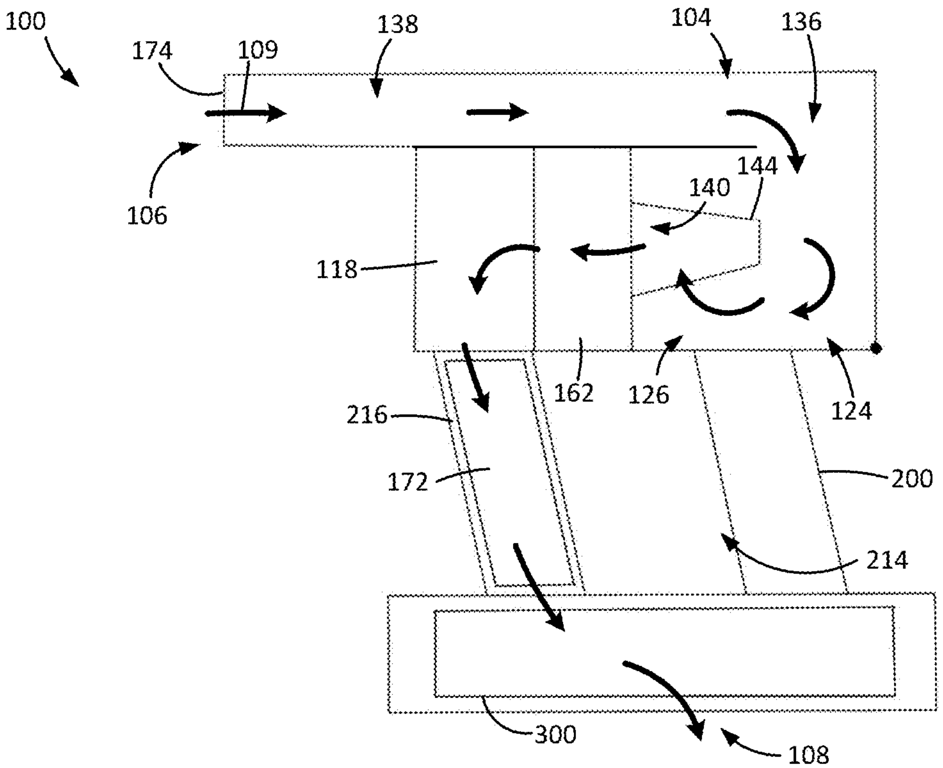
FIGS. 64-67 are side cross-sectional views of other example hand vacuum cleaners.

The post-motor filter 172 may be located above handle 200 (e.g., FIG. 1B). In other embodiments, the post-motor filter 172 may be located below handle 200 (e.g., FIG. 43A). In other embodiments, the post-motor filter 172 may be located within second handle end 206 (e.g., FIG. 62). In other embodiments, the post-motor filter 172 may be located within finger guard 216 (e.g., FIG. 64).

The post-motor filter 172 may be positioned above energy storage pack 300 (e.g., FIG. 1B). Alternatively, the post-motor filter 172 may be located forward of energy storage pack 300 (e.g., FIG. 2), or below energy storage pack 300 (e.g., FIG. 43A).

The post-motor filter 172 may be positioned above dirt collection area 126 (e.g., FIG. 14). In other embodiments, the post-motor filter 172 may be positioned rearward of dirt collection area 126 (e.g., FIG. 43A).

In some embodiments, the post-motor filter 172 may be positioned below inlet conduit 138.

Telescoping Inlet

Hand vacuum cleaner 100 can include a telescoping inlet. Various options for a telescoping inlet configuration and positioning are discussed. Any such telescoping inlet could be used by itself or in combination with one or more of the other aspects set out herein. Accordingly, the telescoping inlet discussed in this aspect may be used by itself or in combination with one or more of the handle, the position of the energy storage member packs, the air flow path, the position of the dirt collection area, the openable and removable portion, the tangential inlet with ramp, the air treatment assembly, the position of a motor and fan assembly, the position of a pre-motor filter, the one or more post-motor filters 172 and a corner screen as disclosed herein In accordance with this aspect, the inlet conduit 138, e.g. of a hand vacuum cleaner comprises a telescoping inlet. The telescoping inlet may comprise two or more telescoping sections. In other embodiments, the surface cleaning apparatus may only comprise first and second telescoping sections 326, 328. The second telescoping section 328 is slidably mounted with the first telescoping section 326. Accordingly, the second telescoping section 328 may be telescopically received in first telescoping section 326. Alternately, it will be appreciated that first telescoping section 326 may be telescopically receivable in second telescoping section 238.

Figure 70B:
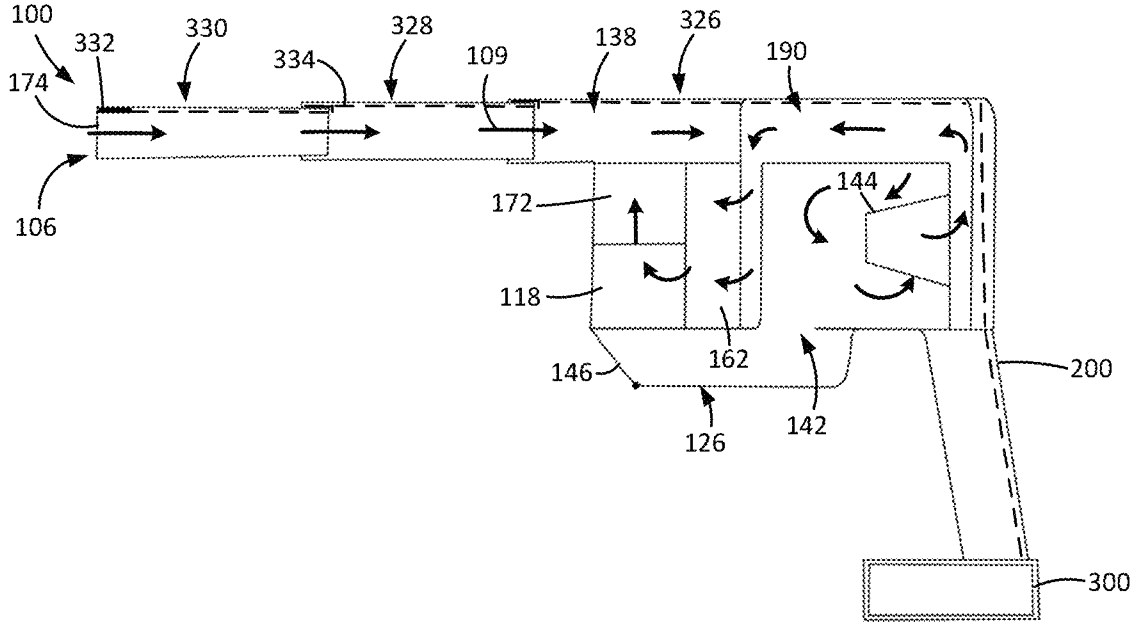

Alternately, the telescoping inlet may comprise a first telescoping section 326, a second telescoping section 328, and a third telescoping section 330 (e.g., FIG. 70B). As exemplified, the third telescoping section 330 is slidably mounted to the second telescoping section 328. Accordingly, the third telescoping section 330 may be telescopically received in the second telescoping section 328. Alternately, it will be appreciated that second telescoping section 328 may be telescopically receivable in third telescoping section 330. As exemplified in FIG. 70A, the third telescoping section 330 is slidingly received in the second telescoping section 328 which itself is slidingly received in the first telescoping section 326. Accordingly, in the retracted position exemplified in FIG. 70A, the length of the telescoping inlet is essentially the length of the first telescoping section 326.

It will be appreciated that the telescoping inlet may be permanently mounted to the hand vacuum cleaner. Accordingly, the first telescoping section 326 may be permanently mounted to the hand vacuum cleaner. The remaining telescoping sections may be permanently mounted as part of the telescoping inlet or one or more telescoping sections may be removably mounted thereto.

The first telescoping section 326 has a downstream outlet port, which may be the cyclone air inlet 136 or terminate at the inlet port of a tangential air inlet.

An inlet end (i.e., dirty air inlet 106) may comprise an electrical connector 332. In such a case, the telescoping inlet may include an electrically conductive component to connect the electrical connector 332 with a power source, e.g., an energy storage pack or household mains. Accordingly, each telescopically moveable section of the telescoping inlet may include an electrically conductive member (which may be provided in a channel) which transmits power along that telescoping section to the next telescoping section or to the electrical connector 332.

Figure 84:
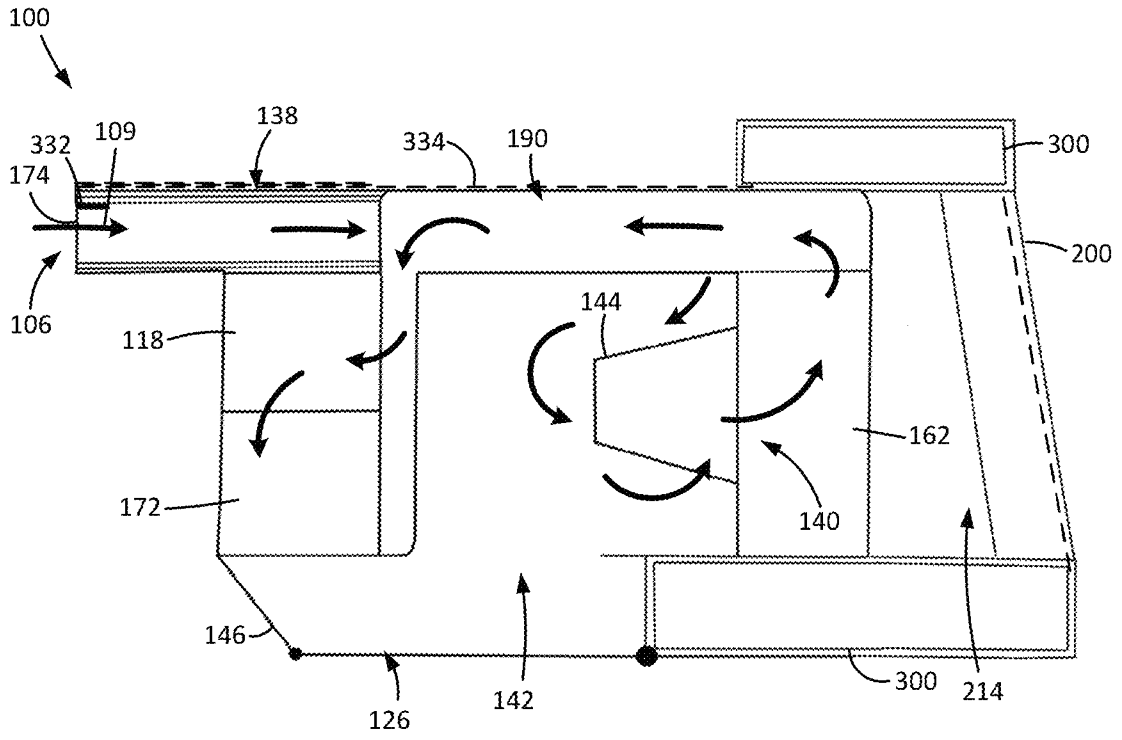

For example, the surface cleaning apparatus 100 may include at least one power cable 334. The power cable 334 may extend rearwardly from the electrical connector 332 with the retractable telescoping dirty air inlet 106 (e.g., as shown in FIG. 70A). In some embodiments, the power cable 332 may extend exterior to the retractable dirty air inlet 106 (e.g., as shown in FIG. 84). In other embodiments, the power cable 332 may extend interior to the retractable dirty air inlet 106 (e.g., as shown in FIG. 70A). In some embodiments, the power cable 334 may be provided on inner surfaces of the first, second, and third telescoping sections 326, 328, 330 (e.g., FIG. 70B). In other embodiments, the power cable 334 may be provided on outer surfaces of the first, second, and third telescoping sections 326, 328, 330 (e.g., FIG. 80).

In some embodiments, the third telescoping section 330 is disengagable from the second telescoping section 328. In some embodiments, the second telescoping section 328 is disengageable from the first telescoping section 326. Any suitable means for connecting and disengaging the telescoping sections may be used (e.g., twist locks, push buttons, clips, etc.).

If an electrical connector 332 is provided, then the connecting member which connects a telescoping section with another telescoping section may include an electrical connector. Accordingly, for example, third telescoping section 330 may have an electrical connector at a downstream end thereof that is electrically connectable with an electrical connector provided on the upstream end of the second telescoping section 328 whereby the third telescoping section 330 is electrically connected to the second telescoping section 328 when the third telescoping section 330 is connected in air flow communication with the second telescoping section 328.

Corner Screen

Hand vacuum cleaner 100 can screen to provide a collection area for finer dirt. Various options for the configuration and positioning of a corner screen are discussed. Any such corner screen could be used by itself or in combination with one or more of the other aspects set out herein. Accordingly, the telescoping inlet discussed in this aspect may be used by itself or in combination with one or more of the handle, the position of the energy storage member packs, the air flow path, the position of the dirt collection area, the openable and removable portion, the tangential inlet with ramp, the air treatment assembly, the position of a motor and fan assembly, the position of a pre-motor filter and the one or more post-motor filters 172 as disclosed herein In accordance with this aspect, the surface cleaning apparatus may include one or more corner screens 336 (see, e.g., FIGS. 87C-F). The corner screen may be located towards a corner of the dirt collection area 126. The corner screen 336 may be any type of screen or porous member which allows for dirt, e.g., finer dirt, to collect under the corner screen 336, in a corner of the dirt collection area 126. The corner screen 336 may be used to collect finer dirt within the dirt collection area 126.

In accordance with this aspect, an air treatment assembly may have a front wall, a rear wall and an air treatment assembly wall extending from the front wall to the rear wall. The air treatment assembly wall may comprise a lower wall portion. The openable portion of the air treatment assembly may be any portion of a wall of the air treatment assembly and may consist of or comprise all or a portion of the lower wall portion. As exemplified in FIG. 88B, the lower wall portion comprises a bottom wall and a portion of the bottom wall is openable.

Figure 56D:
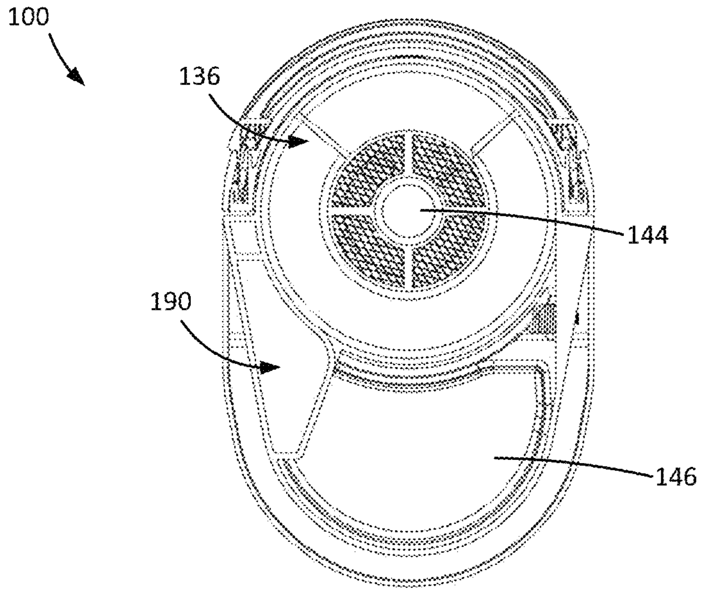
FIG. 56D is a rear cross-sectional view of the hand vacuum cleaner of FIG. 56A taken along the line D-D in FIG. 56A.
Figure 56E:
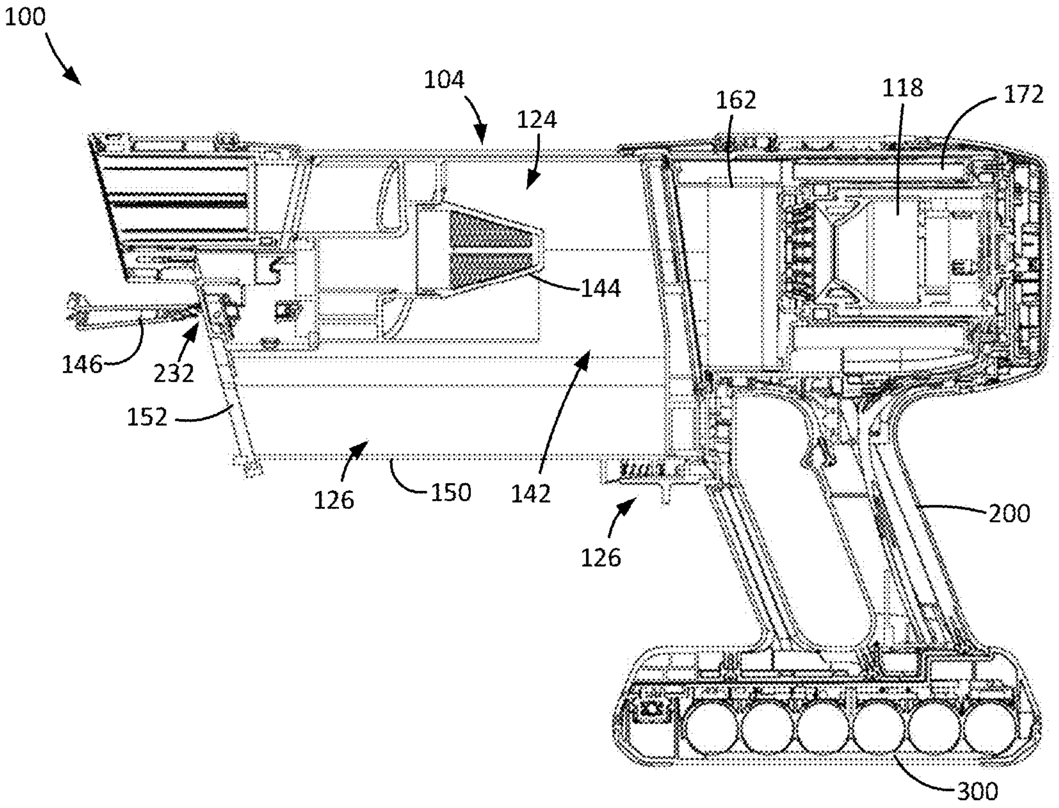
FIG. 56E is a side cross-sectional view of the hand vacuum cleaner of FIG. 56A taken along the line B-B in FIG. 56A with the openable door in an open position.

The air treatment assembly wall may be circular or, as exemplified in FIG. 56D, oval in a plane transverse to axis 117. Accordingly, the air treatment assembly wall may comprise an upper wall, a bottom wall and sidewalls extending, e.g., axially, from the front wall of the air treatment assembly to the rear wall of the air treatment assembly.

If the air treatment assembly comprises an air treatment chamber, e.g., a cyclone chamber, then the corner screen(s) may be provided in a dirt collection region of the air treatment chamber. Alternately, if the air treatment assembly comprises an air treatment chamber, e.g., a cyclone chamber, with an external dirt collection chamber, then the corner screen(s) may be provided in a dirt collection chamber. It will be appreciated that a corner screen may extending from one of the front and rear walls of the air treatment assembly (a front or rear wall of the dirt collection region of the dirt collection chamber) to the lower wall portion (e.g., a bottom wall), optionally adjacent the openable portion. For example, as exemplified in FIG. 87C, the lower end 336*a* of corner screen 336 is located adjacent hinge 234 and a front end of the openable portion. As exemplified in FIG. 88B, the lower end 336*a* of corner screen 336 is located adjacent a rear end of the openable portion.

The surface cleaning apparatus 100 may include one or more corner screens 336. As exemplified in FIG. 87C, the surface cleaning apparatus 100 may include one corner screen 336 positioned towards a front end of the dirt collection area 126. As exemplified in FIG. 88A, the surface cleaning apparatus 100 may include one corner screen 336 positioned towards a rear end of the dirt collection area 126. As exemplified in FIG. 89A, the surface cleaning apparatus 100 may include two corner screens 336, one positioned towards each of a front and rear end of the dirt collection area 126. As shown, the corner screen 336 may extend from the dirt collection bottom wall 150 to a dirt collection end wall (the front end wall and the rear end wall as exemplified).

All or a portion of the lower end 336*a* of the corner screen 336 may terminate prior to the dirt collection bottom wall 150. Accordingly, a gap or opening may be provided between the lower end 336*a* of the corner screen 336 and the dirt collection bottom wall 150. This gap or opening may enable dirt (e.g., finer dirt) that is collected in sub collection area A to be emptied, e.g., when the dirt collection bottom wall 150 is opened.

A closure member 338 may be moveable to open and close the gap or opening between the lower end 336*a* of the corner screen 336 and the dirt collection bottom wall 150. The closure member 338 may be a portion of the bottom wall 150, which may be moved away from (e.g., rotated away from) the corner screen 336 in order to provide access to the sub collection area A, which is below the corner screen 336 (e.g., to remove dirt below the corner screen 336). As exemplified, for example, in FIGS. 87C and 91A, the closure member 338 may be positioned between the lower end 336*a* of the corner screen 336 and the dirt collection bottom wall 150.

In some embodiments, the closure member 338 may be connected to the dirt collection hinge 234 or the openable portion of the dirt collection chamber (e.g., bottom wall 150) such that the closure member 338 may rotate about the dirt collection hinge 234 (e.g., FIG. 87D). The closure member 338 may rotate about the dirt collection hinge 234 along with an openable portion of the dirt collection bottom wall 150 (see, e.g., FIG. 87D). In other embodiments, the closure member 338 may be connected the openable portion of the dirt collection bottom wall 150, such that the dirt collection bottom wall 150 and the closure member 338 may rotate together about dirt collection hinge 234. In embodiments containing more than one corner screen 336, each closure member 338 may be connected to the dirt collection hinge 234 and/or the openable portion of the dirt collection bottom wall 150, such that the closure members 338 rotate together with the openable portion of the dirt collection bottom wall 150 (e.g., FIG. 89B). In other embodiments, at least a portion of the dirt collection walls 152 may rotate together with the corner screen openable portion(s) 338 and the dirt collection bottom wall 150 about dirt collection hinge 234 (e.g., FIG. 90B).

It will be appreciated that the entire surface of the corner screen may be porous (e.g., may of a screen material) or only a portion thereof may be porous and accordingly, the corner screen may be referred to as a porous member. For example, the corner screen may comprise an outer frame surrounding an open inner region with a porous material, e.g., a mesh screen, overlying the open inner region, Alternately, the corner screen may be an injection molded plastic substrate having a plurality of opening formed over part or all of the substrate.

It will also be appreciated that, as exemplified, the corner screen may be planar or it may be curved, kinked (e.g., two planar portions which meet at an angle), or the like.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

Clauses

Clause Set A

1. A hand vacuum cleaner comprising:
   - (a) an air flow path from a dirty air inlet, which is provided at a front end of the hand vacuum cleaner, to a clean air outlet, which is positioned rearward of the dirty air inlet;
   - (b) an air treatment assembly comprising an air treatment chamber, the air treatment chamber comprising a central longitudinal axis that extends centrally through the air treatment chamber from a front end of the air treatment chamber to a rear end of the air treatment chamber;
   - (c) a motor and fan assembly; and,
   - (d) in operation, an energy storage member housing comprising an energy storage member, wherein the motor and fan assembly is provided at one of the front end and rear end of the air treatment assembly, and the energy storage member is provided at the other of the front end and rear end of the air treatment assembly.
2. The hand vacuum cleaner of clause 1 wherein the motor and fan assembly is provided at the front end of the hand vacuum cleaner and the energy storage member is provided at a rear end of the hand vacuum cleaner.

3. The hand vacuum cleaner of clause 2 wherein the dirty air inlet comprises a conduit that extends from an inlet port of the dirty air inlet to the air treatment assembly and a plane that is transverse to the central longitudinal axis extends through the conduit and the motor and fan assembly.
4. The hand vacuum cleaner of clause 3 further comprising a filter provided at the front end of the hand vacuum cleaner.
5. The hand vacuum cleaner of clause 4 wherein the plane also extends through the filter.
6. The hand vacuum cleaner of clause 1 wherein the motor and fan assembly is provided forward of the front end of the air treatment chamber.
7. The hand vacuum cleaner of clause 2 wherein the air flow path comprises a downstream portion that extends from the suction motor to the clean air outlet and the downstream portion comprises a passage that extends from the front end of the air treatment chamber to the rear end of the air treatment chamber.
8. The hand vacuum cleaner of clause 7 wherein the passage extends through the air treatment chamber.
9. The hand vacuum cleaner of clause 7 wherein the passage extends axially exterior to the air treatment chamber.
10. The hand vacuum cleaner of clause 2 wherein the air treatment chamber comprises an air treatment chamber air inlet and an air treatment chamber air outlet, and the air treatment chamber air outlet faces the motor and fan assembly.
11. The hand vacuum cleaner of clause 10 further comprising a handle provided on a lower side of the hand vacuum cleaner, and wherein the air treatment assembly comprises a stationary portion and an openable portion, the openable portion is provided on the lower side of the hand vacuum cleaner, the openable portion is moveable between an open position in which the air treatment assembly is opened and a closed position in which the hand vacuum cleaner is operable to clean a surface.
12. The hand vacuum cleaner of clause 11 wherein the openable portion is rotationally mounted to the lower end of the hand vacuum cleaner and the openable portion is generally U-shaped in a plane that is transverse to the central longitudinal axis.
13. The hand vacuum cleaner of clause 2 further comprising a pistol grip handle extending outwardly from a sidewall of the hand vacuum cleaner.
14. The hand vacuum cleaner of clause 2 further comprising a pistol grip handle provided at a rear end of the hand vacuum cleaner, the pistol grip handle has a pistol grip portion having a pistol grip axis extending through the pistol grip portion from a lower end of the pistol grip portion to an upper end of the pistol grip portion, and the pistol grip axis extends through the energy storage member housing.
15. The hand vacuum cleaner of clause 1 wherein the energy storage member is provided at the front end of the hand vacuum cleaner and the motor and fan assembly is provided at a rear end of the hand vacuum cleaner.
16. The hand vacuum cleaner of clause 15 wherein the dirty air inlet comprises a conduit that extends from an inlet port of the dirty air inlet to the air treatment chamber and a plane that is transverse to the central longitudinal axis extends through the conduit and the energy storage member.
17. The hand vacuum cleaner of clause 16 wherein the energy storage member is provided forward of the front end of the air treatment chamber.
18. The hand vacuum cleaner of clause 15 wherein the air treatment chamber comprises an air treatment chamber air inlet and an air treatment chamber air outlet, and the air treatment chamber air outlet faces the motor and fan assembly.
19. The hand vacuum cleaner of clause 15 further comprising a handle provided on a lower side of the hand vacuum cleaner, and wherein the air treatment assembly comprises a stationary portion and an openable portion, the openable portion is provided on the lower side of the hand vacuum cleaner, the openable portion is moveable between an open position in which the air treatment assembly is opened and a closed position in which the hand vacuum cleaner is operable to clean a surface.
20. The hand vacuum cleaner of clause 19 wherein the openable portion is rotationally mounted to the lower end of the hand vacuum cleaner and the openable portion is generally U-shaped in a plane that is transverse to the central longitudinal axis.
21. The hand vacuum cleaner of clause 18 further comprising a pistol grip handle extending outwardly from a sidewall of the hand vacuum cleaner.

Clause Set B

1. A hand vacuum cleaner comprising:
(a) an air flow path from a dirty air inlet, which is provided at a front end of the hand vacuum cleaner, to a clean air outlet, which is positioned rearward of the dirty air inlet, wherein a hand vacuum cleaner axis extends rearwardly from the front end of the hand vacuum cleaner to a rear end of the hand vacuum cleaner;
(b) a cyclone assembly comprising a cyclone chamber having a cyclone air inlet, a cyclone air outlet and a cyclone axis of rotation, wherein the cyclone axis of rotation extends generally transverse to the hand vacuum cleaner axis;
(c) a motor and fan assembly provided in a motor housing, the motor and fan assembly having a motor axis of rotation; and,
(d) a handle,
wherein the cyclone assembly has an openable portion which is moveable between an open position in which the cyclone assembly is opened and a closed position in which the hand vacuum cleaner is operable to clean a surface, and the openable portion comprises at least a portion of a front wall of the cyclone assembly.
2. The hand vacuum cleaner of clause 1 wherein the cyclone assembly further comprises a dirt collection chamber that is exterior to the cyclone chamber and is in communication with the cyclone chamber through a dirt outlet of the cyclone chamber, wherein the front wall of the cyclone assembly comprises a front wall of the dirt collection chamber and, when the openable portion is in the open position, a front end of the dirt collection chamber is opened.
3. The hand vacuum cleaner of clause 2 wherein, when the openable portion is in the open position, a lower end of the dirt collection chamber is also opened.
4. The hand vacuum cleaner of clause 2 wherein the cyclone air inlet is provided at an upper end of the cyclone chamber, the cyclone chamber has a lower wall, the dirt outlet is provided at a lower end of the cyclone chamber and the lower wall is moveably mounted between an open position in which the cyclone chamber is opened and a closed position in which the hand vacuum cleaner is operable to clean a surface wherein the lower wall moves concurrently with the openable portion.

5. The hand vacuum cleaner of clause 4 wherein a rear end of the lower wall has a lower wall rotational mount.

6. The hand vacuum cleaner of clause 5 wherein a rear end of the openable portion has an openable portion rotational mount.

7. The hand vacuum cleaner of clause 4 wherein a front end of the lower wall has a lower wall rotational mount.

8. The hand vacuum cleaner of clause 7 wherein the openable portion also comprises at least a portion of a front wall of the cyclone chamber.

9. The hand vacuum cleaner of clause 7 wherein a front end of the openable portion has an openable portion rotational mount.

10. The hand vacuum cleaner of clause 8 wherein a front end of the openable portion has an openable portion rotational mount.

11. The hand vacuum cleaner of clause 1 wherein the front wall of the cyclone assembly has an openable door which is moveable between an open position in which the cyclone assembly is opened and a closed position in which the hand vacuum cleaner is operable.

12. The hand vacuum cleaner of clause 11 wherein the openable door is part of the openable portion and, when the openable portion moves to the open position, the openable door moves as a unit with the openable portion while the openable door is in its closed position.

13. The hand vacuum cleaner of clause 1 further comprising a pistol grip handle provided at a rear end of the hand vacuum cleaner wherein a finger grip area is provided rearward of the cyclone assembly and forward of the pistol grip handle.

14. The hand vacuum cleaner of clause 13 further comprising a pre-motor filter provided rearward of the cyclone chamber and forward of the pistol grip handle.

15. The hand vacuum cleaner of clause 13 wherein, in operation, an energy storage member housing is provided at a lower end of the pistol grip handle.

16. The hand vacuum cleaner of clause 15 wherein, the motor and fan assembly is provided rearward of the cyclone assembly and forward of the energy storage member housing whereby a line, which extends in a common direction with the hand vacuum cleaner axis, extends through the cyclone assembly, the motor and fan assembly and the energy storage member housing.

17. The hand vacuum cleaner of clause 16 wherein the motor axis of rotation extends generally transverse to the hand vacuum cleaner axis.

18. The hand vacuum cleaner of clause 1 wherein the motor axis of rotation extends generally transverse to the hand vacuum cleaner axis.

19. The hand vacuum cleaner of clause 1 further comprising a pre-motor filter housing which is provided rearward of the cyclone chamber and the motor axis of rotation extends through the pre-motor filter housing.

20. The hand vacuum cleaner of clause 1 further comprising a pistol grip handle provided at a rear end of the hand vacuum cleaner, wherein, in operation, an energy storage member housing is provided at a lower end of the pistol grip handle and a line, which extends in a common direction with the hand vacuum cleaner axis, extends through the motor and fan assembly and the energy storage member housing, and wherein the hand vacuum cleaner has a lower wall on which the hand vacuum cleaner stands when the hand vacuum cleaner is placed on a horizontal surface and the lower wall comprises a lower wall of the motor assembly housing and a lower wall of the energy storage member housing.

Clause Set C

1. A hand vacuum cleaner comprising:

(a) an air flow path from a dirty air inlet, which is provided at a front end of the hand vacuum cleaner, to a clean air outlet, which is positioned rearward of the dirty air inlet, wherein a hand vacuum cleaner axis extends centrally from the front end of the hand vacuum cleaner rearwardly to a rear end of the hand vacuum cleaner;

(b) a cyclone assembly comprising a cyclone chamber having an upper end, a lower end, a cyclone chamber sidewall extending between the upper and lower ends of the cyclone chamber, a cyclone air inlet, a cyclone air outlet provided at the upper end of the cyclone chamber and a cyclone axis of rotation, wherein the cyclone axis of rotation extends generally transverse to the hand vacuum cleaner axis, wherein the cyclone air outlet comprises a downstream cyclone air outlet portion that extends generally rearwardly and wherein the cyclone air inlet comprises an outlet port through which, in operation, air passes as the air enters the cyclone chamber;

(c) a motor and fan assembly provided in a motor housing, the motor and fan assembly having a motor axis of rotation; and, (d) a handle, wherein the dirty air inlet comprises an inlet port, the air flow path comprises an inlet segment extending from the dirty air inlet to the cyclone air inlet, and a rearward projection of the inlet port intersects the cyclone air outlet, and wherein the outlet port of the cyclone air inlet is located below the downstream cyclone air outlet portion.

2. The hand vacuum cleaner of clause 1 wherein at least a portion of the inlet segment of the air flow path extends downwardly and rearwardly.

3. The hand vacuum cleaner of clause 1 wherein the cyclone air inlet is a tangential air inlet and the tangential air inlet is provided below the downstream cyclone air outlet portion.

4. The hand vacuum cleaner of clause 3 wherein at least a portion of the inlet segment of the air flow path extends downwardly and rearwardly to the tangential air inlet.

5. The hand vacuum cleaner of clause 4 wherein an upstream portion of the inlet segment of the air flow path has a conduit axis that extends in a common direction to the hand vacuum cleaner axis and wherein a downstream portion of the inlet segment of the air flow path extends downwardly and rearwardly to the tangential air inlet.

6. The hand vacuum cleaner of clause 1 wherein the cyclone air outlet comprises a vortex finder that is positioned within the cyclone chamber and the downstream cyclone air outlet portion extends rearwardly from an outlet end of the vortex finder, and at least a portion of the downstream cyclone air outlet portion is positioned below the upper end of the cyclone chamber.

7. The hand vacuum cleaner of clause 6 wherein the downstream cyclone air outlet portion is positioned in the cyclone chamber.

8. The hand vacuum cleaner of clause 6 wherein the rearward projection of the inlet port intersects the vortex finder and the downstream cyclone air outlet portion.
9. The hand vacuum cleaner of clause 1 further comprising a pre-motor filter and the rearward projection of the inlet port also intersects the pre-motor filter.
10. The hand vacuum cleaner of clause 9 wherein the rearward projection of the inlet port also intersects the motor and fan assembly.
11. The hand vacuum cleaner of clause 9 wherein the rearward projection of the inlet port also intersects a post-motor filter.
12. The hand vacuum cleaner of clause 11 wherein the rearward projection of the inlet port also intersects the motor and fan assembly.
13. The hand vacuum cleaner of clause 1 wherein at least a portion of the inlet segment extends laterally.
14. The hand vacuum cleaner of clause 1 wherein at least a portion of the inlet segment of the air flow path extends concurrently laterally and also downwardly and rearwardly.
15. The hand vacuum cleaner of clause 1 wherein the downstream cyclone air outlet portion is centrally located between opposed lateral sides of the hand vacuum cleaner and the downstream cyclone air outlet portion extends axially rearwardly.
16. The hand vacuum cleaner of clause 1 wherein the cyclone axis of rotation extends in a vertical plane and the vertical plane intersects the dirty air inlet, the vortex finder and the downstream portion.
17. The hand vacuum cleaner of clause 16 wherein the vertical plane also intersects the cyclone air inlet.
18. The hand vacuum cleaner of clause 1 wherein the cyclone axis of rotation extends in a vertical plane and the vertical plane intersects the dirty air inlet, cyclone air inlet and the vortex finder.
19. The hand vacuum cleaner of clause 1 wherein the cyclone air inlet comprises a first tangential inlet and a second tangential inlet, an upper end of the second tangential inlet is below a lower end of the first tangential inlet.
20. The hand vacuum cleaner of clause 19 wherein a first portion of the inlet segment of the air flow path extends downwardly and rearwardly to the first tangential inlet, a second portion of the inlet segment of the air flow path extends downwardly and rearwardly to second first tangential inlet, and the second position extends downwardly at a greater angle than the first portion.

Clause Set D

1. A hand vacuum cleaner comprising:
(a) an air flow path from a dirty air inlet, which is provided at a front end of the hand vacuum cleaner, to a clean air outlet, which is positioned rearward of the dirty air inlet, wherein a hand vacuum cleaner axis extends centrally from the front end of the hand vacuum cleaner rearwardly to a rear end of the hand vacuum cleaner;
(b) a cyclone assembly comprising a cyclone chamber having an upper end, a lower end, a cyclone chamber sidewall extending between the upper and lower ends of the cyclone chamber, a cyclone air inlet, a cyclone air outlet, and a cyclone axis of rotation, wherein the cyclone axis of rotation extends generally transverse to the hand vacuum cleaner axis;
(c) a motor and fan assembly provided in a motor housing, the motor and fan assembly having a motor axis of rotation; and,
(d) a handle positioned rearward of the cyclone assembly wherein a finger gap is provided forward of the handle and rearward of the motor and fan assembly.
2. The hand vacuum cleaner of clause 1 wherein an upper line that extends in a common horizontal direction with the hand vacuum cleaner axis extends through the cyclone chamber and the motor and fan assembly.
3. The hand vacuum cleaner of clause 2 further comprising, in operation, an energy storage member provided at a lower end of the handle.
4. The hand vacuum cleaner of clause 1 wherein the handle comprises a pistol grip portion.
5. The hand vacuum cleaner of clause 2 wherein the upper line also extends through the pistol grip portion.
6. The hand vacuum cleaner of clause 5 further comprising, in operation, an energy storage member provided at a lower end of the handle.
7. The hand vacuum cleaner of clause 1 further comprising, in operation, an energy storage member provided at a lower end of the handle.
8. The hand vacuum cleaner of clause 5 wherein the cyclone assembly further comprises a dirt collection chamber exterior to the cyclone chamber wherein, in operation, dirt separated from air in the cyclone chamber enters the dirt collection chamber through a dirt outlet of the cyclone chamber and, when the hand vacuum cleaner is oriented with the dirty air inlet forward of the handle and the cyclone axis of rotation extending vertically, the motor and fan assembly is positioned overlying the dirt collection chamber.
9. The hand vacuum cleaner of clause 8 wherein a lower line that extends in a common horizontal direction with the hand vacuum cleaner axis extends through the dirt collection chamber and the energy storage member.
10. The hand vacuum cleaner of clause 5 wherein the cyclone assembly further comprises a dirt collection chamber exterior to the cyclone chamber wherein, in operation, dirt separated from air in the cyclone chamber enters the dirt collection chamber through a dirt outlet of the cyclone chamber and, when the hand vacuum cleaner is oriented with the dirty air inlet forward of the handle and the cyclone axis of rotation extending vertically, the motor axis of rotation intersects the dirt collection chamber.
11. The hand vacuum cleaner of clause 10 wherein a lower line that extends in a common horizontal direction with the hand vacuum cleaner axis extends through the dirt collection chamber and the energy storage member.
12. The hand vacuum cleaner of clause 1 wherein the cyclone assembly further comprises a dirt collection chamber exterior to the cyclone chamber wherein, in operation, dirt separated from air in the cyclone chamber enters the dirt collection chamber through a dirt outlet of the cyclone chamber.
13. The hand vacuum cleaner of clause 12 wherein the cyclone air outlet is provided at the upper end of the cyclone chamber and the dirt outlet is provided at the lower end of the cyclone chamber.
14. The hand vacuum cleaner of clause 12 wherein a medial line that extends in a common horizontal direction with the hand vacuum cleaner axis extends through the cyclone chamber and the dirt collection chamber.

15. The hand vacuum cleaner of clause 14 wherein, when the hand vacuum cleaner is oriented with the dirty air inlet forward of the handle and the cyclone axis of rotation extending vertically, the motor and fan assembly is positioned overlying the dirt collection chamber.

16. The hand vacuum cleaner of clause 12 wherein, when the hand vacuum cleaner is oriented with the dirty air inlet forward of the handle and the cyclone axis of rotation extending vertically, the motor axis of rotation intersects the dirt collection chamber.

17. The hand vacuum cleaner of clause 16 wherein a medial line that extends in a common horizontal direction with the hand vacuum cleaner axis extends through the cyclone chamber and the dirt collection chamber.

18. The hand vacuum cleaner of clause 1 wherein the cyclone assembly further comprises a dirt collection chamber exterior to the cyclone chamber wherein, in operation, dirt separated from air in the cyclone chamber enters the dirt collection chamber through a dirt outlet of the cyclone chamber and, when the hand vacuum cleaner is oriented with the dirty air inlet forward of the handle and the cyclone axis of rotation extending vertically, the first portion of the dirt collection chamber underlies the cyclone chamber and a second portion of the dirt collection chamber is positioned rearward of the cyclone chamber.

19. The hand vacuum cleaner of clause 18, wherein, when the hand vacuum cleaner is oriented with the dirty air inlet forward of the handle and the cyclone axis of rotation extending vertically, a medial line that extends in a common horizontal direction with the hand vacuum cleaner axis extends through the cyclone chamber and a third portion of the dirt collection chamber which overlies the second portion of the dirt collection chamber.

20. The hand vacuum cleaner of clause 19 wherein an upper line that extends in a common horizontal direction with the hand vacuum cleaner axis extends through the cyclone chamber and the motor and fan assembly.

Clause Set E

1. A hand vacuum cleaner comprising:

(a) an air flow path from a dirty air inlet, which is provided at a front end of the hand vacuum cleaner, to a clean air outlet, which is positioned rearward of the dirty air inlet, wherein a hand vacuum cleaner axis extends centrally from the front end of the hand vacuum cleaner rearwardly to a rear end of the hand vacuum cleaner;

(b) a cyclone assembly comprising a cyclone chamber and a dirt collection chamber exterior to the cyclone chamber, the cyclone chamber having an upper end, a lower end, a cyclone chamber sidewall extending between the upper and lower ends of the cyclone chamber, a cyclone air inlet, a cyclone air outlet, a dirt outlet and a cyclone axis of rotation wherein, in operation, dirt separated from air in the cyclone chamber enters the dirt collection chamber through a dirt outlet of the cyclone chamber, and wherein the cyclone axis of rotation extends generally transverse to the hand vacuum cleaner axis and;

(c) a motor and fan assembly provided in a motor housing, the motor and fan assembly having a motor axis of rotation; and, (d) a handle wherein a line that extends in a common horizontal direction with the hand vacuum cleaner axis extends through the cyclone chamber and the dirt collection chamber, and wherein the cyclone assembly has a front wall and a rear wall, the cyclone assembly has a first openable portion which is moveable between an open position in which the cyclone assembly is opened and a closed position in which the hand vacuum cleaner is operable to clean a surface, and the openable portion comprises at least a portion of one of the front wall and the rear wall of the cyclone assembly.

2. The hand vacuum cleaner of clause 1 wherein the cyclone assembly has a second openable portion which is moveable between an open position in which the cyclone assembly is opened and a closed position in which the hand vacuum cleaner is operable to clean a surface, and the second portion also opens at least a portion of a lower end of the cyclone assembly.

3. The hand vacuum cleaner of clause 1 wherein the first and second openable portions are openable concurrently.

4. The hand vacuum cleaner of clause 3 wherein the first openable portion is openable while the second openable portion is in its closed position.

5. The hand vacuum cleaner of clause 2 wherein, when the hand vacuum cleaner is oriented with the dirty air inlet forward of the handle and the cyclone axis of rotation extending vertically, at least a portion of the dirt collection chamber is provided forward of the cyclone chamber and the first openable portion comprises at least a portion of the front wall of the cyclone assembly.

6. The hand vacuum cleaner of clause 5 wherein the first openable portion is rotationally mounted to a remainder of the hand vacuum cleaner at a front end of the cyclone assembly.

7. The hand vacuum cleaner of clause 6 wherein the second openable portion is rotationally mounted to the remainder of the hand vacuum cleaner at the front end of the cyclone assembly.

8. The hand vacuum cleaner of clause 6 wherein the second openable portion is rotationally mounted to the remainder of the hand vacuum cleaner at a rear end of the cyclone assembly.

9. The hand vacuum cleaner of clause 2 wherein, when the hand vacuum cleaner is oriented with the dirty air inlet forward of the handle and the cyclone axis of rotation extending vertically, at least a portion of the dirt collection chamber is provided rearward of the cyclone chamber and the first openable portion comprises at least a portion of the rear wall of the cyclone assembly.

10. The hand vacuum cleaner of clause 9 wherein the first openable portion is rotationally mounted to a remainder of the hand vacuum cleaner at a rear end of the cyclone assembly.

11. The hand vacuum cleaner of clause 10 wherein the second openable portion is rotationally mounted to the remainder of the hand vacuum cleaner at a front end of the cyclone assembly.

12. The hand vacuum cleaner of clause 10 wherein the second openable portion is rotationally mounted to the remainder of the hand vacuum cleaner at the rear end of the cyclone assembly.

13. The hand vacuum cleaner of clause 1 wherein the dirt collection chamber comprises a first portion that underlies the cyclone chamber, a second portion that is forward of the cyclone chamber and a third portion that is axially spaced from the cyclone chamber overlies the second portion of the dirt collection chamber.

14. The hand vacuum cleaner of clause 13 wherein the first openable portion opens only the dirt collection chamber.

15. The hand vacuum cleaner of clause 13 wherein a line that extends in a common horizontal direction with the hand vacuum cleaner axis is positioned at the lower end of the cyclone chamber and, when the hand vacuum cleaner is oriented with the dirty air inlet forward of the handle and the cyclone axis of rotation extending vertically, the first openable portion is positioned below the line.

16. The hand vacuum cleaner of clause 15 wherein the cyclone assembly has a second openable portion which is moveable between an open position in which the cyclone assembly is opened and a closed position in which the hand vacuum cleaner is operable to clean a surface, and the second portion also opens the dirt collection chamber and the cyclone chamber.

17. The hand vacuum cleaner of clause 13 wherein the cyclone assembly has a second openable portion which is moveable between an open position in which the cyclone assembly is opened and a closed position in which the hand vacuum cleaner is operable to clean a surface, and the second portion also opens the dirt collection chamber and the cyclone chamber.

Clause Set F

1. A hand vacuum cleaner comprising:

(a) an air flow path from a dirty air inlet, which is provided at a front end of the hand vacuum cleaner, to a clean air outlet, which is positioned rearward of the dirty air inlet;

(b) an air treatment assembly comprising an air treatment chamber, the air treatment chamber comprising an air treatment chamber air inlet, an air treatment chamber air outlet provided at a front end of the air treatment chamber and a central longitudinal axis that extends centrally through the air treatment chamber from a front end of the air treatment chamber to a rear end of the air treatment chamber;

(c) a main body housing a motor and fan assembly; and, (d) a handle provided on the main body, wherein, in operation, the handle is a driving handle of the hand vacuum cleaner.

2. The hand vacuum cleaner of clause 1 wherein the motor and fan assembly is provided at a rear end of the hand vacuum cleaner.

3. The hand vacuum cleaner of clause 1 further comprising a filter provided at the front end of the hand vacuum cleaner.

4. The hand vacuum cleaner of clause 1 wherein the air flow path comprises a downstream portion that extends from the air treatment chamber air outlet to the clean air outlet and the downstream portion comprises a passage that extends from the front end of the air treatment chamber to the rear end of the air treatment chamber.

5. The hand vacuum cleaner of clause 4 wherein the passage extends through the air treatment chamber.

6. The hand vacuum cleaner of clause 4 wherein the passage extends axially exterior to the air treatment chamber.

7. The hand vacuum cleaner of clause 4 wherein the motor and fan assembly is provided at a rear end of the hand vacuum cleaner and the motor and fan assembly is provided in the downstream portion of the air flow passage.

8. The hand vacuum cleaner of clause 1 wherein the air treatment chamber air outlet faces forwardly.

9. The hand vacuum cleaner of clause 1 wherein the air treatment assembly further comprises a dirt collection chamber wherein, in operation, dirt separated from air in the air treatment chamber enters the dirt collection chamber through a dirt outlet of the air treatment chamber.

10. The hand vacuum cleaner of clause 9 further comprising a handle provided on a lower side of the main body, and wherein the air treatment assembly comprises a stationary portion and an openable portion, the openable portion is provided on the lower side of the hand vacuum cleaner, the openable portion is moveable between an open position in which the air treatment assembly is opened and a closed position in which the hand vacuum cleaner is operable to clean a surface.

11. The hand vacuum cleaner of clause 10 wherein the openable portion is rotationally mounted to the lower end of the hand vacuum cleaner and the openable portion is generally U-shaped in a plane that is transverse to the central longitudinal axis.

12. The hand vacuum cleaner of clause 10 wherein a front wall of the air treatment assembly has an openable door which is moveable between an open position in which the air treatment assembly is opened and a closed position in which the hand vacuum cleaner is operable to clean a surface.

13. The hand vacuum cleaner of clause 12 wherein the openable door is part of the openable portion and, when the openable portion moves to the open position, the openable door moves as a unit with the openable portion while the openable door is in its closed position and the openable door is moveable while the openable portion remains in its closed position.

14. The hand vacuum cleaner of clause 9 wherein the air treatment assembly comprises a sidewall extending from the front end of the air treatment assembly to a rear end of the air treatment assembly, the air treatment assembly comprises a stationary portion and an openable portion, the openable portion comprises a portion of the sidewall, wherein the openable portion is moveably mounted between an open position in which the air treatment chamber and the dirt collection chamber are opened and a closed position in which the hand vacuum cleaner is operable to clean a surface.

15. The hand vacuum cleaner of clause 14 wherein the openable portion is generally U-shaped in a plane that is transverse to the central longitudinal axis.

16. The hand vacuum cleaner of clause 14 wherein a front wall of the air treatment assembly has an openable door which is moveable between an open position in which the air treatment assembly is opened and a closed position in which the hand vacuum cleaner is operable to clean a surface.

17. The hand vacuum cleaner of clause 16 wherein the openable door is part of the openable portion and, when the openable portion moves to the open position, the openable door moves as a unit with the openable portion while the openable door is in its closed position the openable door is moveable while the openable portion remains in its closed position.

18. The hand vacuum cleaner of clause 1 further comprising a pre-motor filter provided at the front end of the air treatment assembly, and wherein a front wall of the air treatment assembly has an openable door which is moveable between an open position in which the air treatment assembly is opened and a closed position in which the hand vacuum cleaner is operable to clean a surface and the pre-motor filter is provided in the openable portion.

19. The hand vacuum cleaner of clause 1 wherein the air treatment chamber comprises a cyclone chamber, the central longitudinal axis is a cyclone axis of rotation, the air treatment chamber air inlet is a cyclone air inlet and the air treatment chamber air outlet is a cyclone air outlet.

20. The hand vacuum cleaner of clause 19 wherein the cyclone air inlet has an outlet port that is centrally located between a front end and a rear end of the cyclone chamber.

21. The hand vacuum cleaner of clause 19 wherein the cyclone air outlet comprises a first vortex finder and a second vortex finder is provided at a rear end of the cyclone chamber.

22. The hand vacuum cleaner of clause 19 wherein an air impermeable wall is provided overlying the cyclone air outlet, the air impermeable wall extends generally transverse to the cyclone axis of rotation.

Clause Set G

1. A hand vacuum cleaner comprising:

(a) an air flow path from a dirty air inlet, which is provided at a front end of the hand vacuum cleaner, to a clean air outlet, which is positioned rearward of the dirty air inlet;

(b) an air treatment assembly comprising an air treatment chamber, the air treatment chamber comprising an air treatment chamber air inlet, an air treatment chamber air outlet and a central longitudinal axis that extends centrally through the air treatment chamber from a front end of the air treatment chamber to a rear end of the air treatment chamber;

(c) a motor and fan assembly; and, (d) a handle, wherein the air treatment assembly is provided at a rear end of the hand vacuum cleaner and a rear end of the air treatment chamber is openable.

2. The hand vacuum cleaner of clause 1 wherein the handle has an upper end provided on a sidewall of the hand vacuum cleaner and the handle extends outwardly from the sidewall.

3. The hand vacuum cleaner of clause 2 wherein the handle is a pistol grip handle.

4. The hand vacuum cleaner of clause 2 wherein the handle has a lower end that is spaced from the upper end of the handle and a least one of the motor and fan assembly and an energy storage member is provided at the lower end of the handle.

5. The hand vacuum cleaner of clause 2 wherein the motor and fan assembly and the energy storage member are provided at the lower end of the handle.

6. The hand vacuum cleaner of clause 2 further comprising a finger guard provided forward of the handle.

7. The hand vacuum cleaner of clause 6 wherein a portion of the air flow path extends through the finger guard.

8. The hand vacuum cleaner of clause 7 wherein the motor and fan assembly is provided in a housing that is provided at the lower end of the finger guard.

9. The hand vacuum cleaner of clause 9 wherein the handle has a lower end that is provided on the housing.

10. The hand vacuum cleaner of clause 2 wherein the handle has a lower end that is spaced from the upper end of the handle, a handle axis extends through the handle from the lower end of the handle to the upper end of the handle and the handle axis intersects the air treatment chamber.

11. The hand vacuum cleaner of clause 1 wherein the air treatment chamber air outlet is provided at a rear end of the air treatment chamber.

12. The hand vacuum cleaner of clause 11 further comprising a pre-motor filter that is positioned forward of the air treatment chamber and the air flow path comprises a downstream portion that extends from the air treatment chamber air outlet to the clean air outlet and the downstream portion comprises a passage that extends from the rear end of the air treatment chamber to the front end of the air treatment chamber.

13. The hand vacuum cleaner of clause 12 wherein the passage extends through the air treatment chamber.

14. The hand vacuum cleaner of clause 12 wherein the passage extends axially exterior to the air treatment chamber.

15. The hand vacuum cleaner of clause 11 wherein the air flow path comprises a downstream portion that extends from the air treatment chamber air outlet to the clean air outlet and the downstream portion comprises a passage that extends from the rear end of the air treatment chamber to the front end of the air treatment chamber.

16. The hand vacuum cleaner of clause 15 wherein the passage extends through the air treatment chamber.

17. The hand vacuum cleaner of clause 15 wherein the passage extends axially exterior to the air treatment chamber.

18. The hand vacuum cleaner of clause 15 wherein the handle has an upper end provided on a sidewall of the hand vacuum cleaner and the handle extends outwardly from the sidewall, the hand vacuum cleaner further comprises a finger guard provided forward of the handle and a portion of the air flow path extends through the finger guard.

19. The hand vacuum cleaner of clause 18 wherein the motor and fan assembly is provided in a housing that is provided at the lower end of the finger guard.

20. The hand vacuum cleaner of clause 1 wherein the air treatment chamber air outlet is provided at the front end of the air treatment chamber.

21. The hand vacuum cleaner of clause 20 further comprising a dirt collection chamber exterior to the air treatment chamber wherein, in operation, dirt separated from air in the air treatment chamber enters the dirt collection chamber through the dirt outlet and the dirt outlet is provided at the rear end of the air treatment chamber.

22. The hand vacuum cleaner of clause 1 wherein a rear end of the dirt collection chamber is opened concurrently with the rear end of the air treatment chamber.

23. The hand vacuum cleaner of clause 20 further comprising a pre-motor filter that is positioned forward of the air treatment chamber.

24. The hand vacuum cleaner of clause 23 wherein the handle has an upper end provided on a sidewall of the hand vacuum cleaner and the handle extends outwardly from the sidewall, the hand vacuum cleaner further comprises a finger guard provided forward of the handle and a portion of the air flow path extends through the finger guard.

25. The hand vacuum cleaner of clause 24 wherein the motor and fan assembly is provided in a housing that is provided at the lower end of the finger guard.

Clause Set H

1. A hand vacuum cleaner comprising:

(a) an air flow path from a retractable telescoping dirty air inlet, which is provided at a front end of the hand vacuum cleaner, to a clean air outlet, which is positioned rearward of the dirty air inlet;

(b) an air treatment assembly comprising an air treatment chamber, the air treatment chamber comprising an air treatment chamber air inlet, an air treatment chamber air outlet and a central longitudinal axis that extends centrally through the air treatment chamber from a front end of the air treatment chamber to a rear end of the air treatment chamber;

(c) a motor and fan assembly; and, (d) a handle.

2. The hand vacuum cleaner of clause 1 wherein the retractable telescoping dirty air inlet comprises a first telescoping section and a second telescoping section that is slideably engaged with the first telescoping section.

3. The hand vacuum cleaner of clause 2 wherein the retractable telescoping dirty air inlet comprises a third telescoping section that is slideably engaged with the second telescoping section.

4. The hand vacuum cleaner of clause 2 wherein the first telescoping section has a downstream outlet port through which, in operation, air enters the air treatment chamber.

5. The hand vacuum cleaner of clause 2 wherein the air treatment chamber comprises a cyclone chamber, the air treatment chamber air inlet is a cyclone air inlet and the first telescoping section has a downstream outlet that extends to the cyclone air inlet.

6. The hand vacuum cleaner of clause 1 wherein an inlet end of the retractable telescoping dirty air inlet comprises an electrical connector.

7. The hand vacuum cleaner of clause 6 wherein a power cable extends rearwardly from the electrical connector with the retractable telescoping dirty air inlet.

8. The hand vacuum cleaner of clause 7 wherein a power cable extends exterior to the retractable telescoping dirty air inlet.

9. The hand vacuum cleaner of clause 7 wherein a power cable extends interior to the retractable telescoping dirty air inlet.

10. The hand vacuum cleaner of clause 7 wherein the retractable telescoping dirty air inlet comprises a first telescoping section and a second telescoping section that is slideably engaged with the first telescoping section and a power cable is provided in an inner or outer surface of the first and second telescoping sections.

11. The hand vacuum cleaner of clause 1 wherein the retractable telescoping dirty air inlet comprises a first telescoping section and a second telescoping section that is slideably engaged with the first telescoping section and retractable into the first telescoping section and the first telescoping section is permanently mounted as part of the hand vacuum cleaner.

12. The hand vacuum cleaner of clause 11 wherein the second telescoping section is disengagable with the first telescoping section.

13. The hand vacuum cleaner of clause 11 wherein an inlet end of the retractable telescoping dirty air inlet comprises an electrical connector.

14. The hand vacuum cleaner of clause 13 wherein a power cable extends rearwardly from the electrical connector with the retractable telescoping dirty air inlet.

15. The hand vacuum cleaner of clause 13 wherein the second telescoping section is disengagable with the first telescoping section.

16. The hand vacuum cleaner of clause 15 wherein a power cable extends rearwardly from the electrical connector with the retractable telescoping dirty air inlet.

Clause Set I

1. A hand vacuum cleaner comprising:

(a) an air flow path from a dirty air inlet, which is provided at a front end of the hand vacuum cleaner, to a clean air outlet, which is positioned rearward of the dirty air inlet, wherein a hand vacuum cleaner axis extends centrally from the front end of the hand vacuum cleaner rearwardly to a rear end of the hand vacuum cleaner;

(b) an air treatment assembly comprising a front wall, a rear wall, an air treatment assembly wall extending from the front wall to the rear wall, the air treatment assembly wall comprising a lower wall portion, a porous member extending from one of the front and rear walls to the lower wall portion;

(c) a motor and fan assembly provided in a motor housing, the motor and fan assembly having a motor axis of rotation; and, (d) a handle, wherein the air treatment assembly comprises a stationary portion and an openable portion, the openable portion is moveable between an open position in which the air treatment assembly is opened and a closed position in which the hand vacuum cleaner is operable to clean a surface.

2. The hand vacuum cleaner of clause 1 wherein the openable portion is provided on the lower side of the hand vacuum cleaner.

3. The hand vacuum cleaner of clause 1 wherein the openable portion comprises at least a portion of the lower wall portion.

4. The hand vacuum cleaner of clause 1 wherein the lower wall portion comprises a bottom wall and the openable portion comprises at least a portion of the bottom wall.

5. The hand vacuum cleaner of clause 1 wherein the air treatment assembly comprises an air treatment chamber and a dirt collection region.

6. The hand vacuum cleaner of clause 5 wherein the porous member is provided in the dirt collection region.

7. The hand vacuum cleaner of clause 6 wherein the front wall of the air treatment assembly comprises a front wall of the dirt collection region, the lower wall portion of the air treatment assembly comprises a lower wall portion of the dirt collection region, and the porous member extends from front wall of the dirt collection region to the lower wall portion of the dirt collection region.

8. The hand vacuum cleaner of clause 6 wherein the rear wall of the air treatment assembly comprises a rear wall of the dirt collection region, the lower wall portion of the air treatment assembly comprises a lower wall portion of the dirt collection region, and the porous member extends from rear wall of the dirt collection region to the lower wall portion of the dirt collection region.

9. The hand vacuum cleaner of clause 5 wherein the dirt collection region comprises a dirt collection chamber that is external to the air treatment chamber.
10. The hand vacuum cleaner of clause 9 wherein the front wall of the air treatment assembly comprises a front wall of the dirt collection chamber, the lower wall portion of the air treatment assembly comprises a lower wall portion of the dirt collection chamber, and the porous member extends from front wall of the dirt collection chamber to the lower wall portion of the dirt collection chamber.
11. The hand vacuum cleaner of clause 9 wherein the rear wall of the air treatment assembly comprises a rear wall of the dirt collection chamber, the lower wall portion of the air treatment assembly comprises a lower wall portion of the dirt collection chamber, and the porous member extends from rear wall of the dirt collection chamber to the lower wall portion of the dirt collection chamber.
12. The hand vacuum cleaner of clause 1 wherein the air treatment assembly comprises a cyclone chamber.
13. The hand vacuum cleaner of clause 12 wherein the air treatment assembly further comprises a dirt collection chamber that is external to the cyclone chamber.
14. The hand vacuum cleaner of clause 1 wherein the porous member comprises a screen.
15. The hand vacuum cleaner of clause 1 wherein the porous member is planar.
16. The hand vacuum cleaner of clause 1 wherein a sub collection area is located between the one of the front and rear walls to the lower wall portion and the sub collection area is opened when the openable portion is opened.
17. The hand vacuum cleaner of clause 16 wherein the porous member remains in position when the openable portion is moved to the open position.
18. The hand vacuum cleaner of clause 17 wherein the openable portion comprises a closure member which opens the porous member when the openable portion is moved to the open position.
19. The hand vacuum cleaner of clause 17 wherein an opening is provided between the porous member and the openable portion and the closure member closes the opening when the openable portion is moved to the closed position.
20. The hand vacuum cleaner of clause 1 wherein the dirty air inlet is provided at an upper end of the hand vacuum cleaner.

The invention claimed is:

1. A hand vacuum cleaner comprising:

(a) an air flow path from a dirty air inlet, which is provided at a front end of the hand vacuum cleaner, to a clean air outlet, which is positioned rearward of the dirty air inlet, wherein a hand vacuum cleaner axis extends centrally from the front end of the hand vacuum cleaner rearwardly to a rear end of the hand vacuum cleaner;

(b) a cyclone assembly comprising:

(i) a cyclone chamber having an upper end, a lower end, a cyclone chamber sidewall extending between the upper and lower ends of the cyclone chamber, a cyclone air inlet, a cyclone air outlet provided at the upper end of the cyclone chamber, a dirt outlet provided at the lower end of the cyclone chamber and a cyclone axis of rotation, wherein the cyclone axis of rotation extends generally transverse to the hand vacuum cleaner axis; and (ii) a dirt collection chamber exterior to the cyclone chamber wherein, in operation, dirt separated from air in the cyclone chamber enters the dirt collection chamber through the dirt outlet, the dirt collection chamber comprises first portion that underlies the cyclone chamber, a second portion that is forward of the cyclone chamber and a third portion that is forward of the cyclone chamber and above the second portion of the dirt collection chamber;

(c) a motor and fan assembly provided in a motor housing, the motor and fan assembly having a motor axis of rotation; and, (d) a handle, wherein a first line that extends in a common horizontal direction with the hand vacuum cleaner axis extends through the cyclone chamber and the third portion of the dirt collection chamber, and wherein a front wall of the cyclone assembly is openable whereby the second portion of the dirt collection chamber is openable while a lower end of the first portion of the dirt collection chamber is closed and a second line that extends in a common horizontal direction with the hand vacuum cleaner axis extends through the first and second portions of the dirt collection chamber.

2. The hand vacuum cleaner of claim 1 wherein:

(a) the first portion has a first portion length in a horizontal direction of the hand vacuum cleaner axis;

(b) the second portion has a height in a vertical direction of the cyclone axis of rotation from a lower end of the dirt collection chamber to a lower plane that is transverse to the cyclone axis of rotation and is positioned at a lower end of the cyclone chamber sidewall, and the second portion has a second portion length in the horizontal direction; and, (c) the third portion has a height in the vertical direction from the lower plane to an upper end of the dirt collection chamber.

3. The hand vacuum cleaner of claim 2 wherein the cyclone inlet has an inlet height in the vertical direction, the second portion of the dirt collection chamber has a second portion height that is about half the inlet height and a ratio of the second portion length to the first portion length is from 1.25 to 2.25 and optionally about 1.75.

4. The hand vacuum cleaner of claim 2 wherein the cyclone inlet has an inlet height in the vertical direction, the second portion of the dirt collection chamber has a second portion height that is about the inlet height and a ratio of the second portion length to the first portion length is from 1.1 to 1.5 and optionally about 1.25.

5. The hand vacuum cleaner of claim 1 wherein the cyclone assembly has a lower wall and the cyclone chamber sidewall has a lower end that is spaced above the lower wall of the cyclone assembly wherein the dirt outlet is a lower open end of the cyclone chamber at a location of the lower end of the cyclone chamber sidewall.

6. The hand vacuum cleaner of claim 1 wherein the lower end of the cyclone chamber comprises a lower end wall and the dirt outlet comprises an opening between the lower end wall and a lower end of the cyclone chamber sidewall.

7. The hand vacuum cleaner of claim 1 wherein the dirty air inlet is provided at an upper end of the hand vacuum cleaner.

8. The hand vacuum cleaner of claim 1 wherein the cyclone assembly has an openable lower end of the cyclone assembly that is moveable between a closed position in which the hand vacuum cleaner is operable to clean a surface and an open position in which the cyclone and the dirt collection chamber are opened.

9. The hand vacuum cleaner of claim 8 wherein the openable end includes at least a portion of the front wall of the cyclone assembly.

10. The hand vacuum cleaner of claim 1 wherein the air flow path comprises an upstream portion extending from the dirty air inlet to the cyclone air inlet and at least a portion of the dirty air inlet extends through the dirt collection chamber.

11. The hand vacuum cleaner of claim 1 wherein the air flow path comprises an upstream portion extending from the dirty air inlet to the cyclone air inlet and at least a portion of the dirty air inlet extends through the third portion of the dirt collection chamber.

12. A hand vacuum cleaner comprising:

(a) an air flow path from a dirty air inlet, which is provided at a front end of the hand vacuum cleaner, to a clean air outlet, which is positioned rearward of the dirty air inlet, wherein a hand vacuum cleaner axis extends centrally from the front end of the hand vacuum cleaner rearwardly to a rear end of the hand vacuum cleaner;

(b) a cyclone assembly comprising:

(i) a cyclone chamber having an upper end, a lower end, a cyclone chamber sidewall extending between the upper and lower ends of the cyclone chamber, a cyclone air inlet, a cyclone air outlet provided at the upper end of the cyclone chamber, a dirt outlet provided at the lower end of the cyclone chamber and a cyclone axis of rotation, wherein the cyclone axis of rotation extends generally transverse to the hand vacuum cleaner axis, wherein the lower end of the cyclone chamber comprises a lower end wall and the dirt outlet comprises an opening between the lower end wall and a lower end of the cyclone chamber sidewall; and (ii) a dirt collection chamber exterior to the cyclone chamber wherein, in operation, dirt separated from air in the cyclone chamber enters the dirt collection chamber through the dirt outlet;

(c) a motor and fan assembly provided in a motor housing, the motor and fan assembly having a motor axis of rotation; and, (d) a handle, wherein the dirt collection chamber comprises:

(i) a first portion that underlies the cyclone chamber, the first portion has a first portion length in a horizontal direction of the hand vacuum cleaner axis;

(ii) a second portion that is forward of the cyclone chamber, the second portion has a height in a vertical direction of the cyclone axis of rotation from a lower end of the dirt collection chamber to a lower plane that is transverse to the cyclone axis of rotation and is positioned at a lower end of the cyclone chamber sidewall, and the second portion has a second portion length in the horizontal direction, wherein at least a portion of a front wall of the cyclone assembly is openable whereby the second portion of the dirt collection chamber is openable while the dirt collection chamber is otherwise closed.

13. The hand vacuum cleaner of claim 12 wherein a ratio of the second portion length to the first portion length is greater than 1.5.

14. The hand vacuum cleaner of claim 12 wherein the ratio of the second portion length to the first portion length is from 1.5 to 3 or 1.5 to 2.

15. The hand vacuum cleaner of claim 12 wherein the dirt collection chamber comprises a third portion that is forward of the cyclone chamber and has a height in the vertical direction from the lower plane to an upper end of the dirt collection chamber, and wherein the cyclone inlet has an inlet height in the vertical direction, the second portion of the dirt collection chamber has a second portion height that is about half the inlet height and a ratio of the second portion length to the first portion length is from 1.25 to 2.25 and optionally about 1.75.

16. The hand vacuum cleaner of claim 12 wherein the dirt collection chamber comprises a third portion that is forward of the cyclone chamber and has a height in the vertical direction from the lower plane to an upper end of the dirt collection chamber, and wherein the cyclone inlet has an inlet height in the vertical direction, the second portion of the dirt collection chamber has a second portion height that is about the inlet height and a ratio of the second portion length to the first portion length is from 1.1 to 1.5 and optionally about 1.25.

17. The hand vacuum cleaner of claim 12 wherein the air flow path comprises an upstream portion extending from the dirty air inlet to the cyclone air inlet and at least a portion of the dirty air inlet extends through the dirt collection chamber.

18. The hand vacuum cleaner of claim 12 wherein the dirt collection chamber comprises a third portion that is forward of the cyclone chamber and has a height in the vertical direction from the lower plane to an upper end of the dirt collection chamber, and the air flow path comprises an upstream portion extending from the dirty air inlet to the cyclone air inlet and at least a portion of the dirty air inlet extends through the third portion of the dirt collection chamber.

19. The hand vacuum cleaner of claim 12 wherein a lower end of the cyclone assembly is moveable between a closed position in which the hand vacuum cleaner is operable to clean a surface and an open position in which the cyclone and the dirt collection chamber are opened.

20. The hand vacuum cleaner of claim 19 wherein openable portion includes the at least a portion of the front wall of the cyclone assembly.

* * * * *